(12) United States Patent
Bures et al.

(10) Patent No.: US 11,910,137 B2
(45) Date of Patent: Feb. 20, 2024

(54) PROCESSING TIME-SERIES MEASUREMENT ENTRIES OF A MEASUREMENT DATABASE

(71) Applicant: InfiSense, LLC, North Andover, MA (US)

(72) Inventors: Martin Ethan Bures, Somerville, MA (US); Mark Chellman D'Antonio, Stow, MA (US); Gary Jerome Epstein, Andover, MA (US); Brian Douglas McCowan, Lunenburg, MA (US); Jeffrey Nelson Perkins, Lowell, MA (US); Isaac Kolbin Wainstein, New York, NY (US)

(73) Assignee: InfiSense, Inc., North Andover, MA (US)

( * ) Notice: Subject to any disclaimer, the term of this patent is extended or adjusted under 35 U.S.C. 154(b) by 784 days.

(21) Appl. No.: 16/833,881

(22) Filed: Mar. 30, 2020

(65) Prior Publication Data

US 2020/0322703 A1    Oct. 8, 2020

Related U.S. Application Data

(60) Provisional application No. 62/830,655, filed on Apr. 8, 2019, provisional application No. 62/830,673, filed
(Continued)

(51) Int. Cl.
*H04Q 9/02*      (2006.01)
*G06F 16/27*    (2019.01)
*G06N 20/00*   (2019.01)

(52) U.S. Cl.
CPC .............. *H04Q 9/02* (2013.01); *G06F 16/27* (2019.01); *G06N 20/00* (2019.01);
(Continued)

(58) Field of Classification Search
CPC .. H04Q 9/02; H04Q 2209/10; H04Q 2209/40; H04Q 2209/826; H04Q 2209/84; H04Q 9/00; G06F 16/27; G06N 20/00
See application file for complete search history.

(56) References Cited

U.S. PATENT DOCUMENTS 5,539,637 A  *  7/1996  Upchurch  ..............  A01G 25/16
                                                    702/130
6,963,285 B2 * 11/2005  Fischer  .....................  G06F 1/30
                                                    340/635

(Continued)

*Primary Examiner* — Amine Benlagsir
(74) *Attorney, Agent, or Firm* — Garlick & Markison; Katherine C. Stuckman

(57) ABSTRACT

A method for execution by a monitoring data analysis system includes receiving a plurality of measurement data from the gateway device, each indicating a measurement generated by one of a plurality of multi-sensor units. A set of measurement entries are generated based on the plurality of measurement data, and the set of measurement entries are added to a measurement database. A custom function definition for a custom function is received from a client device based on user input to a graphical user interface. Custom function output is generated by performing the custom function on a filtered subset of the plurality of measurement entries by utilizing the custom function definition. The custom function output is transmitted to the client device for display via the graphical user interface.

20 Claims, 20 Drawing Sheets

Related U.S. Application Data on Apr. 8, 2019, provisional application No. 62/830,682, filed on Apr. 8, 2019, provisional application No. 62/830,690, filed on Apr. 8, 2019, provisional application No. 62/830,701, filed on Apr. 8, 2019, provisional application No. 62/830,709, filed on Apr. 8, 2019.

(52) U.S. Cl.
CPC ..... *H04Q 2209/10* (2013.01); *H04Q 2209/40* (2013.01); *H04Q 2209/826* (2013.01); *H04Q 2209/84* (2013.01)

(56) References Cited

U.S. PATENT DOCUMENTS

| | | | |
|---|---|---|---|
| 8,131,609 B1* | 3/2012 | Hart, Jr. | G06Q 50/06 705/29 |
| 11,085,455 B1* | 8/2021 | Combs | F04D 27/006 |
| 2005/0156587 A1* | 7/2005 | Yakymyshyn | G01R 15/207 324/117 R |
| 2005/0270173 A1* | 12/2005 | Boaz | H04Q 9/00 340/870.02 |
| 2018/0160283 A1* | 6/2018 | Stamatakis | H04W 4/70 |
| 2019/0186952 A1* | 6/2019 | Schwartz | H04L 45/22 |
| 2019/0259108 A1* | 8/2019 | Bongartz | A01G 7/045 |
| 2019/0385244 A1* | 12/2019 | Stelmar Netto | G06Q 10/06316 |
| 2020/0065628 A1* | 2/2020 | Olnick | G06F 9/542 |
| 2021/0120491 A1* | 4/2021 | Gupta | H04L 1/0015 |

* cited by examiner

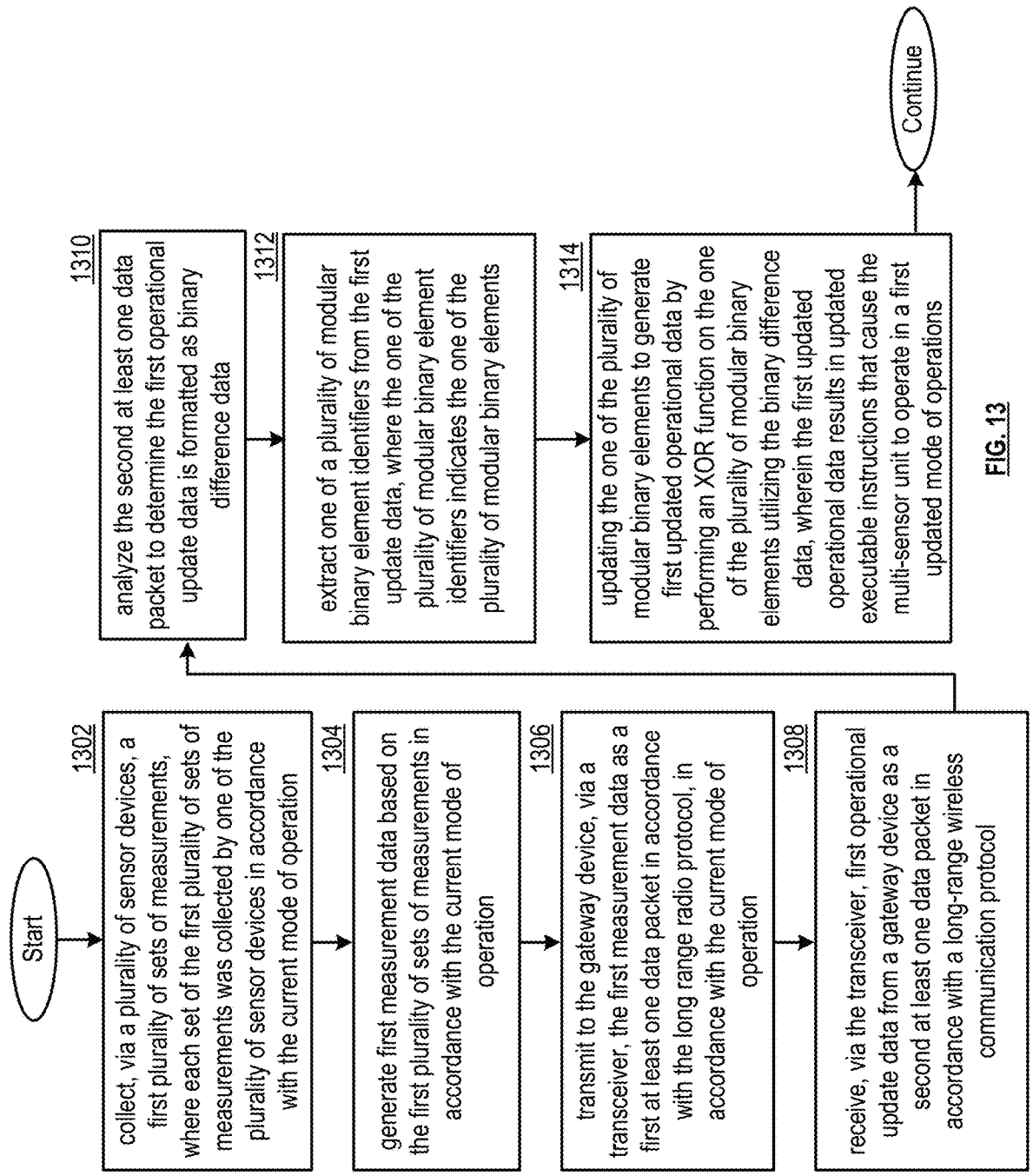

PROCESSING TIME-SERIES MEASUREMENT ENTRIES OF A MEASUREMENT DATABASE

CROSS-REFERENCE TO RELATED APPLICATIONS

The present U.S. Utility patent application claims priority pursuant to 35 U.S.C. § 119(e) to U.S. Provisional Application No. 62/830,655, entitled "COLLECTING MEASUREMENT DATA VIA SENSOR DEVICES OF A PLURALITY OF MULTI-SENSOR UNITS", filed Apr. 8, 2019; U.S. Provisional Application No. 62/830,673, entitled "ANALYZING TIME-SERIES MEASUREMENT ENTRIES OF A MEASUREMENT DATABASE", filed Apr. 8, 2019; U.S. Provisional Application No. 62/830,682, entitled "DETECTING MOTOR FAILURE CONDITIONS VIA MEASUREMENTS COLLECTED BY AT LEAST ONE MULTI-SENSOR UNIT", filed Apr. 8, 2019; U.S. Provisional Application No. 62/830,690, entitled "DETECTING POWER LOSS VIA MEASUREMENTS COLLECTED BY AT LEAST ONE MULTI-SENSOR UNIT", filed Apr. 8, 2019; U.S. Provisional Application No. 62/830, 701, entitled "FACILITATING OPERATIONAL UPDATES TO MULTI-SENSOR UNITS VIA MULTIPLE UPDATE TYPES", filed Apr. 8, 2019; and U.S. Provisional Application No. 62/830,709, entitled "GENERATING PRODUCTIVITY DATA VIA MEASUREMENTS COLLECTED BY AT LEAST ONE MULTI-SENSOR UNIT", filed Apr. 8, 2019, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to knowledge based systems used in conjunction with client/server network architectures.

BRIEF DESCRIPTION OF THE SEVERAL VIEWS OF THE DRAWING(S)

FIG. 6 illustrates an example of data fields populating a measurement entry of a measurement database in accordance with various embodiments of the present invention;

FIGS. 10-19 are flowchart representations of various methods in accordance with various embodiments of the present invention.

DETAILED DESCRIPTION OF THE INVENTION

Figure 1:
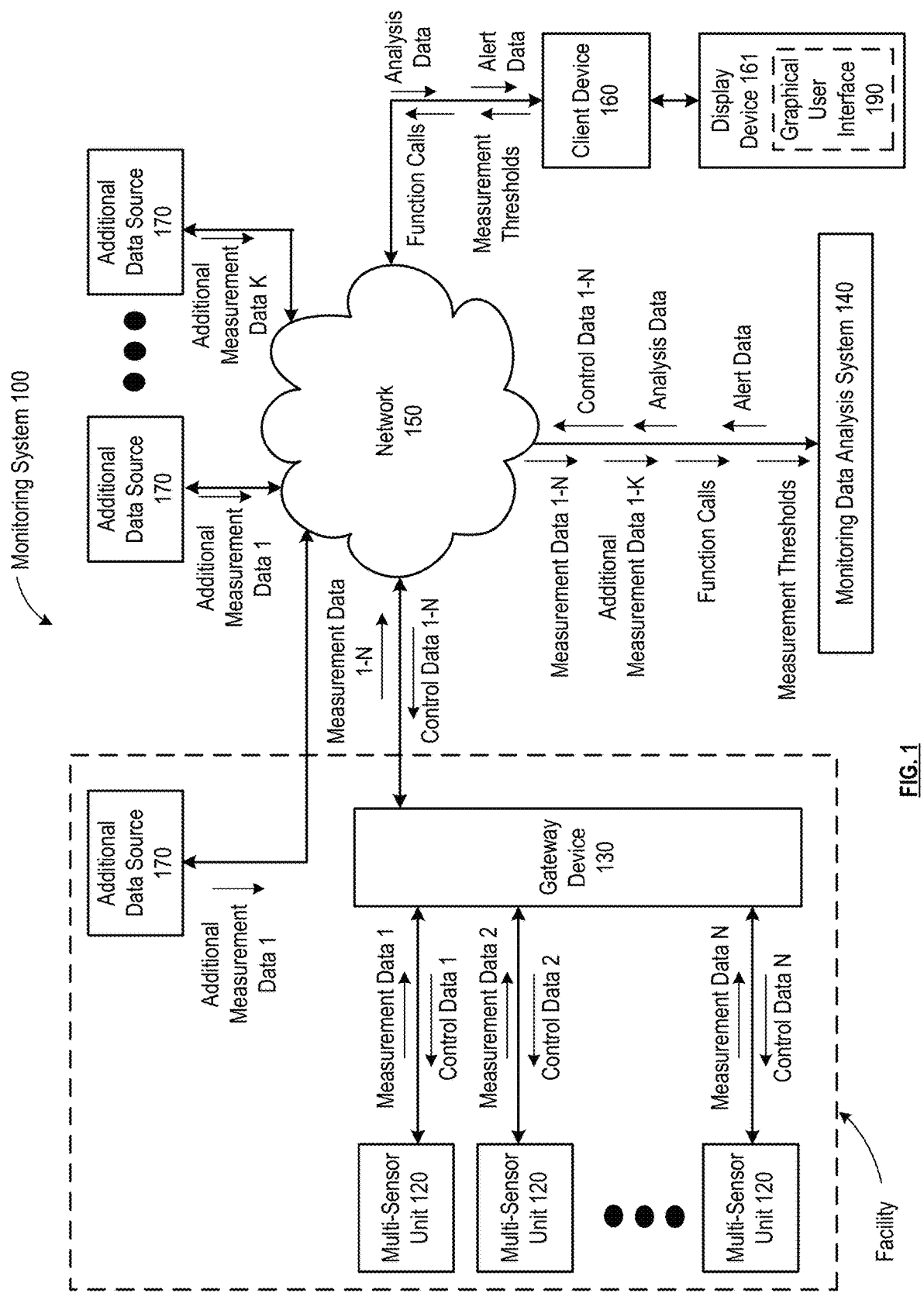
FIG. 1 is a schematic block diagram of an embodiment of a monitoring system in accordance with the present invention.

FIG. 1 illustrates a monitoring system 100. The monitoring system 100 can include a plurality of multi-sensor units 120, at least one gateway device 130, a monitoring data analysis system 140, a plurality of client devices 160, and/or a plurality of additional data sources 170.

Each multi-sensor unit 120 can communicate bidirectionally with the gateway device 130, for example, where a multi-sensor unit communicates with the gateway device 130 via electromagnetic signals broadcasted by the multi-sensor unit, and/or where the gateway device 130 communicates with each multi-sensor unit 120 via electromagnetic signals broadcasted by the gateway device. In some embodiments, each multi-sensor unit 120 communicates exclusively with the gateway device 130.

The gateway device 130 can communicate bidirectionally with the monitoring data analysis system 140, for example via wired and/or wireless network 150. Each of the plurality of additional data sources 170 can communicate bidirectionally with the monitoring data analysis system 140, for example, via the same or different network 150. Each of the plurality of client devices 160 can communicate bidirectionally with the monitoring data analysis system 140, for example, via the same or different network 150. Network 150 can include the Internet, cellular communications, an Ethernet connection, a Local Area Network, a fiber optic connection, short range radio transmissions, long range radio transmissions, satellite communications, a low-power wide area network, and/or other wired and/or wireless communication.

Monitoring system 100 can be implemented to monitor environmental, electrical, and/or operational activity at an indoor and/or outdoor facility. The plurality of multi-sensor units 120 can be installed in various locations within the facility and/or in the vicinity of the facility, for example, dispersed across the facility based on the physical range of their various sensors, dispersed across the facility based on particular locations of interest in the facility, such as physical zones of interest within the facility and/or in proximity of the facility. Multi-sensor units 120 can each include its own set of various sensors, and can each generate measurement data by utilizing its set of sensors to a set of environmental measurements, electrical measurements, operational measurements, or other raw and/or processed sensor measurements. Measurement data can be repeatedly collected over time, and can be sent to the gateway device in data packet transmissions over time as it is collected. The gateway device 130 can thus receive measurement data from some or all of the plurality of multi-sensor units 120 over time. As illustrated in FIG. 1, gateway device 130 can receive measurement data 1-N, each transmitted by one of a set of multi-sensor units 120.

The gateway device 130 can forward the measurement data 1-N received from the plurality of multi-sensor units 120 to the monitoring data analysis system 140. The monitoring system can also receive each of a set of additional measurement data 1-K, transmitted from each of a set of additional data sources 170. The monitoring data analysis system 140 can process incoming data received from the gateway device 130 and/or additional data sources 170 to extract a plurality of individual measurement values, to further extract which particular sensor device of a particular sensor device captured each of the plurality of individual measurement values, and/or to further extract a particular time that each individual measurement value was captured. This information can be utilized to populate a measurement database of the monitoring data analysis system 140 with time-series data corresponding to measurements taken by the various sensors of the various multi-sensor units 120 and/or additional data sources 170 over time.

The monitoring data analysis system 140 can generate control data 1-N, each designated for transmission to a corresponding one of the set of multi-sensor units 120, via gateway device 130. The control data can indicate how rich of measurements and/or how often measurement is collected by various sensors of each multi-sensor units 120; can indicate how measurements are is processed, packeted, and scheduled for transmission by each multi-sensor units 120; can indicate how much bandwidth is allocated to each multi-sensor units 120 as a whole; can indicate measurement thresholds utilized to dictate whether or not a condition of interest is detected and/or whether or not collected measurements should be transmitted; and/or include updates to firmware, software platform, and/or functionality of the multi-sensor units 120. Some of all of the control data, such as measurement thresholds and/or update instructions, can be generated automatically by monitoring data analysis system 140 and/or can be generated by client device 160 via user interaction with graphical user interface 190 displayed on a display device 161.

The monitoring data analysis system 140 can analyze data collected in the measurement database automatically and/or in response to queries and/or function calls received from or more client devices 160 via graphical user interface 190. This analysis can be utilized, for example, to calculate statistical trends; automatically determine correlated types of information; automatically determine monitoring priority of different locations, features, and/or measurable conditions in the facility; automatically determine highest entropy data or otherwise optimal raw and/or processed data to be sent by some or all multi-sensor units 120 based on these determined statistical trends, correlated types of information, monitoring priority, and/or bandwidth constraints; to generate instructions to update the mode of operation of some or all multi-sensor units based on the automatically determined highest entropy data or otherwise optimal raw and/or processed data; train machine learning models; utilize the machine learning models to generate inference data predicting current conditions and/or future conditions; automatically generate heat map data illustrating current and/or predicted conditions across different locations within the facility; automatically determine optimal environmental and/or electrical conditions for different parts of the facility; automatically determine specialized optimal environmental and/or electrical conditions for different features in the facility; automatically detect anomalies, detect non-optimal conditions, and/or detect other conditions of interest by utilizing user-defined functions and/or inference data generated by inference functions; automatically generate alert data to alert users, personnel and/or customers of detected anomalies and/or detected non-optimal conditions via a notification to a client devices 160 associated with the users personnel and/or customers; automatically generate updated control data for transmission, via the gateway, to one or more multi-sensor units to cause the one or more multi-sensor units 120 to change the rate of collection and/or richness of collection of one or more of their sensors in response to a detected anomalies and/or non-optimal conditions; and/or automatically generate control data for transmission to equipment in the facility to adjust current electrical and/or environmental conditions to detected anomalies and/or detected non-optimal conditions.

Some or all of this analysis data and/or alert data can be transmitted to one or more client devices 160 for display via a graphical user interface 190 corresponding to users such as administrators of the monitoring system 100 and/or personnel and/or customers of the facility. Some or all of these features can be configured and/or facilitated by a user via user input to the graphical user interface 190 of the client device 160, and/or some or all of these features can be performed with no human intervention.

Figure 2:
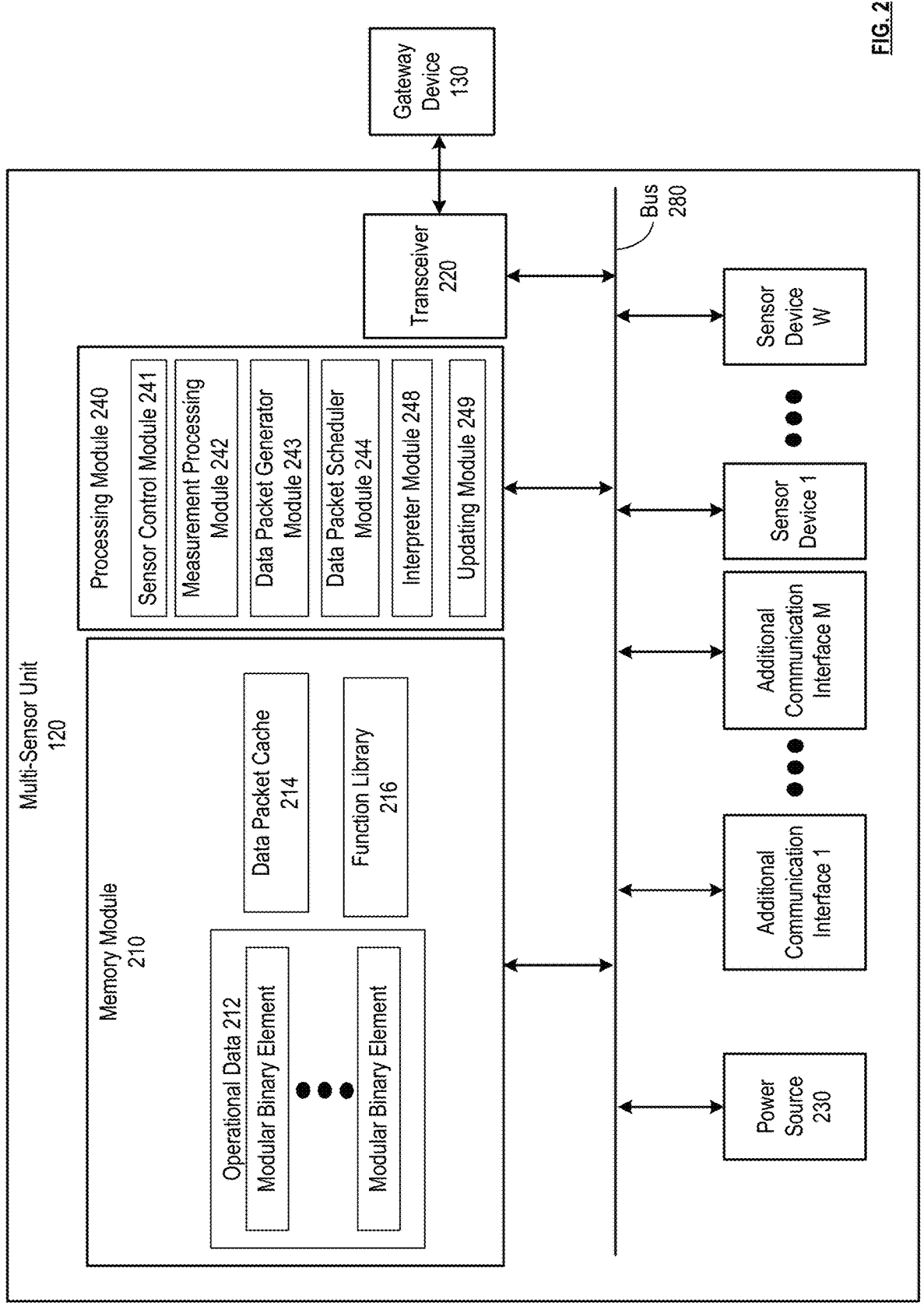
FIG. 2 is a schematic block diagram of a multi-sensor unit in accordance with various embodiments of the present invention.

FIG. 2 illustrates an embodiment of a multi-sensor unit 120. A multi-sensor unit 120 can include a memory module 210, a transceiver 220, a power source 230, a processing module 240, and set of sensor devices 1-W, and/or additional communication interfaces 1-M, all communicating and/or coupled via bus 280.

Bus 280 can be implemented by utilizing a single printed circuit board (PCB) and/or multiple PCBs, where some or all of the memory module 210, transceiver 220, power source 230, processing module 240, sensor devices 1-W, and/or additional communication interfaces 1-M are mounted to a single PCB of the multi-sensor unit 120 or multiple, interconnected PCBs of the multi-sensor unit 120. Alternatively, bus 280 can include one or more other wired and/or wireless connections.

Transceiver 220 can be implemented utilizing a radio transceiver, network interface, and/or other communications interface. This can include a LoRa transceiver, a long-range wireless communication transceiver, a 3G, 4G, 5G or other cellular wireless transceiver; a Bluetooth transceiver; a Wi-Fi transceiver; an UltraWideBand transceiver, a WIMAX transceiver; a ZigBee transceiver or other wireless interface, a Universal Serial Bus (USB) interface; an IEEE 1394 Firewire interface; an Ethernet interface or other wired interface; and/or other network card or modem for transmitting and/or receiving data as discussed herein. The transceiver 220 can be implemented in accordance with a low-power wide area network (LPWAN) protocol.

Alternatively or in addition, some or all of these radio transceivers, network interfaces, and/or other communications interfaces can be utilized to implement one or more additional communication interfaces 1-M that are also included in the multi-sensor unit 120. For example, these additional communication interfaces 1-M can be configured to support bi-directional communication between the multi-sensor unit and multiple other computing devices such as additional sensors, client devices 160, additional data sources 170, monitoring data analysis system 140, equipment that regulates environmental and/or electrical conditions that can be controlled, and/or other computing devices operable to communicate with the multi-sensor unit 120 via an additional communication interface. One or more additional communication interfaces can be operable to communicate with the gateway device 130, for example, to facilitate multiple types of communication between multi-sensor unit and gateway device that are utilized for different purposes and/or different types of data.

The additional communication interfaces 1-M can all be different from the transceiver 220. Alternatively, at least one of the additional communication interfaces 1-M can be the same as transceiver 220. Some additional communication interfaces 1-M can be identical, can be operable to support the same type of communication, and/or can be configured to communicate with the same computing device. Alternatively, all additional communication interfaces 1-M can be unique and/or can facilitate unique types of communications. In some embodiments, no additional communication interfaces are included, and transceiver 220 alone is operable to transmit and/or receive data via a corresponding communications protocol, for example, where no other communication protocols are supported by multi-sensor unit 120.

Transceiver 220 can be implemented by utilizing a radio transceiver and/or a network interface. Transceiver 220 can be operable to transmit and/or receive radio signals in accordance with a particular communication protocol. In particular, transceiver 220 can be configured to communicate bidirectionally with gateway device 130, for example, where gateway device 130 utilizes a transceiver that is the same as transceiver 220 and/or where gateway device is otherwise configured to utilize the same radio frequency band and/or the same communications protocol as transceiver 220.

In some embodiments, transceiver 220 is configured to receive and/or transmit signals in accordance with a long-range wireless communication protocol, for example, enabling the multi-sensor unit 120 to communicate bidirectionally with a corresponding low-power network and/or a low-power, wide-area network. For example, the low-power network and/or the low-power, wide-area network can utilize a star topology to facilitate the bi-directional communication between and one or more gateway devices 130 and some or all multi-sensor units 120 within one or more facilities of the monitoring system 100. In some embodiments, the low-power network and/or low-power wide-area network spans multiple kilometers, and/or can otherwise facilitate communication between a gateway devices 130 and a multi-sensor unit 120 that are multiple kilometers apart.

The transceiver 220 can be configured to operate in a particular frequency band, such as a 169 MHz frequency band, a 443 MHz frequency band, a 868 MHz frequency band, a 915 MHz frequency band, and/or another frequency band operable to support long-range wireless communication transmissions and/or to otherwise support the transmission of signals generated and/or transmitted by transceiver 220. The transceiver 220 can be configured to support communications via a plurality of channels within the particular frequency band.

The transceiver 220 can further utilize a spread spectrum modulation technique, such as a chirp spread spectrum modulation and/or another spread spectrum modulation technique to generate the measurement data signals transmitted by the transceiver 220. For example, transceiver 220 can be configured to generate measurement data signals by performing a modulation function on data packets generated by the data packet generator module 243.

In some embodiments, the transceiver 220 can be implemented by utilizing a LoRa transceiver and/or another transceiver operable to transmit and/or receive communications utilizing a LoRa communications protocol and/or a LoRa wide area networking protocol. Alternatively, a different long-range wireless communication protocol, a different communications protocol designated to support low-power devices, a different communications protocol designated to support long ranges, and/or another communication protocol can be utilized to facilitate communication between a multi-sensor unit 120 and the gateway device 130.

Sensor devices 1-W can include a single sensor device, or can include multiple sensor devices. The sensor devices 1-W can include multiple identical sensor devices, for example, operable to collect measurements from different directions, different locations, and/or different features in proximity to the multi-sensor unit 120. The sensor devices 1-W can include multiple sensor devices that are operable to collect the same type of measurement. Alternatively, the sensor devices can include distinct sensor devices that are each operable to collect a distinct type of measurement.

The sensor devices 1-W can utilize power source 230 of the multi-sensor unit to collect measurements. In some embodiments, at least one of the sensor devices 1-W can include its own processor, memory, and/or communication interface, which can be utilized by the sensor device to collect its measurements, pre-process its measurements, timestamp its measurements, and/or send its measurements to the processing module 240 and/or memory module 210 of the multi-sensor unit.

Memory module 210 can be implemented by utilizing a computer readable memory, one or more memory devices, and/or one or more other memory elements. Memory module 210 can store operational data 212, which can be executed and/or utilized by the processing module 240 to perform operations and/or functionality of the multi-sensor unit 120 discussed herein. The operational data 212 can be configurable and/or updated based on control data received via the transceiver 220 and/or received via at least one other one of the additional communication interfaces 1-M.

For example, the operational data 212 can indicate a current mode of operation. The current mode of operation can correspond to current functionality and/or currently utilized executable instructions. The processing module can execute the operational data to cause the multi-sensor unit 120 to operate in accordance with the current mode of operation. The current mode of operation can correspond to a currently utilized software, firmware, and/or operating system version. The current mode of operation can correspond to currently utilized variable values and/or other parameter values stored in memory module 210, such a unit weight prioritizing the multi-sensor unit relative to other multi-sensor units, sensor device weights prioritizing the sensor devices 1-W, power constraint data, a maximum data transmission rate, and/or other variables discussed herein that dictate current functionality. Changing from a current mode of operation to an updated mode of operation can correspond to a software update, firmware update, operating system update, changes to variable values and/or other parameter values, and/or can otherwise cause at least one change in the functionality and/or operations of the multi-sensor unit 120.

Processing module 240 can be implemented by utilizing one or more processing devices, and can be operable to execute operational instructions of the operational data 212 to perform functions and/or operations of the multi-sensor unit. The processing module can include a sensor control module 241, measurement processing module 242, data packet generator module 243, data packet scheduling module 244, and/or an updating module 249. Operational data 212 can be utilized by the processing module 240 to operate the sensor control module 241, measurement processing module 242, data packet generator module 243, data packet scheduling module 244, and/or an updating module 249 of the processing module 240.

Figure 3:
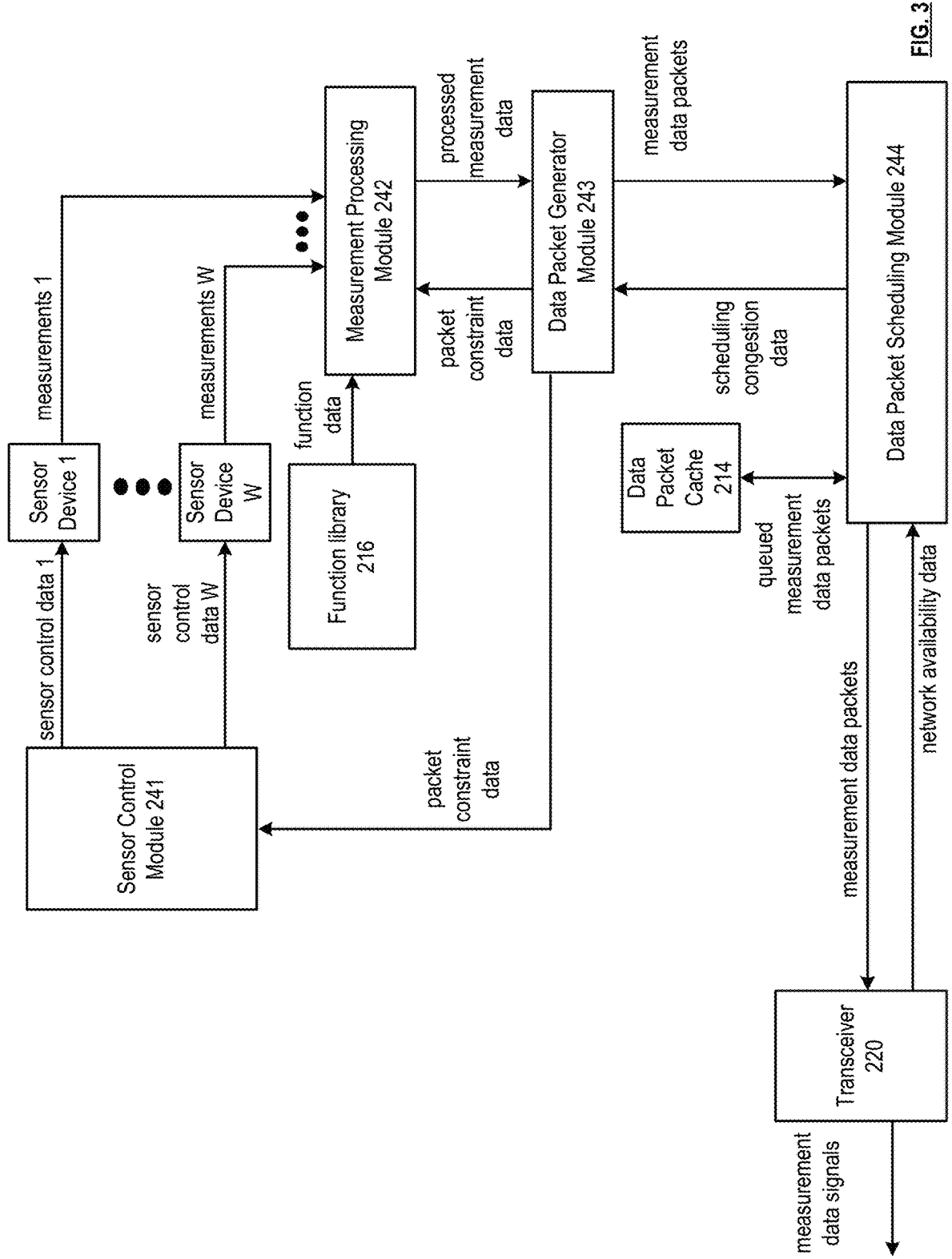
FIG. 3 is a schematic block diagram illustrating functionality of a multi-sensor unit in accordance with various embodiments of the present invention.

An example embodiment illustrating functionality of a multi-sensor unit 120 via execution of the operation data 212 by the various components of the processing module 240 is illustrated in FIG. 3. At least one of the sensor devices 1-W can collect its measurements in accordance with the sensor control data generated by the sensor control module 241. For example, this sensor control data can be generated by the sensor control module in accordance with a current mode of operation and/or in response to changing from a previous mode of operation to the current mode of operation. Alternatively, this sensor control data can be determined and generated automatically by the sensor control module 241 based on current constraints to the multi-sensor unit 120, such as packet constraint data received from data packet generator module 243 or otherwise determined by processing module 240.

The sensor control data generated by and/or received from the sensor control module 241 can cause a sensor device to turn on and/or off; cause the sensor device to collect a single measurement, cause the sensor device to begin measurement collection and/or stop measurement collection; cause the sensor device to change its frequency of measurement collection; cause the sensor device to change its resolution, precision, quality, and/or amount of data collected in each time frame dictated by the frequency; cause the sensor device to change its resolution and/or quality of collected audio data, image data, video data, and/or other media data; cause the sensor device to consume more or less power from the power source 230 in collecting its measurements; and/or otherwise can dictate how often the sensor device collects data, how much data is collected by the sensor device, and/or how much power is consumed by the sensor device.

The current mode of operation can indicate a first proper subset of sensor devices 1-W that are to be turned on, powered by the power source, and/or operable to be collecting measurements. The current mode of operation can indicate a second proper subset of sensor devices 1-W that are to be turned off, unpowered by the power source, and/or not operable to be collecting measurements. This first and second proper subset of sensor devices 1-W can be mutually exclusive and collectively exhaustive with respect to the set of sensor devices 1-W. The number of subsets in the first subset can be determined based on how many sensor devices can be powered given power constraint data of the current mode of operation. The sensor devices selected to be included in the first subset can be based on weights and/or priorities of the sensor devices and/or different types data collected by the sensor devices, where higher priority sensor devices are turned on and where lower priority devices are turned off. A change to an updated mode of operation can cause an update to the first and second proper subset of sensor devices 1-W. For example, at least one sensor device that was previously turned on, powered by the power source, and/or operable to be collecting measurements is changed to be turned off, unpowered by the power source, and/or not operable to be collecting measurements in response to the change to the updated mode of operation. Alternatively or in addition, at least one sensor device that was previously turned off, unpowered by the power source, and/or not operable to be collecting measurements is changed to be turned on, powered by the power source, and/or operable to be collecting measurements in response to the change to the updated mode of operation.

The current mode of operation can indicate an allocation of power generated by the power source that is to be delivered and/or made available to each the set of sensor devices 1-W. For example, the current mode of operation and/or sensor control data generated by the sensor control module 241 can dictate that a first one of the set of sensor devices be allocated a first non-zero fraction of power, and can dictate that a second one of the set of sensor devices be allocated a second non-zero fraction of power that is different from the first non-zero fraction of power. The allotment of power can be proportional to, and/or an increasing function of, the sensor device weights dictating priorities of the sensor devices and/or different types data collected by the sensor devices, where higher priority sensor devices are allotted more power than lower priority devices. An update to an updated mode of operation can cause an change in the allocation of power for some or all of the sensor devices 1-W, for example, where the first non-zero fraction of power allocated to the first one of the set of sensor devices is increased or decreased.

The current mode of operation can indicate a frequency of data collection by each of the sensor devices 1-W. This can indicate a rate for collection of measurements by each sensor device, and/or amount of time between measurements collected by each sensor device. For example, the current mode of operation and/or sensor control data generated by the sensor control module 241 can dictate that a first one of the set of sensor devices collect measurements at a first measurement rate, and can dictate that a second one of the set of sensor devices collect measurements at a second measurement rate that is different from the first measurement rate. The collection rates of different sensor devices can be proportional to, and/or an increasing function of, the sensor devices weights dictating priorities of the sensor devices and/or different types data collected by the sensor devices, where higher priority sensor devices collect data at a higher rate than lower priority devices. An update to an updated mode of operation can cause a change in the measurement rate some or all of the sensor devices 1-W, for example, where the measurement rate of the first one of the set of sensor devices is increased or decreased.

The current mode of can indicate a quality, precision, resolution, and/or tuning of the amount and/or type of data collected by each of the sensor devices 1-W. For example, this can dictate the quality and quantity of data collected in each measurements by a particular sensor device, in accordance with the particular measurement rate that is determined for the particular sensor device. For example, a resolution of an image frame captured by an image capture sensor device at each measurement collected; a number of data points captured by the sensor device at each collected measurement; the precision in which the data is collected by the sensor device for each collected measurement; an amount of signal power allocated for communicating each collected measurement to the processing module 240; a number of bits and/or amount of storage allocated for each collected measurement; and/or other tuning of the amount of and/or richness of data captured at each time and/or within each time window can be dictated by the measurement rate.

For example, the current mode of operation and/or sensor control data generated by the sensor control module 241 can dictate that a first one of the set of sensor devices collect each of its measurement in accordance with a first data quality, and can dictate that a second one of the set of sensor devices collect each of its measurement in accordance with a second data quality that is different from the first data quality and/or that requires a different amount of storage than the first data quality. The collection rates of different sensor devices can be proportional to, and/or an increasing function of, the sensor devices weights dictating priorities of the sensor devices and/or different types data collected by the sensor devices, where higher priority sensor devices collect data at a higher quality than lower priority devices. An update to an updated mode of operation can cause an change in the measurement quality for some or all of the sensor devices 1-W, for example, where the measurement quality of the first one of the set of sensor devices is increased to capture a greater amount of data, a higher resolution of data, and/or more precise measurements, and/ or where the measurement quality of the first one of the set of sensor devices is decreased to capture a smaller amount of data, a lower resolution of data, and/or less precise measurements.

Some or all of this sensor control data dictated by current mode of operation can be instead be determined and/or dynamically adjusted by the processing module 240. For example, the sensor control module 241 can generate some or all of its own sensor control data dynamically, despite a fixed current mode of operation dictated by control data received via transceiver 220 and/or received via at least one other communication interface. In particular, the sensor control module 241 can dynamically generate some or all of its own sensor control data within bounds dictated by the current mode of operation. For example, some or all of the sensor control data can be generated by the sensor control module 241 based on packet constraint data, for example, received from the data packet generator module 243. The packet constraint data can indicate current restrictions to packet sizes and/or packet transmission rate. This can further indicate distribution ratios of data generated by different sensor devices, dictating the allotment of different types of sensor data within each data packet and/or across multiple data packets. Changes in the packet constraint data over time can cause the sensor control module to generate its own sensor control data to change measurement collection rate, measurement collection quality, and/or otherwise change how much data is being generated by one or more sensor devices.

The packet constraint data can indicate that the current rate and/or amount of data currently being collected by a particular sensor device exceeds the maximum data transmission rate for measurements collected by that particular sensor device, where the maximum data transmission rate is dictated by the current packet sizes, current packet transmission rate, and/or current allotment measurement collection rate indicated in the packet constraint data. The sensor control module can generate sensor control data accordingly to decrease the measurement collection rate and/or measurement collection quality of the particular device, for example, such that the updated rate and/or amount of data to be collected by the one or more sensor devices, as indicated in this sensor control data, compares favorably to the packet constraint data. By utilizing a bottleneck dictated by the maximum data transmission rate for data collected by each sensor device as indicated by the packet constraint data, the multi-sensor unit 120 can save battery power, processing resources, and memory that would otherwise be utilized to collect and/or store more measurements than the multi-sensor unit is able to packet and transmit.

If the packet constraint data later indicates that the current rate and/or amount of data currently being collected by a particular devices no longer exceeds the maximum data transmission rate dictated by the current packet sizes, current packet transmission rate, and/or current allotment measurement collection rate for that particular sensor device, the sensor control module can generate sensor control data accordingly to decrease the measurement collection rate and/or measurement collection quality of the particular device, for example, such that the updated rate and/or amount of data to be collected by the one or more sensor devices, as indicated in this sensor control data, compares favorably to the packet constraint data.

As the maximum data transmission rate for data collected by each sensor device changes over time, the sensor control data can be updated accordingly to cause the sensor device to tune its collection accordingly to match the maximum data transmission rate, be substantially the same as the maximum data transmission rate, and/or be within under the maximum data transmission rate by a pre-determined buffer. The trade-off of tuning data rate versus data quality of a particular sensor device can be determined based on the operation data 212, and/or control data received via transceiver 220 and/or received via one or more additional communication interfaces. For example, a minimum data quality, a minimum data rate, and/or preference data indicating the trade-off between data rate and data quality of a particular sensor device can be received and/or determined, and the sensor control data can be generated accordingly.

In some embodiments, if collection of data at the minimum data quality and/or minimum data rate by a particular sensor device still compares unfavorably to the maximum data transmission rate, measurements by this sensor device can be buffered for later transmission, and/or data packets that include can these measurements can be generated and buffered for later transmission. In some embodiments, if a first sensor device reaches the minimum data quality and/or the minimum data rate, the data quality and/or data rate of measurements collected by a second sensor device can be lowered, for example, if their lowered data quality and/or data rate still compares favorably to their respective minimum data quality and/or minimum data rate. In such embodiments, the packet constraint data can be changed, for example, to raise the data allocation for the first sensor device and to lower the data allocation for the second sensor device.

In some embodiments, some or all of the sensor devices themselves are not configurable via sensor control data generated by the processing module, and have a fixed measurement rate, fixed measurement quality, and/or otherwise collect their measurements in a predetermined, non-configurable fashion. While the sensor control module 241 can be operable to switch these sensor devices between on and off configurations, the sensor control module 241 may not be able to control any of the data collection by these sensor devices while in the on configuration.

Alternatively or in addition to sending control data to the sensor devices, the processing module 240 can process measurement data for transmission to the gateway device 130 based on desired measurement collection rates and/or qualities for some or all of the sensor devices, even if the data received from these sensor devices collect their measurements at a fixed rate. In particular, while a processing module 240 cannot increase measurement rate and/or measurement quality of a particular sensor device is operating under a fixed measurement rate and/or measurement quality, the processing module 240 can still be configured transmit measurement data in accordance with desired measurement collection rates. This can be achieved if desired measurement collection rates are lower than the actual collection rate of the one or more sensor devices, and/or if desired measurement qualities are lower in quality than the actual quality of collection. These lower rate and/or lower quality of measurements can be desirable and/or dictated, for example, based on the maximum data transmission rate of the collected measurements for each sensor devices, dictated by network constraints and/or bandwidth constraints of the communications protocol. Lower rate and/or lower size of processed measurements can be generated in accordance with the network constraints, while still capturing some or all information of the original higher rate and/or higher quality measurements collected by the sensor devices.

To enable this functionality, measurements collected by the sensor devices 1-W can be processed by a measurement processing module 242 to generate processed measurement data. Processing of the measurements received from sensor devices 1-W can be performed alternatively or in addition to controlling collection rates and/or qualities of the sensor devices themselves via the sensor control module 241. Measurements that are collected by the sensor devices can be sent directly to the measurement processing module 242 and/or can be temporarily stored in memory for access by the measurement processing module 242. For example, the measurement processing module 242 can access stored measurements once a threshold amount of data has been received from the sensor devices for processing and/or once it is time to process measurements for one or more new data packets.

The measurement processing module 242 can generate processed measurements by performing one or more processing functions on measurement data collected by a single sensor device at a single time; by performing one or more processing functions on measurement data collected by a single sensor device at multiple, consecutive times; by performing one or more processing functions on measurement data collected by multiple sensor devices at the same time and/or within the same time window; and/or by performing one or more processing functions on measurement data collected by multiple sensor devices at the different times and/or within the different time window. In particular, the current mode of operation can dictate how the measurements data collected from the sensor devices are to be pre-processed and/or compressed by dictating how functions of the function library will be used on measurement data collected by the sensor devices. Alternatively or in addition, the measurement processing module 242 can dynamically and/or automatically dictate which functions will be utilized based on the packet constraint data.

Performing the processing functions on the measurement data can include accessing one or more functions of the function library 216. The function library can store a plurality of processing function entries for each of a plurality of processing functions that the measurement processing module 242 is operable to perform on collected measurements and/or that other components of processing module 240 are operable to perform. Each processing function entry can store a function definition, function parameter values, and/or executable instructions that, when executed by the measurement processing module 242, cause the measurement processing module 242 to perform the processing function. The function entry can include a plurality of function parameter fields that, when assigned a parameter value, cause the processing function to be performed in accordance with the assigned parameter value. In this fashion, the same processing function can be performed in accordance with different parameter values, selected based on control data and/or determined by the measurement processing module 242.

Entries of the function library can include executable interpreted code in one or more interpreted languages. For example, the measurement processing module 242 can include and/or can access one or more interpreter modules 248, each corresponding to an interpreted language. For example, executable interpreter instructions can be stored for one or more interpreter modules 248 of the processing module in memory module 210. Each interpreter module 248 can be operable to execute interpreted code in the corresponding interpreted language. In this fashion, interpreted code stored in for a particular processing function in the function library can be executed by an interpreter module 248. For example, the collected measurements can be utilized as input to an interpreted code function definition, and/or parameter values determined by the measurement processing module 242 can be utilized as input parameter fields of the interpreted code function definition. The processed measurement functions can be generated as a result of utilizing the interpreter module 248 to execute the selected processing function on the selected collected measurements, utilizing selected parameter values.

The function library can include one or more signal processing functions, such as any signal processing functions discussed included in the function database as discussed herein. Alternatively or in addition, the function library can include one or more detection functions, for example, configured to output a binary value indicating whether or not a condition of interest is determined to be detected or predicted to exist. The detection function can be utilized to perform a counting function to generate count indicating how many times the condition is detected within a time window.

The function library can further include one or more characterization functions, indicating one of a discrete plurality of mutually exclusive conditions and/or collectively exhaustive that the measurement data corresponds to, for example, by quantizing a single summary metric of the measurement data into one of a plurality of quantized levels and/or by selecting one of a plurality of categories that the measurement data most closely corresponds to and/or compares most favorably to. The number of categories can be greater than two. The number of categories can further be a power of 2, for example, to maximize entropy of a plurality of bits that indicate the one of the plurality of categories.

The detection function, counting function and/or characterization functions can include measurement thresholds, where raw and/or processed measurement data is compared to the measurement thresholds to determine whether or not a condition of interest occurred, how many times the condition of interest occurred, and/or which of the plurality of categories the measurement data corresponds to. The detection function and/or characterization function can correspond to inference functions performed on the measurement data to predict whether or not the condition of interest occurred and/or to predict which of the categories corresponds to the current condition. The inference functions can utilize parameters generated by the monitoring data analysis system 140 by training a model utilizing a training set of raw and/or processed measurement data previously collected from the multi-sensor unit 120 and/or multiple multi-sensor units 120, and further utilizing output labels for the measurement data corresponding to known information as to whether the detected condition occurred at the time each input measurement data was collected, and/or which of the categories a condition, at the time each input measurement data was collected, corresponded to.

The current mode of operation can indicate one or more signal processing functions, detection functions, counting functions and/or characterization functions to be performed on measurement data of a particular sensor device. The current mode of operation can further dictate a time window for processing of measurement data of a particular sensor device, where an average measurement, aggregate measurement, summary measurement, and/or lossily compressed measurement data is generated to produce processed measurement data of the particular sensor device for each of these time windows by utilizing one or more signal processing functions detection functions, counting functions and/or characterization functions indicated in the current mode of operation. This processed measurement data can be transmitted to the gateway device 130 instead of the raw measurement data collected in the time window. In some embodiments, the processed measurement data can be transmitted to the gateway device 130 in addition to some or all of the raw measurement data collected in the time window.

For example, consider a particular sensor device that collects each of its measurements a millisecond apart. Suppose a one second time window is utilized based on the current mode of operation. These thousand time-series measurements collected by the sensor device can be processed to generate aggregate and/or summary data for the one second time window. For example, some or all of the measurement values can be quantized in accordance with the current mode of operation, where precision for each measurement is lost based on the number of quantizing levels, but where one thousand time-series data points are still included for the time window as the processed measurement data. Alternatively or in addition, some or all of the measurement values can be summarized over time, for example, where a maximum, minimum mean, median, and/or mode of every consecutive one hundred measurements is generated to generate ten time-series data points, and/or ten time-series sets of points that includes multiple of these summary metrics. Alternatively or in addition, waveform metrics such as average amplitude, frequency, and/or phase of a waveform characterized by the one thousand time-series, or other summarizing metrics can be calculated to generate the processed measurement data, for example, including three waveform metrics for the time window. Alternatively or in addition, the one thousand time-series values can be converted to the frequency domain, where raw and/or processed frequency domain data is generated as the processed measurement data. For example, one or more peak frequencies can be detected in the frequency domain, where a small number of discrete values indicating each peak frequency are generated for the time window as the processed measurement data.

Alternatively or in addition, a detection function can be performed on the raw and/or processed measurement data for the time window to determine whether or not a condition of interest occurred within the tine window, resulting in a binary value indicating whether or not the condition of interest occurred. This can include comparing raw values and/or processed measurement data processed by a signal processing function to measurement thresholds indicated in the current mode of operation, where the condition of interest is determined to have occurred when a single measurement and/or summary measurement falls outside the measurement thresholds and/or when the raw and/or processed measurement data compares unfavorably to the measurement thresholds. In such embodiments, the single binary value can correspond to the processed measurement data.

Alternatively or in addition, a count indicating a number of times the condition of interest was determined to have occurred in the time window can be calculated to generate a single discrete value indicating the count as the processed measurement data. Alternatively or in addition, a characterization function can be performed on the raw and/or processed measurement data for the time window to determine which one of a discrete set of conditions the measurement data falls within to generate an identifier for determined one of the discrete set of the conditions. This can include comparing the measurement data to a plurality of measurement thresholds indicated in the current mode of operation and/or quantizing the measurement data collected across the time window into one of the discrete set of conditions, where each of the discrete set of conditions corresponds to processed and/or processed measurement data falling within the a consecutive, corresponding pair of the measurement thresholds. The identifier indicating the one of the discrete set of conditions can correspond to the processed measurement data.

The current mode of operation can indicate a proper subset of processing functions of the function library that will be performed on the measurement data collected by a sensor device. The proper subset of processing functions can include a single processing function or multiple processing functions to be performed in succession and/or performed separately to generate different types of processed data. The current mode of operation can indicate function parameters for some or all of this proper subset of processing functions that will be performed on the measurement data collected by a sensor device. The current mode of operation can further include instructions indicating an ordering of the proper subset of functions that will be performed on the measurement data. The current mode of operation can indicate a single function, which can call and/or otherwise utilize the proper subset of processing functions of the function library in a designated ordering and/or designated fashion, to produce the processed measurement data from the raw measurement data. For example, the single function can be written as interpreted code in an interpretive language, and can include one or more function calls to the proper subset of processing functions of the function library, where the one or more function calls indicate the corresponding function parameters. Interpreter module 248 can be utilized to execute the single function on measurement data collected by the corresponding sensor device in the time window.

The time window, the proper subset of processing functions, the corresponding function parameters for the proper subset of processing functions, the ordering of the proper subset of functions, and/or the single function can be the same or different for measurement data collected by different sensor devices. The time window, the proper subset of processing functions, the corresponding function parameters for the proper subset of processing functions, the ordering of the proper subset of functions, and/or the single function for one or more sensor devices can be updated and/or changed based on an indication in an updated mode of operation.

The time window can be a function of a fixed, expected, and/or average transmission rate to the gateway device, for example, where a single average measurement, a summary measurement, and/or other lossily compressed measurement data generated as the processed measurement data is transmitted in each transmission to the gateway device. The time window can correspond to an amount of time since the last transmission, where all of the measurement data since the last transmission is collectively processed via one or more signal processing functions. Alternatively, the time window can be fixed based on the current mode of operation, and can be changed to a smaller or larger time window in response to an update to an updated mode of operation. In some embodiments, the processed measurement data is packaged for transmission with other processed measurement data for other sensor devices once the time window has elapsed and the processed measurement data is generated. In some embodiments, the transmission occurs as soon as the packaging for transmission is complete. Alternatively, the transmission can occur at a later, scheduled time and/or can be transmitted at a later time once a determined current transmission collision condition is determined to no longer exist. For example, the measurement data can be separately processed for each of several time windows within the time since the last transmission to generate a plurality of separate, processed measurement data for each time window, and some or all of this separate, processed measurement can is transmitted in one or more future transmissions, once transmissions to the gateway device 130 are determined to be scheduled and/or permissible.

In some embodiments, particular measurements are processed differently over time. For example, more heavily compressed data for a particular type of data can be generated most of the time, for example, for a high, pre-determined proportion of time windows. Occasionally, in the remaining low proportion of time windows, the raw measurements, richer data, higher resolution data, and/or less heavily compressed data can be transmitted. In this fashion, the multi-sensor unit 120 can transmit less precise and/or lossily compressed measurements for one or more sensors most of the time, which can convey loose characteristics of the measurements at a higher rate, where more precise, richer, and/or higher resolution data for these sensors is occasionally transmitted, which, while transmitted at a lower rate than the less precise measurements, can be utilized to convey more information for analysis at this lower rate.

Alternatively or in addition, the current mode of operation can dictate that raw and/or processed measurements are only transmitted when they compare unfavorably to corresponding measurement thresholds of the current mode of operation and/or are only transmitted when a condition of interest is detected by a detection function. In this fashion, the multi-sensor unit can be configured to transmit measurements for some or all sensor devices only when they correspond to unusual conditions, when the measurements are outside of configured thresholds, and/or when a configured condition of interest is detected. The transmission of detection notifications by the multi-sensor unit instead of transmission of all measurements for some or all sensor devices can still convey relevant information over time. This can aid in decreasing bandwidth consumed by the multi-sensor unit by ensuring that only critical and/or alarming information is transmitted.

Alternatively, such detection notifications can be transmitted in addition to collected measurements. In such embodiments, the detection notifications can be transmitted as an interrupt, for example, where the rate that collected measurements of a sensor device are compared to measurement thresholds is higher than the rate that the measurements by the sensor device are actually transmitted. A measurement and/or detection notification can be transmitted before a scheduled next transmission. For example, the measurement and/or detection notification can be transmitted immediately, and/or can be prioritized to be included in the next data packet transmitted by the multi-sensor unit 120, in response to determining the measurement compares unfavorably to the measurement thresholds.

The measurement thresholds for a detection function and/or for determining whether a measurement will be transmitted can be indicated in the control data, and/or can be generated automatically by the multi-sensor unit. For example, the multi-sensor unit can store historical measurements. This can include storing raw and/or processed measurement data that compares favorably to a recency threshold. To save memory, this can include storing a running mean of measurement data by recalculating the mean as new measurements are generated over time. This can otherwise include performing a statistical measurement function on its data collected over time to determine the mean and standard deviation, or other distribution data.

Measurement thresholds can adaptably be set by the multi-sensor unit based on a discrepancy threshold. This can correspond to a pre-defined distance from the mean and/or a statistically significant distance from the mean indicated in the historical data. A difference measurement function can be performed on new raw and/or processed measurement data, and the corresponding type of historical data to generate a discrepancy value indicating a level of discrepancy between the new measurement and historical measurement data. The discrepancy value can indicate a discrepancy between the at least one additional measurement and the updated historical measurement data collected by the one of the plurality of sensor devices. Discrepancy data can be generated by comparing the discrepancy value to a discrepancy threshold. In some embodiments, measurement data is not transmitted unless the discrepancy data indicates that the discrepancy value exceeds the discrepancy threshold. For example, a discrepancy notification can be generated in response to determining that the discrepancy data indicates that the discrepancy value exceeds a discrepancy threshold, for example, for transmission as processed measurement data.

Alternatively or in addition to received control data dictating the functionality of the measurement processing module 242, the time window, the proper subset of processing functions, the corresponding function parameters for the proper subset of processing functions, the ordering of the proper subset of functions, and/or the single function for one or more sensor devices can be updated and/or changed based on an automatic determination by the processing module 240, for example, based on the packet constraint data. This can be in response to a detection function or characterization function performed by the measurement processing module 242 indicating a condition that causes the measurement processing module 242 to change the set of functions, function parameters, and the time window accordingly.

For example, the means in which the measurement processing module 242 generates processed measurements can correspond to the rate and/or amount of data necessitated by the maximum data transmission rate indicated in the packet constraint data. In particular, the sensor control module can automatically tune the set of functions, function parameters, and the time window performed on measurement data for a particular sensor device to generate processed control data that matches, compares favorably to, and/or is within a pre-defined buffer of the maximum data transmission rate for data generated by the particular sensor device. For example, the time window of collected measurements utilized to generate a single measurement and/or set of measurements for a single timestamp can be widened to decrease the data transmission rate for measurements of a sensor device, and/or the time window can be narrowed to increase the data transmission rate for measurements of a sensor device. As another example, in response to determining the rate and/or amount of data in processed measurements for a sensor device exceed and/or otherwise compares favorably to the maximum data transmission rate for that sensor device, the function parameters and/or selected functions utilized to generate the processed measurements be tuned to cause a higher compression rate of the collected measurements and/or can otherwise increase the ratio of the amount of data of the original measurements to the amount of data of the processed measurements collection. These function parameters and/or selected functions can be tuned to cause a lower compression rate of the collected measurements and/or can otherwise decrease the ratio of the amount of data of the original measurements to the amount of data of the processed measurements collection, for example, in response to determining a higher rate and/or higher quality of data can be transmitted while still adhering to the maximum data transmission rate.

In some embodiments, changes in function parameters, time window, and/or selected functions to meet requirements set by the maximum data transmission rate for a sensor device can further be based on an amount of information entropy preserved in a compression of the measurement data. In particular, multiple options for changes in function parameters, time window, and/or selected functions that would cause the rate and/or amount of processed measurement data to be within the bounds of the maximum data transmission rate can be evaluated based on their respective impacts on the information entropy of the original measurement data. For example, a compression algorithm and/or other processing function that decreases the amount of data transmitted, but corresponds to a lossless compression algorithm can be selected over a different compression algorithm and/or different processing function that also decreases the amount of data transmitted, but corresponds to a lossy compression algorithm.

In some embodiments, the function library can include one or more processing functions that are performed on multiple types of measurements collected by two or more different sensor devices. These processing functions can be performed on measurements collected by these different devices at the same time or across different times within the same time window. These multi-input source processing functions can be utilized to further compress measurement data generated by the measurement processing module 242. For example, a single processed measurement generated as a function of multiple measurements from measurement sensors can be sent to the data packet generating module 243 instead of some or all of the measurement data captured by the sensor devices separately. In such embodiments, the information presented in the single processed measurement can fully preserve and/or indicate significant features of the original measurement data, while compressing data from multiple sources to decrease the amount of data outputted by the multi-sensor unit.

Alternatively or in addition, the information presented in the processed measurement utilizing multiple sources corresponds to a particular type of measurement or calculation of interest, for example, that would otherwise be calculated by the monitoring data analysis system 140. This type of measurement can be determined by the monitoring data analysis system and/or a user to be more significant and/or more telling than the individual measurements. Transmitting this multi-source processed measurement alone can present this measure of interest, while also decreasing the amount of data outputted by the multi-sensor unit, when the individual measurements are determined to be no more important than this combined assessment of the measurements in tandem. Alternatively or in addition, one or more of the detection functions, counting functions, and/or characterization functions can determine whether a detectable condition exists as a function of multiple types of measurements captured by different sensors of the multi-sensor unit.

For example, one the processing functions of the function library can include a vapor pressure deficit (VPD) measurement function. The vapor pressure deficit function can utilize air temperature measurements captured by an air temperature sensor, surface temperature measurements captured by a surface temperature sensor, and humidity measurements captured by a humidity sensor as input to produce a VPD measurement as output. In such embodiments, the VPD measurements can be sent to the data packet generator module 243 for transmission instead of air temperature measurements, surface temperature measurements, and/or humidity measurements. In this fashion, less data is transmitted, but the original air temperature measurements, surface temperature measurements, and/or humidity measurements are still utilized in generating a VPD measurement. In particular, if collection of VPD measurement data is the main reason that air temperature measurements, surface temperature measurements, and/or humidity measurements are collected and/or are important to the monitoring system 100, transmission of VPD measurements instead of the raw temperature measurements, surface temperature measurements, and/or humidity measurements can be preferred. Alternatively, the VPD measurements can be generated and sent to the data packet generator module 243 for transmission for most time windows or for a high proportion of time windows, where raw air temperature measurements, surface temperature measurements, and/or humidity measurements are occasionally sent to the data packet generator module 243 for transmission for a low proportion of time windows and/or when the maximum data transmission rate of the multi-sensor unit 120 allows for the transmission of this additional information.

The processed measurement data can be received by the data packet generator module 243. The data packet generator module can generate a plurality of data packets for transmission to the gateway device 130 via transceiver 220. The plurality of data packets can be generated based on the current mode of operation and/or control data indicating a format and/or protocol for the plurality of data packets. The plurality of data packets can further be error encoded and/or encrypted in accordance with the current mode of operation, control data, and/or the communication protocol utilized by transceiver 220. The plurality of data packets can include raw and/or processed measurement data collected by the sensor devices and/or generated by the measurement processing module. For example, a set of consecutive data packets can include raw and/or processed measurement data for some or all sensor devices collected at a same time and/or collected within a same time window. The data packets generated by the data packet generator module can be sent to the data packet scheduling module 244 and/or can be sent to a cache that is accessed by the data packet scheduling module 244.

The data packets can include timestamps and/or time window data for each raw and/or processed measurement. Alternatively a timestamp of transmission by the multi-sensor unit and/or a timestamp of receipt by the gateway device can be utilized as timestamp data for the measurements in the data packet. The data packets can indicate which sensor device collected each raw and/or processed measurement in the data packet. Alternatively, formatting data for the data packets can dictate the ordering of measurements within the data packet and/or an ordering of multiple data packets that include different measurements. The sensor device that generated each measurement can be derived automatically, for example, by the monitoring data analysis system 140, if the formatting data is known by the monitoring data analysis system 140 and/or if the formatting data was generated monitoring data analysis system 140 as control data to the multi-sensor unit. The data packet can further indicate an identifier of one or more processing function of the function library utilized to generate each processed measurement, function parameters of each processing function utilized to generate each processed measurement, and/or a time window utilized by each processing function to generate each processed measurement. Alternatively, the set of processing functions, their parameters, and/or the time windows can be derived automatically, for example, by the monitoring data analysis system 140, if the processing functions and their respective parameters are known by the monitoring data analysis system 140 and/or if the monitoring data analysis system 140 dictated the processing functions, their parameters and/or their time windows as control data to the multi-sensor unit.

The current mode of operation can dictate a plurality of proportions for a plurality of types of measurements, corresponds to different types of raw and/or processed measurements outputted by the measurement processing module 242 and/or otherwise corresponding the types of measurements collected by different types of sensors. This plurality of proportions can dictate the data allocation of different types of sensor data in the plurality of data packets that are transmitted by the multi-sensor unit 120. For example, the current mode of operation can dictate that a first proportion of data that will be transmitted by the multi-sensor unit be allocated to raw and/or processed measurement data collected by a first sensor device, and can dictate that a second proportion of data that will be transmitted by the multi-sensor unit be allocated to raw and/or processed measurement data collected by a first sensor device, where the first proportion is different from the second proportion. These different proportions can be based on weights and/or priorities of data collected by various sensor devices; based on weights and/or priorities of different types of processed data that can be generated by performing one or more processing functions; based on the measurement rates for raw and/or processed data of the different sensor devices; and/or based on the measurement qualities for raw and/or processed data of the different sensor devices.

In some embodiments, different data packets of the same size are each designated for different types of measurements, where the proportion of data packets designated for each type of measurement over time corresponds to the different proportions assigned to the different sensor devices. These data packets can be generated separately and can be transmitted in sequence over time, for example, in a regular ordering that cycles across the multiple types of sensors. In some embodiments, individual data packets can include multiple types of measurements, where the proportion of data within a data packet designated for each of the multiple types of measurements is dictated by the plurality of proportions. A set of consecutive data packets transmitted by the multi-sensor unit can include raw and/or processed measurement data for all of the sensor devices in accordance with their respective proportions. Alternatively, a set of consecutive data packets transmitted by the multi-sensor unit can include raw and/or processed measurement data for a proper subset of the sensor devices that are currently turned on and/or are currently collecting data, in accordance with their respective proportions.

The plurality of proportions and/or the maximum data transmission rate of the multi-sensor unit can be indicated in the packet constraint data sent to the sensor control module 241, and the sensor control module 241 can generate sensor control data accordingly. The set of consecutive data packets transmitted by the multi-sensor unit can further include raw and/or processed measurement data sensor devices in accordance with the measurement rates and/or measurement quality dictated by the collected measurement rates and/or measurement quality by each sensor device, as controlled by the sensor control module 241. Alternatively or in addition, the plurality of proportions can be indicated in the packet constraint data sent to the measurement processing module 242, and the measurement processing module 242 can generate processed measurements accordingly. The set of consecutive data packets transmitted by the multi-sensor unit can utilize selected processing functions, processing function parameters, and/or time windows to generate processed measurement data in accordance with the measurement rates and/or measurement quality dictated by the plurality of proportions.

In some embodiments, the maximum data transmission rate is variable based on changing network conditions, and scheduling congestion data received from the data packet scheduling module can dictate the current data transmission rate. This can be relayed in the measurement processing module 242 and/or the sensor control module 241 in the packet constraint data as the maximum data transmission rate changes with time based on network congestion. In such embodiments, variable amounts of data can be collected and/or processed in accordance with the changing transmission rate.

Alternatively, the amount of data collected and/or generated in processing the measurements is not dependent on changes in network availability. The amount of data included in data packets can be fixed, for example, based on a fixed measurement rate and/or a fixed measurement quality for each sensor device and/or can be a function of measurement rate and/or a measurement quality that changes for other reasons, for example, in response to changing modes of operation. In such embodiments, the data packet scheduling module 244 can store excess data packets in a data packet cache 214, for example, in response to determining size and/or rate of data packets generated by the data packet generator compares unfavorably to the current data transmission rate and/or current network availability, and can attempt to transmit some or all of these excess data packets at a time that the current data transmission rate increases and/or when network availability increases to facilitate the transmission of the some or all stored data packets.

The data packet scheduling module 244 can schedule transmission of the packets via transceiver 220 in accordance with the communications protocol and/or network protocol utilized by the transceiver 220 and the gateway device 130. The data packet scheduling module 244 can be integrated in, be coupled to, and/or can communicate with transceiver 220 to determine when transmission of each data packet is possible, scheduled, and/or acknowledged by the gateway device in accordance with the communications protocol and/or network protocol utilized by the transceiver 220 and the gateway device 130. The transmission window can be determined based on network availability data received via the gateway device 130 and/or otherwise received via transceiver 220, for example, indicating current network availability; indicating current transmission collisions; indicating whether or not a request to transmit has been acknowledged; indicating whether or not a previous transmission was acknowledged; indicating whether or not a previous transmission encountered a collision with transmissions by other multi-sensor units; indicating whether or not a previous transmission was otherwise was determined to have been properly transmitted to the gateway device 130; indicating a scheduled transmission window for a next transmission; indicating a request to retransmit one or more previously transmitted data packets; and/or otherwise indicating when the next data packet can and/or should be transmitted. For example, an ALOHA protocol, slotted-ALOHA protocol, and/or random back-off protocol utilized by the communications protocol and/or network protocol can be utilized in determining a transmission window for each data packet. In some embodiments, the transceiver 220 can receive and/or detect transmissions by other multi-sensor units within range of the multi-sensor unit, and can utilize these detected transmissions and/or a determined frequency channel utilized by these detected transmissions to determine whether transmission is currently possible without collision and/or to determine an available frequency channel.

When each transmission window is determined to be scheduled, available, and/or acknowledged, the next data packet determined to be scheduled for transmission by the data packet scheduling module 244 can be modulated and/or otherwise processed by the transceiver 220 and/or the processing module 240 to generate a measurement data signal that includes the data packet, where the measurement data signal is in accordance with a frequency band and/or frequency channel of the communication protocol and/or network protocol, and where the measurement data signal is transmitted by the transceiver 220 in the determined transmission window.

The data packet scheduling module 244 can store data packets generated by the data packet generator module in a data packet cache 214 until they are able to be transmitted. These queued data packets can be ordered based on the time they are generated, for example, where data packets are transmitted in the order they are generated. However, a transmission lag can accumulate over time if the maximum data transmission rate of the multi-sensor unit compares unfavorably to the rate and/or size of data packets generated by the data packet generator can increase. This can be unideal, and it may be more favorable for most recent packets to be transmitted by the multi-sensor unit to keep the monitoring system 100 as close to real-time as possible, even if there are gaps in certain time intervals corresponding times that network congestion caused the maximum data transmission rate of a multi-sensor unit to lower to a point that data packets generated in those time intervals needed to be skipped. This can include determining a proportion and/or number of data packets that need to be skipped based on the current network availability and/or current packet transmission rate that is possible. This can further include selecting which ones of queued and/or recently received data packets will be skipped in accordance with the determined proportion and/or number.

In such embodiments, the data packet scheduling module 244 can queue packets that cannot be transmitted, and can monitor the data packets in the queue. In particular, consider an embodiment where the data packet generating module 243 generates a plurality of sets of consecutive data packets, where each set of the set of consecutive data packets include measurements from all sensors or a proper subset of operable sensors, and where consecutive sets of the plurality of consecutive sets of data packets include measurements from all sensors or a proper subset of operable sensors collected in corresponding, consecutive time windows. Thus, once an entire one of these sets of consecutive data packets is generated, the next set of consecutive data packets will include more recent measurements from the same sensor devices. As the data packet scheduling module 244 queues data packets for transmission, the data packet scheduling module 244 can determine whether the queue includes at least an entire one of these sets of data packets. If this is the case, the data packet scheduling module 244 can determine to skip some or all of the queued set of data packets, and can resume transmission with the most recent data packets. For example, the data packet scheduling module 244 can skip an entire set of consecutive data packets and begin ordered transmission with the next set of consecutive data packets.

Different data packets in each set of consecutive can include measurement data collected by multiple sensors, but not all of the sensors. The measurement data allocated for each different data packet can be determined based on weights dictating priorities of each sensor type and/or dictating priorities of different types of processed measurements. The different data packets in a set of consecutive data packets can each include data grouped by priority of the measurements. For example, one data packet in a set of consecutive data packets can include multiple types of measurements of a lowest ranked priority, and another data packet in the set of consecutive data packets can include multiple types of measurements of a highest ranked priority. These priorities can thus dictate a ranking of the data packets within a set of consecutive data packets, where the data packets that include the highest priority measurements are prioritized higher than the data packets that include the lower priority measurements. The priorities can be determined by the current mode of operation and/or can be determined in response to a detection function indicating a higher priority of a particular type of sensor and/or type of measurement in response to corresponding measurements indicating an alarming condition or otherwise comparing unfavorably to measurement thresholds.

If the data packet scheduling module 244 determines that the current rate of packet generation compares unfavorably to the current network availability and/or current rate that packets can be transmitted, instead of or in addition to skipping all of the packets in a single set of consecutive packets, the data packet scheduling module 244 can determine to skip transmission of one or more lowest priority data packets in each set of consecutive data packets for a period of time that the network availability dictates that all of the data packets cannot be transmitted without accumulating lag.

These skipped data packets can remain in the data packet cache 214 and/or can be transferred to other temporary and/or permanent memory of the multi-sensor unit. For example, these skipped data packets can be transmitted at a later time, once network availability data indicates the multi-sensor unit can transmit some or all of these skipped data packets while maintaining a transmission rate of the newly generated data packets received from the data packet generating module 243 without lagging and/or without needing to queue a threshold number of the new data packets. Alternatively, the data packet scheduling module 244 can determine to delete these skipped data packets, for example, once a threshold amount of time has elapsed since the oldest data packet and/or as the size of the queue and/or number of skipped data packets exceeds a threshold.

Alternatively or in addition, the data packet scheduling module 244 can move some or all of these skipped data packets from the queue for transmission to a different memory, for example, that is not accessed for transmission via transceiver 220. For example, a designated portion of memory of can store some or all of these skipped data packets, for example, with their respective timestamp data preserved, and these skipped data packets can be accessed by the monitoring data analysis system, a client device, and/or another data extraction means via one or more of the additional communication interfaces. For example, some or all of these skipped data packets can be automatically be transmitted via an additional communication interface of the multi-sensor unit once the number of skipped data packets exceeds a threshold; once an amount of time elapsed since an oldest one of the skipped data packets exceeds a threshold; and/or in pre-defined intervals, for example where the pre-defined intervals are very infrequent in comparison to the transmission frequency facilitated by the transceiver 220. In particular, these data packets can still be transmitted via a different transmission medium and/or communication protocol that can handle a high volume of data transmission. This different transmission medium and/or communication protocol can be utilized by the additional communication interface to flush these skipped data packets for subsequent analysis and/or other subsequent use. The additional communication interface can transmit these skipped data packets to the monitoring data analysis system 140 via a connection to network 150. The additional communication interface can transmit these skipped data packets to a client device 160 when the client device is in range, for example, via a short range wireless connection and/or wired connection. The client device 160 can transmit these received skipped packets to monitoring data analysis system 140 via its connection to network 150.

The skipped data packets can be flushed via the additional communication interface in response to control data received via the additional communication interface, in response to detecting a device has connected to the communication interface, and/or in response to control data received via transceiver 220 instructing that the skipped data packets be flushed via the additional communication interface. Alternatively or in addition, a memory card or other physically removable memory device that is designated to store these skipped data packets can be physically removed by a user, for example, where the user utilizes a memory card reading device to extract the skipped data packets, delete the skipped data packets from the memory card, and replace the empty memory card to being storing subsequently skipped data packets.

If the skipping of data packets persists for a threshold amount of time and/or is determined to persist in the future, rather than continuing to drain battery power in collecting, processing, and packeting the corresponding data for data packets that are skipped and not transmitted, the multi-sensor unit can cease some of all of this unnecessary collecting, processing, and packeting. The data packet scheduling module 244 can generate scheduling constraint data, sent to the data packet generating module 243, indicating a proportion of data packets that are skipped, indicating a type of data packets that are skipped, indicating an amount of time that this skipping is expected to continue, and/or indicating current packet transmission constraints. This can be utilized by the packet generator module to generate the set of consecutive packets without including the lowest priority data, to otherwise include less data packets in each consecutive set of data packets, and/or to generate the same consecutive set of data packets less frequently. This can also be utilized by the data packet generator module to generate updated packet constraint data, sent to the sensor control module 241 and/or the measurement processing module 242, to indicate which types of data are no longer being included in data packets, to turn off corresponding sensors or decrease the frequency of collection of these sensors, to cease processing of collected measurements to generate processed data that is no longer included in data packets, and/or to update the time window for processing and/or collection rate to facilitate a lower rate of packet generation. As network availability increases and packets can be transmitted at a higher rate, the sensor control module 241, measurement processing module 242, and/or data packet generator module 243 can resume some or all of its normal activity accordingly.

The processing module 240 can utilize the updating module 249 to cause the multi-sensor unit 120 to change from operating in accordance with a current mode of operation to begin operating in accordance with an updated mode of operation in response to receiving and/or generating control data that indicates an update to operations that indicates the updated mode of operation. This updated mode of operation can be considered the new current mode of operation, and can subsequently be further updated and/or reverted to a previous mode of operation in response to subsequently received control data.

The updating module 249 can be configured to determine the appropriate mode of operation and/or to facilitate a change in mode of operation based on updating the operational data 212. The updating module 249 can make the determination to change mode of operation to an updated mode of operation based extracting instructions received in control data. This control data can indicate an instruction to switch to operating in accordance with a different, currently stored modes of operation, and/or can include changes and/or executable updates to be applied to the operational data 212. This control data can be received from gateway device 130 via transceiver 220 and/or can be received from a different computing device via an additional communication interface. For example, this control data can be generated by and/or originate from the monitoring data analysis system 140, in response to the monitoring data analysis system 140 automatically determining to set and/or update the mode of operation of the multi-sensor unit 120 and/or in response to the monitoring data analysis system 140 receiving user-configuration instructions from a client device 160 based on user input to graphical user interface 190 displayed by a display device 161 of client device 160.

In some embodiments, the memory module 210 can store operational data for a plurality of modes of operation, where the current mode of operation is one of the plurality of modes of operation. The control data indicating an update from the current mode of operation to an updated mode of operation can include mode of operation selection data identifying the updated mode of operation from the plurality of modes of operation. For example, one of a plurality of discrete identifiers indicating one of the plurality of modes of operation stored by the memory module 210 can be indicated in the control data. The updating module 249 can extract the identifier from the control data and can select the one of the plurality of modes of operation accordingly. The multi-sensor unit 120 can begin operating in the updated mode of operation accordingly by utilizing the operational data corresponding to the newly selected one of the plurality of modes of operation indicated by the one of the plurality of discrete identifiers. In this fashion, if the multi-sensor unit 120 can change between different ones of a discrete set of modes of operation over time without having to receive and install major updates, and without the gateway device 130 having to transmit large update instructions as control data.

In some embodiments, one of the plurality of modes of operation corresponds to a default mode of operation. For example, only this default mode of operation and/or instructions to revert to this default operation can be allocated permanent storage in the memory module 210. Other modes of operation that are initiated by the updating module 249 can correspond to temporary modes of operation, where the temporary mode of operation has a corresponding time of operation. Once the time of operation is determined to elapse, the temporary mode of operation can end, and the mode of operation can be reverted back to the default mode of operation. In such embodiments, operation instructions for the default mode of operation can always be stored in memory module 210, allowing for easy reversion to the default mode of operation. The operational instructions for the temporary mode of operation may only be stored by memory module 210 while the temporary mode of operation persists. The time of operation can be a fixed, pre-determined amount of time indicated in the operational instructions and/or control data for the default mode of operation and/or the temporary mode of operation. The time of operation can alternatively be based on determining to end the temporary mode of operation in response to receiving control data indicating to end the temporary mode of operation. Alternatively, the temporary mode of operation can indicate an exit condition, for example, corresponding to a detectable condition that can be determined by the multi-sensor unit by performing a detection function. In response to determining the exit condition exists, for example, as a function of measurement data and/or network constraints, the default mode of operation can be reinitiated automatically.

Alternatively or in addition, the memory module 210 may only store operational data corresponding to the current mode of operation, and changes to the operational data can cause the current mode of operation to change to a new, updated mode of operation. For example, the memory module 210 can store some or all of its operational data as a plurality of modular binary elements. The processing module 240 can execute a plurality of executable instructions stored in and/or indicated by the plurality of modular binary elements, and the execution of these executable instructions can cause the multi-sensor unit to operate in accordance with the current mode of operation. Changes to one or more of the plurality of modular binary elements stored in memory module 210 can thus cause the current mode of operation to change to an updated mode of operation. In some embodiments, the updating module 249 is operable to change the mode of operation to the updated mode of operation by updating one or more of the plurality of modular binary elements as indicated in control data received via transceiver 220 and/or via an additional communication interface.

In some embodiments, the control data includes a binary difference of a single modular binary element and/or a plurality of binary differences for a plurality of binary elements. The control data can indicate the corresponding modular binary element for each binary difference by including an identifier linked to each binary difference in the control data. The control data can indicate the information corresponds to binary differences, for example, in a header or other update instruction data included in the control data. The updating module 249 can extract and analyze the header and/or update instruction data to determine that the control data corresponds to a plurality of binary differences to be applied to one or more modular binary elements. The updating module 249 can extract one or more binary differences and/or can extract the identifier indicating the modular binary element corresponding to each one or more binary differences in response to determining the control data corresponds to the plurality of binary differences to be applied to one or more modular binary elements. The updating module 249 can change the multi-sensor unit 120 from operating under the current mode of operation to operating under the updated mode of operation by applying each received binary difference to its corresponding modular binary element stored in memory module 210, causing the corresponding modular binary element to store and/or indicate updated executable instructions in accordance with the updated mode of operation. For example, the updating module 249 can apply an exclusive-OR function on an existing modular binary element and the corresponding binary difference to generate an updated modular binary element, where the updated modular binary element replaces the existing modular binary element in memory module 210.

Alternatively or in addition, the updating module 249 can include and/or can access one or more interpreter modules 248, each corresponding to one or more interpreted languages. These can be the same or different interpreter modules 248 that are utilized by the measurement processing module 242 to perform processing functions of the function library. The control data received by the multi-sensor unit can include interpreted code that is written in an interpreted language corresponding to one of the interpreter modules 248. This interpreted code, when executed by utilizing the interpreter module 248, can cause the multi-sensor unit 120 to change from the current mode of operation to the updated mode of operation. For example, execution of the interpreted code can cause changes to the operational data 212 stored in memory, such as changes to values stored in memory and/or changes to one or more modular binary elements.

The control data can indicate that its update instructions correspond to interpreted code, for example, in a header or other update instruction data included in the control data. The control data can further indicate one of a plurality of interpreted languages that the interpreted code is written in. The updating module 249 can extract and analyze the header and/or update instruction data to determine that the control data corresponds to interpreted code to be executed by an interpreter module. In response to determining the control data corresponds to interpreted code, the updating module 249 can further identify one of a plurality of languages that the interpreted code is written in based on extracting a corresponding identifier from the control data and/or analyzing the control data to determine the one of the plurality of languages. In response to determining the control data corresponds to interpreted code and/or in response to identifying the interpreted language the interpreted code is written in, the updating module 249 can extract the interpreted code from the control data and can execute the interpreted code by utilizing the interpreter module of the corresponding interpreted language.

The monitoring system 100 can utilize different types of updates for different purposes. For example, major updates can be transmitted to a multi-sensor unit 120 as binary differences, for example, where the major updates correspond to substantial changes in operations, firmware level updates, and/or new versions of software, firmware and/or the operating system of the operation data dictating the mode of operation. Alternatively or in addition, minor updates can be transmitted to a multi-sensor unit 120 as a few lines of interpreted code to be executed by an interpreter module 248 of processing module 240. For example, minor updates can correspond to tuning and/or minor changes in collection of measurements by sensor devices, tuning and/or minor changes in processing of measurement data to generate the processed measurement data, tuning and/or minor changes in transmission rates and/or data packet format; and/or other minor changes to operations and/or functionality of the multi-sensor unit.

For example, the memory module 210 can store a plurality of variables dictating the current mode of operation, where the processing module accesses some or all of these plurality of variables to perform its operations. The plurality of variables can store bandwidth allocation for the multi-sensor unit 120 overall based on a unit weight assigned to the multi-sensor unit; a set of measurement quality values for measurements collected by a corresponding set of sensor devices; a set of power allocation values dictating power consumption by each of a corresponding set of sensor devices; power consumption values of the power constraint data dictating power consumption by the multi-sensor unit as a whole and/or individual components of the multi-sensor unit; a set of processing function identifiers; a set of sensor device weights ranking and/or prioritizing the type of data collected by some or all of the sensor devices; a set of processing function parameter values, and/or a set of time window values utilized to generated processed measurement data for measurement data collected by each of a corresponding set of sensor devices; current network availability; current scheduling constraints dictated by current network availability; current packet constraints dictated by scheduling constraints and/or current network availability; current maximum data transmission rate dictated by current network availability; a set of processing function weights ranking and/or prioritizing the type of data generated by performing some or all of the processing functions on collected data; a set of transmission rate values dictating rate of generation and/or transmission of measurement data transmissions of raw and/or processed measurement data via transceiver 220; packet structure parameters dictating packet structure of the measurement data transmissions; a set of packet weights ranking and/or prioritizing the type of measurement data included in different types of packets; detection function parameter values; measurement threshold values characterizing mode of operation update conditional data; and/or other values dictating functionality of the multi-processing unit as discussed herein.

Minor updates included in the interpreted code can include instructions to change the value of one or more of these variables. The interpreted code can indicate variable names and/or memory references for some of all of these variables, and can further indicate an updated value to replace the current value and/or a function to be applied to the current value to generate the updated value. The interpreter module can update the value of these variables stored as machine code in memory module 210 accordingly by executing the corresponding interpreted code. The updated values of one or more of these variables can be utilized in subsequent performance of operations by the processing module 240, thus dictating the updated mode of operation. In some embodiments, at least one of these variables can be stored in a modular binary element, and changes to at least one of these variables can be caused by performing a binary difference on at least one modular binary element and/or by executing interpreted code that results in a change of at least one modular binary element that stores the at least one variable.

In some embodiments, some interpreted code received in control data can correspond to single executions, for example, corresponding to a request for particular data that stored by and/or generated by the multi-sensor unit be transmitted by the multi-sensor unit; to configure a particular sensor of the multi-sensor unit; and/or to otherwise execute an instruction that does not result in a change to the operation data in memory and/or otherwise does not result in a change in mode of operation.

In some embodiments, some interpreted code received in control data can correspond to additional function definitions to be added as new entries to the function library, and/or updates to current functions stored in the function library. The interpreted code can be included in these function entries for execution by an interpreter module 248 when these functions are called to be performed by the measurement processing module. The control data can further indicate that some or all of these new processing functions be utilized instead of one or more existing processing functions in generation of measurement data in accordance with an updated mode of operation.

One or more interpreter modules 248 can be included and/or accessed by other components of processing module 240 for facilitating performance of operations that do not necessarily correspond to updates. For example, the sensor control module 241, measurement processing module 242, data packet generator module 243, and/or the data packet scheduler module 244 can utilize the same or different interpreter modules 248 of the processing module 240 to execute control data, to update its functionality in accordance with an updated mode of operation, to update variables and/or parameters dictating its performance such as one or more of the variables discussed above, and/or to otherwise facilitate functionality of these components.

In some embodiments, the interpreted code received as control data by the multi-sensor unit 120 is written via text input to graphical user interface 190, allowing a user to fine tune functionality of one or more particular multi-sensor units. If the user input corresponds to a major update and/or an amount of interpreted code that exceeds a threshold, the interpreted code can be automatically converted into binary differences for transmission as binary difference updates. Alternatively or in addition, the interpreted code and/or binary differences can be automatically generated by monitoring data analysis system 140 in response to determining to change one or more of these values, for example, based on performing its own detection functions in execution of its own mode of operation update conditional data.

In some embodiments, updates are sent as control data transmissions via the gateway device 130 and are received via transceiver 220. In particular, minor updates such as interpreted code updates and/or binary difference updates for individual, modular binary elements can be transmitted as control data in this fashion. Alternatively or in addition, some updates, such as major updates and/or updates that require a large amount of data and/or bandwidth for transmission to the multi-sensor units, can be transmitted in a different fashion. In particular, monitoring data analysis system 140, in response to generating an update for delivery to one or more multi-sensor units, can determine an update size and/or update bandwidth requirements for the update. The update size and/or update bandwidth requirements can be compared to a size threshold and/or a bandwidth threshold, and if the update size and/or update bandwidth is larger than and/or otherwise compares unfavorably to the size threshold and/or a bandwidth threshold, the monitoring data analysis system 140 can designate that the update be delivered to the multi-sensor unit via a different communication channel, for example, by utilizing an additional communication interface of the multi-sensor unit.

For example, a separate computing device that is operable to communicate with the multi-sensor unit via an additional communication interface can send the control data for these updates to the multi-sensor unit via the additional communication interface. In some embodiments the separate computing device can receive the control data for the update from client device 160 and/or from monitoring data analysis system 140 via the network 150 and/or via another communication channel facilitating communications between the separate computing device and the client device 160 and/or monitoring data analysis system 140 in response to the determination to use the difference communication channel. The separate computing device can transmit the control data to one or more multi-sensor units in response to receiving the control data.

In some embodiments, the client device 160 and/or monitoring data analysis system 140 can be operable to communicate with multi-sensor units 120 via an additional communication interface of the multi-sensor units 120, for example, strictly for the purpose of delivering updates. For example, the client device 160 can receive update data from the monitoring data analysis system 140 via network 150. The client device 160 can transmit the update data to one or more multi-sensor units via their additional communication interface when the client device 160 is moved by a user to be within range of a short range wireless connection and/or a wired connection to the multi-sensor units 120.

In some embodiments, the current mode of operation can include mode of operation update conditional data, indicating one or more detectable conditions that the processing module 240 can detect itself. This can be utilized by the processing module 240 to automatically update the mode of operation from the current mode of operation to the updated mode of operation in response to detecting one or more detectable conditions indicated in the mode of operation update conditional data. This can include detecting the detectable condition based on evaluating recently collected measurement data; evaluating transmission conditions of transceiver 220 and/or evaluating a number of collision in transmissions to the gateway via transceiver 220; evaluating current power supply of the power source, detecting one or more failing sensor device devices, and/or evaluating health of one or more components of the multi-sensor unit; and/or performing one or more functions of the function library, such as a detection function, counting function, and/or characterization function, based on some or all of this information to determine the detectable condition exists. In some embodiments, the detectable conditions, and/or the detection functions, counting functions, and/or characterization functions utilized to detect the datable conditions, can be indicated in control data and/or can change in response to an update from the current mode of operation to an updated mode of operation.

In such embodiments, the processing module 240 can adapt to its own detectable circumstances to update one or more components of its current mode of operation automatically and/or to change to an update mode of operation. In particular multi-sensor units can change some or all of their operations within the current mode of operation automatically and/or update to the updated mode of operation automatically in response to detecting a corresponding detectable condition, without waiting for instructions from the gateway device and/or from another computing device.

Detection of a detectable condition can cause the current mode of operation to a particular updated mode of operation, indicated by the current mode of operation. This particular updated mode of operation can be dictated by particular changes and/or particular actions that are initiated automatically by the processing module 240 in response to detection of the detectable condition. This can cause increases, decreases, and/or other changes discussed herein, such as increases and/or decreases to measurement rates for one or more sensor devices; such as increases and/or decreases to measurement quality for one or more sensor devices; and/or collection quality of one or more of its sensor devices; increases and/or decreases to power consumption by one or more of its sensor devices; increases and/or decreases to overall power consumption by the multi-sensor unit; changes to the subset of processing functions, function parameters, and/or time window utilized to generated processed measurement data for one or more sensor devices; increases and/or decreases in transmission rates of measurement data transmissions of raw and/or processed measurement data via transceiver 220; changes to packet structure and/or changes to allocation of data for particular sensor devices and/or particular types of measurements within some or all packets sent as measurement data transmissions via transceiver 220, and/or changes to other operations. In some embodiments, the particular changes and/or particular actions performed in response to different particular detectable conditions can be indicated in control data and/or can change in response to an update from the current mode of operation to an updated mode of operation.

In particular, a detectable condition can correspond to determining when a particular raw and/or processed measurement is not within or otherwise compares unfavorably to measurement thresholds. These measurement thresholds can correspond to regulatory and/or desired bounds that a raw and/or processed measurement should fall within. Thus, if the corresponding raw and/or processed measurement falls outside the measurement thresholds, this can correspond to the detection of an alarming condition and/or an unfavorable condition.

For example, in response to detecting that particular raw and/or processed measurements compare unfavorably to their respective measurement thresholds, the updated mode of operation can automatically initiate. This automatic initiation of the updated mode of operation can cause and automatic increased rate of measurement collection and/or increased measurement quality by the sensor device itself via sensor control data transmitted to the sensor device via the sensor control module 241. Alternatively or in addition, this automatic initiation of the updated mode of operation can initiate a less-lossy and/or lossless processing function be performed on the measurement data to preserve more of the raw measurements captured by the sensor devices. Alternatively or in addition, this automatic initiation of the updated mode of operation can initiate transmission of these measurements at a higher rate and/or a higher quality, for example, by allocating a higher proportion of packet data for these measurements.

To accommodate for the increased transmission of these particular measurements, the updated mode of operation can indicate that other sensor devices have their respective decreases in their collection rates, collection qualities, and/or proportion of data allocation in packet transmissions, for example, to keep the data transmission rate of the multi-sensor unit 120 constant and/or relatively constant. In some embodiments, the updated mode of operation can cause one or more of the other sensors devices to be turned off and/or cease collection of measurements to accommodate the increase in data quality and/or transmission rate of the particular sensor.

In some embodiments, such modes of operation necessitating heavy collection and/or transmission of particular sensor data can correspond to a temporary mode of operation, for example, where the exit condition corresponds to the measurement data once again comparing favorably to the measurement thresholds. For example, the increased transmission and/or increased quality of measurements determined to compare unfavorably to the corresponding measurement thresholds can persist until these measurements once again compare favorably to the corresponding measurement thresholds and/or have returned to being within the measurement thresholds for at least a threshold amount of time. Once these measurements once again compare favorably to the corresponding measurement thresholds, the default mode of operation and/or a previous mode of operation can automatically be reinitiated.

In some embodiments, a desired minimum transmission rate of one or more types of measurements can be indicated in the current mode of operation, dictating a set of processing functions and/or time windows that cannot be used. In particular, if a processing time necessary to compute the processed measurements exceeds a maximum processing time dictated by the desired minimum transmission rate, or otherwise compares unfavorably to the minimum transmission rate for this data, these processing functions can be determined to be unusable for these measurements as they would cause the transmission rate to fall below the desired minimum. Similarly, if the time window for collection of measurements exceeds a maximum collection window time dictated by the desired minimum transmission rate, or otherwise compares unfavorably to the minimum transmission rate for this data, this transmission window can be considered unusable or can otherwise be decreased to adhere to the maximum collection window time. In some embodiments, these processing functions and/or time windows are still used, and supplement the transmission of raw data.

Power source 230 can be utilized to power some or all of the memory module 210, the transceiver 220, the processing module 240, the set of sensor devices 1-W, and/or the additional communication interfaces 1-M. The power source 230 can be implemented utilizing one or more rechargeable batteries and/or one or more non-rechargeable batteries. These can include one or more nickel cadmium batteries, nickel-metal hydride batteries, lead acid batteries, lithium ion batteries, lithium ion polymer batteries, zinc carbon batteries, alkaline batteries, and/or lithium batteries. The power source 230 can be implemented utilizing AC power. For example, when the multi-sensor unit is installed in proximity to an electrical source and/or outlet of the facility, the multi-sensor unit 120 can utilize AC power delivered to the facility, for example, where the multi-sensor unit 120 utilizes an AC power adapter jack. The power source 230 can be implemented by utilizing one or more solar cells, for example, if the multi-sensor unit is installed outdoors and/or is expected to receive a favorable amount of sunlight. In some embodiments, some or all of the power source 230 can be harvested by the multi-sensor unit 120 in performing electrical measurements by one or more of its sensor devices 1-W. In particular, if one or more sensor devices 1-W utilize a current transformer to collect an electrical measurement, parasitic energy that is inherent in performing the electrical measurement by utilizing the current transformer can be utilized as some or all of the power source 230.

In some embodiments, the current mode of operation indicates power constraint data. The power constraint data can be determined based on a type and/or cost of power source 230, based on a desired battery life of power source 230 before power source 230 needs to be replaced and/or recharged, and/or based on desired operation costs involved in drawing power from an AC source of the facility as power source 230. The power constraint data can dictate control data for the operations of the multi-sensor unit, for example, where control data was generated by the monitoring data analysis system to ensure that an average rate of power consumption by the multi-sensor unit adheres to predetermined power constraint data. In some embodiments, the type of the at least one battery utilized for power source 230 and the limitations dictated by the power constraint data cause the battery life of the power source 230 before needing to be recharged or replaced to last at least one year.

In particular, the power constraint data can dictate that the expected battery life of power source 230 exceeds and/or otherwise compares favorably to a desired battery life of power source 230, where the desired battery life is determined by the monitoring data analysis system 140 and/or based on user input to graphical user interface 190. Similarly, the control data can dictate that the average power consumption of AC power delivered to the multi-sensor unit compares favorably to a desired power consumption threshold, where the desired power consumption is determined by the monitoring data analysis system 140 and/or based on user input to graphical user interface 190, for example, based on a cost associated with the consumption of AC power and/or based on adhering to desired operating costs of operating the facility.

The current mode of operation can dictate different power constraints in response to different conditions. For example, if remaining battery levels are determined to be low, the power constraint data can be more restrictive to ensure that only the most necessary operations continue to function for as long as possible. As another example, if current conditions monitored by the multi-sensor unit are normal, the power constraint data can conserve battery power by monitoring less rigorously and/or by transmitting data packets less frequently. Alternatively, if current conditions monitored by the multi-sensor unit are determined to be abnormal and/or compare unfavorably to threshold conditions, the power constraint data can allocate more power to particular sensor devices to collect measurements at a higher frequency and/or a higher quality, to allocate additional processing power to process these measurements, and/or data packets including these measurements can be transmitted more frequently and/or instead of data packets for other types of measurements. In some embodiments, data packets that include particular types of raw and/or processed measurements are only generated and transmitted in response to detection of an abnormal condition that necessitates the collection and/or generation of this type of data.

Instead of or in addition to a bottleneck to the functionality of the multi-sensor unit 120 being dictated by the maximum data transmission rate dictated by network availability, the power consumption constraints can further bottleneck various functionality of the multi-sensor unit 120. The power constraint data can indicate total power constraints across the multi-sensor unit 120 as a whole, and the multi-sensor unit can allocate power consumption to different components itself by utilizing processing module 240. Alternatively or in addition, the power constraint data can indicate proportions of power and/or maximum rate of power consumption to individual components of the multi-sensor unit.

This can include limitations to the power consumption due to measurement collection by individual sensor devices, for example, where different sensor devices are allotted different power consumption. A proportion of sensor devices 1-W that are turned off entirely at any given time can be non-zero and can be a function of the power constraint data. A proportion of time that one or more particular sensor devices will be turned off can be non-zero and can be a function of the power constraint data. In some embodiments, some sensor devices are never turned off, and/or are turned off for smaller proportions of time than other sensor devices based on the amount of power they require being lower than other sensor devices. Alternatively or in addition, these sensor devices are never turned off, and/or are turned off for smaller proportions of time than other sensor devices based on the current mode of operation indicating the priority of their collected data is higher than the priority of collected data of the other sensor devices.

Alternatively or in addition, the collection rate and/or the collection quality for each sensor device can be further dictated by the power constraint data and/or the power constraint data can otherwise set a maximum collection rate and/or maximum collection quality. For example, instead of or in addition to turning different sensor devices on and off to conserve power, their respective collection rates and/or collection quality can be tuned in accordance with the power constraint data. For example, the collection rates and/or collection quality can be lowered for particular devices at particular times and/or overall to conserve power in accordance with the power constraint data.

Alternatively or in addition, the power constraint data can include limitations to power consumption by the processing module 240 due to performance of functions in accordance with the operation data 212, and can set different limitations for functionality of one or more of the sensor control module 241, the measurement processing module 242, the data packet generator module 243, and/or the data packet scheduling module 244. For example, the processing required to generate processed measurements by performing processing functions on collected measurements can be dictated and/or limited by the power constraint data, where a higher proportion of unprocessed measurements and/or a higher proportion of processing functions that utilize less processing are utilized on collected measurement to ensure the performance of processing functions by the measurement processing module 242 adheres to the power constraint data.

Alternatively or in addition, the power constraint data can include limitations to power consumption by the transceiver 220 and/or additional communication interfaces. In particular, power consumption due to transmission of data packets, receiving of data packets, and/or listening for data packets or other signals that may be directed to the transceiver 220 and/or additional communication interfaces.

For example, the maximum data transmission rate can be bottlenecked by the power constraint data instead of or in addition to being bottlenecked by the network availability. For example, a constant rate of transmission of data packets and/or times at which fewer and/or no data packets are transmitted can be dictated by the power constraint data of the current mode of operation. Alternatively or in addition, the power constraint data can dictate a signal power utilized to deliver the signal, for example, where weaker signals are transmitted in response to a lower availability of power. A lower bound to the signal power can be dictated by the minimum required signal power required for the gateway device 130 to receive the signal from the multi-sensor unit at a desired minimum signal to noise ratio. For example, a desired minimum signal to noise ratio can be dictated by a threshold probability that the data packet is received without error and/or a threshold probability that errors are detectable and/or correctable by applying an error decoding scheme corresponding to an error correction code applied to the data packets and/or the signal. The expected signal to noise ratio given a signal power can be determined and/or estimated based on a distance of the multi-sensor unit from the gateway device, obstacles or other factors in based on the layout of the facility and/or other features within the facility that affect signal attenuation, levels of interference created based on features within the facility that generate additional interference, and/or other factors.

The power consumption due to receiving data, listening for potential transmissions, and/or being powered on can be further reduced in accordance with the power constraint data. For example, the transceiver 220 and/or additional communication interfaces can be turned off for windows of time that the transceiver 220 and/or additional communication interfaces are not transmitting data. In such embodiments, a listening window of the transceiver 220 and/or additional communication interfaces may occur only at particular times, where transmissions from gateway device 130 and/or other computing devices attempting to transmit data to the multi-sensor unit 120 will only be received by the multi-sensor unit 120 in these listening windows. In some embodiments, the scheduled times and/or lengths of the listening windows are known the monitoring data analysis system 140, gateway device 130 and/or other computing devices, for example, as a result of being dictated by the current mode of operation indicated in control data generated by the monitoring data analysis system 140 and/or transmitted by the gateway device 130. The gateway device 130 and/or other computing devices can transmit information such as control data accordingly within these listening windows.

Alternatively, if the listening windows are unknown and/or are dynamically changed by multi-sensor units in response to conserving additional power due to the power constraint data, the gateway device 130 and/or other computing devices can transmit frequent and/or periodic transmissions of the information and/or can transmit frequent and/or periodic queries as to whether or not the listening window is currently open. If one of these transmissions occurs when the listening window is open, the multi-sensor unit 120 can acknowledge receipt of the transmission, and/or can widen their listening window in response to the transmission indicating that further information will be transmitted to the multi-sensor unit 120.

The listening windows can occur directly after some or all transmissions of a single data packet and/or set of data packets to the gateway device, for example, allowing the gateway device to acknowledge receipt of the data packets and/or allowing the gateway device to send additional information, such as control data, to the multi-sensor unit immediately following the acknowledgment. In some embodiments, the acknowledgement transmission can indicate that the additional information will be transmitted and/or can indicate an amount of additional information that will be transmitted, and the multi-sensor unit can widen their listening window and/or can continue to listen for transmission until the entirety of additional information is determined to be received from the gateway device 130.

In some embodiments, control data sent via the transceiver 220 can instruct the multi-sensor unit 120 to turn on an additional communication interface and/or can indicate that additional data will be sent to the multi-sensor unit via the additional communication interface. Similarly, control data sent via an additional communication interface can instruct the multi-sensor unit 120 to turn on a different additional communication interface and/or to turn on the transceiver 220, and/or can indicate that additional data will be sent to the multi-sensor unit via the different additional communication interface and/or the transceiver 220.

These listening windows can impact the receipt of control data such update data to update from of the current mode of operation to an updated mode of operation, and/or can impact the receipt of other control data to be executed by the multi-sensor unit. The monitoring data analysis system 140 and/or a client device 160 can plan for updates to the operation data 212, such as major updates requiring execution via updating module 249 as a binary difference to one or more modular binary elements of the operation data, in accordance with known listening windows. In some embodiments, the power consumption required to facilitate an update via the updating module 249 can be dictated by the power constraint data. The multi-sensor unit may be unable to facilitate an update at particular times due to the power constraint data, for example, as a result of other components of the multi-sensor unit drawing more power than usual. The multi-sensor unit can indicate times that updating is unavailable and/or that updating is available in transmissions to the gateway device 130, or in other transmissions via the additional communication interfaces. In some embodiments, the multi-sensor unit can respond to control data indicating a request to update and/or indicating update data with an acknowledgment that the update is able to be performed and/or with a notification that the update will be performed at a later time and/or that the update data needs to be retransmitted at a later time.

In some embodiments, the collection rates and/or collection quality of different sensors are configured in the current mode of operation based on known and/or learned properties of a particular feature, location, and/or properties of the environment that the particular sensors are configured to measure. For example, a range of measurements and/or sensitivity of measurements the sensors are operable to capture can be based on a range of measurements that are expected in normal operation and/or a range of measurements that are expected in both normal operation and/or under unusual, but possible circumstances. The sensitivity can be configured to differentiate between different conditions of interest, for example, to determine whether or not the measurements correspond to normal or abnormal behavior, and/or to characterize the measurements. For example, a corresponding detection function and/or characterization function can be utilized to dictate how sensitive the measurements need to be to appropriately determine and/or predict the corresponding detectable condition or characterization within a threshold probability. In some embodiments, the sensitivity is set to the broadest possible sensitivity that still attains the detection and/or characterization within the threshold probability.

The rate of collection can be dictated based on known frequencies and/or cadences of captured measurements for the particular feature or environment. For example, if the measurements collected in the time domain are analyzed in the frequency domain to perform a detection function and/or characterization function, a minimum rate of collection can be set to be equal to twice the maximum frequency characterizing the known frequency range of the cadence, can be set equal to twice a maximum frequency determined to be necessary be captured to determine within a threshold probability that a condition is detected and/or to characterize the condition within a threshold probability, and/or can otherwise be determined as a minimum sampling rate in accordance with the Nyquist theorem to capture the desired frequency properties of the time-series measurements.

In some embodiments, the minimum rate of collection and/or minimum sensitivity of data captured can alternatively or additionally be applied to the processing functions, where the output of the processing functions meets at least and/or exactly the minimum rate of collection and/or minimum sensitivity of data required to capture and/or differentiate between the known properties of the particular feature and/or environment being measured by the corresponding sensor device and/or being captured in the processed measurement outputted by the processing function.

The set of sensor devices 1-W can include one or more temperature sensors. At least one of the temperature sensors can be operable to air temperature or ambient temperature. One or more temperature sensors can be implemented by utilizing a negative temperature coefficient thermistor, a resistance temperature detector, a thermocouple, a semiconductor based temperature sensor, a thermometer, and/or another thermal sensor device operable to collect temperature measurements.

Alternatively or in addition, at least one of the temperature sensors can be operable to measure surface temperature of an object such as a feature of interest within the facility and/or a part of the facility itself. One or more surface temperature sensors can include an infrared radiation sensor that measures infrared radiation given off by the surface of an object to collect surface temperature measurements for the object. One or more surface temperature sensor can utilize a microbolometer to measure infrared radiation. Alternatively or in addition, one or more surface temperature sensors can utilize a surface contact sensor that measures the surface temperature of an object via physical contact. Alternatively or in addition, one or more surface temperature sensors can utilize a probe, for example, that extends from the multi-sensor unit 120, where the probe makes contact with and/or is submerged within a feature of interest to be measured such as a liquid, soil, and/or another feature.

The set of sensor devices 1-W can include one or more humidity sensors. One or more humidity sensors can utilize a capacitive humidity sensor and can generate humidity measurements by measuring moisture levels by utilizing a humidity-dependent condenser. One or more humidity sensors can utilize a resistive humidity sensor and can generate humidity measurements by measuring electrical change in conductive polymers and/or treated substrates. One or more humidity sensors can utilize a thermal conductivity sensor that generate humidity measurements by determining the difference in thermal conductivity between dry and moist air.

The set of sensor devices 1-W can include one or more pressure sensors that measure pressure of the atmosphere, a gas, and/or a liquid. One or more pressure sensors can include an absolute pressure sensor, a gauge pressure sensor, a vacuum pressure sensor, a differential pressure sensor, and/or a sealed pressure sensor. One or more pressure sensors can measure atmospheric pressure by utilizing a barometric pressure sensor and/or another barometer. One or more pressure sensors can generate flow measurements, level and/or depth measurements, leak testing measurements, and/or other measurements characterizing a contained liquid or gas being measured. Alternatively, some or all of these measurements can be calculated by processing module 240 and/or the monitoring data analysis system 140 by utilizing the raw pressure measurements collected by the one or more pressure sensors over time, for example, by performing one or more processing functions.

The set of sensor devices 1-W can include one or more gas sensors, such as one or more carbon dioxide sensors, one or more carbon monoxide sensors, one or more volatile organic compound sensors, one or more air quality sensors, and/or one or more other gas sensors operable to measure the amount of and/or ratio of one or more particular types of gases in the atmosphere and/or within a contained area. The one or more gas sensors can utilize infrared gas sensors and/or chemical gas sensors to generate its measurements. The one or more gas sensors can be operable to measure a quality of the air based on detected levels of a plurality of different types of gases detected by the one or more gas sensors. Alternatively, an air quality metric can be calculated by processing module 240 and/or the monitoring data analysis system 140 by performing one or more processing functions on raw measurements generated by one or more gas sensors.

The set of sensor devices 1-W can include one or more soil sensors that measure properties of soil. This can include soil moisture sensors moisture levels and/or volumetric water content. This can include soil moisture sensors that include water potential sensors that include tensiometers and/or gypsum blocks. This can include soil pH sensors that measure pH levels of soil.

The set of sensor devices 1-W can include one or more light sensors that measure properties of detected visible light. This can include measures of brightness and/or illuminance such as lux measurements, measures of luminous intensity such as candela measurements, measures of luminous flux such as lumens measurements, color temperature measurements, measurements for detected red, green, and blue components of detected light, and/or other measurements of light. These can include one or more photodetectors, cameras, or other light sensors.

The set of sensor devices can include one or more electrical sensors. These can include voltage sensors and/or current sensors that utilize current transformers to generate current measurements. Voltage and/or current measurements of the same electrical source can be utilized by the processing module 240 and/or monitoring data analysis system 140 to calculate power measurements, for example, by performing at least one processing function. This can include utilizing time-series measurements of voltage and/or current to determine magnitude and phase of voltage and current waveforms, and can further include determining a phase offset between these voltage and current waveforms. For example, if the voltage and current measurements are synchronized and/or correspond to synchronized timestamps, differences in time between timestamps of peak magnitude of the voltage waveform and current waveform in a particular time window, or otherwise measuring difference in phase of the voltage waveform and current waveform based on synchronized time-series measurements of voltage and current. This information can be utilized to generate measurements of real power, reactive power, and/or apparent power. The power measurements can correspond to single phase power measurements and/or three phase power measurements, for example, where voltage and/or current are measured for one line of a three phase system, with the knowledge and/or presumption that the load is balanced across the three lines, and where power measurements for the three-phase system are extrapolated based on the assumption of balance and based on the measurements of one line. Alternatively, measurements all three lines can be collected to generate voltage, current, and power measurements for each line and/or for the three-phase system as a whole.

In some embodiments, if the power source 230 utilizes the same power source, such as an AC power source, being measured by one or more of its electrical sensors, some or all of the power constraint data can be generated as a function of the current measurements collected by the electrical sensors. For example, the power constraint data can dictate a decrease in power utilization by the multi-sensor unit if the collected measurements indicate a decrease in power delivered by the AC source, variability and/or alarming spikes in power delivered by the AC source, and/or in response to otherwise determining electrical measurements compare unfavorably to measurement thresholds. In such embodiments, the prioritization of the electrical sensors can increase relative to other sensors and/or the electrical sensors can continue their normal monitoring and/or an increased monitoring of the power source, despite the power constraint data indicating that power utilization and/or functionality of the multi-sensor unit as a whole be decreased.

The set of sensor devices 1-W can include one or more noise, acoustic, and/or vibration sensors, operable to measure one or more characteristics of noise, sound, vibrations, and/or other acoustic data. The one or more acoustic and/or vibration sensors can be operable to measure noise level, to measure decibel levels, to measure pitch and/or timbre of sound, measure vibration frequency and/or vibration amplitude for vibrations in the air or vibrations of a surface, to detect the physical location and/or physical source of a detected sound, to determine a particular feature in the facility that produced the sound based on characteristics of the sound and/or a location from which the sound was determined to originate, to detect and/or process human speech, to detect and/or process animal sounds, to collect raw audible sound data over time, and/or to collect raw inaudible sound data over time. Some or all of this information can be determined in processing of the raw measurements collected by the noise, acoustic, and/or vibration sensors. In some embodiments, raw measurements collected by a single acoustic sensor and/or multiple acoustic sensors, such as multiple directional acoustic sensors and/or multiple acoustic sensors operable to collect acoustic data in different frequency ranges, can be processed by processing module 240 and/or the monitoring data analysis system 140 by performing one or more processing functions to calculate, determine, and/or detect some or all of these particular characteristics of the collected acoustic data. The one or more acoustic sensors can include at least one geophone, at least one hydrophone, at least one lace sensor, at least one guitar pickup, at least one microphone, at least one seismometer, at least one acoustic localization sensor, and/or at least one surface acoustic wave sensor.

The set of sensor devices 1-W can include one or more accelerometers, gyroscopes, and/or magnetometers. Raw and/or processed measurements collected by the one or more accelerometers, gyroscopes, and/or magnetometers can be utilized alone and/or in combination by the processing module 240 and/or the monitoring data analysis system 140 to determine and/or calculate magnetic field measurements, absolute orientation measurements such as heading attitude, absolute orientation in the NESW plane and/or absolute orientation in the Up-Down plane, changes in relative orientation; absolute acceleration and/or changes in relative acceleration, absolute linear velocity and/or relative changes in linear velocity; absolute angular velocity and/or relative changes in angular velocity; and/or absolute position with respect to a global reference frame and/or changes in relative position. In some embodiments, the multi-sensor unit 120 includes an accelerometer, gyroscope, and/or magnetometer for each of a pitch, roll, and/or yaw axis of the multi-sensor unit. The combination of the one or more accelerometers, gyroscopes, and/or magnetometers can be utilized as an inertial measurement unit. For example, an inertial measurement unit sensor device can be utilized to calculate some or all of these measurements based on measurements collected across its one or more accelerometers, gyroscopes, and/or magnetometers, where some or all of these measurements are collected as raw measurements by the inertial measurement unit sensor device without post-processing by the processing module 240 and/or the monitoring data analysis system 140. In some embodiments, vibration data is collected by utilizing the one or more accelerometers, gyroscopes, and/or magnetometers based on vibrating motion detected by the one or more accelerometers, gyroscopes, and/or magnetometers, and the one or more accelerometers, gyroscopes, and/or magnetometers can be implemented as vibration sensors as described herein.

At least one multi-sensor unit 120 that includes one or more accelerometers, gyroscopes, and/or magnetometers can be installed on a moving feature within the facility, for example, to capture changes in position, orientation, velocity, and/or acceleration of the feature to characterize the motion of the object. This can be utilized to track and/or characterize changes in motion type and/or location of the moving feature across the facility. For example, at least one multi-sensor unit 120 can be installed upon features that move throughout the facility, equipment that move throughout the facility, vehicles that move throughout of the facility, animals that move throughout the facility, customers that move throughout the facility, and/or personnel that move throughout the facility can be monitored, where their motion patterns across multiple locations are tracked and/or to monitor the cadence of movement, velocity of movement, acceleration changes, orientation changes, and/or characteristics and/or changes in movement of the moving features.

Alternatively or in addition, this can be utilized to measure motion of the feature within a stationary location and/or relative to a fixed location. For example, the moving feature can correspond to equipment that undergoes its own vibration or motions while in operation. For example, motors, generators, large machinery, elevators, vehicles, and/or other stationary and/or mobile equipment operating in the facility can be monitored, where its vibration as a whole and/or motion of one or more of its moving parts can be monitored. This can be utilized by the processing module 240 and/or the monitoring data analysis system 140, via performance of one or more processing function on the motion data, the to evaluate whether equipment is running, is operating properly and/or is operating within regulatory thresholds. In some embodiments, at least one multi-sensor unit 120 is installed directly upon one or more parts of equipment that undergoes vibration or other motion while in operation, allowing the motion of the equipment to be monitored by the monitoring system 100.

In some embodiments, at least one multi-sensor unit 120 is mounted upon or otherwise installed upon a feature that is intended to be stationary, such as a stationary feature inside the facility, the floor of the facility, walls, posts, and/or beams of the facility, a ceiling of the facility, and/or other structural components of the facility itself. In particular these features can undergo vibrational motion and/or other motion as a result physical contact with and/or proximity to the equipment undergoing vibration as a result of its motion in operation. In embodiments where installation of multi-sensor units 120 upon the equipment or other moving feature directly is non-ideal, for example, due to likelihood of the multi-sensor units 120 disconnecting from the equipment as a result of large motions; due to the mounting of the multi-sensor unit impeding the proper operation of the equipment, for example, due to an imbalance caused by the weight of the multi-sensor unit induced upon the equipment and/or due to the presence of the multi-sensor unit obstructing movement or other functionality of the equipment; due to the equipment lacking a flat surface large enough for the multi-sensor unit to be mounted upon, lacking a surface material conducive to installation of the multi-sensor unit via an adhesive, or otherwise lacking a surface for the multi-sensor unit to be mounted upon; and/or due to the motion of the equipment being too large to be accurately measured and/or characterized by the multi-sensor unit. The motion data collected by these multi-sensor units 120 can still be utilized to characterize and/or monitor motion, vibration, and/or operation of the equipment based on the motion induced upon the stationary feature. The motion data can be calibrated and/or normalized over time by the processing module 240 and/or the monitoring data analysis system 140 via performance of one or more processing functions. This can be utilized to determine threshold measurements for the induced motion upon the stationary object that corresponds to normal operation of the equipment and/or regulatory requirements for operation of the equipment.

Alternatively or in addition to using the motion data to determine motion induced by moving equipment to characterize the operation of the equipment, the collection of motion data to measure motion of a feature and/or structural component upon which the multi-sensor unit 120 is installed can be utilized to detect when motion conditions become unsafe, to detect when motion conditions will disrupt and/or negatively growing, production, and/or storage of products within the facility, or to otherwise determine when motion compares unfavorably to measurement thresholds. For example, this can include detecting motion caused by earthquakes and/or seismic activity, motion caused by disruptive activity caused by people or animals in the facility, motion caused by wind conditions, motion caused by excessive vibrations or other motion due to large machinery in the facility or in proximity to the facility, or other unexpected and/or unfavorable motion.

Alternatively or in addition, the motion data can be utilized to capture changes in motion of the facility as a whole and/or different portions of the facility that are intended to be in motion. In particular, the monitoring system 100 can be operable to monitor people serviced by a transportation service, to monitor vehicles that need to be maintained at particular conditions, to monitor valuable cargo being transported by one or more vehicles, and/or to monitor cargo being transported by one or more vehicles that needs undergo constant and/or rigid environmental conditions. For example, multi-sensor units can be installed on vehicles, where a monitoring system 100 corresponds to a single vehicle or multiple vehicles. These vehicles can include air planes, container ships, cruises, other boats, trains, trucks, cars, or other vehicles, where the motion and/or other environmental conditions inside and/or outside the vehicle are monitored. Similarly, a facility that does not change in location, but has constant motion induced, such as a docked, floating facility on a deck, docked boat, and/or other facility floating on water, can be monitored motion induced by floating on the water. Similarly, multi-sensor units can be installed within or upon one or more shipping containers, freight containers, and/or other cargo containers of a monitoring system 100, where the monitoring system 100 includes a single cargo container or multiple cargo containers. The motion and/or other environmental conditions inside and/or outside of a cargo container as it undergoes transportation via one or more different transportation methods can be monitored. The motion data can be utilized to determine when a vehicle, and/or particular features within a vehicle such as people and/or cargo, undergo motion that compares unfavorably to threshold measurements, based on requirements for safety and/or satisfaction of people on the vehicle, requirements for the cargo on the vehicle, and/or requirements for safe and/or efficient operation of the vehicle itself.

The same and/or different magnetometer can alternatively and/or additionally be utilized to measure other magnetic fields, such as direct current fields caused by electrical activity in the facility. The set of sensor devices 1-W can alternatively and/or additionally include electromagnetic field sensors, and/or gaussmeters operable to measure electromagnetic fields, for example, by collecting broadband measurements and/or frequency selective measurements based on a spectrum of interest, for example, corresponding to a spectrum of an electromagnetic field induced by equipment and/or a feature of interest in the facility. In some embodiments, one or more antennas of the transceiver 220 and/or additional communication interfaces can be utilized to determine if electromagnetic interference is present and/or is interfering with communications sent and/or received by the multi-sensor units. In some embodiments, the multi-sensor units can monitor its own health and/or performance its own operations to determine if electromagnetic interference is present based on a disturbance and/or degradation of its own performance.

The set of sensor devices 1-W can include a geolocation sensor operable to measure an absolute location and/or otherwise measure geolocation data of the multi-sensor unit. This can be utilized to determine absolute location of the multi-sensor unit, for example, to track location of various moving features within the facility as discussed above, and/or to track the location of the facility itself if the facility is aboard a vehicle and/or corresponds to a vehicle itself as discussed above. This can include a Global Positioning System (GPS) device and/or another device that utilizes a Global Navigation Satellite System (GNSS) to receive multiple signals transmitted by satellites of the GNSS system and to process the multiple signals to determine a current position. Alternatively or in addition, the geolocation sensor can determine location based on receiving radio signals, and utilizing timing data of the signal, a signal strength of the signal, and/or known and/or extracted location of the source of the signal to determine and/or estimate a current location. This can be based on receiving cellular signals via at least one of the additional communications interfaces and/or can be based on a Wi-Fi network connection established by utilizing at least one of the additional communications interfaces. This can be based on receiving geolocation data from a client device 160 or other device that includes its own GPS device and/or utilizes a cellular connection and/or Wi-Fi connection to generate its own location data. For example, at least one of the additional communications interfaces can be utilized to facilitate short range radio transmissions and/or a wired connection with the computing device to collect geolocation data generated by the computing device, and the processing module 240 can utilize the geolocation data of the computing device as the location of the multi-sensor unit.

Alternatively or in addition if the multi-sensor unit is installed on a feature that moves throughout the facility, thus changing position relative to the facility, a distance from one or more gateway devices 130 and/or a position relative to one or more gateway devices 130 of the monitoring system can be calculated and/or estimated. This can be determined based on based on signal strength of signals received from the one or more gateway devices 130 via the transceiver 220 and/or via one or more of the additional communications interfaces operable to receive the signals transmitted by one or more gateway devices 130; based on known locations of the one or more gateway devices 130; and/or based on timing data extracted from the signals received from the one or more gateway devices 130 if timing between the one or more gateways devices and the multi-sensor unit 120 is synchronized. Performing these distance and/or relative position calculations and/or estimates can include performance of one or more processing functions by the processing module 240 and/or by the monitoring data analysis system 140.

Alternatively or in addition, if one or more other multi-sensor units 120 are installed in fixed locations relative to the facility, a multi-sensor unit installed on a feature that moves within the facility can estimate and/or calculate a distance from one or more of these fixed location multi-sensor units 120; estimate and/or calculate a position relative to one or more of these fixed location multi-sensor units 120 of the monitoring system 100; and/or determine a proper subset of the fixed location multi-sensor units 120 that the moving feature is in proximity to. This can be determined based on receiving signals, broadcasted by these fixed location multi-sensor units 120 to the gateway device 130, via the transceiver 220 and/or via one or more of the additional communications interfaces. Identifiers for these fixed location multi-sensor units 120 from which the signal was received can be utilized to determine a region within the facility that the moving feature is within and/or in proximity to, if the signals are only received from a proper subset of the fixed location multi-sensor units 120 installed in the facility. The signal strength of these signals broadcasted by one or more multi-sensor units 120; extracted timing data such as timestamps for measurements data included in these signals and/or a transmission time if timing between the one or more gateways devices and every multi-sensor unit 120 is synchronized; and/or the known locations of these more multi-sensor units 120 can be utilized to calculate and/or estimate distance from and/or position relative to these other multi-sensor units and/or to determine relative position within the facility. Performing these distance and/or relative position calculations and/or estimates can include performance of one or more processing functions by the processing module 240 and/or by the monitoring data analysis system 140.

Alternatively, the gateway device 130 and/or the monitoring data analysis system 140 can generate the distance and/or relative location estimate and/or prediction by utilizing the known location of the gateway device within the facility, a signal strength of the measurement data signal received from the multi-sensor unit, and/or timestamp data of the measurement data and/or other timing data extracted from the signal if the timing between the gateway device 130 and the multi-sensor unit is synchronized. In some embodiments, if multiple gateways 130 are included in the facility at known locations and receive the signal; signal strength of the signal broadcasted by the multi-sensor unit 120 and received by some or all of the multiple gateways 130; and/or difference in time that the signal is received by the multiple gateways, if the multiple gateways are synchronized, can be logged by each gateway device 130, and this information can be included in the transmissions from the gateway to the monitoring data analysis system 140, enabling the monitoring data analysis system 140 to calculate and/or estimate a distance from and/or position relative to the multiple gateway devices 130 based on receiving this information from each gateway device 130.

One or more of the set of sensor devices 1-W can include optical sensors and/or imaging sensors utilized to capture image data in the electromagnetic spectrum. These can include cameras or other imaging sensors that capture visible image data, and can capture video data and/or still photograph data. These can include thermal imaging sensors such as microbolometers that capture thermal image data. One or more processing functions of the function library 216 can be performed on the captured visible, thermal, and/or other electromagnetic image data to pre-process, compressed, and/or generate metrics characterizing the image data. This can include characterizing features such as color and/or brightness of visible image data, detecting the presence and/or movement of objects, people, and/or other features the visible and/or thermal image data, detecting temperature and/or the heating and cooling of equipment and/or other features detected in thermal image data, detecting unexpected changes in the image data captured over time, and/or otherwise summarizing and/or extracting information from the image data. In particular, such pre-processing can be performed by the multi-sensor unit 120 to generate smaller volume of data that characterizes the captured image data, without having to transmit all of the captured image data to the gateway device.

One or more of the set of sensor devices 1-W can include tracking sensors such as an RFID reader, QR code scanner, barcode scanner, facial recognition sensor, biometric identification scanner, or other sensor that automatically detects the presence of identifying information that can be utilized to identify a particular one of a plurality of feature identifiers, such as particular products, equipment, animals, customers, and/or personnel within the facility. In some embodiments, a visible image capture device is utilized as a tracking sensor to detect identifying visual features, such as QR codes, logos, and/or faces. Various features in the facility, such as products stored, manufactured, and/or sold in the facility, equipment of the facility, customers visiting the facility, and/or personnel of the facility can be identifiable via an identifying tag, which can be detected by the tracking sensor to determine that the particular feature is in proximity to a particular one of the multi-sensor units 120. For example, passive and/or active RFID tags can be attached to and/or embedded within various features and/or can be carried by and/or worn by features corresponding to people or animals. The RFID reader of a multi-sensor units 120 can be utilized to detect that a particular feature is in proximity to the multi-sensor unit. Other tracking devices can similarly be utilized to detect and identify a feature based on detecting a barcode, QR code, face, identifying biometric information, and/or other identifying tag. This information can be utilized by the monitoring data analysis system 140 to determine a location and/or zone within the facility that various features are located at particular times, and can be utilized to track the movement of the features throughout the facility over time.

In some embodiments, at least one of the additional communication interfaces 1-M are utilized to as tracking sensors. For example, short range radio signals transmitted by client devices 160, additional data sources 170, and/or other computing devices can be received by at least one of the additional communication interfaces 1-M. This can be utilized by the multi-sensor units 120 to detect that this device is proximity to the multi-sensor units 120. This information can similarly be utilized by the monitoring data analysis system 140 to determine a location and/or zone within the facility that various computing devices are located at particular times, and can be utilized to track the movement of people associated with these computing devices. The multi-sensor unit can generate measurement data indicating an identifier of the computing device, and/or timestamp data indicating the time that a signal was received from the computing device and/or a timeframe that a pairing and/or bi-directional communications with the computing device was established and/or maintained.

One or more of the set of sensor devices 1-W can include occupancy sensors operable to detect whether or not a region within the facility being measured by the sensor includes a person, animal, and/or another particular feature of interest, and/or to detect how many people, animals, or particular features of interest are within the region at a given time or within a time window. This can include motion detection devices, passive infrared sensors, ultrasonic sensors, and/or microwave sensors. Alternatively or in addition, the occupancy sensors can utilize one or more of the other sensors discussed herein to determine this occupancy data, for example, based on changes in vibration, other motion, noise, electricity, light, carbon dioxide levels, and/or other measures discussed herein that can indicate the presence of people of animals and/or changes in presence in people or animals. The measurement values generated by occupancy sensors can include a binary value indicating whether or not the region is occupied by a feature of interest at a particular time or within a time window, a count of features of interest at a particular time or within the time window, and/or identifiers of features of interest detected in the region within the time window. In some embodiments, an occupancy function is performed by the processing module 240 and/or the monitoring data analysis system 140 on measurement data generated by other sensor devices discussed herein to generate the measurement values corresponding to occupancy.

At least one additional communication interface can be utilized to collect additional measurement data, for example, based on receiving additional measurement data transmitted by another computing device via a receiver of the additional communication interface and/or establishing bi-directional communication with another computing device via a wired connection and/or via a wireless short range connection with the another computing device. This can include receiving measurement data collected by at least one sensor device of the additional computing device, and including this additional measurement data in the measurement data.

In some embodiments, at least one of the sensor devices 1-W is coupled to the multi-sensor unit 120, but is not PCB mounted. In such embodiments, some or all of the additional communication interfaces can be utilized to receive measurement data from and/or send control data to at least one of the sensor devices via a corresponding communication interface of the non-PCB mounted at least one sensor device. For example, some of the sensor devices 1-W, such as a proper subset of the sensor devices 1-W, can be configurable and/or interchangeable by a user of the monitoring system, where the user selects one or more sensor devices, such as commercially available sensor devices, as external sensor devices. A communication interface of each external sensor device, such as a short range wireless radio transceiver and/or a wired connection, can be utilized to pair, connect, and/or facilitate bi-directional communication between the external sensor device and a corresponding additional communication interface of the multi-sensor unit 120. This can extend the measurement capabilities of the multi-sensor unit 120 to further generate measurement data for measurements collected by these external sensor devices. In some embodiments, some or all of these external sensor devices can utilize power source 230, for example, via a wired connection to power source 230, to power the external device. Alternatively, some or all of the external sensor devices can utilize their own power source. In some embodiments, the additional communication interface can be utilized to send control data to the external device to turn the external device on and/or off, to change the frequency of data collection, and/or to tune the resolution and/or quality of data collected.

The multi-sensor unit can be partially and/or entirely enclosed within a protective casing of the multi-sensor unit, for example, protecting and/or covering some or all of these elements while allowing access to the one or more additional communication interfaces 1-M, while enabling the transceiver 220 to transmit and/or receive communications without obstruction, and/or while enabling one or more of the set of sensor devices 1-W to collect measurements outside the protective casing. The material of the protective casing can enable one or more of the set of sensor devices 1-W to collect measurements through the protective casing and/or to collect measurements without being compromised and/or affected by the presence of the protective casing. The material of the protective casing can enable one or more of the additional communication interfaces 1-M to wirelessly transmit and/or receive communications through the protective casing. In some embodiments, one or more holes can be included in the protective casing designated for particular sensor devices, such as cameras, visual image sensors, or other sensor devices whose measurements would be obstructed by the protective casing, and/or designated for one or more of the additional communication interfaces 1-M designated for a wired connection.

The outside of the protective casing can include one or more mounting mechanisms on one or more surfaces of the protective casing, for example, allowing a user to mount and/or install the protective casing in a permanent location. The one or more mounting mechanisms can include one or more screw holes or other holes enabling the multi-sensor unit to be screwed to a wall, and or connected to a feature and/or structural element of the facility via a hook and/or rope looped through the one or more holes to affix the multi-sensor unit to its permanent location. The one or more mounting mechanisms can include one or more clamps, for example, allowing the multi-sensor unit to be installed to a thin cylindrical element and/or prism element within the facility. The one or more mounting mechanisms can include one or more magnets, for example, allowing he multi-sensor unit to be mounted to a magnetic material via the one or more magnets, where the protective casing between the one or more magnets and the electronic elements of the multi-sensor unit includes a shielding material to shield the electronic elements from the one or more magnets. The one or more mounting mechanisms can include one or more detachable mounting mechanisms, allowing the multi-sensor unit to be easily moved to different locations within the facility if a more favorable installation location is determined by the user and/or is determined automatically by the monitoring data analysis system 140.

Alternatively or in addition, one or more mounting mechanisms utilized to install the multi-sensor unit are not included on the multi-sensor unit, and are provided by the user or other person responsible for installing the multi-sensor unit. The outside of the protective casing can be made of a material conducive to being mounted in its permanent location via commercially available adhesives that stick to and/or otherwise attach favorably to the material. Alternatively or in addition, the outside of the protective casing can include at least one flat surface of a large enough area to allows the multi-sensor unit to be installed in its permanent location via an adhesive and/or to otherwise be mounted flush to a wall, beam, or other feature and/or structural element. Alternatively or in addition, the multi-sensor unit can be configured to be installed upon the ground or a flat, elevated surface, where the multi-sensor unit remains in place via the force of gravity and the normal force induced by the ground or other flat surface, and where no mounting mechanisms are necessary.

In some embodiments, one or more sensor devices is directional relative to the multi-sensor unit, for example, only capturing measurements in a particular direction relative to the multi-sensor unit and/or only capturing measurements if a corresponding side of the multi-sensor unit is not obstructed and/or installed at a particular orientation. For example, a camera in a particular orientation and position will only capture image data in a particular field of view. As another example, light sensors will not capture accurate brightness readings and/or microphone sensors will not capture accurate acoustic information if facing a wall or submerged underground and/or underwater. The multi-sensor unit may be configured to be installed in a particular orientation based on the orientation of one or more directional sensor devices. In some embodiments, the directionality of such sensor devices is configurable by the user, for example, where a user can manually adjust the position and/or orientation of these sensors and/or where motors controlling the position and/or orientation of these sensors can be configured via control data sent to the multi-sensor unit.

In some embodiments, if a multi-sensor unit is installed in a wrong location and/or, configuration and/or moves from its original location and/or configuration, measurements captured by its accelerometer, gyroscope and/or magnetometer sensors can be utilized to automatically send an alert, for transmission to the monitoring data analysis system via the gateway device, that the sensor is in an unideal configuration and/or has moved from its intended installation configuration. This can be utilized to send an alert to a user for display via graphical user interface 190 of a client device 160, notifying the user of the particular multi-sensor unit, the location of the multi-sensor unit, and instructions for correction of orientation and/or position of the re-installment of the multi-sensor unit.

The multi-sensor unit can be configured to be installed in conditions not affected by electromagnetic interference due to an electromagnetic field. Electromagnetic sensors measuring electromagnetic field can be utilized to determine if the installation location of multi-sensor unit is induced by an undesirable amount of electromagnetic interference. This information can be utilized to send an alert to a user for display via graphical user interface 190 of a client device 160, notifying the user of the particular multi-sensor unit, the location of the multi-sensor unit, and instructions for correction of location of the re-installment of the multi-sensor unit. For example, other installed multi-sensor units measuring electromagnetic fields within the facility can be utilized to generate a mapping of electromagnetic fields across the facility in two dimension or three dimensions. This can be utilized to automatically suggest installation locations that have a low and/or otherwise acceptable level of electromagnetic interference induced by one or more electromagnetic fields.

In some embodiments, the multi-sensor unit includes multiple directional sensors operable to collectively capture a type of measurement from every angle in three-dimensions, relative to the center of the multi-sensor unit. This can be optimal in ensuring that any installation of the multi-sensor unit 120 selected by the user won't render a particular sensor type useless. In such embodiments, if a side of the multi-sensor unit is installed against a wall or boundary of the facility and/or is partially submerged within soil in the ground of a facility, a directional sensor such as an image capture sensor and/or light sensor can automatically be turned off in response to detection of this installation and/or in response to control data indicating that this directional sensor is facing a wall and/or is pointed outside the facility. In some embodiments, one or more directional sensors can automatically be turned off in response to control data based on a user selection or automatic determination that these one or more directional sensors are not directed towards a feature of interest, an automatic determination that sensor input to this sensor is always static, and/or an automatic determination that the sensor data is otherwise not important.

In some embodiments, installation locations of multi-sensor units can be based on the desire to collect different types of data. For example, a first multi-sensor unit placed directly under a light source can be prioritized for light measurements, and its soil moisture sensor may be turned off, may be collecting data very infrequently, and/or may be collecting measurements that are rarely and/or never transmitted in data packets to the gateway device. Alternatively, a multi-sensor unit partially and/or entirely submerged within soil can be prioritized for soil moisture measurements, and its light measurement sensor may be turned off, may be collecting data very infrequently, and/or may be collecting measurements that are rarely and/or never transmitted in data packets to the gateway device. These different modes of collection can be received as control data based on a determination by the monitoring data analysis system 140, a determination by the processing module 240, and/or a determination via user input to graphical user interface 190, for example, based on whether or not readings by particular sensors are static and/or important, based on user configuration of the multi-sensor units, based on a determined orientation and/or position of the multi-sensor unit measured based on its accelerometer, gyroscope and/or magnetometer data, and/or based on other information.

In some embodiments, the monitoring system 100 includes a plurality of multi-sensor units that fall into two types: a first type of multi-sensor unit and a second type of multi-sensor unit. Each of the plurality of multi-sensor units can correspond to one of these two types. The gateway device 130 can be operable to forward communications received via the long-range wireless communication protocol from only these two types of multi-sensor units.

The first type of multi-sensor unit can be exclusively powered by a battery source. The first type of multi-sensor unit can include a plurality of PCB mounted sensors, for example, where all of its sensors 1-W are PCB mounted. The PCB mounted sensors include least one of: a temperature sensor; a humidity sensor, an atmospheric pressure sensor; an occupancy sensor; an infrared surface temperature sensor; a gas sensor for carbon dioxide, carbon monoxide, and/or volatile organic compounds; a microphone or other sound level and/or noise sensor; an accelerometer; a magnetometer; of a gyroscope. In some embodiments, every sensor of the first type includes all of these sensors. In some embodiments, the first type of multi-sensor unit includes all of these PCB mounted sensors. In some embodiments, the first type of sensor further includes at least one of: GPS sensor, a visible image sensor, and/or a thermal imaging sensor. In some embodiments, the first type of multi-sensor unit does not include a voltage sensor and does not include a current sensor.

In some embodiments, the first type of multi-sensor unit includes three, or any number, of additional communication interfaces. The configuration of these additional communication interfaces can be the same or different for different ones of the first type of multi-sensor unit across the facility. These additional communication interfaces can be utilized to collect sensor data via a wired and/or short range wireless connection to an additional sensor; can be utilized to send control data to a connected device via a wired and/or short range wireless connection; and/or can be utilized to send and/or receive communications via network 150 and/or via another communications method that is different from the communication protocol utilized by transceiver 220.

All of the first type of multi-sensor unit can include an identical set of PCB mounted sensors, but different ones of these identical set of sensors can be powered on and/or off on different multi-sensor units in the facility. All of the first type of multi-sensor unit can be physically identical, and/or can otherwise further include identical types of power sources 230, identical memory devices to implement memory module 210, identical processor devices to implement processing module 240, an identical transceiver 220, an identical set of additional communication interfaces and/or no additional communication interfaces, identical PCBs, identical circuitry, and/or identical protective casing.

The second type of multi-sensor unit can include at least one voltage sensor and at least one current sensor. The second type of multi-sensor unit can be powered by a connection an AC power source via an AC jack of the second type of multi-sensor unit. This can correspond to the AC power source being monitored by its at least one voltage sensor and at least one current sensor, and/or can correspond to the AC power source delivering voltage and/or current to a device, wires, and/or a circuit being monitored by its at least one voltage sensor and at least one current sensor. The second type of multi-sensor unit can alternatively and/or additionally be powered by parasitic energy harvested by utilizing at least one current transformer to collect current measurements via the at least one current sensor.

The second type of multi-sensor unit can include sixteen and/or any other number of input channels. The input channels can correspond to additional communication interfaces 1-M. Each of a subset of these input channels can utilized to collect voltage measurements or current measurements. In some embodiments, all input channels are only utilized to collect voltage measurements or current measurements. In some embodiments, discrete groups of these channels are processed in tandem to generate single phase and/or three phase power measurements from the corresponding voltage and current measurements in the discrete group. In some embodiments, at least one of these input channels is not utilized to collect voltage measurements or current measurements, and is instead left unutilized.

In some embodiments, at least one of these available input channels is not utilized to collect voltage measurements or current measurements, and is instead utilized to collect other measurements discussed herein via a wired connection to the input channel. This can include a wired connection to a sensor device 1-W, and/or another wired collection to collect data from sensors and/or otherwise receive electrical input utilized to collect other types of measurements discussed herein, such as flowrate measurements, temperature measurements, and/or pressure measurement. In some embodiments, at least one of these available input channels is not utilized to collect voltage measurements or current measurements, and is instead utilized to collect other measurements discussed herein via a wired connection to the input channel. In some embodiments, at least one of these available input channels is not utilized to collect voltage measurements In some embodiments, at least one of these available input channels can be configured as an output channel, and is instead utilized to send and/or receive communication data, for example, via network 150 and/or via another communication method that is different from the communication protocol utilized by transceiver 220.

While every one of the second type of multi-sensor unit can include an identical number of input channels, each second type of multi-sensor unit can be configured to receive different types of input and/or generate different types of output by some or all input channels. All of the second type of multi-sensor unit can be physically identical, and/or can otherwise further include identical AC jacks, identical memory devices to implement memory module 210, identical processor devices to implement processing module 240, an identical transceiver 220, an identical set of additional communication interfaces, identical circuitry, and/or identical protective casing.

Figure 4:
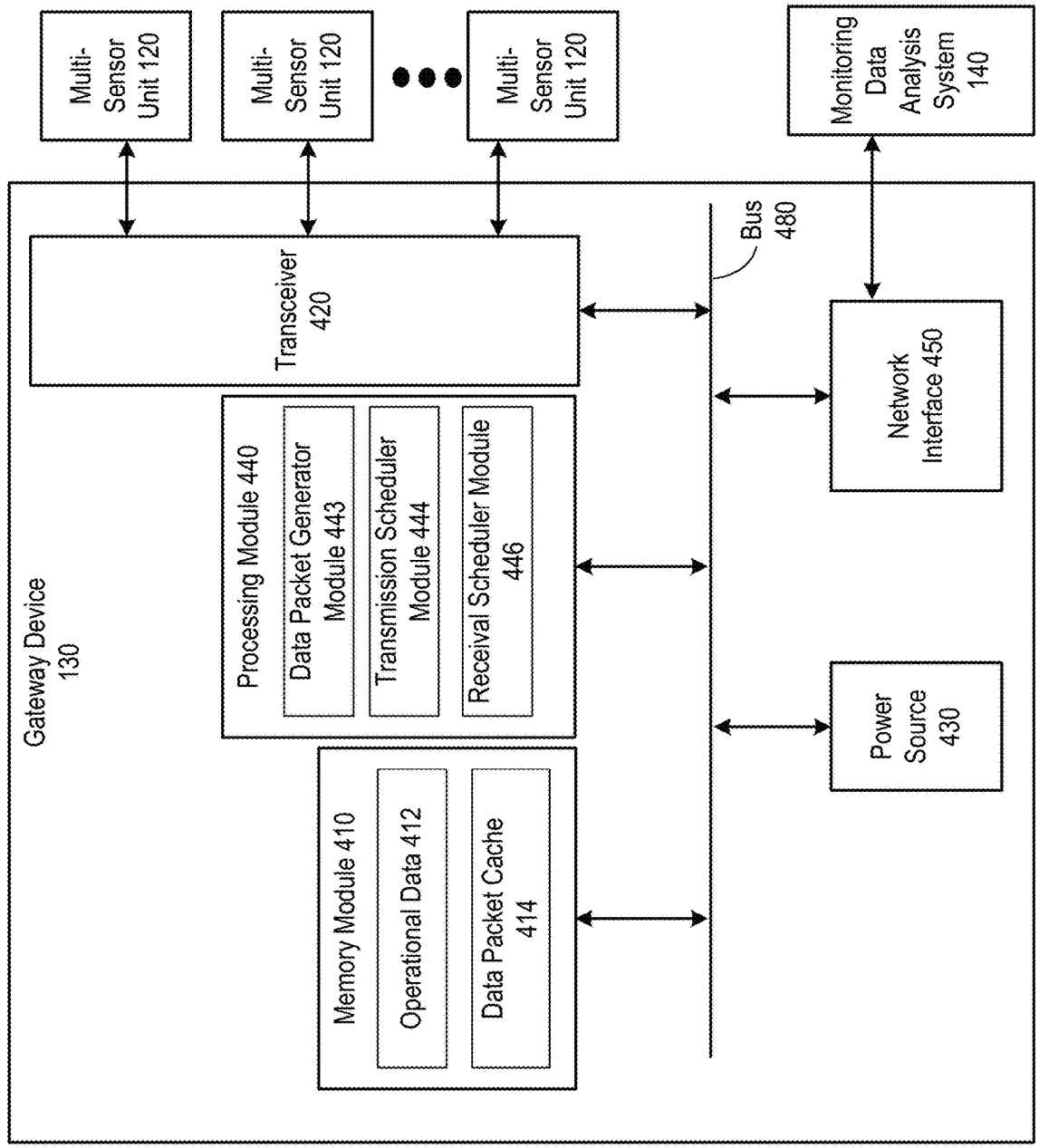
FIG. 4 is schematic block diagram of a gateway device in accordance with various embodiments of the present invention.

FIG. 4 presents an embodiments of a gateway device 130. Gateway device 130 can include a memory module 410, a processing module 440, a power source 430, a network interface 450, and/or a transceiver 420, connected via bus 480.

Transceiver 420 can be operable to communicate with a plurality of multi-sensor units 120. The transceiver 420 can be the same as transceiver 220 and/or can otherwise be configured to transmit and receive communications in accordance with a same frequency band and/or a same communication protocol and/or network protocol utilized by transceiver 220. The processing module 440 can execute a plurality of executable instructions stored as operational data 412 in memory module 410 to receive the plurality of data packets from the plurality of multi-sensor units 120 via network and to forward some or all of this plurality of data packets to monitoring data analysis system 140 via network interface 450. Network interface 450 can transmit the data packets to monitoring data analysis system 140 via the network 150 and/or in accordance with a network protocol of network 150. The network interface 450 can receive data packets, corresponding to control data, from the monitoring data analysis system 140, via the network 150. The transceiver 220 can transmit these data packets to designated multi-sensor units, for example, by broadcasting these data packets with an indication of the recipient multi-sensor unit and/or in a channel and/or within a time window designated for that multi-sensor unit.

Network interface 450 can include a wired and/or wireless connection to network 150 to facilitate transmission of data via network 150. The power source 430 can be operable to power the components of the gateway device to facilitate its operations, and can be the same and/or different from power source 230.

The communications mechanism and/or network protocol of network 150 utilized to facilitate communications between the gateway device 130 and the monitoring data analysis system 140 can be different from the communications mechanism and/or network protocol utilized by transceiver 420 can be the same as transceiver 220 to facilitate communications between the gateway device 130 and the plurality of multi-sensor units 120. The gateway device 130 can be configured to convert a first type of signal received by the transceiver 420 into a second type of signal for transmission by network interface 450, where first type of signal is in accordance with a first communication protocol utilized by the transceiver 420 and where the second type of signal is different from the first type of signal and is in accordance with a second communication protocol utilized by network interface 450. The data packets included in the first type of signal can be included in and/or otherwise recoverable from the second type of signal. The processing module 440 can be utilized to perform this conversion and/or to generate the second type of signal. Alternatively, the network interface 450 can be operable to generate the second type of signal from the first type of signal and/or from data packets extracted from the first type of signal by the processing module 440.

The processing module can further be utilized to implement a data packet generator module 443, a data packet scheduler module 444, and/or a receival scheduler module 446. Functionality of data packet generator module 443, data packet scheduler module 444, and/or or receival scheduler module 446 can operate in updated accordance with the operation data 412, can be updated based on gateway control data received from the monitoring data analysis system 140, can be changed automatically by the gateway device 130 to adapt to network conditions of network 150 and/or a possible transmission rate of data packets via the network interface 450, can be changed automatically by the gateway device 130 to adapt to network conditions the communication network utilized to receive communications via the transceiver 420 from the multi-sensor units 120, and/or can be changed automatically by the gateway device 130 to adapt to a rate of data packets received from the multi-sensor units 120 via transceiver 420.

In particular, measurement data received in data packets extracted from the first type of signal can be repacketed and/or reformatted into different types of data packets of a different size and/or formatting. In some embodiments, a data packet generated by the data packet generator module 443 includes data extracted from multiple data packets received from multiple multi-sensor units, and can include measurement data received from multiple multi-sensor units. Alternatively, the data packets can be simply forwarded in their existing format.

The data packet scheduler module 444 can determine a transmission ordering of the data packets received from the plurality of multi-sensor units and/or generated by the data packet generator module 443, for example, based on a time of receipt of the data packets from the multi-sensor units, based on timestamps of data packet transmission, based on measurement collection timestamps for measurements included in the data packets, based on a fixed, cyclic ordering of the types of data packets and/or the plurality of multi-sensor units, and/or based on a plurality of weights that rank and/or prioritize different ones of the plurality of multi-sensor units and/or different types of packets transmitted by different ones of the plurality of multi-sensor units. In some embodiments, a data packet that includes a measurement determined to compare unfavorably to measurement threshold and/or data packet that indicates detection of a condition of interest can be prioritized, and can automatically be queued to be transmitted next in response to being generated. The data packet scheduler module 444 can determine to buffer received data packets into a data packet cache 414 until they are transmitted via network interface 450.

The data packet scheduler module 444 can further determine a transmission ordering of control data packets received from the monitoring data analysis system 140 and designated for the plurality of multi-sensor units, for example, based on a time of receipt of the data packets from the monitoring data analysis system 140, based on known listening windows of the plurality of multi-sensor units, and/or in an acknowledgement of receipt of a data packet from the corresponding multi-sensor unit or immediately following receipt of a data packet from the corresponding multi-sensor unit. The data packet scheduler module 444 can determine to buffer data packets designated for transmission to multi-sensor units into the same or different data packet cache 414 until they are transmitted via transceiver 420, for example, once there is network availability for the transmission, and/or once a listening window of the corresponding multi-sensor unit is scheduled to be open or otherwise determined to be open. In some embodiments, a single set of data packets including control data is broadcasted for receipt by multiple multi-sensor units, if the same control data is determined to be designated for these multiple multi-sensor units.

In some embodiments, the data packet scheduler module 444 can buffer packets received from the multi-sensor units in response to the data receival rate of the data packets exceeding or otherwise comparing unfavorably to a data transmission rate that the network interface 450, the network 150, and/or the monitoring data analysis system 140 is able to accommodate at a given time. To avoid a lag in measurement data received by the monitoring data analysis system 140, some data packets can be selectively skipped for deletion or for later transmission. Selection of data packets for skipping can be performed in a similar fashion as discussed with regards to the data packet scheduler module 244. This can include determining a proportion and/or number of data packets that need to be skipped, and can further include selecting which ones of queued and/or recently received data packets will be skipped in accordance with the determined proportion and/or number. For example, most recent measurement data timestamps and/or most recently received data packets can be prioritized for transmission, where currently queued older data packets are determined to skipped in response to subsequently receiving more recent packets from the same multi-sensor unit, corresponding to the same type of data packet and/or same types of measurements collected by that multi-sensor unit at a later time. As another example, lower priority data packets from each multi-sensor unit can be skipped, allowing the higher priority data packets from each multi-sensor unit to be transmitted without significant lag. As another example, all data packets from lower priority multi-sensor units can be skipped, allowing some or all data packets from some or all higher priority multi-sensor units to be transmitted without significant lag. In some embodiments, data packets that indicate measurements that compare unfavorably to corresponding measurement thresholds and/or that indicate detection of a condition of interest are never skipped, even if the corresponding sensor device has a low weight and would otherwise have its data packets skipped.

The receival scheduler module 446 can communicate network availability data to the multi-sensor units and/or can be utilized to communicate scheduling data to individual multi-sensor units, for example, to control the transmission windows of individual multi-sensor units, to control a channel utilized by different multi-sensor units, to dictate the transmission scheduling and/or other functionality of each data packet scheduling module 244, and/or to otherwise minimize and/or avoid collisions amongst the different multi-sensor units in facilitating synchronized or asynchronous scheduling of packet transmission by the different multi-sensor units. The receival scheduler module 446 can further acknowledge whether or not a transmission window is available in response to transmission requests from multi-sensor units and/or can acknowledge whether a packet transmitted by a multi-sensor unit was successfully received by the gateway device or needs to be retransmitted.

The receival scheduler module 446 can facilitate scheduling of transmissions across the plurality of sensor units in accordance with differing amounts of available transmission time, bandwidth, and/or packet transmission rates to different multi-sensor units. For example, a plurality of unit weights ranking and/or prioritizing different multi-sensor units can be utilized to allocate different available transmission time, bandwidth, and/or packet transmission rates to different multi sensor units. The available transmission time, bandwidth, and/or packet transmission rates can be proportional to and/or can be a function of the unit weights assigned to the different multi-sensor units. For example, higher priority multi-sensor units can be allotted greater length and/or frequency of available transmission times, can be allotted a greater amount of bandwidth, and/or can be allotted greater packet transmission rates than lower priority multi-sensor units. The weights indicating these priorities can be sent to the gateway module 130 as control data from the monitoring data analysis system 140, and can change over time. This allotted length and/or frequency of available transmission times, allotted bandwidth, allotted packet transmission rates, and/or the corresponding unit weight dictating these allotments, can be indicated in network availability data transmitted to each corresponding multi-sensor unit, can be indicated in the control data generated by the monitoring data analysis system 140 and transmitted to the multi-sensor unit, and/or can be indicated in current mode of operation utilized by the multi-sensor unit.

Figure 5:
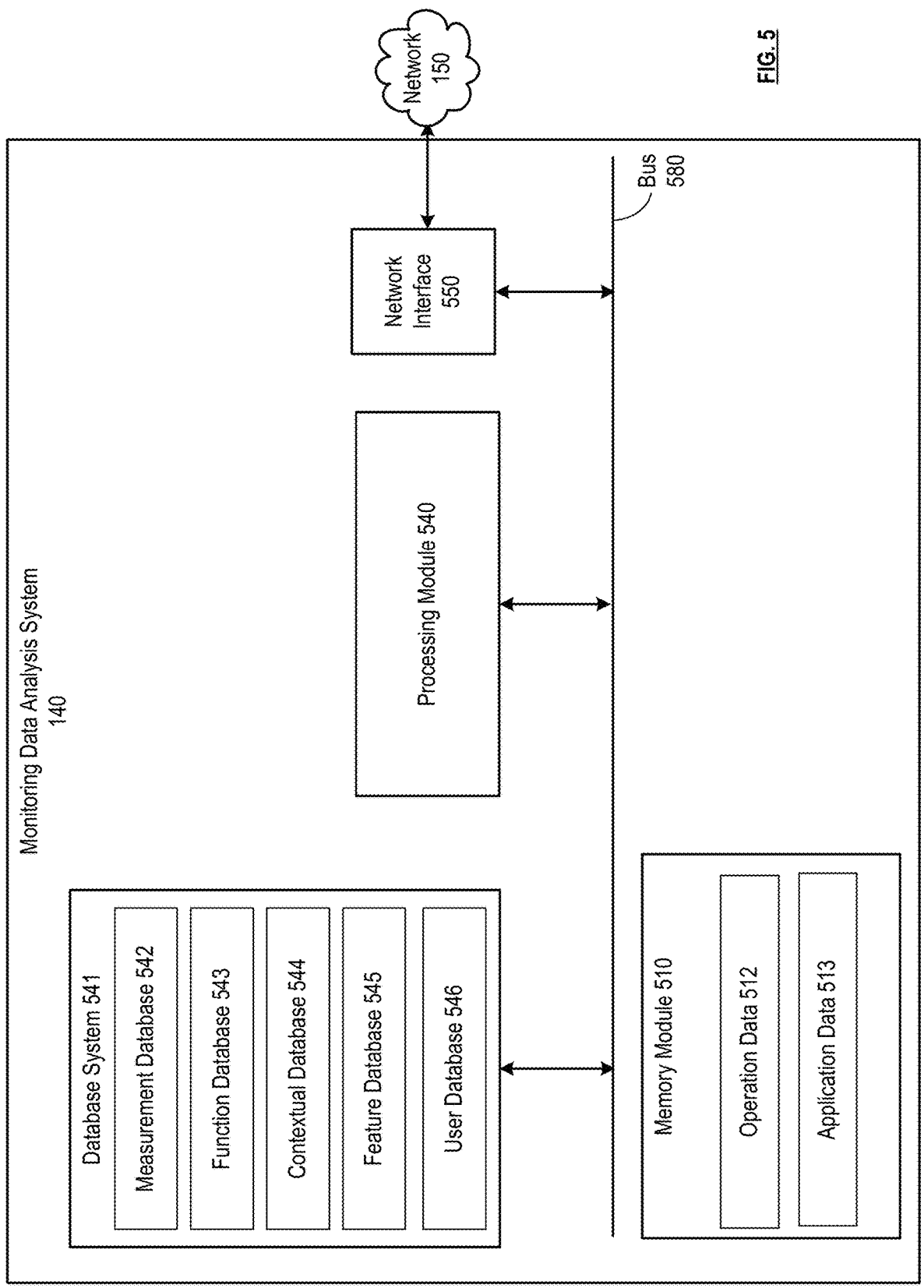
FIG. 5 is schematic block diagram of a monitoring data analysis system in accordance with various embodiments of the present invention.

FIG. 5 presents an embodiment of a monitoring data analysis system 140. The monitoring data analysis system 140 can include a processing module 540 and/or a memory module 510 utilized to perform its various functions, where the processing module and/or memory module can include one or more processing devices and/or one or more memory devices stored in one or more locations, for example, by utilizing at least one server system. The monitoring data analysis system 140 can include a memory module 510 can store operational data 512 that, when executed by processing module 540, causes the processing module to perform operations corresponding to the functionality of the monitoring data analysis system 140 discussed herein.

The monitoring data analysis system 140 can include at least one network interface 550, operable to communicate bidirectionally with one or more gateway devices 130, one or more client devices 160, and/or one or more additional data sources 170, for example, via the same and/or different network 150. For example, the network interface 550 can be the same and/or different from network interface 450 of the gateway device, operable to communicate via the same network 150.

Alternatively, in some embodiments, the gateway device 130 is operable to implement some or all of the functionality of monitoring data analysis system 140, for example, utilizing processing module 440 to implement the processing module 540 of the monitoring data analysis system 140 and/or utilizing memory module 410 to implement memory module 510 of the monitoring data analysis system 140 and/or to implement database system 541 of the monitoring data analysis system 140. In such embodiments, communication between the gateway device 130 and monitoring data analysis system 140 via network 150 may not be necessary, as the gateway device 130 can be configured to locally implement some or all of the functionality of monitoring data analysis system 140 discussed herein.

The memory module 510 can further store client application data 513 for one or more client applications, which can be transmitted to one or more client devices 160 to enable client devices 160 to execute client application data 513. Execution of client application data 513 can cause the client device 160 to display alerts, analysis data, and/or other information generated by monitoring data analysis system 140 via graphical user interface 190. The graphical user interface 190 can further display various prompts for user input, along with corresponding discrete selectable options and/or text boxes allowing the user to select and/or enter user input in response. The client device can collect, process, and/transmit the user input to the monitoring data analysis system 140, in accordance with client application data 513. This enables the user to provide observation measurements and/or customize functionality of various aspects of the monitoring system 100 via user input to graphical user interface 190 as discussed herein.

The monitoring data analysis system 140 can further store and/or otherwise communicate with a database system 541, which can be stored in the same or different plurality of memory devices utilized by memory module 510, for example, utilizing the same or different server system. In some embodiments, monitoring data analysis system 140 accesses the database system 541 via a wired and/or wireless connection, for example, by utilizing network 150.

Bus 580 can couple these components of the monitoring data analysis system 140 via a wired and/or wireless connection to facilitate communication between these components of the monitoring data analysis system 140.

Database system 541 can include a plurality of databases storing various data utilized by monitoring data analysis system 140 and/or utilized by client devices 160. In some embodiments, the database system 541 includes a measurement database 542, a function database 543, a contextual database 544, a feature database 545, and/or a user database 546. The measurement database 542 can be populated by particular measurements taken by various sensor devices of various multi-sensor units over time. In particular, the measurement database 542 can store time-series measurement values for each sensor device of each multi-sensor unit. The function database 543 can be utilized as a function library, populated with entries corresponding to functions that can be performed on measurement data to generate processed measurement values, to generate alerts, and/or to perform analysis. The contextual database 544 can be populated by data describing the facility in which the various multi-sensor units of a monitoring system 100 have been installed. In particular, entries of the contextual database can indicate various features and/or conditions describing different locations within the facility. Alternatively or in addition, a feature database 545 can be populated by data describing particular features in the facility, such as particular machines, equipment, goods and/or products, people, animals, infrastructure of the facility, and/or other features of interest that can be monitored by utilizing the monitoring system 100. The user database 546 can be populated by data for different users communicating with the monitoring data analysis system 140. In particular, user database 546 can store user profile data and/or user preference data for one or more users of client devices 160 that, via user interaction with graphical user interface 190, manage, analyze, and/or respond to measurements and/or analyses stored and/or generated by the monitoring data analysis system 140.

Some or all of the databases of the database system 541 can be relational databases and/or non-relational databases. One or more fields within entries of a databases of database system 541 can reference different entries of a different database, and/or entries between databases can otherwise be linked. For example, key identifiers included as a key field of a first database entry of one database can be included or otherwise referenced in a field of another database entry to map the first database entry to another database entry. The database structure described herein discusses various data fields that can be linked to, mapped to, and/or indicated by particular keyed identifiers, and stored in the same database and/or across different databases in various embodiments of the invention. As used herein, one data field can be "mapped to" and/or "linked to" and/or "indicated by" a second data field by being in the same database entry, for example where the one data field is included as a data field in a database entry keyed by the second data field; or by being in a different database entry of the same or different database, for example, where the one data field is included as a data field in a database entry keyed by a third data field, and where the third data field is included as a data field in a database entry keyed by the second data field.

The present invention is not limited to a particular configuration of storage of data in the database system, and other embodiments can include a different database structure. Other embodiments can include more or less databases, for example, where a database described herein is implemented utilizing multiple databases in other embodiments and/or where multiple databases described herein are implemented utilizing a single database. Other embodiments can include additional types of data fields to database entries and/or can be implemented without including some of the data fields described herein.

Figure 6:
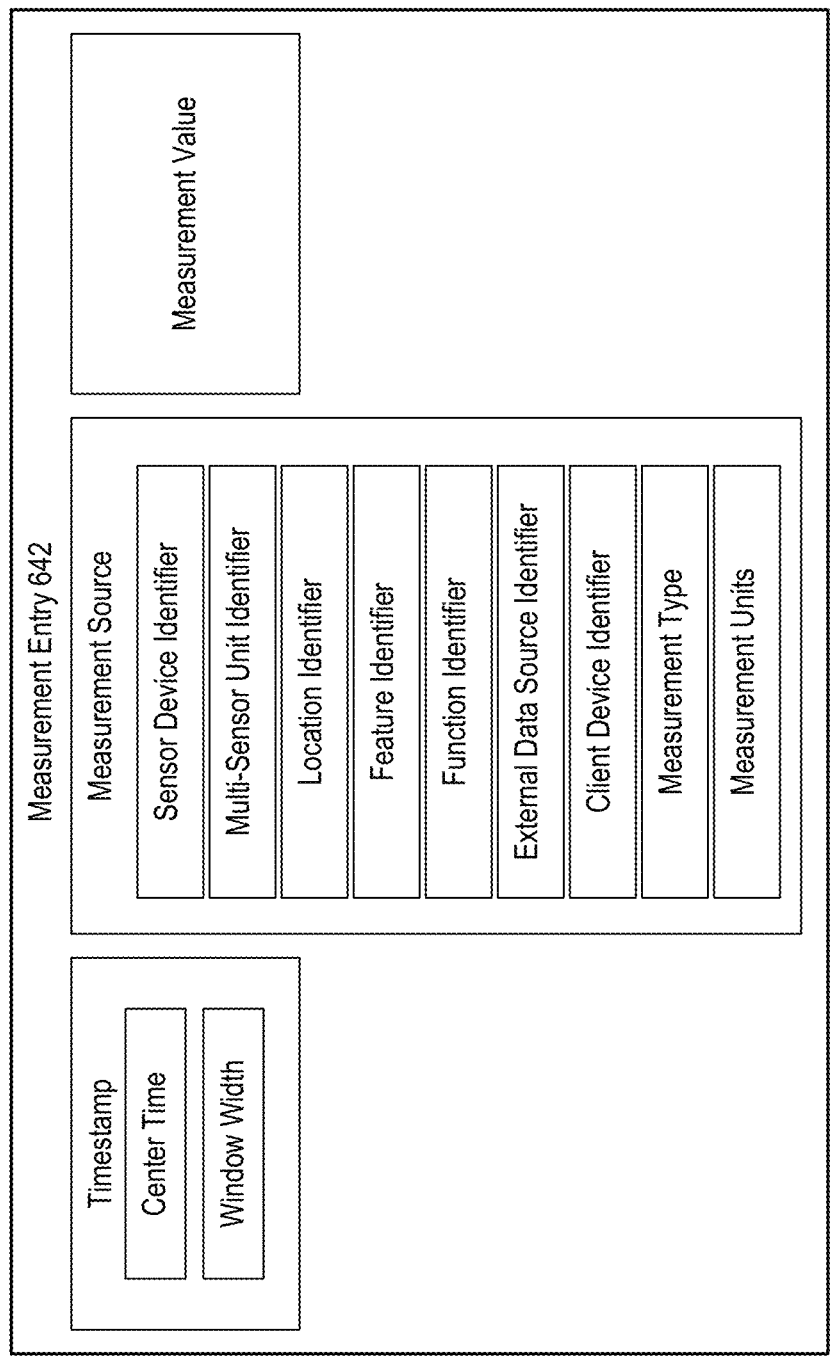
FIG. 6 illustrates an example of data fields populating a measurement entry of a measurement data in accordance with various embodiments of the present invention.

FIG. 6 illustrates an embodiment of a measurement entry 642 of a measurement database 542. The monitoring data analysis system 140 can generate measurement entries of the measurement database 542 that each store a particular measurement value indicated in the measurement data, keyed by a timestamp and a measurement source identifier. Measurement entries can be generated for some or all of the data packets transmitted by the gateway device 130 over time, as they are received over time. The measurement database 542 can thus store measurement entries corresponding all measurement data successfully transmitted by various multi-sensor units 120 in the facility, as well as measurements transmitted by additional data sources 170, by client device 160, and/or generated as output of a synthetic function or other function of function database 543.

The standardization of entries to measurement database 542 for measurements generated by all of these measurement sources, time-aligning the timestamps of entries of measurement database 542, and/or normalizing the measurement values of entries of measurement database 542 can ease the consumability of some of all of this various measurement data collected over time. This can be utilized in automatically facilitating various functionality discussed herein and/or enabling user-friendly configurability of various functionality discussed herein, including but not limited to: determining statistical trends; determining correlations and/or cause and effect relationships between various measurement types; training and performing inference functions to predict the occurrence of conditions of interest and/or to predict the values of future measurements; determining optimal weight distribution of unit weights and/or sensor device weights to optimally allocate bandwidth across different multi-sensor units and/or individual sensor devices based on their learned importance in detecting conditions of interest; determining optimal control of controllable environmental factors; determining optimal locations of various equipment, inventory, people, and/or other objects in the facility; and/or otherwise determining optimal conditions for optimal functioning of the facility.

The measurement value can correspond to raw and/or pre-processed sensor data collected by a sensor device. The measurement value can be one of a plurality of possible discrete and/or continuous values measured by the sensor device. Alternatively, the measurement value can include or indicate a set of different discrete and/or continuous values measured by one or more correlated sensor devices. The measurement value can include and/or be generated based on processing signal data such as frequency domain data and/or captured time-series data within a time window centered by or otherwise indicated by the timestamp. The measurement value can include and/or be generated based on processing media data such as audio data, video data, and/or one or more still images. The measurement value includes a binary indicator, indicating of whether or not a condition of interest exists. The measurement value can include a probability value, indicting a probability of whether or not a condition of interest exists. The measurement value can include a human generated qualitative and/or evaluative measure and/or observation, where measurement value includes or is generated by processing human generated text and/or human generated selections made from a discrete set of options. The measurement value can include a predicted value, indicating a prediction for an unknown and/or future measurement, for example, generated by performing an inference function that utilizes a model that was trained on a training set of measurement entries of the measurement database.

The measurement source identifier can include one or more fields indicating where the measurement value originated and/or any processing that was induced to generate the measurement value. The measurement source can indicate a particular multi-sensor unit 120 determined to have captured the measurement value. The measurement can indicate an identifier for a particular sensor device of a particular multi-sensor unit 120 determined to have captured the measurement value. The measurement source identifier can indicate a particular feature, or a particular part of a particular feature, that was measured to generate the measurement value. These identifiers can be extracted from the original data packets transmitted by the multi-sensor units and/or can be extracted from the data packets packaged by the gateway device.

The measurement source identifier can indicate a particular location within the facility where the measurement occurred, for example, linking to a contextual database entry for the location. The measurement source identifier can indicate a feature within the facility that the measurement was taken of, for example, linking to a feature database entry for the feature.

The measurement source identifier can link to at least one function identifier corresponding to a function performed to generate the measurement value, for example, linking to a function entry of the function database 543. This can correspond to a function identifier for a function of function library 216 that is performed by a multi-sensor unit by utilizing measurement processing module 242 before the multi-sensor unit's transmission of the measurement. This can correspond to a function identifier corresponding to a function performed by the monitoring data analysis system 140 after receiving the measurement data to generate a final measurement value.

The measurement source identifier can indicate an additional data source 170 that generated the measurement value and/or from which a processed measurement value is derived from. The measurement source identifier can indicate a client device 160 that generated the measurement value and/or from which a processed measurement value is derived from. The measurement source identifier can indicate a particular person, such as particular personnel of the facility or a particular customer of products or services provided by the facility, that generated the measurement value and/or from which a processed measurement value is derived from. This can correspond to a user identifier indicating a user in the user database and/or a feature identifier indicating a feature of the feature database, and/or can be linked to the client device identifier.

The measurement source identifier can be utilized to determine the type of data and the units of data the measurement value corresponds to. In particular, the type of sensor corresponding to the sensor device that captured the measurement value and/or a function performed to generate the measurement value can be derived from the measurement source identifier and can be utilized to determine measurement type and units. Alternatively, the measurement source can explicitly indicate and/or link to the type of measurement and/or units for the measurement as one or more additional fields.

Measurement values can be normalized for its corresponding measurement source. A normalization function to be performed on the measurement values can be a function of the measurement source. The measurement value received by the monitoring data analysis system 140 that was collected by a certain device and/or generated as output to a certain function performed can be normalized in accordance with the expected and/or absolute bounds of the measurement collection of the device and/or output of the certain function. For example, every normalization function can output values within the same range, given different ranges of input values. Each normalization function can be a direct or indirect function, a linear or non-linear function, and and/or a strictly increasing or strictly decreasing function. This resulting normalized output results in all measurement values across the measurement database being within the same range. This can be useful in easing analysis across multiple data sources, for example, to perform statistical measurement functions, to train inference functions, and/or enable user-configurable processing. Each normalization function can be lossy or lossless, enabling the original value to be recoverable and/or estimated given the measurement source.

The timestamp can indicate a single time and/or a time window that the measurement value was collected by its originating source. The timestamp can be generated by a multi-sensor unit based on a collection time for the measurement and/or a transmission time of the measurement. The timestamp can be generated by the gateway device 130 based on a time the measurement was received from the multi-sensor unit. The timestamp can be generated by the monitoring data analysis system 140 based on the time the measurement was received from the gateway device 130, from an additional data source 170, and/or from a client device 160. The timestamp can indicate a single time and/or a time frame that the measurement value was generated by processing raw measurements and/or other information. The timestamp can indicate a center of the time window, can include the width of the time window, and/or can otherwise indicate the bounds of the time window. In some embodiments, the timestamp indicates a single time, and can indicate the time window bounds based on the corresponding measurement source indicating a time window width utilized to generate the bound and/or whether the time window begins, is centered by, and/or ends with the timestamp. This can be determined based on an identifier of a function utilized to generate the measurement value and/or known delays between a plurality of multi-sensor units 120 utilized to generate the measurement value, for example, indicated in the measurement source field. In some embodiments, the timestamp is the only indicator of time, and while the corresponding measurement may have been taken within a time window that includes the timestamp and/or is within proximity of the timestamp, the actual bounds of the time window may be unknown, where the timestamp is an estimate and/or lossy summary of the time window.

In some embodiments, multiple measurements received from the same multi-sensor unit and/or different multi-sensor unit can be time-aligned. For example, received measurements in an asynchronous system with various timestamps and/or receipt times can be assigned a timestamp in accordance with a timestamp schedule controlled by the monitoring system. Multiple timestamps that are similar and/or correspond to measurements determined to have been collected at approximately the same time can be assigned identical timestamps. The timestamp schedule can include fixed-width timestamps set by a clock of the monitoring system. Timestamps received for various measurements can be rounded to the nearest time or otherwise assigned a time in the timestamp schedule. This can ensure that rather that storing a plurality of arbitrary, asynchronous timestamps, the measurement database can include time-aligned entries, and/or can include timestamps that all correspond to fixed intervals, to further ease the use of measurement entries in further processing, for use in analysis, to train inference functions, and/or to ease user-configurable processing.

In some embodiments, the frequency of the clock utilized to define these fixed-width timestamps is at least as high as the highest-rate sensor device, the highest-rate transmission rate of a multi-sensor unit, and/or another highest-rate collection of measurements in the system. In some embodiments, this frequency is utilized to determine a set of frequency options for the frequency dictating the measurement collection rates assigned to various sensor devices, and/or the frequency that dictates the interval of time windows utilized to generate processed measurement values by multi-sensor units. Control data sent to the corresponding multi-sensor units can dictate collection rates and/or time windows that correspond to a selected frequency from these frequency options. In particular, the frequency options are determined such that product of any one of the frequency options and a selected integer is equal to the frequency of the timestamp schedule. This can be utilized to ensure that once the raw or pre-processed measurements received from a particular measurement source are time-aligned, their corresponding rates are preserved, where the number of time-aligned timestamps between measurements is fixed and preserves the actual collection rate and/or actual time window.

Measurement entries to the measurement database can be generated for measurements collected by the multi-sensor unit 120 once they are received from the gateway device via the network. For example, one or more incoming data packets received from the gateway device 130 can include a first air temperature measurement, a first surface temperature measurement, and a first humidity measurement captured by an air temperature sensor device, a surface temperature sensor device, and a humidity sensor device of a first multi-sensor unit 120 at a first time. The one or more incoming data packets received from the gateway device 130 can further include a second air temperature measurement, a second surface temperature measurement, and a second humidity measurement captured by an air temperature sensor device, a surface temperature sensor device, and a humidity sensor device of a second multi-sensor unit 120 at a second time. The monitoring data analysis system 140 can extract six entries to the measurement database from these one or more incoming data packets: the first entry includes the value of the first air temperature measurement, the first timestamp, and a unique identifier indicating the first multi-sensor unit 120 and further indicating the air temperature sensor device of the first multi-sensor unit 120; the second entry includes the value of the first surface temperature measurement, the first timestamp, and a unique identifier indicating the first multi-sensor unit 120 and further indicating the surface temperature sensor device of the first multi-sensor unit 120; the third entry includes the value of the first humidity measurement, the first timestamp, and a unique identifier indicating the first multi-sensor unit 120 and further indicating the humidity sensor device of the first multi-sensor unit 120; the fourth entry includes the value of the second air temperature measurement, the second timestamp, and a unique identifier indicating the second multi-sensor unit 120 and further indicating the air temperature sensor device of the second multi-sensor unit 120; the fifth entry includes the value of the second surface temperature measurement, the second timestamp, and a unique identifier indicating the second multi-sensor unit 120 and further indicating the surface temperature sensor device of the second multi-sensor unit 120; the sixth entry includes the value of the second humidity measurement, the second timestamp, and a unique identifier indicating the second multi-sensor unit 120 and further indicating the humidity sensor device of the second multi-sensor unit 120.

The measurement source identifier can denote a particular feature that the measurement corresponds to, for example, linking to an entry of the feature database. The particular feature can correspond to the sensor device determined to have captured the measurement value. The feature identifier can thus be derived from a sensor device and/or multi-sensor unit of the measurement source identifier, for example, based on installation, default configuration, and/or user-defined configuration to measure the feature and/or collect measurements in the vicinity of the feature. For example, the first and second multi-sensor units 120 in the example above can be installed in an agricultural facility. The first multi-sensor units 120 can be configured to utilize its surface temperature sensor device, or a particular one of a plurality of its surface temperature sensor devices, to measure the surface temperature of at least one leaf of at least one plant being grown at the agricultural facility that is in the vicinity of the first multi-sensor unit 120. If this configuration doesn't change, given a received measurement value that is determined to have been captured by the surface temperature sensor device on the first multi-sensor unit 120, or the particular one of a plurality of surface temperature sensor device on the first multi-sensor unit 120, the measurement value can be known to correspond to a surface temperature measurement of the at least one leaf of the at least one plant. Similarly, if surface temperature devices of a set of multi-sensor units 120 are configured to measure surface temperate of leaves in their vicinity, all measurement values determined to have been captured by surface temperature sensor devices of the set of multi-sensor units can be known to correspond to leaf surface temperatures in particular. These configurations can be stored in feature database 545 and/or contextual database 544, indicating which multi-sensor units and/or which sensor devices are configured to monitor particular features. In some embodiments, the measurement entry can include a feature identifier field that indicates a feature identifier, for example, with its own entry in the feature database 545.

In addition to being populated by measurements collected by the multi-sensor units 120, the measurement database 542 can be further populated by other, externally generated measurement data, for example, received via the network 150. For example, additional data sources 170 can transmit their own collected, calculated, and/or user generated data to the monitoring data analysis system 140. Measurement values, timestamps, and/or measurement sources can be similarly extracted from this received data to generate additional measurement entries for storage in the measurement database and/or for processing. Alternatively or in addition, the information collected from the additional data sources 170 can be stored in another database of the database system 541, such as one or more designated databases for this externally collected data, the contextual database 544, and/or the feature database 545.

A time of receipt by the monitoring data analysis system 140 and/or a time this data was collected and/or generated by the additional data source 170 can be utilized to determine the timestamp for measurement entries generated for externally generated measurements. The measurement source in measurement entries generated for these externally generated measurements can indicate the additional data source 170. An identifier of a particular sensor, particular equipment, a particular client device, particular corporate entity, and/or particular person that generated or is otherwise associated with collection of these externally generated measurements can also be indicated in the measurement source.

Additional data sources 170 can correspond to other server systems, database systems, sensors, and/or computing devices that generate, collect, and/or store measurements, quantitative data, qualitative data, evaluative data, user-inputted data, and/or other information. Some or all of this data can be utilized to generate additional measurement entries to the measurement database, for example, with their own measurement value, timestamp, and measurement source identifier indicating the additional data source 170. Some or all of this data can be processed by a function of the function database to generate processed measurements for storage in the measurement database. Some or all of this data can be stored as contextual data, populating one or more entries of the contextual database, and/or can be utilized to populate one or more fields describing a particular feature. Some or all of this data can be otherwise stored and/or processed by the monitoring data analysis system 140, allowing the monitoring data analysis system 140 to utilize additional types and/or sources of information to better monitor and/or analyze the conditions and/or operations of the facility.

The additional data sources 170 can communicate with the monitoring data analysis system 140 with different signal types and/or different communication schemes than the multi-sensor units 120. The additional data sources 170 can communicate their data to the monitoring data analysis system 140 without utilizing the gateway 130, and/or utilizing their own signals with different frequency or protocol than the frequency and/or protocol of utilized by multi-sensor units 120. The additional data sources 170 can utilize network 150, the Internet, cellular communications, an Ethernet connection, a Local Area Network, a fiber optic connection, short range radio transmissions, long range radio transmissions, satellite communications, and/or other wired and/or wireless communication means to transmit their data to monitoring data analysis system 140. Some or all of the data received from additional data sources 170 can be transmitted in response to a request and/or instruction generated by the monitoring data analysis system 140 that is received by the additional data sources 170. Some or all of the data received from additional data sources 170 can be automatically transmitted by the additional data sources 170 at pre-defined intervals, in response to collecting the data, and/or in response to determining a pre-defined condition exists.

Additional data sources 170 can provide a variety of additional data that can be utilized to provide additional monitoring to provide more accurate information about the various conditions being monitored and/or to provide measurements for additional measurements of electrical and/or environmental conditions of the facility. Information provided by additional data sources 170 can further be utilized to generate analytic data. In particular, the monitoring data analysis system 140 can utilize additional information, in conjunction with the measured conditions of the facility, to determine how environmental conditions, electrical conditions, and/or other conditions monitored by the monitoring system 100 affect quantitative metrics and/or qualitative metrics associated with operating efficiency, productivity, profit, production quality, equipment maintenance, customer satisfaction, customer performance, personnel efficiency, personnel performance, and/or other evaluative metrics indicating levels of success and/or failure of operation of the facility.

For example, if the facility operates to manufacture, grow, produce, and/or store one or more types of organic or inorganic product, information about yield; quantity of the different types of these products sold by the entity; and/or customer satisfaction metrics for different types of these products can be utilized in analyzing and/or automatically adjusting environmental, and/or operational conditions of the facility monitored by the monitoring system 100. This information can be collected by and/or transmitted to the monitoring data analysis system by one or more additional data sources 170. Corresponding measurement entries and/or contextual data generated for this information can further be analyzed and/or otherwise utilized to determine distinct ones of the electrical, environmental, operational, and/or other measured conditions that have a statistically significant impact upon, or are otherwise determined to affect, the quantity of particular types of products produced and/or sold, quality of particular types of products sold, asking price and/or appraisal information for particular types of products produced and/or sold, and/or customer satisfaction associated with particular types of products.

As another example, if the facility services customers by providing a service within the facility, information about occupancy, attendance of various customers, length of time various customers stay at the facility, customer satisfaction metrics for their time at the facility, customer performance metrics for their time at the facility, locations within the facility that various customers frequent and/or traffic patterns of the various customers across different locations within the facility over time can be utilized in analyzing and/or automatically adjusting electrical, environmental, and/or operational conditions of the facility monitored by the monitoring system 100. This information can be collected by and/or transmitted to the monitoring data analysis system by one or more additional data sources 170. Corresponding measurement entries and/or contextual data generated for this information can further be analyzed and/or otherwise utilized to determine distinct ones of the electrical, environmental, and/or operational conditions that have a statistically significant impact upon, or are otherwise determined to affect, customer attraction to the facility, customer retention, customer performance, customer interest in different locations and/or features within the facility, and/or customer satisfaction by the service provided.

As another example, if the facility is staffed by personnel that contribute to, service, and/or monitor operations of the facility, information about who, amongst a plurality of personnel, contribute to, serviced, and/or monitored different ones of a plurality of operations of the facility in different ones of a plurality of locations in the facility at different ones of a plurality of different times can be utilized to determine which personnel have higher levels of work quality or efficiency, which areas of the facility require more or less consistent human intervention, and/or can otherwise be utilized to analyzing and/or automatically adjusting electrical and/or environmental conditions of the facility. This can further be utilized to determine distinct ones of the electrical, environmental, and/or operational conditions that have a statistically significant impact upon, or are otherwise determined to affect, personnel efficiency and/or quality of performance by personnel overall. This can further be utilized to differentiate distinct ones of the electrical, environmental, and/or operational conditions that have different impacts on efficiency and/or performance of for particular personnel and/or can be utilized to determine particular strengths and/or weakness in skillsets for particular personnel.

As another example, a facility can serves as a location that evaluates performance metrics for people or animals, for example, facilitating athletic and/or knowledge-based testing and/or competition for people or animals in the facility. Quantitative measures of physical, mental, and/or emotional performance of the people and/or animals can be collected from additional data sources 170. This can include test scores in examinations proctored at the facility. This can include biometric data and/or physical efficiency data for people performing physical activities at the facility in a work or competitive setting. This can include race times, scores, competitions won or lost, amount of weight lifted, and/or other metrics for physical performance at athletic competitions hosted by the facility and/or for physical performance utilizing training equipment provided by the facility. Such quantitative measures of physical, mental, and/or emotional performance can be utilized to determine how distinct ones of the environmental, electrical, or other operating conditions of the facility affect physical, mental, and/or emotional performance across all people and/or animals. This can further be utilized to determine distinct ones of the electrical, environmental, and/or operational conditions that have a statistically significant impact upon, or are otherwise determined to affect, personnel physical, mental, and/or emotional performance for particular people and/or animals, and/or can be utilized to determine particular strengths and/or weakness in skillsets for particular personnel. This can further be utilized to allow particular people to determine their ideal performance conditions, allowing them to achieve peak performance in critical competitive measures and/or allowing them to plan for conditions known to negatively affect their performance.

Additional data sources 170 can include sensor devices within the facility and/or outside of the facility that are separate from the multi-sensor units 120. For example, as illustrated in FIG. 1, additional data measurements 1 are collected from an additional data source 170 that is within the facility. These other sensor devices can collect the same or different types of measurements collected by sensor devices of the multi-sensor units 120. These various other sensor devices can similarly be installed in one or more locations within the facility, but can communicate with the monitoring data analysis system 140 with different signal types from the signals transmitted by transceivers 220, different communication schemes and/or protocols transmitted by transceivers 220, and/or without utilizing the gateway 130. Measurement entries can similarly be generated for these additional sensors for storage in measurement database 542, and can similarly include the measurement values, timestamps, and/or measurement source identifiers.

The additional data sources 170 can include other computing devices, server systems, and/or databases corresponding to the entity responsible for the facility. This can include one or more client devices 160 and/or other database systems 541 of other monitoring systems 100 located at other facilities that are associated with the same entity and/or one or more same users of the monitoring system 100. For example, other monitoring systems 100 can transmit data collected for their facility, which can be used to compare operational metrics across different facilities in different locations. Measurement values for measurement entries can duplicate the measurement entries from the other monitoring systems 100, can correspond to statistical measurements collected by the other monitoring systems 100, and/or can include an identifier in the measurement source indicating which one of the other monitoring systems 100 the measurement corresponds to. In some embodiments, measurement data collected by some or all monitoring systems 100, across facilities with any affiliation, can be centralized to enable collection and analysis of a higher volume of various data. For example, this can be utilized as training data to train more adaptive machine learning models for execution of various inference functions utilized herein.

Alternatively or in addition, retail data, customer purchasing history, personnel data, operational data, productivity data, accounting data, customer review data, and/or other data managed by the entity responsible for the facility can be sent to the monitoring data analysis system 140 and/or stored by the monitoring data analysis system 140. This can be utilized to provide the monitoring data analysis system 140 with additional information about the facility and/or products stored and/or produced by the facility that can be utilized in automatically gauging consistency and/or effectiveness of particular electrical and/or environmental the facility.

Alternatively or in addition, the additional data sources 170 can correspond to data collected by a public entity and/or other entity, for example, that collects data across a large geographic region that includes the facility. Measurement values for externally generated measurements can correspond to weather data corresponding to weather conditions in the vicinity of the facility, where the additional data source 170 corresponds to a server system or other data source for a weather collecting entity. This information can be utilized to provide additional information about current and/or historical weather conditions that may impact environmental conditions and/or operations of the facility. Measurement values for measurement entries can include weather related measurements and/or forecasts. The measurement source can indicate the weather collection entity and/or a location or identifier of weather collecting equipment utilized to generate the measurement values. The timestamp can indicate a time the information was collected by the weather collection entity and/or a future time corresponding to the time the forecast is expected to occur.

The additional data source 170 can corresponds to a server system or other data source for such utility, infrastructure, and/or service entity. This information can be utilized to provide additional information about current and/or historical availability, cost, quality, servicing times, servicing frequency, and/or conditions of various utilities and/or infrastructure. For example, this can include information regarding electric utilities, gas utilities, water utilities, cellular communications services, internet communications services, road traffic conditions, road construction conditions, postal services, garbage collection services, recycling collection services, and/or other private and/or public services that may impact operations of the facility. Measurement values for measurement entries can include availability, cost, quality, servicing times, servicing frequency, and/or measured conditions of a utility, service, and/or equipment provided by the utility, infrastructure, and/or service entity. The measurement source can indicate the particular utility, infrastructure, and/or service entity. The timestamp can indicate a time the information was collected by the utility, infrastructure, and/or service entity.

Additional data sources can correspond to tracking sources utilized to track the movement of features such as customers, personnel, other people, animals, products, equipment, and/or other objects within the facility. In such embodiments, the locations of and/or traffic of different features across the different locations within the facility can be tracked. This can further be utilized in analyzing and/or automatically adjusting electrical conditions, environmental conditions, and/or operations of the facility. Measurement values can correspond to location of particular features at a given time and/or occupancy counts of features within a particular location at a given time. Measurement values for a measurement entry can correspond to one or more customer satisfaction metrics. The measurement source can identify a feature identifier for the tracked feature and/or a particular location within the facility. Timestamps can correspond to the time that the feature location was determined and/or a time frame in which the occupancy count was made.

Tracking sources can include barcodes and/or RFID tags, associated with a particular person, animal, equipment, product, and/or other feature within the facility, for example, where the multi-sensor unit 120 and/or other sensor units installed in the facility include sensor devices that include barcode readers and/or RFID readers. These tracking sources can include active RFID tags or other transmitters that transmit a signal uniquely identifying the feature. A unique identifier of a detected tag can be linked to the corresponding feature in the feature database, allowing the feature's whereabouts to be tracked in the measurement database over time.

Alternatively or in addition, these tracking sources can include cellular devices, wearable devices, or other client devices that are associated with a particular customer or personnel. For example, IP addresses, identifying data, geolocation data, user data, or other data generated by and/or received from client devices carried by and/or worn by a person can be utilized to determine whether the person is within the facility and/or where the person is within the facility. This can be based on a determining a client device's connection to a local network and/or a client device's pairing to and/or communication with a short range wireless transceiver of a sensor device of a multi-sensor unit 120 and/or other sensor device installed in the facility. This can be based on determining that geolocation data generated by a client devices, via cellular data and/or GPS data, compares favorably to a known location of the facility. Identifiers of these detected devices can link to an entry for a corresponding person in the feature database and/or can otherwise link to its own feature entry in the feature database.

Alternatively or in addition, these tracking sources can include social media sources, for example, where social media data is received from a social media server system via an Internet connection, and where a social media account associated with the facility can be utilized to determine visitation to the facility by different people. The people that visited the facility and/or the time frame in which the visit occurred can be determined in response to determining that a person checked-into and/or tagged the facility in a social media post. Alternatively or in addition, this can be determined in response to a computer vision model automatically detecting that a photograph included in a social media post corresponds to a photo of the outside of the facility, a particular location inside of the facility, a logo of the facility, and/or a product produced by the facility. A metric indicating satisfaction of the customer can be determined based on performing a natural language processing function on text of the post to determine whether or not the post is positive or negative. Alternatively or in addition, a metric indicating satisfaction of the customer can be determined based on a computer vision model whether facial features in a photograph included in the post indicate happiness or sadness.

Additional data sources 170 can include third party service review entities and/or product review entities, which can be utilized to determine customer satisfaction data, retail data, product review data, and/or other evaluating metrics that can be utilized to determine whether quantity of sale of products and/or services, various products and/or services provided by the facility are satisfactory, to determine a quality metric for various products and/or services provided by the facility, and/or to determine how people performed in the facility. Customer review data such as ratings and/or text reviews can be collected from third party systems that are not managed by the entity running the facility, and can be tied to a particular person that wrote the review, particular product, and/or particular time that the review was written, product was sold, and/or service was provided. Natural language processing can be performed on text of the review to identify particular feedback for distinct products and/or locations within the facility. Alternatively or in addition, a rating of the review can be utilized to measure the positivity and/or negativity of the review of the product or service. Measurement values for a measurement entry can correspond to one or more customer satisfaction metrics. The measurement source can identify a feature identifier for the product and/or service being reviewed, a feature identifier for personnel involved in providing the product or service, a feature identifier or other identifier indicating the person that wrote the review and/or an affiliation of the person that wrote the review, and/or a location within the facility where a service was provided and/or where the review was generated. Timestamps can correspond to the time the review data was written and/or provided to the third party review system.

Client devices such as cellular devices and/or wearable devices can be utilized to generate performance data for particular people within the facility, for example, by collecting and/or processing accelerometer data, gyroscope data, pedometer data, heart rate data, perspiration data, and/or other biometric data. This data can be received by the monitoring data analysis system 140 from these client devices as biometric data, which can be utilized to evaluate physical performance, health, stress, and/or other physical behavior for customers and/or personnel. Measurement values can correspond to one or more biometric measures for a particular person at a particular time. The measurement source can identify a feature identifier for the person to which the biometric data corresponds, can identify a location within the facility where the person is located and/or activity was performed, can identify a type of work-related and/or physical activity being performed by the person, and/or can identify equipment within the facility being used in conjunction with performance of the physical activity. Timestamps can correspond to the time the biometric data was collected.

Client devices can be utilized as additional data sources 170 to collect observation data, evaluative data, and/or maintenance data provided via user input to graphical user interface 190, for example, in conjunction with execution of client application data 513 associated with the monitoring system 100. Client application data 513 can be transmitted to client devices associated with customers and/or personnel of the system, and the client application data 513, when executed by the client device, can cause the client device to display graphical user interface 190 on display device 161 of the client device to enable the collection of observation data via user input for transmission back to the monitoring data analysis system 140.

The graphical user interface 190 can prompt users to answer questions; input manually collected measurements; provide customer satisfaction data; provide personal performance data; provide observations corresponding to visual observations, auditory observations, smell observations, taste observations, and/or tactile observations of particular features within the facility; and/or otherwise provide additional data via user input to the graphical user interface 190. The graphical user interface 190 can include prompts to select one or more options from a discrete set of options presented to the user via the graphical user interface. The graphical user interface 190 can include prompts to input text via a text box to provide descriptive information. The graphical user interface can include prompts to take a picture of a particular feature of the facility by utilizing a camera coupled to the client device. The client device, in conjunction with executing the application data, can transmit, to the monitoring data analysis system 140, the selected options provided by the user input, the descriptive text provided via the user input, and/or the picture captured by utilizing the camera of the client device. Measurement values for a measurement entry utilizing this information can correspond to raw and/or processed responses to the prompts, such as particular observations made for a particular feature and/or particular observations made in a particular location. The measurement source can identify the prompt, the feature and/or location within the facility being observed, a user identifier for the user that provided the user input, and/or a client device identifier for the client device the input was received from. Timestamps can correspond to the time the observations were received from the client device and/or the time the observations were inputted to the client device.

The client device, in conjunction with executing the application data, can further display observation instructions via the graphical user interface, guiding the user in generating particular measurements or observations of particular equipment, products, or other features of the facility. This can include instructing the user of the location of the feature to be measures; providing navigational data to guide the user to the location of the feature, for example, by utilizing geolocation data of the client device and a determined location of the feature within the facility; displaying text and/or photos to provide guidance in selecting and operating a measurement tool to perform the measurement; providing text describing the feature and/or photos of the feature to aid the user in properly identifying the particular feature being measured; providing picture and/or video examples illustrating of different visual conditions of a feature and/or illustrating different motion conditions of a feature, where the user is instructed to select one of the picture and/or video examples via user input that most closely matches the feature based on their own visual observation of the feature; and/or otherwise instructing the user in providing the measurement and/or observation data.

In some embodiments, a measurement tool utilized by the user to collect the measurement can connect to the client device via a wired and/or wireless connection, and measurement data collected by the measurement tool can be collected by the client device in executing the application data, where this collected measurement data is transmitted to the monitoring data analysis system 140. Alternatively or in addition, a measurement tool utilized by the user to collect the measurement can connect to the network 150 via a wired and/or wireless connection, and measurement data collected by the measurement tool can be transmitted to the monitoring data analysis system 140 via the network. The measurement value can correspond to the measurement collected by the measurement tool. The measurement source can identify the measurement tool, the feature being measured by the measurement tool, the location in which the measurement is taken, a feature identifier indicating the user handing the measurement tool, and/or a client device identifier indicating the client device instructing the user to handle the measurement tool.

The monitoring data analysis system 140 can perform functions on the measurement values stored in the measurement database system by utilizing a function database 543. The function database 543 can serve as a function library, and can be populated by function parameters, function definitions, and/or executable functions. The functions can be pre-defined and/or user-defined functions that, when called or otherwise retrieved from the function database by a client device or by the monitoring data analysis system 140, can be performed on input to produce function output.

In some embodiments, function parameters, function definitions, and/or executable functions for some of various functions of the function database 543 described herein can be transmitted to one or more multi-sensor units via the gateway device 130, to be performed by the one or more multi-sensor units on their collected sensor data, for example, where function output corresponding to processed measurements is transmitted by the multi-sensor unit 120 to the gateway for storage in the measurement database 542, instead of or in addition to the raw measurements.

Some or all of the processing functions in a function library of a multi-sensor unit 120 can include some or all of the functions of function database 543. For example, the monitoring data analysis system 140 can send function definitions for some or all of the functions in the function database, allowing the multi-sensor unit 120 to perform various functions of the function database 543 locally in accordance with their current mode of operation. Function definitions, parameters, and/or interpreted code for new functions to be added to libraries of some or all multi-sensor units 120 can be sent as control data to the multi-sensor unit, for example, as an update to be applied by updating module 249. Any of the processing functions performed by the measurement processing module 242 as discussed herein can alternatively or additionally be performed by the monitoring data analysis system 140 on the same or different type of data. Any of the functions of function database 543 as discussed herein can alternatively or additionally be performed by measurement processing module 242 to generate processed measurements for the same or different type of data.

The monitoring data analysis system 140 can determine which functions of function database 543 should be performed locally by multi-sensor units 120 via their own function library 216, and which functions of function database 543 should instead be performed on data by monitoring data analysis system 140 once it is received from the multi-sensor units. This determination can be based on how timely and/or how much processing resources are needed to perform the function, for example, where only functions that are less expensive in time and/or processing resources are designated for performance by multi-sensor units locally, based on determining these functions can be performed while still attaining a desired transmission rate of collected data, without draining more than a desired amount of battery power, and/or without consuming more than a threshold amount of resources within each time window to ensure that other processing functions and/or other necessary functionality of the multi-sensor can be performed within each time window.

Alternatively or in addition, this determination can be based on unit weights assigned to the multi-sensor units, based on sensor device weights assigned to sensor devices of each multi-sensor unit, based on the known and/or expected data transmission rate of each multi-sensor unit, based on the rate of data collected in raw measurements collected, and/or based on a desired amount data in the raw measurements to be conserved and/or recoverable. In particular, the functions can be selected to ensure that, once processed, the amount of data to be transmitted within a time frame compares favorably to an amount of data that can be transmitted within the time frame as dictated by the data transmission rate allocated to the multi-sensor unit and/or expected based on historical network availability. Furthermore, less-lossy functions can be selected based on a desire to conserve more of the raw measurements.

Alternatively or in addition, this determination can be based on desired detectable conditions for the multi-sensor units, for example, to enable the multi-sensor units to adapt and/or change their mode of operation in response to detecting a condition of interest. In particular, detection functions that are utilized to determine detectable conditions and cause the multi-sensor units to adapt their mode of operation accordingly as discussed herein can be designated for performance by the multi-sensor units locally.

This can be desirable as multi-sensor units can more quickly increase the richness of data collection, processing, and/or transmission in response to detecting a corresponding condition of interest themselves. Suppose that instead, the unprocessed data was transmitted to the monitoring data analysis system, the monitoring data analysis system performed the detection function to detect the condition of interest, the monitoring data analysis system generated control data for transmission to the multi-sensor unit to increase its data collection in response, and the multi-sensor unit updated its mode of operation in response to receiving the control data. The time taken for these transmissions and processing to be performed could result in significant data that could have been collected by the same or different sensors during that critical time being foregone due to the delay in determining the condition of interest was detected. Additionally, in response to receiving processed measurement data indicating a condition of interest was detected by the multi-sensor unit, the monitoring data analysis system can more quickly generate alerts, can facilitate control of corresponding equipment and/or utilities to mitigate the problem, and/or can generate control data for increased collection, processing and/or transmission of measurements for transmission to other multi-sensor units in the same location, neighboring locations and/or otherwise monitoring a same feature or same type of feature corresponding to the condition of interest.

The function database 543 can include function entries for a plurality of synthetic measurement functions. A synthetic measurement function can be performed on a plurality of different measurements to produce a synthetic measurement value. Synthetic measurement functions can preserve timestamp data, for example, where the synthetic measurement outputted by the synthetic measurement function includes a timestamp for the synthetic measurement value. In particular, some or all synthetic measurement functions can be designed to be performed on input measurement values that have matching timestamps in their respective measurement entries and/or on input that have timestamps in their respective measurement entries that are all within a small, predefined time window. The timestamp of the output can be equal to the matching timestamps of the input measurement values and/or can correspond to an average, median, time window, or other summary value of differing timestamps of the input measurement values. Furthermore, synthetic measurement functions can preserve measurement source data, for example, where the synthetic measurement outputted by the synthetic measurement function includes a measurement source identifier for the synthetic measurement value. For example, some or all synthetic measurement functions can be designed to be performed on input measurement values that are captured by different sensor devices of the same multi-sensor unit. The identifier of the multi-sensor unit can be indicated in the measurement source data outputted by the synthetic measurement function. As another example, some synthetic measurement functions can be designed to be performed on input measurement values that are captured by the same type of sensor devices across different multi-sensor units, or one or more different types of sensor devices across different multi-sensor units. Identifiers indicating the different multi-sensor units, and further indicating the same type of sensor devices or the one or more different types of sensor devices, can be indicated in the measurement source data outputted by the synthetic measurement function. An identifier of the synthetic measurement function itself can also be indicated in the measurement source data to signify that the synthetic measurement value corresponds to output produced by this particular type of function.

In this fashion, output produced by performing synthetic measurement functions can be formatted as measurement entries and can further populate the measurement database 542. Thus, the measurement database 542 can include some entries that correspond to raw measurements captured by various sensor devices over time, and can include other entries that correspond to function output for a synthetic measurement function performed on one or more raw measurements. Because synthetic measurement functions can be designed to be performed on any measurement entries in the measurement database, and because the output to synthetic measurement functions can be formatted as additional measurement entries to the measurement database, some synthetic measurement functions can utilize previously produced synthetic measurement output as its input. Thus, a synthetic measurement function can utilize any combination of raw measurements and synthetic measurements produced by other synthetic measurement functions as input, and output to any synthetic measurement function can be utilized to produce new measurement entries in a standardized format of the measurement database. Furthermore, other functions of the function database 543 that are configured to take measurement entries as input can be performed on measurement entries corresponding to raw measurements, synthetic measurements, and/or a combination of both, by utilizing the standardized format of the measurement database.

For example, one synthetic measurement function of the function database 543 can correspond to the VPD measurement function discussed previously. To continue the example discussed above, after receiving the first air temperature measurement, the first surface temperature measurement, and the first humidity measurement at the first time, the monitoring data analysis system 140 can determine to produce a VPD measurement for the first multi-sensor unit 120 at the first time by performing the VPD function on the first air temperature measurement, the first surface temperature measurement, and the first humidity measurement. A seventh entry to the measurement database can include this calculated VPD measurement, the first timestamp, and a measurement source identifier indicating the first multi-sensor unit 120 and an identifier of the VPD function.

The measurement source identifier can further indicate identifiers for each of the air temperature sensor device, surface temperature sensor device, and the humidity sensor device of first multi-sensor unit 120, for example, when the first multi-sensor unit 120 includes multiple air temperature sensor devices, multiple surface temperature sensor device, and/or multiple humidity sensor devices. Alternatively, these identifiers can be derived based on the knowledge that the VPD function was performed, for example, when the first multi-sensor unit 120 includes only one of each of these sensors. Furthermore, the measurement source identifier of a synthetic measurement function can indicate one or more feature identifier indicating one or more particular features that were measured to ultimately generate the synthetic measurement, and/or the feature identifier can be derived based on the knowledge of the configuration of the sensor devices utilized to capture the raw measurements utilized to generate the synthetic measurement. For example, a feature identifier indicating a particular leaf, a particular plant, and/or a particular location of the facility where the measured plant is located that can be included in or derived from the measurement source identifier of the VPD measurement.

The monitoring data analysis system 140 can perform this calculation in response to receiving the one or more incoming data packets, for example, where the first, second, third, and seventh entries are generated for the air temperature, humidity, surface temperature, and VPD for the first multi-sensor unit 120 at the first time, and where these entries are then added to the measurement database 542 after all of these entries are generated. Alternatively, synthetic measurements can be retroactively be calculated at a later time, for example, in response to a request received from a client device, based on user input to the client device. For example, in response to determining at a later time to calculate VPD for the first multi-sensor unit 120 at the first time, the first, second, and third entries of the measurement database can be queried by the monitoring data analysis system 140 by utilizing the identifier for the first multi-sensor unit 120 and an indicator of the first timestamp in the query, and the first, second, and third entries can be received from the measurement database 542 in response, allowing the monitoring data analysis system 140 to calculate the VPD measurement by performing the VPD function on the measurement values of the first, second, and third entries.

A second VPD measurement can similarly be calculated for the second multi-sensor unit 120 at the second time, where an eighth entry to the measurement database can include this second VPD measurement, the second timestamp, and an measurement source identifier indicating the second multi-sensor unit 120 and an identifier of the VPD function. Thus, the measurement database can further include time-series data corresponding to VPDs for different particular plants and/or different locations across the facility.

The function database 543 can further include function entries for a plurality of signal processing functions to process time-series data, to determine summary measures for time-series data in the measurement database. The signal processing functions can include and/or utilize a fast Fourier transform (FFT) function, discrete Fourier transform function, Laplace transform, Z transform, Wavelet transform, other transform functions, peak detection functions, spectral analysis functions, energy spectral density calculations, power spectral density calculations, convolution functions, filtering functions, smoothing functions, counting functions, quantizing functions, averaging functions, lossy and/or lossless compression functions, and/or other functions that are configured transform, filter, aggregate, summarize, and/or otherwise process discrete time-series data. Some or all signal processing functions can be configured to process time-series data for a particular sensor device of a particular multi-sensor unit 120. For example, measurement entries for a particular sensor device of a particular multi-sensor unit 120 with timestamps within a pre-defined time frame can be processed via one or more signal processing functions.

In some embodiments, the output of a signal processing functions performed on a set of measurement entries can be utilized to generate a new measurement entry, for example, that includes a particular calculated value and/or a plurality of processed measurements as the measurement value, that indicates the particular sensor device and the particular multi-sensor unit 120, as well as the function identifier for the utilized signal processing function as the measurement source, and that indicates the time window and/or a central timestamp within the time window as the timestamp. For example, one or more peaks detected in the frequency domain representation of measurement values of a particular sensor device of a particular multi-sensor unit for all timestamps within the time interval, determined for example by performing a FFT and peak detection function, can be utilized as measurement value for a measurement entry indicating the particular sensor device of a particular multi-sensor unit, and indicating a time window and/or central timestamp. As another example, power spectral density, calculated for measurement values measurement values of a particular sensor device of a particular multi-sensor unit for all timestamps within the time interval, can be utilized as measurement value for a measurement entry indicating the particular sensor device of a particular multi-sensor unit, and indicating a time window and/or central timestamp.

In some embodiments, processed data, such a plurality of modified measurement values generated as output of a filtering function and/or smoothing function, can be utilized to generate new time-series measurement data within the time interval and/or to replace the existing raw time-series measurement data within the time interval. For example, the existing measurement values can be replaced with the corresponding modified measurement values in their respective entries in the measurement database. Alternatively, a new set of measurement entries that include the modified measurement values and the corresponding timestamps, indicating the particular sensor device and the particular multi-sensor unit 120 as well as an identifier of the filtering and/or smoothing function utilized to generate the modified measurement values, can be generated and added to the measurement database to supplement the existing, raw measurement values for the particular sensor device of the particular multi-sensor unit 120 within the pre-defined time frame.

The monitoring data analysis system 140 can extract an identifier indicating the signal processing function utilized to generate each pre-processed measurement, and can add the pre-processed measurement to the measurement database as a measurement entry that includes the measurement value for the pre-processed measurement, indicating the particular sensor device and the multi-sensor unit 120 and/or indicating an identifier of the signal processing function and/or otherwise indicating the pre-processed measurement was generated by utilizing the signal processing function, and indicating the timestamp and/or the pre-defined time window utilized to perform the signal processing function.

Measurements in the measurement database can be further summarized by utilizing one or more statistical measurements. The time-series data for various raw and/or synthetic measurements of the measurement database can be utilized to aggregate and/or summarize selected sets of measurement entries in the measurement database, to determine statistical trends for selected sets of measurement entries in the measurement database, and/or to otherwise determine summary measures for environmental and/or electrical conditions captured across the facility as a whole, captured in particular locations, captured at particular times, and/or captured over time. The function database 543 can further include function entries for a plurality of statistical measurement functions that can be utilized to calculate this statistical data. The statistical measurement functions can include central measurement functions such as arithmetic mean, median, mode, interquartile mean, and/or other spread measurement functions utilized for statistical measurement. The statistical measurement functions can include spread measurement functions such as standard deviation, range, interquartile range, absolute deviation, mean absolute difference, distance standard deviation, coefficient of variation, and/or other spread measurement functions utilized for statistical measurement. The statistical measurement functions can include shape measurements functions such as skewness measurements, L-moments measurements, and/or other shape measurement functions utilized for statistical measurement. The statistical measurement functions can include dependence measurements such as correlation measurements and/or correlation coefficient measurements and/or other dependence measurements utilized for statistical measurement. The statistical measurement functions can utilize one or more of the signal processing functions to generate summarizing data for time-series measurement data. Output of some statistical measurement functions can indicate outlier measurements of a set of input measurement values and/or ones of the set of input measurement values that differ from the mean by a statistically significant amount.

Some statistical measurement functions can be configured to calculate statistical measurements for a particular type of raw or synthetic measurement, at a given time, across the facility. This can be useful in summarizing the state of the facility at a whole at a given time, such as the current time or a recent time, and/or to detect different areas of the facility with particular environmental and/or electrical measurements that may differ from the other parts of the facility. For example, statistical measures of air temperature across the facility at a given time can be calculated. As another example, statistical measures of air VPD collected by a particular multi-sensor unit 120 in the facility over time can be calculated. The input can correspond to a plurality of measurement entries of the measurement database, for example, with measurement source data indicating the measurement entries correspond to a same type of raw or synthetic measurement, captured by each of a plurality of different multi-sensor units 120, and/or with timestamp data indicating the timestamp matches, is within a threshold time window of, or otherwise compares favorably to the given time. The output can indicate the calculated statistical measurements, the timestamp indicating the given time, and/or the sensor device. In some embodiments, these statistical measurements can be utilized as a synthetic measurement function as discussed above to generate a one or more new measurement entries to the measurement database indicating a statistical measurement calculated by performing the statistical measurement function as the measurement value, the given time as the timestamp, and an identifier indicating type of sensor device, and/or the identifiers for the plurality of different multi-sensor units 120 included in the input set.

Some statistical measurement functions can be configured to calculate statistical measurements for a sensor device of a particular type and/or a particular synthetic measurement, for a particular multi-sensor unit 120 over time. This can be useful in summarizing the trends in the type of environmental and/or electrical condition corresponding to the measurement, particularly at the location of the multi-sensor unit or within a zone the particular multi-sensor unit 120 is configured to measure with their particular sensor device. For example, some of the statistical measurement functions can utilize one or more signal processing functions to generate statistical and/or summarizing data for time-series measurements collected by a particular sensor device of a particular multi-sensor unit 120 over time. In some embodiments, time windows utilized to perform some or all of the statistical measurement functions on measurement values collected by a particular sensor device of a particular multi-sensor unit 120 are typically or always longer than time windows utilized to perform some or all of the perform some or all of the signal processing functions on measurement values collected by a particular sensor device of a particular multi-sensor unit 120. In particular, the signal processing functions can process smaller time windows worth of measurement values for a sensor device to generate measurements describing the state of conditions measurement by the sensor device at a particular time corresponding to the time window, for example, where signal processing functions can be performed on several of these small time windows to generate further time-series data for the sensor device as described above. The statistical measurement functions on the other hand can be utilized to determine trends of the measurement values over longer periods time for the sensor device, generating data describing how a particular type of environmental and/or electrical condition in a particular location changes with time and/or otherwise describing trends for the particular type of condition in a particular location.

For example, statistical measures of air temperature collected by a particular multi-sensor unit 120 in the facility over time can be calculated. As another example, statistical measures of air VPD collected by a particular multi-sensor unit 120 in the facility over time can be calculated. The input can correspond to a plurality of measurement entries of the measurement database, for example, with measurement source data indicating the measurement entries were captured by the sensor device of the particular multi-sensor unit 120, The output can indicate the calculated statistical measurements, the sensor device and the particular multi-sensor unit, and/or a time window that includes the timestamps of measurement entries utilized to calculate the data. As these statistical measurements do not correspond to time-series data, a separate database of statistical measurements can store entries populated by these measurements, and/or the contextual database can be utilized to store entries populated by statistical measurements, for example, for different types of sensor devices and/or for different locations.

The statistical measurement functions can include at least one normalizing function. The normalizing functions can be utilized to normalize one or more measurement values, for example, with respect to other multi-sensor units within the facility at the same time and/or with respect to measurement values captured by the same multi-sensor unit over time. The input to a normalizing function can correspond to a plurality of measurement entries, and the output can include a corresponding plurality of measurement entries with normalized measurement values. The normalized measurement values of the can be utilized to replace the un-normalized measurement values of the corresponding measurement entries in the measurement database 542. Alternatively, the output measurement entries can be added to measurement database 542 to supplement the un-normalized measurement entries, where the output measurement entries further include an identifier indicating the normalizing function and/or indicating that the measurement value corresponds to a normalized value.

Some statistical measurement functions include correlation functions, which can be utilized to determine correlation between different types of raw and/or synthetic measurements. For example, a plurality of pairs of measurement entries, each corresponding to two different measurement values captured by the same multi-sensor unit 120 over time, can be utilized to determine a correlation coefficient or other measure of correlation between the two different measurement entries. All of the plurality of pairs of measurement entries can be captured by the same multi-sensor unit 120, to determine a correlation between the measurements specifically within the vicinity of the corresponding multi-sensor unit 120. Alternatively, sets of the plurality of pairs can each be captured by a different one of the plurality of multi-sensor units 120, to determine a correlation between the measurements across the facility. Correlation functions can be performed on any set of measurement entries of the measurement database, a set of contextual entries of the contextual database 544, and/or a set of feature entries of the feature database 545. In this fashion, correlations between different raw and/or synthetic measurements and corresponding static conditions can be determined.

The monitoring data analysis system 140 can further include a contextual database 544. The contextual database 544 can include static data describing and/or relating to different aspects of the facility, different locations within the facility, and/or some or all of the multi-sensor units. In some embodiments, the contextual database includes a plurality of contextual entries to describe different locations and/or the conditions surrounding particular multi-sensor units. For example, the contextual database can be keyed by location identifiers, corresponding to a particular location and/or zone within the facility and/or in proximity of the facility. Thus, the contextual database can include a plurality of location specific entries, and can include data describing the particular location and/or zone denoted by the location identifier.

Figure 7:
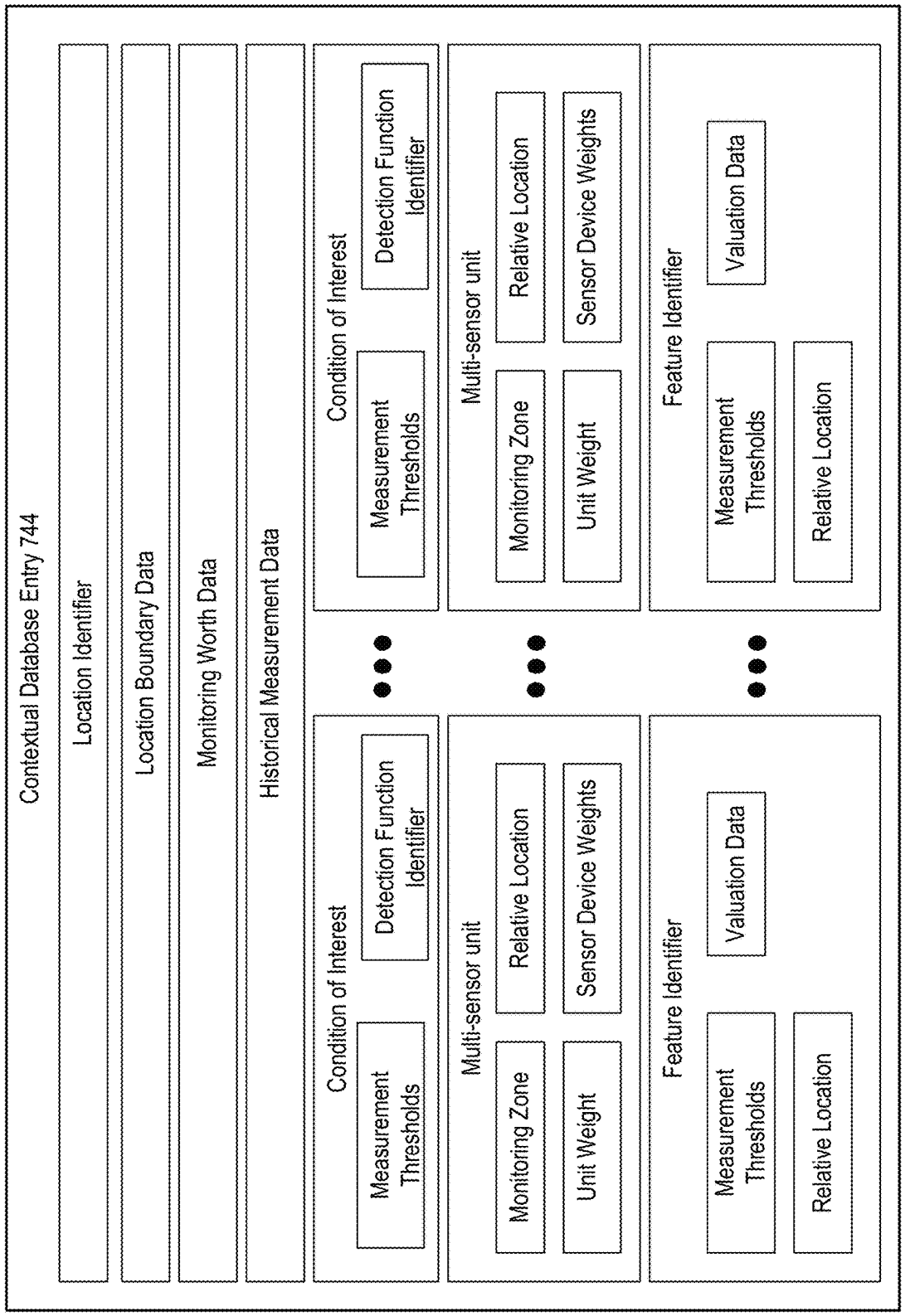
FIG. 7 illustrates an example of data fields populating a contextual database entry of a contextual database in accordance with various embodiments of the present invention.

FIG. 7 illustrates an example embodiment of an entry 744 to a contextual database keyed by location. A location of the contextual database can indicate a plurality of multi-sensor unit identifiers, indicating one or more particular multi-sensor units 120 that are associated with the location identifier. This can include one or more multi-sensor units installed within a zone denoted by the location identifier, and/or can include one or more particular multi-sensor units that include one or more sensors that capture measurements at a range from the location of the one or more particular multi-sensor units that includes the particular location and/or zone denoted by the location identifier. In some embodiments, the particular location can correspond to the location of a single multi-sensor unit, for example, where the contextual database system is keyed by identifiers of the multi-sensor units themselves, and where an entry indicates a physical location where the multi-sensor unit 120 is installed.

An entry of the contextual database 544 can indicate a monitored zone 123 corresponding to the three-dimensional region that each multi-sensor unit 120 is operable to monitor based on the range of collection of one or more of its sensor devices. The entry can indicate a plurality of such monitored zones 123 of the location, each corresponding to a particular one of the sensor devices on the multi-sensor unit 120, based on the range the particular one of the sensor devices is operable to monitor. A monitored zone 123 be dictated based on a maximum range of collection of one or more particular sensor devices, a minimum range of collection of one or more particular sensor devices, an average range of collection of one or more particular sensor devices, and/or the determined range of collection under normal conditions for the one or more particular sensor devices. The monitored zone can be further defined by an accuracy fallout function, where the accuracy fallout function is a function of distance from the multi-sensor unit 120 and/or is a function of a particular location relative to the multi-sensor unit 120 and/or relative to the facility, and where the function outputs a sensor accuracy value, indicating the accuracy of one or more particular sensors for capturing a measurement originating away particular distance from the multi-sensor unit 120, originating at a particular location relative to the location of the multi-sensor unit 120, and/or originating at a particular location relative to the facility. While the monitored zone 123 can be considered a spherical range centered at its multi-sensor unit 120, the monitored zone can defined a particular three-dimensional region of any shape, for example, based on obstacles and/or other obstructions within the facility that cause the shape of the monitored zone to be non-spherical.

A contextual database entry can further indicate a plurality of feature identifiers. This can include one or more features located within a zone denoted by the location identifier, and/or can include one or more particular features that are within a range such they are measured by and/or monitored by one or more particular multi-sensor units associated with the particular location and/or zone denoted by the location identifier of a contextual data entry.

The feature database 545 can include information describing each of a plurality of these features, such as monetary valuation of features, regulatory information for operating and/or maintaining the feature within the facility, normal measurement values for the features, failure conditions and/or degradation conditions for operating and/or maintaining the object within the facility, normal operating behavior for the feature, ideal environmental conditions for operating and/or maintaining the feature, location of the feature within the facility, historical measurement data and/or statistical trends of historical data collected for the feature, and/or other information describing the feature. If some features correspond to customers of the facility, the same or different feature database can include customer purchasing history information, customer visitation history to the facility, client device identifiers for client devices 160 associated with the customer, and/or other customer information. If some features correspond to personnel of the facility, the same or different feature database can include personnel work history, scheduled working hours, scheduled tasks, feature identifiers for equipment and/or products used, maintained, and/or monitored by the personnel, location identifiers the personnel is responsible for, client device identifiers for client devices 160 associated with the customer, and/or other personnel information.

Figure 8:
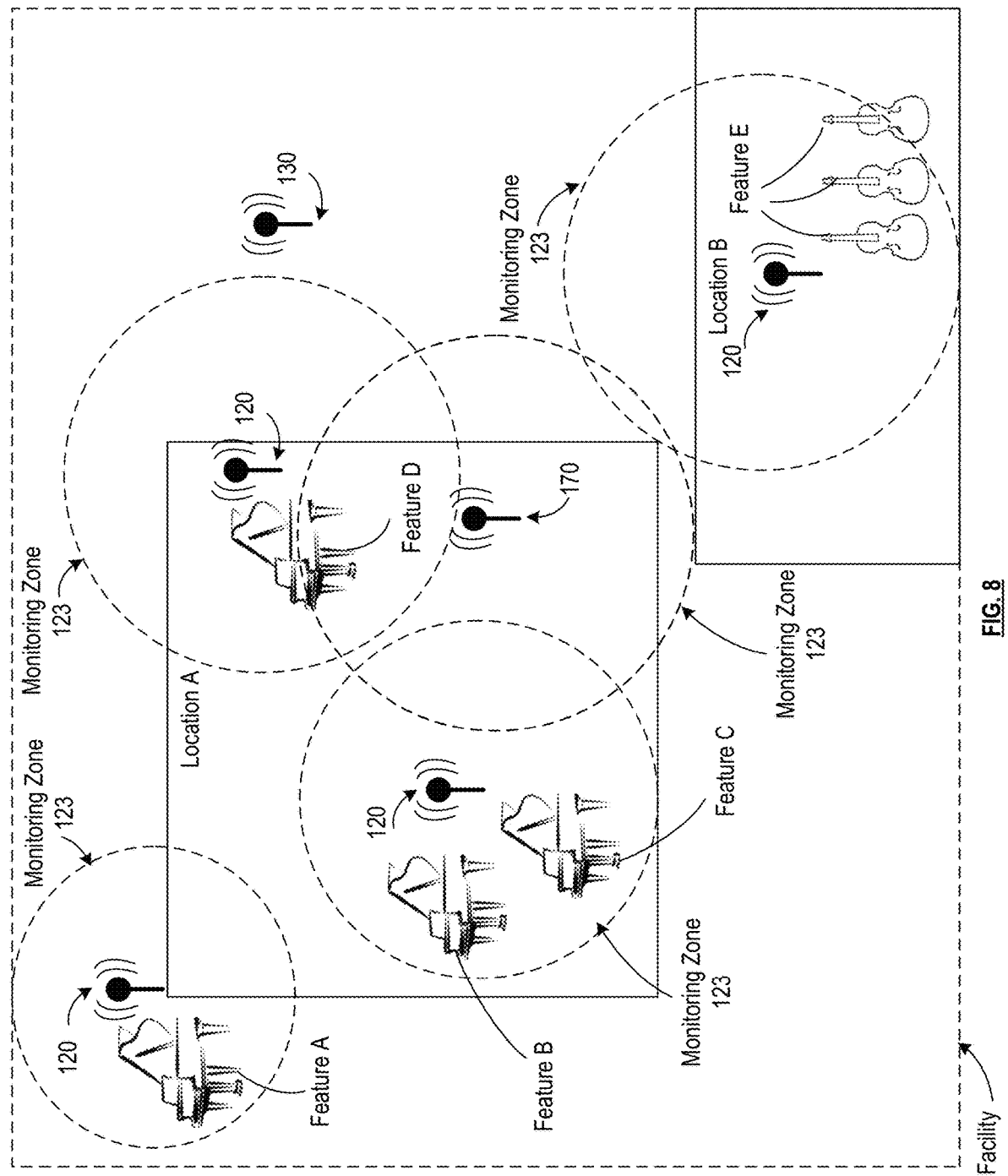
FIG. 8 illustrates an example of a two-dimensional layout of a facility in accordance with various embodiments of the present invention.

FIG. 8 illustrates an example illustrating a two-dimensional mapping of locations within a facility, such as location A and location B. These can correspond to different rooms within the facility and/or different regions utilized for different purposes, and/or can otherwise correspond to different regions in the facility. For example, location A stores multiple pianos, and location B stores multiple violins. Location A can include multiple multi-sensor units installed in different locations. The monitoring zone 123 of each multi-sensor unit 120 can be the same and/or different, can be centered and/or uncentered by the multi-sensor unit 120, and/or can be overlapping or non-overlapping with different monitoring zones. Some portions of location A are not monitored by monitoring zones, for example, because these regions of location A were deemed non-important for monitoring. Alternatively, all portions within a location can be monitored by at least one multi-sensor unit. Location A includes one additional data source 170, which can have its own known and/or unknown monitoring zone 123. Some monitoring zones of multi-sensor units 120 extend beyond the bounds of location A, and some multi-sensor units 120 are located outside of location A, but monitor locations within location A. One or more gateway devices 130 can be located within the facility and/or proximity of the facility, but is not necessarily within a particular location of the contextual database. Some portions of the facility may not have corresponding location data in the contextual database. Alternatively the entire two-dimensional and/or three-dimensional space of the facility across one or more floors including indoor and/or outdoor portions of the facility can be linked to and/or bounded within a corresponding location entry, even if the location is not monitored by any multi-sensor units.

The pianos and/or violins stored by the facility can be deemed valuable, and the monitoring of the facility may be directed towards monitoring of conditions that could impact the quality of these pianos and/or violins and/or the security of these pianos and/or violins. Some or all of this valuable inventory can be indicated in feature entries A-E of the feature database, indicating their location within the facility and/or other relevant information regarding environmental conditions such as temperature, humidity, and/or lighting that must be maintained to ensure these instruments are stored properly. In this example, feature E corresponds to multiple violins rather than a particular violin, for example, due to the close proximity of the violins and/or due to the violins requiring the same condition.

The conditions of locations A and B of FIG. 8 may be required to be different, for example, based on location A storing pianos that may require a first configuration of conditions such as temperature, humidity, and/or lighting due to the optimal conditions for the pianos, and based on location B storing violins that may require a second configuration of conditions such as temperature, humidity, and/or lighting due to the optimal conditions for the violins. Conditions of interest, desired measurement thresholds of various measurable conditions, and/or monetary worth determined for the pianos and/or violins within locations A and B can be utilized to allocate bandwidth and/or power constraints to different sensor devices of the different multi-sensor units and/or to trigger alerts based on detecting that conditions are not within the measurement thresholds.

Some or all of this information describing the layout of the locations, multi-sensor units, monitored zones, and/or features within the facility can be indicated in and/or derived from one or more entries of the contextual database 544 and/or the feature database 545 as two-dimensional information for one or more floors of the facility and/or as three-dimensional information indicating absolute and/or relative locations of some or all of these aspects and/or describing various aspects within the bounds of the facility, within proximity of the bounds of the facility, and/or within the entity of the collective monitoring zones 123.

In some embodiments, some or all of the contextual data of the contextual database 544 is dynamic, for example, changing as a function of a current state determined based on current measurements or other determined current conditions and/or changing overtime based on analysis of the data in the measurement database 542 over time. For example, the contextual database can include expected current conditions for the location, for example, generated based on performing one or more statistical measurement functions of the function database 543 and/or otherwise determining a statistical trend of one or more conditions of the location based on historical data included in the measurement database 542, for example, indicating a historical average and/or standard deviation of one or more measurements for that location. Alternatively or in addition, predicted average and/or standard deviation for current conditions can be included in the contextual database, for example, automatically generated as a function of one or more other factors such as current time of day, day of the week, month of the year, recent measurements, weather data, other current measurements determined to be correlated to the condition being predicted, and/or other data determined to dictate a current state that is expected to impacts the condition being predicted. Inference data or other output generated by automatically applying one or more data analysis functions of the function library can be utilized to determine the predicted average and/or standard deviation for current conditions. Historical data corresponding to processed and/or unprocessed past measurements values of the measurement database corresponding to the location and/or features in the location can otherwise be reflected in a contextual database entry. The contextual database can also indicate the movement of features and/or changes of location of features within a location or between locations.

Fields mapped to a location in the contextual database 544 can include one or more conditions of interest. These conditions of interest can correspond to particularly desirable and/or particularly undesirable conditions that can be detected and/or predicted to occur based on measurements collected by sensor devices of multi-sensor units. This can be determined by comparing one or more measurements of the measurement database to corresponding thresholds and/or comparing output to one or more functions performed on measurements of the measurement database to corresponding thresholds, for example, by performing a detection function, counting function, and/or characterization function.

For example, a condition of interest can correspond to raw and/or synthetic measurement values comparing unfavorably to corresponding threshold measurements, indicating the corresponding measurement is outside a desired range. Other conditions of interest can include determining a condition corresponds to a particular binary value corresponding to detection and/or determining a condition corresponds a particular discrete value corresponding to one or more categories included in the condition of interest. Conditions of interest can be bounded by a lower measurement threshold, and upper measurement threshold, and/or both.

Conditions of interest can be based on a threshold number of people, animals, vehicles, and/or other features determined to be within the location at a given time and/or within a particular time frame. This can include a count comparing favorably to count threshold measurements. Other conditions of interests can correspond to quality and/or performance measurements, determined for goods, products, and/or people in the location. This can include quality and/or performance measurements of one or more features comparing favorably to high quality and/or high performance thresholds, and/or can quality and/or performance measurements of one or more features comparing unfavorably to quality thresholds and/or performance thresholds. Other conditions of interest can correspond to equipment failing, whether equipment is turned on and/or off, and/or the current performance of equipment comparing unfavorably to equipment performance thresholds. Other conditions of interest can correspond to operating cost comparing unfavorably to optimal cost thresholds, operating efficiency comparing unfavorably to optimal efficiency thresholds, productivity comparing unfavorably to productivity thresholds, profit comparing unfavorably to profit thresholds.

Thus, one of more conditions of interest that can be detected and/or predicted for the location and/or a particular feature within the location can be defined corresponding measurement thresholds and/or other conditional thresholds. The condition of interest can further be defined by whether or not the corresponding condition of interest is detected if corresponding measurement values fall within and/or fall outside the measurement thresholds. As used herein, the measurement thresholds can correspond to a conditional requirement, for example, that is a function of multiple types of measurements for the same or different multi-sensor unit, is a function of calculated measurement values generated by performing one or more functions of the function database, and/or is a function of measurement values received from additional data sources 170. In particular, the measurement threshold data and/or the other conditional requirements can correspond to requirements that, when determined to be unmet at a particular time and/or for at least a threshold amount of time, triggers generation of an alert, triggers particular control data be sent to corresponding equipment and/or utilities, and/or triggers a change in mode of operation for collection by one or more multi-sensor units.

A particular condition of interest can be defined by measurement thresholds for one or more types of measurements. The measurement thresholds can indicate required and/or desired bounds, such as maximum or minimum measurement values, for corresponding raw and/or processed measurements discussed herein. In this fashion, the measurement thresholds can dictate the threshold parameters for one or more detection functions, where the detection function indicates a condition of interest exists in response to determining a measurement value, utilized as input to the detection function, falls outside the bounds dictated by the measurement thresholds and/or otherwise compares unfavorably to the measurement thresholds. For example, a detection function can utilize different measurement thresholds for different locations based on corresponding different measurement thresholds indicated for the entries of the different locations in the contextual database 544. Alternatively, a detection function can utilize the measurement thresholds across the facility based on the measurement thresholds being indicated for all entries of all different locations in the contextual database 544, and/or otherwise being determined to be the same measurement thresholds across the facility regardless of location.

Some measurement thresholds can correspond to rates of change, for example, where rapid changes in measurement trigger the condition of interest. Some processing functions of the function database 543 can correspond to derivative functions and/or calculate rate of change between raw and/or synthetic measurements in one or more consecutive time windows, where rate of change in measurements over time can be tracked and/or stored as measurement entries. In some embodiments, a processed value corresponds to multiple derivatives to characterize how the rate of change changes over time. The corresponding measurement thresholds can correspond to threshold maximums and/or minimums of rates of change.

The measurement thresholds can be based on regulatory requirements set by a regulating entity, where a user that owns and/or operates the facility aims to adhere to regulations set by the regulating entity. The regulatory requirements indicate regulation values and/or ranges for one or more types of measurements. In some embodiments, regulatory requirements are automatically determined by the monitoring data analysis system 140 based on receiving the regulatory requirements from a server system associated with the regulatory entity via the network 150. The regulatory requirement can be related to safety regulations designed to ensure the safety of consumers that use goods or products produced at the facility; can be related to safety regulations designed to ensure the safety of personnel operating equipment at the facility; can be related to safety regulations designed to ensure the safety of customers being serviced at the facility; can be related to failure conditions for machines or other equipment operating at the facility;

can be related to federal requirements or other regulated requirements regulating the production, storage and/or sale of particular food or beverages, plants, chemicals, and/or other particular organic and/or inorganic goods or services; can be related to federal requirements or other regulated requirements regulating the conditions of a facility that is operable to provide service to and/or otherwise include people and/or animals; and/or can be related to insurance requirements for features that are insured due to their monetary worth and/or insurance requirements for the facility as a whole. In some embodiments, the regulatory requirements are a function of one or more conditions, such as valuation, particular objects in the location, number of people in the location, age of equipment being regulated, type of organic good being produced in the location, and/or other information. In some embodiments, a user can be prompted to provide user input via the graphical user interface 190, where these regulatory conditions are determined based on a user selection from a set of options presented via the graphical user interface 190 and/or based on text entered via user input to a text box of the graphical user interface 190.

Alternatively or in addition, the measurement thresholds can correspond to user selected requirements, where a user indicated desired ranges for one or more types of measurements. The user can be prompted to provide user input via the graphical user interface 190, where these user-defined measurement thresholds are determined based on a user selection from a set of options presented via the graphical user interface 190 and/or based on text entered via user input to a text box of the graphical user interface 190. In some embodiments, the user selected requirements can correspond to a more conservative range of measurement thresholds within the measurement thresholds set by regulatory requirements. In other embodiments, the user selected requirements can correspond to other desired conditions dictated by the user.

Alternatively or in addition, the measurement thresholds can correspond to historical measurements in the measurement database, for example, based on a mean, variance and/or distribution of the measurements collected in the location and/or in similar locations over time, recently, and/or at the same time of day, week, and/or year. In particular, this can be utilized to define normal conditions and can define the expected variation in the normal conditions. These normal conditions can further be conditioned on other information such as weather, contextual data, or other information determined to affect the normal conditions, but aren't necessarily indicative of the condition of interest occurring and/or shouldn't be cause for alarm. These can correspond to the expected conditions of the contextual database. The measurement thresholds can correspond to two standard deviations away from the mean, in accordance with the determined historical distribution, which can be unconditioned and/or conditioned on one or more conditions. Measurements compare unfavorably to the measurement threshold if they are more than two standard deviations away from the mean, and/or are another predefined distance, such as a statistically significant distance, from the mean.

Alternatively or in addition, the measurement thresholds can correspond to automatically generated optimization requirements. The automatically generated optimization requirements can be determined automatically by the monitoring data analysis system 140. In particular, the optimized measurement thresholds can be determined based on a determination that these optimized measurement thresholds optimize operating efficiency, optimize production output, optimize operating costs, optimize quality of goods and/or services produced, stored, and/or sold at the facility, optimize customer satisfaction of customers that are served at the facility by a service provided at the facility, optimize customer satisfaction of customers that purchased goods and/or products stored at the facility, optimize health, yield, and/or productivity of plants and/or animals in the facility, optimize prevention of failure of equipment at the facility, optimize prevention of loss or spoiling of goods produced and/or stored at the facility, optimize prevention of loss, spoiling, and/or degradation of goods, products, or other items produced and/or stored at the facility, and/or to otherwise optimize the operations of the facility.

The monitoring data analysis system 140 can perform a measurement threshold optimization function that outputs optimal conditions corresponding to one or more measurement types captured by one or more sensor devices, and/or optimal conditions corresponding to one or more synthetic values that are a function of one or more measurements captured by one or more sensor devices of one or more multi-sensor units and/or other contextual data. The measurement threshold optimization function can be a function stored in the function database 543. The measurement threshold optimization function can be performed in the generation of analysis data via one or more statistical measurement functions, correlation functions, and/or inference functions.

Detection functions can be performed by monitoring data analysis system 140 on incoming measurement data to determine if one of these conditions of interest of a particular location and/or particular feature is determined to and/or predicted to exist. The detection functions can be performed on some or all measurement values of the measurement database at some or all timestamps at which the measurement values are received. The detection functions can be performed in response to determining all necessary input measurement data for a most recent timestamp and/or time window, for example, to facilitate detection of conditions of interest as close to real-time as possible.

The function database can include some or all of these detection functions. Detection functions can be performed on one or more measurement values to detect that a particular condition of interest exists. The detection functions can take one or more measurement entries as input, and can generate a binary value as output, where the binary value indicates a whether or not the condition of interest is determined to exist. In some embodiments, the detection functions can take one or more measurement entries as input, and can generate a probability value, where the probability value indicates a probability indicating whether or not the condition of interest exists. The binary value can be generated by comparing the probability value to a probability threshold. Alternatively or in addition, the probability value itself can be included in the output of the detection function.

This can further include one or more characterization functions, indicating one of a discrete plurality of mutually exclusive conditions and/or collectively exhaustive that the measurement data corresponds to, for example, by quantizing a single summary metric of the measurement data into one of a plurality of quantized levels and/or by selecting one of a plurality of categories that the measurement data most closely corresponds to and/or compares most favorably to. The number of categories can be greater than two.

The detection function and/or characterization function can be utilized to implement a counting function to count a number of times a condition occurred and/or was categorized in a particular category within a particular timeframe, and/or to further determine a frequency and/or fluctuations in frequency that the condition occurred and/or was categorized in a particular category over time.

In some embodiments, detection functions and/or characterization functions utilize pre-determined and/or user-defined measurement threshold parameters to determine whether or not the condition of interest exists and/or to quantize the measurements into a particular category. This can include utilizing measurement thresholds indicated in the contextual database that dictate the corresponding condition of interest. When a particular measurement value compares unfavorably to the measurement threshold parameters, for example, by falling outside of pre-determined and/or user-defined required and/or desired bounds that a particular measurement value should fall within, the detection function can output a binary value indicating the condition of interest exists. Similarly, a quantized level dictated by a plurality of mutually exclusive and collectively exhaustive options a measurement value and/or set of measurement values can fall within and/or most closely correspond to can cause the characterization function to output a discrete value identifying the category. In some embodiments, the detection function and/or characterization function utilizes different measurement threshold parameters for measurements collected by different multi-sensor units 120. For example, if the measurement threshold parameters indicate that air temperature measurements for a particular multi-sensor unit 120 should fall between 65 degrees Fahrenheit and 67 degrees Fahrenheit, the detection function can indicate that the condition of interest exists when a measurement value of 64 degrees is collected because it compares unfavorably to the measurement threshold parameters, and can indicate that the condition of interest does not exists when a measurement value of 66 degrees is collected because it compares favorably to the measurement threshold parameters.

Some detection functions can simply check a binary value and/or discrete indicator of a category indicated in measurement data received from multi-sensor units. For example, if the detection function performed by a multi-sensor functions corresponds to detection of the condition of interest, the monitoring data analysis system can determine whether or not the condition of interest exists without further processing and/or comparison to measurement thresholds.

In some embodiments, a detection function and/or characterization function can be a function of multiple detection functions, and/or can test multiple sub-conditions in determining whether the condition of interest exists. This can include evaluating measurement values of multiple types, collected by the same multi-sensor unit at a particular time. This can include evaluating measurement values collected by multiple multi-sensor units at a particular time. This can include evaluating measurement values collected at multiple times within a time window. In some embodiments, each measurement value can be compared to its own set of measurement threshold parameters specific to the type of measurement, specific to the type of the multi-sensor unit that generated the measurement, and/or specific to the type of the timestamp within the time window. In some embodiments, a condition of interest is determined to exist when all of a set of sub-conditions are met. In some embodiments, a condition of interest is determined to exist when any of a set of sub-conditions are met. In some embodiments, a condition of interest is determined to exist when a subset of a set of sub-conditions are met, and when the subset includes at least a threshold number of the set of sub-conditions. In some embodiments, the condition of interest is determined to exist as a weighted function outputted by evaluating the set of sub-conditions, where some sub-conditions are weighted more heavily than others in dictating whether the condition of interest exists.

Performing a detection function can include performing a synthetic function on all collected measurements of the same timestamp and/or within a time window. This can include utilizing multiple, consecutive measurements for each type of measurement within the time window as input and/or can include utilizing a single, raw and/or processed measurement for each type of measurement as input corresponding to the time window as input. The detection function can include normalizing each measurement, for example, by converting each measurement to be within the same range, based on its respective distance from known thresholds and/or based on a known range of the measurement. For example, each measurement can be mapped to a value from zero to one, where zero corresponds to a lower bound measurement for the measurement type and where one corresponds to an upper bound measurement for the measurement type, and where the conversion for each type of measurement is in accordance with its own strictly decreasing or strictly increasing function, on its own linear or non-linear scale. The detection function can further include computing a weighted sum of these normalized measurements and comparing the weighted sum to a single detection threshold and/or multiple detection threshold bounds. A different, positive weight value assigned to each type of measurement can be determined based on a relative importance of each type of measurement configured by the user and/or determined by the system over time, for example, based on analysis of historical data. If the sum compares favorably to the single detection threshold and/or multiple detection threshold bounds, the detection function can indicate the condition of interest is not detected. If the sum compares unfavorably to the single detection threshold and/or multiple detection threshold bounds, the detection function can indicate the condition of interest is detected. A deviation from the single detection threshold and/or multiple detection threshold bounds can be indicated in the output, for example, to generate a detection probability and/or to dictate how far from acceptable bounds the measurements are.

In some embodiments, the detection functions is performed over multiple consecutive time windows, and detection is only determined to exist if the weighted sum and/or other calculated synthetic value compares unfavorably to detection thresholds at least a threshold number of times within a time frame and/or at least a threshold number of consecutives times. This can include summing the deviation from the detection threshold over multiple consecutive time windows, where detection is only determined to exist when deviation sum across a fixed number of time windows exceeds a deviation sum threshold. Other filtering functions and/or mechanisms can be performed to remove outlier values and/or dictate whether indication of detection at isolated timestamps is truly indicative of actual detection. A measured proportion of false positives of detection and/or false negatives of no detection outputted a detection function over time can be analyzed based on retroactive analysis of corresponding measurements in the measurement database, and can be utilized to automatically fine-tune detection thresholds and/or filtering parameters for the detection function in a single time window and/or over multiple time windows for future execution of the detection function. The tradeoff costs of false positives and false negatives respectively can be determined automatically based on their determined impact to success metrics in analysis of historical data of measurement database 542, and/or can be configured via user input. this tradeoff can further be utilized to set detection thresholds and/or filtering parameters accordingly.

In some embodiments, the function database includes at least one inference function. The inference function utilizes measurement entries of the measurement database 542 as input, and can generate inference data as output. For example, one or more detection functions can perform one or more inference function to generate inference data to predict whether a particular condition of interest exists and/or to generate a probability indicating whether a particular condition of interest exists. Similarly, one or more characterization functions can perform one or more inference functions to predict which category a particular condition falls within and/or to otherwise classify particular measurement data and/or to generate a corresponding probability for the predicted category and/or a plurality of probabilities for each of the plurality of categories. In some embodiments, the probability that the condition of interest exists, outputted by the inference function, can be compared to a probability threshold that is configurable via user input and/or is automatically tuned based on a determined tradeoff between the relative costs and/or frequency of false positives and false negatives.

These inference functions can be generated by the monitoring data analysis system 140 by training a model, such as a classification and/or regression machine learning model, on a set of training data. The model can correspond to a neural network, a deep neural network, an artificial neural network, a convolutional neural network, a Bayesian model, a support vector machine model, a cluster analysis model, and/or other supervised or unsupervised learning model. The function database 543 can further include one or more training functions utilized to train models to generate corresponding inference functions, and/or the monitoring data analysis system 140 can otherwise be operable to determine training data, determine a number of input and/or output nodes and/or fields of a feature vector, determine a type of model to be trained on the training data, determine an number and/or types of neural network layers and/or other structure of the model, determine an initial set of weights and/or parameters dictating the model, determine step sizes and/or a number of iterations utilized to train the model, Some or all of these determinations can be made in response to user input to graphical user interface 190, for example, in response to a prompt to enter the determination, to select one or more of these determinations from a discrete set of options, and/or to enter one or more of these determinations. Alternatively or in addition, some or all of these determinations can be made automatically by the monitoring data analysis system, for example, based on previous models, default selection data, and/or selections determined to be optimal or otherwise desirable.

The model can be trained by tuning the weights and/or parameters by performing a determined training step by utilizing the training databased on the training data, input and/or output format, the initial set of weights and/or parameters, the step sizes, and/or the number of iterations. The trained model can be retrained over time, for example, based on additional input fields and/or based on new data received over time, for example to increase accuracy of the model based on additional types of data, more recent data, and/or a higher volume of training data. The model can also be retrained example, to broaden the application of the model, for example, to detect and/or characterize a condition across the facility at any time and/or to narrow or fine-tune the application of the model, for example, to detect and/or characterize a condition at specific location, corresponding to a specific feature, and/or at a specific time of day, month, and/or year.

Some or all of the training data can include measurement entries of the measurement database 542. In some embodiments, one subset of measurement entries of the measurement database 542 is utilized a set of labeled input to the model, and another subset of measurement entries of the measurement database 542 is utilized as a set of output to the model. A plurality of feature vectors can be generated from the plurality of measurement entries, where a training function is performed on the plurality of feature vectors to train the model. Each feature vector can include at least one input field and at least one corresponding output field. Each set of measurement entries utilized as output labels for output fields of a feature vector can have timestamps that match or otherwise compare favorably to corresponding set of measurement entries utilized as input labels for input fields of the same feature vector. Alternatively or in addition, each set of measurement entries utilized as output labels for output fields of a feature vector can be generated by the same multi-sensor unit 120 as the corresponding set of measurement entries utilized as input labels. Alternatively or in addition, each set of measurement entries utilized as output labels for output fields of a feature vector can be linked to a same feature identifier or contextual identifier as the corresponding set of measurement entries utilized as input labels. In some embodiments, entries and/or particular fields of the feature database 545 and/or contextual database 544 are utilized as input labels and/or output labels performing the training function to train the model. In embodiments that utilize a neural network, the input fields of the feature vectors can correspond to input nodes and the output fields of the feature vector can correspond to output nodes.

Some models can be trained to generate a prediction based on data captured at a single time or within a small time window by a particular multi-sensor unit, by multiple multi-sensor units, and/or by external data sources. A single feature vector can correspond to data captured at a particular time or within a particular time window, denoted by the timestamp of the measurement database. The fields of the feature vectors can correspond to different measurement sources, and can be populated by the corresponding measurement data for that measurement source captured at the timestamp of the feature vector. A plurality of feature vectors of the training data can each correspond to data collected at a particular times.

One of more fields can be designated as output, for example, based on the desired functionality of the inference function. The output fields of a feature vector can correspond to measurement values of the measurement database with the same timestamp and/or within the same time window of the feature vector. In some embodiments, these correspond to user-provided timestamped values and/or labels via interaction with graphical user interface 190, correspond to output of a detection function and/or categorization function with reliable output, correspond to measurement values provided by external data sources, and/or otherwise correspond to truth labels and/or values. One or more fields corresponding to an output field of the feature vector can include a binary and/or discrete category identifiers of a truth output at the timeframe, for example, if the inference model is to be utilized for classification. Alternatively, a measurement value or other numerical and/or continuous value of a truth output can be utilized to populate one or more output fields, for example, if the inference model is to be utilized for regression. In particular, the output of regression models can be used to generate predicted measurement values as additional entries to the measurement database and/or can be compared to corresponding measurement thresholds to predict whether or not a condition of interest is detected.

In some embodiments, the plurality of feature vectors of the training data can each correspond to data collected by different multi-sensor units. In such embodiments, contextual data of the contextual database can populate additional fields of the feature vector to differentiate different static conditions of the locations the different multi-sensor units are monitoring. Alternatively, multiple multi-sensor units can be included in the same feature vector as input. As another option, all of the plurality of feature vectors of the training data correspond to the same multi-sensor unit, and/or the same set of multi-sensor units within the proximity to the same location and/or measuring the same feature, for example, where different models are generated for different multi-sensor units, locations, and/or features to fine-tune the models based on conditions specific to the different multi-sensor units, locations and/or features.

Some models can be trained to generate a prediction based on data captured over time in a longer timeframe, such as data captured in multiple consecutive time windows and/or data captured at multiple times within the time frame. A single feature vector can correspond to data captured at multiple times, within the timeframe, by the same and/or different measurement source. The fields of the feature vector can be further designated by a timestamp, relative to the width of the timeframe or ordered number of timestamps within the timeframe, alternatively or in addition to its measurement source. This can be utilized to generate predictions based on trends over a given timeframe rather than instantaneous data. Alternatively, measurement data generate by performing processing functions utilized to capture trends characterizing measurements within a time window and/or timeframe can be utilized as input, for example, where the single feature vector utilizes a single, processed measurement characterizing measurements collected by the corresponding measurement within the corresponding timeframe.

In some embodiments, models trained by the monitoring data analysis system can be utilized to determine the significance of particular measurement sources in generating prediction data and/or to determine the correlation between particular measurement sources. For example, the final weights and/or parameters can be utilized to determine which input fields are most important in detecting the condition of interest.

Alternatively or in addition, once a model is trained, multiple additional models can be trained, where each additional model corresponds to a removal one or more different fields corresponding to one or more different measurement source utilized in the original model. The determined accuracies of the resulting models, for example, compared to the original model and/or each other can be utilized to determine whether these measurement sources are required as input and/or how heavily these measurement sources impact the prediction. This can be utilized to determine a proper subset of measurement sources that be utilized in the final model to achieve at least a threshold accuracy, and/or can dictate that all measurement sources of the original model are required.

This can further be utilized to by the monitoring data analysis system 140 to automatically generate weights for different measurement sources, such as sensor device weights for some or all multi-sensor units ranking their respective sensors and/or unit weights ranking the different multi-sensor units. In particular, measurement sources deemed more important and/or having a greater impact on accuracy of inference data can be weighted more favorably than measurement sources deemed less important and/or having a smaller impact on accuracy of inference data. This can also be utilized to determine monitoring worth values for different sensor devices and/or different multi-sensor units as discussed herein.

Alternatively, measurement values of one or more measurement sources deemed to be less important can be optional input to the model in generating inference data. If these measurement values are not received for a time window corresponding to the rest of the feature vector to generate the inference data, for example, based on their corresponding sensors being currently turned off and/or collecting at a lower rate, the same or modified inference function can still process the rest of the input to produce an output, for example, with marginally less accurate results.

Alternatively or in addition, multiple models can be trained utilizing different levels of measurement resolution and/or quality and/or can be trained on processed data generated from different collection rates. The determined accuracies of the resulting models can be utilized to determine how quality and/or rate of different measurement collection affects the accuracy of the measurement sources are required as input and/or how heavily these measurement sources impact the prediction. This can be utilized to dictate the collection rate and/or collection quality by various sensors of various multi-sensor units accordingly. For example, the monitoring data analysis system can automatically update control data sent to multi-sensor units to reflect these determined collection rates and/or collection qualities of particular sensors to achieve at least a threshold level of accuracy.

Entries of the contextual database 544 can store and/or link to monitoring worth data indicating one or more monitoring worth values. The monitoring worth values can indicate how valuable monitoring is for that particular location. This can be a direct function of monetary value of one or more items, such as valuation of features of the feature database 545, located within the particular location. For example, the monitoring worth values of a location can be a summation of monitoring worth values of multiple features, denoted by a feature identifier. The monitoring worth value can alternatively or additionally be a function of how dynamic various conditions are within the location, for example, indicating how often and/or with what precision the location needs to be monitored to detect a condition of interest. For example, this can be determined based on the historical measurement data and/or determined statistical trends indicating how stable various measurements are and/or indicating how often a condition of interest occurs. The monitoring worth can be a function of a cost associated with the condition of interest occurring, for example, the cost associated with equipment breaking, the cost associated with goods and/or products being exposed to unideal environmental conditions for more than a threshold amount of time, and/or a determined positive and/or negative cost associated with a condition of interest occurring in the location. The monitoring worth function can be a function of the time sensitivity of a condition of interest occurring, indicating whether immediate action must be taken and/or whether a more delayed response is acceptable.

For example, the contextual database can store valuation data, indicating the actual or estimated value, appraisal data, and/or monetary worth of different aspects of the facility. This can include the valuation data of particular features in the feature database. In particular, the valuation data can be utilized to determine which locations within the facility are more valuable than others. For example, different locations being assigned differing valuation values, can be based on the value of various organic and/or inorganic goods and/or products that are produced and/or stored in different parts of the facility, where a first location is determined to have a higher valuation and/or higher worth than a second location in response to determining the first location stores and/or produces a summation of valuations of particular goods and/or products that is higher than a summation of valuations of particular goods and/or products in the second location. As another example, different locations being assigned differing valuation values can be based on the value of equipment. The monitoring worth value of a location can be a function of this valuation data. For example, the monitoring worth value of a location can be a function of the sum of the valuations of each feature in the location.

The monitoring worth values can correspond to each of a set of measurement sources of the measurement database within the location and/or additional measurements sources that, for example, dictate additional conditions associated with the location. In particular, the monitoring worth values can be different for different multi-sensor units 120 in the location and/or for particular sensor devices of the multi-sensor units 120. These monitoring worth values can be based on the valuation data for the location and/or features within the location, increasing with increasing valuation of the location and/or features within the location. These monitoring worth values can be based on a proximity of the sensor device and/or multi-sensor unit to a feature being monitored; can be based on how accurately the sensor device and/or multi-sensor unit monitors the feature; can be based on a determined correlation and/or level of relative importance in different measurement types collected by different measurement sources in detecting a condition of interest; can be based on a determined level of redundancy dictated by other multi-sensor units monitoring the location and/or feature based on performing a correlation function; can be based on the distance between and/or other multi-sensor units within the location and/or monitoring the location; can be based on whether or not measurements collected by the sensor device and/or multi-sensor unit are utilized as input to any detection functions; and/or determined correlation between different types of sensors utilized to determine and/or predict the same condition of interest.

In some embodiments, a monitoring worth function can be performed by the monitoring data analysis system 140 on fields linked to a location entry of a contextual database to determine its monitoring worth value overall, the monitoring worth values for different types of measurement data, the monitoring worth and/or relative monitoring worth for each multi-sensor unit 120 within the location, and/or the monitoring worth value or relative monitoring worth of each sensor device of each multi-sensor unit 120 within the location. The monitoring worth function can be stored in the function database 543.

In embodiments where monitoring worth values can indicate how valuable monitoring is for different locations, this information can be utilized to weight different multi-sensor units 120 based on the monitoring worth values for different locations that include different multi-sensor units, where the monitoring data analysis system 140 automatically assigns weights to the different multi-sensor units based on performing a multi-sensor unit weighting function utilizing the monitoring worth values. The multi-sensor unit weighting function can be stored in the function database 543.

Performing the multi-sensor unit weighting function can cause a weight of a first multi-sensor unit 120 to be higher than the weight of a second multi-sensor unit 120, in response to the first location having a monitoring worth value that indicates a greater worth or is otherwise more favorable than a monitoring worth value of the second location. Furthermore, the monitoring worth values can indicate monitoring worth of different types of measurements collected by different types of sensors on the same or different multi-sensor unit 120. The monitoring worth values for a particular location and/or particular feature can be utilized to prioritize different multi-sensor units 120 in different locations and/or different types of sensor data collected by different sensors devices of multi-sensor units 120. These priorities can correspond to unit weights assigned to the different multi-sensor units 120, which can be utilized by the monitoring data analysis system 140 to automatically designate differing bandwidths to the different multi-sensor units 120. These unit weights can be assigned by performing a weight generating function to generate the unit weights for the plurality of multi-sensor units 120.

The unit weights can dictate that multi-sensor units 120 with higher unit weights transmit a higher amount of measurement data to the gateway device 130 than multi-sensor units 120 with lower unit weights, dictating that multi-sensor units 120 with higher unit weights transmit their measurements more frequently than multi-sensor units 120 with lower unit weights, and/or dictating that multi-sensor units 120 with higher weights transmit richer and/or a greater amount of measurement data to the gateway device 130 than multi-sensor units 120 with lower unit weights. The generated unit weights can be utilized by the monitoring data analysis system 140 to automatically allocate bandwidth to different multi-sensor units, to determine the power constraint data for different multi sensor units, and/or to otherwise control the amount of data collected and/or transmitted by the multi-sensor units, for example, by transmitting control data to the multi-sensor units indicating their allocation of bandwidth, their maximum data transmission rate, and/or their power constraint data. This can correspond to a current mode of operation and/or a default mode of operation, for example, corresponding to default situations where not condition of interest has been detected.

In particular, each unit weight can correspond to a fraction of total bandwidth, corresponding to an input transmission rate the gateway device 130 is determined to be able to handle and/or configured to handle at a particular time or in general. The fraction of total bandwidth allocated to a multi-sensor unit can equal to or can be a function of the proportion of a multi-sensor units unit weight to the sum of all unit weights for all multi-sensor units. Furthermore, the fraction a multi-sensor's allotted bandwidth allocated to one of its sensor device can be can equal to or can be a function of the sensor device weight of the sensor device to the sum of all sensor device weights for all sensor devices of the multi-sensor unit.

In embodiments where monitoring worth values indicates how valuable a particular measurement type is for a particular location, this information can be utilized to weight particular sensor devices on one or more particular multi-sensor units, where different multi-sensor units can have the same or different weights assigned to its sensor devices. Each of a plurality of particular measurement types can correspond to one or more of a plurality of different sensor devices on the multi-sensor unit 120. This information can thus be utilized to weight different sensor devices of a particular multi-sensor unit 120 based on differing monitoring worth values for the corresponding measurement types determined for the particular location that is monitored by the particular multi-sensor unit 120. The monitoring data analysis system 140 can automatically assign sensor value weights to the different sensor devices of a particular multi-sensor unit 120 based on performing a sensor device weighting function that utilizes the monitoring worth values. Performing the sensor device weighting function for a can cause a weight of a first sensor device of a multi-sensor unit 120 to be higher than the weight of a second sensor device of the multi-sensor unit 120, in response to a first measurement type of the particular location having a monitoring worth value that indicates a greater worth or is otherwise more favorable than a monitoring worth value of a second measurement type of the particular location, where the first measurement type corresponds to the type of measurement that the first sensor device of the multi-sensor unit 120 is operable to capture, and where the second measurement type corresponds to the type of measurement that the second sensor device of the multi-sensor unit 120 is operable to capture.

The monitoring worth can be further determined based on the particular conditions of interest being detected in the location, where multi-sensor units and/or sensor devices being utilized as input to a detection function to detect the condition of interest are weighted higher than multi-sensor units and/or sensor devices that are not being utilized as input to a detection function to detect the condition of interest. Similarly, multi-sensor units and/or sensor devices being determined to be more statistically significant in detecting the condition of interest can be weighted higher than multi-sensor units and/or sensor devices that are not as statistically significant or otherwise less important in detecting the condition of interest.

Weights assigned to the different sensor devices of a particular multi-sensor units 120 can be utilized by the monitoring data analysis system 140 to generate control data transmitted to the multi-sensor units 120 via gateway device 130. These weights can automatically designate differing bandwidth fractions to the different sensor devices of a particular multi-sensor unit 120 as fractions of the total bandwidth allocated to the particular multi-sensor unit 120. For example, the monitoring data analysis system 140 can dictate that sensor devices with higher weights have their captured measurements be included in transmissions to the gateway device 130 more frequently than measurements captured by sensor devices with lower weights. As another example, the monitoring data analysis system 140 can dictate that sensor devices with higher weights be turned on and that sensor devices with lower weights be turned off. As another example, the monitoring data analysis system 140 can dictate that sensor devices with higher weights be allocated greater amounts of outgoing data packets sent by the multi-sensor units 120 than sensor devices with lower weights. In particular, higher resolution measurements and/or uncompressed measurements can be included in outgoing data packets for sensor devices with higher weights, and lower resolution measurements and/or compressed measurement data that is compressed via a lossy compression function can be included in outgoing data packets for sensor devices with lower weights. Alternatively or in addition, a greater fraction of measurements captured by the sensor devices with higher weights within the timeframe since the most recent set of outgoing data packets were transmitted can be included in the next set of outgoing data packets, and a smaller fraction of measurements captured by the sensor devices with lower weights within the timeframe can be included in the next set of outgoing data packets. As another example, the monitoring data analysis system 140 can dictate that sensor devices with lower weights have their respective packets skipped before skipping higher weighted sensor devices when network constraints decrease the transmission rate; have their collection rate and/or quality be decreased before higher weighted sensor devices when network constraints decrease the transmission rate; and/or be turned off first when network constraints decrease the transmission rate and/or power constraint data allocates less power to sensor devices.

These sensor device weights and/or some or all of these corresponding consequences of the sensor device weights can be sent to the respective multi-sensor unit as control data. This can correspond to a current mode of operation and/or a default mode of operation, for example, corresponding to default situations where not condition of interest has been detected. The same or different sensor device weights can be determined for multi-sensor units in the same location and/or for multi-sensor units in different locations of the facility.

The detection functions and/or characterization functions can be utilized to automatically generate alerts to be displayed to or otherwise communicated to users of the monitoring system 100, for example, via a graphical user interface displayed via a display device of a client device associated with the user. For example, in response to detecting a condition of interest by performing a detection function, alert data can be generated, for transmission to at least one client device 160, indicating that the condition of interest was detected. The alert data can indicate timestamp, measurement values, particular one of a plurality of conditions of interest that was detected, a probability associated with the detection, a particular location where the condition of interest was detected, a particular feature corresponding to the condition of interest that was detected, and/or a particular multi-sensor unit that detected the condition of interest. In response to receiving the alert, the client device can display some or all of this information to the user, convey some or all of this information to the user audibly via a speaker of the client device, and/or can otherwise notify the user that the condition of interest was detected along with some or all of this information provided in the alert data.

In some embodiments, the alert data can include mitigation instructions, for example, to identify a particular course of action to be made by the user in response to the alert, such as turning off and/or on equipment and/or a particular utility; manually repairing equipment; manually retuning a musical instrument; ordering one or more replacement parts and/or replacement equipment, changing settings of particular equipment; physically inspecting a particular feature and/or location in person; moving valuable and/or sensitive inventory to another location; calling emergency services and/or law enforcement services; shutting down and/or closing the facility and/or a particular location within the facility; initiating additional measurement collection such as richer image data collection by an additional data source 170 that includes a sensor device operable to collect and communicate a higher volume of media data and/or other measurements to the monitoring data analysis system 140 and/or the client device 160 via network 150, and/or other necessary courses of action. Some or all of these mitigation instructions can be determined based on prior user configuration to indicate a particular course of action in response to detection of a particular condition of interest, for example, via user input to graphical user interface 190 in response to a prompt to enter mitigation instructions for some or all of the conditions of interest identified by the user.

In some embodiments, some or all of the mitigation instructions can be initiated and/or completed automatically by the monitoring data analysis system 140 itself, for example, via network 150. For example, the monitoring data analysis system 140 can be operable to send control data to equipment, for example, via the network 150, to turn utilities and/or equipment on and/or off automatically, to change setting of utilities and/or equipment, and/or to lock doors to the facility to close the facility. For example, the monitoring data analysis system 140 can be operable to send control data to additional data sources 170 via network 150 to initiate collection and/or additional collection of measurements by the additional data sources 170 for transmission. The monitoring data analysis system 140 can be operable to automatically facilitate an ordering of a replacement part and/or equipment via network 150, for example, by placing an order online with a vendor that sells the part, delivers the part, and/or installs the part via payment information supplied by the user and/or indicated in a user profile of the user. The monitoring data analysis system 140 can be operable to automatically alert emergency services and/or law enforcement services via network 150.

Alternatively or in addition, the monitoring data analysis system 140 can automatically initiate an updated mode of operation to one or more multi-sensor units in response to detecting the condition of interest. In particular, monitoring data analysis system 140 can generate control data for transmission to the multi-sensor unit 120 that collected the measurement data corresponding to the detection of the condition of interest, dictating an updated mode of operation for that multi-sensor unit 120. This can include increasing the transmission rate, bandwidth fraction, and/or richness of data collected by the multi-sensor unit as a whole, for example, by increasing its unit weight or otherwise indicating these increases in the control data. This can include increasing the transmission rate, bandwidth fraction, and/or richness of data collected by the particular sensor device that generated the measurement data corresponding to the detection of the condition of interest as a whole, for example, by increasing its sensor device weight. This can include turning off, decreasing the transmission rate, bandwidth fraction, and/or richness of data collected by other sensor devices of the multi-sensor unit to accommodate for the increased sensor device weight of the sensor device corresponding to detection of the condition of interest.

Alternatively, one or more sensor devices can instead increase in sensor device weight, causing these sensor devices of the multi-sensor unit to turn on, increase their transmission rate, bandwidth fraction, and/or richness of data. This can be beneficial to capture a higher volume of related measurements that can be utilized to analyze other electrical, environmental, operational, and/or other measured factors in the vicinity that may have contributed to the cause of the condition of interest and/or may have changed themselves as a result of the condition of interest. In particular, the selected sensor devices to be increased and/or selected processing functions to be performed in the updated mode of operation can correspond to types of measurements determined by the monitoring data analysis system 140 to be correlated to the type of measurement utilized to detect the condition of interest as a result of performing statistical measurement functions, inference functions, and/or other analysis on previously collected data as discussed herein.

Other multi-sensor units 120 can be assigned lower unit weights to accommodate for the heightened unit weight of the multi-sensor units 120 responsible for detecting the condition of interest. Alternatively, one or more multi-sensor units 120 in the vicinity and/or within range of a location and/or feature corresponding to the condition of interest can also be assigned higher unit weights in response to detecting the condition of interest, and/or can be assigned redistributed sensor weights to accommodate heavier collection by the type of sensor device corresponding to the condition of interest and/or other sensor devices determined to be correlated. This can be beneficial in collecting additional data in the surrounding area in response to detecting the condition of interest. Alternatively, one or more multi-sensor units 120 in an entirely different location, and/or measuring an entirely different feature, can have its unit weight raised and/or can be assigned redistributed sensor weights to accommodate heavier collection by one or more particular types of sensor devices. In particular, these other locations and/or features may have been determined to be highly correlated to the condition of interest, highly correlated to the location in which the condition of interest was detected, and/or highly correlated to the feature corresponding to the condition of interest in response to performance of statistical measurement functions, correlation functions, and/or inference functions on historical data and/or other analysis of historical collected by the monitoring data analysis system.

This updating of multi-sensor unit modes of operation can include recalculating sensor device weights for one or more multi-sensor units and/or recalculating the unit weights based on detecting the condition of interest. Alternatively, pre-determined weights to be utilized in response to the condition of interest can be pre-defined, determined previously by the monitoring data analysis system 140 automatically and/or can be configured via user input to graphical user interface 190. The monitoring data analysis system 140 can generate control data indicating the update to the updated mode of operation, for example, based on the redistributed sensor device weights and/or unit weights. In some embodiments, the control data to be utilized in response to the condition of interest can be pre-defined, determined previously by the monitoring data analysis system 140 automatically and/or can be configured via user input to graphical user interface 190. For example, interpreted code generated by the user for execution by one or more particular sensor units and/or indicated by the user to be executed in response to a particular condition of interest being detected, can be sent to multi-sensor units automatically in response to detecting the condition of interest. Alternatively, if some or all of this interpreted code is stored in memory of one or more multi-sensor units 120 already, for example, in their function library 216 and/or as one of the plurality of modes of operation stored as operational data 212, the monitoring data analysis system 140 can indicate the stored interpreted code to be executed and/or the stored mode of operation to be initiated, and the multi-sensor unit can execute the interpreted code and/or otherwise change to the indicated mode of operation automatically in response to receiving the control data. The control data can further indicate an exit condition and/or period of time for this updated mode of operation, and/or the updated mode of operation can be performed until additional code data is generated and sent by the monitoring data analysis system 140 to again change mode of operation and/or revert to a previous and/or default mode of operation.

Alternatively or in addition to generating alerts, the monitoring data analysis system can generate analysis data over time, based on performing various statistical measurement functions, correlation functions, and/or inference functions. This can be utilized to identify trends in measurements over time and/or to identify cause and effect relationships. For example, metrics such as customer satisfaction, customer reviews, product quality, appraisal data, performance metrics, agricultural yield, operational efficiency, sales data, attendance, and/or other metrics indicative of levels of success and/or failure in the operations of the facility, products produced by the facility, and/or performance of people in the facility can be monitored over time and can be analyzed as a function of various environmental conditions and/or other measurements in the measurement database to determine whether particular environmental or other measured factors contributed to these successes and/or failures. Correlation functions can be utilized to determine which measurement sources, and/or which sets of measurement sources, are statistically significant and/or highly correlated with one or more of these metrics. These statistically significant and/or highly correlated measurement sources and/or corresponding measurement thresholds corresponding to favorable versus unfavorable success metrics can be transmitted to the client device as analysis data for display via the display device, along with corresponding correlation coefficients and/or visualization data illustrating trends in the measurements by these measurement sources over time and corresponding trends in the success metrics.

Particular measurement sources that are determined to be statistically significant in determining conditions of interest in particular locations can be assigned heavier weights accordingly, and/or particular measurement sources that are determined to be unimportant can be assigned lower weights and/or turned off. This can be utilized to control which proper subset of sensors of each multi-sensor units are turned on and/or how their respective collection rates and/or quality is allocated, based on their determined significance in detection of conditions of interest in their respective locations.

This can further be utilized to determine redundant sources of information, such as multiple sensor devices on the same multi-sensor unit and/or multiple multi-sensor units in the same location, based on these sets of sensors types and/or multi-sensor units being determined to be highly correlated to each other. In some embodiments, if a set of sensor devices on the same or different multi-sensor units are determined to be redundant, only one of these sensor devices is turned on and/or at least one of these sensor devices is turned off. Alternatively or in addition, some or all of these sensor devices that are powered on can collect a lower volume of data and/or be allotted lower bandwidth due to the redundancy. This less-redundant configuration of sensor allocation can correspond to a default mode of operation. In particular, these highly correlated sensors can automatically be powered on and/or weighted more heavily in response to detection of a condition of interest, for example, to collect as much relevant information as possible in these circumstances.

Once particular measurement sources are determined to be statistically significant and/or highly correlated, this can be utilized to postulate that variation in particular environmental data corresponding to conditions measured by or all of these measurement sources are a cause of favorable and/or unfavorable metrics indicating levels of success of the facility. This can be utilized by the monitoring data analysis system to automatically propose controlled experiments, based on controlling variation in the environmental conditions postulated to cause one or more success metrics to be favorable and/or unfavorable. For example, the monitoring data analysis system can propose a control group and/or one or more experimental groups, and can propose a set of controllable, experimental conditions of the measurable environmental condition be induced in different areas of the facility at the same time, in the same area of the facility in different times, on different products and/or other features of the same type, and/or can otherwise propose a controlled experiment.

As a particular example, the monitoring data analysis system 140 can detect that the cadence of noise measurements collected in a facility are correlated to the productivity, quality, and/or yield of a plant or other agricultural good produced in the facility. The monitoring data analysis system can propose an experiment to apply different ambient noise at different pitches, amplitudes, and/or cadences to some rows of plants, to apply different music of different genres and/or styles to other rows of plants, and/or to apply different words and/or voice inflection by people talking to other rows of plants, for example, in response to postulating that some or all of these noise characteristics may have an effect on plant quality and/or plant yield. The monitoring data analysis system 140 can further dictate that each row of plants includes multiple different sets of plants produced by the facility, allowing the impact of these conditions on different types of plants to be determined. The monitoring data analysis system 140 can update control data to multi-sensor units in the location where the experiment is being conducted to increase collection rate and/or quality for their acoustic sensors to more closely monitor the noise conditions in the different rows as this experiment is conducted.

As another example, the monitoring data analysis system 140 can determine that a particular musical instrument manufactured in a facility deviated greatly in its pitch and/or timbre from other instruments of the same type. This can be determined based on user input and/or based on collecting audio samples of music performed on the different musical instruments and determining the particular musical instrument is different. Alternatively or in addition, customer satisfaction data, appraisal data generated by a professional musician, and/or observation data collected via graphical user interface 190 can indicate that the resulting musical instrument was particularly good and should be replicated, or particularly bad and should never be replicated. If the instrument was particularly good, the monitoring data analysis system 140 can determine if any measured factors in the measurement database for the manufacturing of the particular musical instrument were different from measured factors in the measurement database for the manufacturing of the other musical instruments by a statistically significant amount, and can postulate that such factors can cause better production of the musical instruments. Similarly, this statistically significant difference in a particular factor can be utilized to postulate that this factor can cause worse production of the musical instruments if the particular musical instrument was particularly bad. The monitoring data analysis system 140 can propose experimental groups and/or an experimental setup to test various factors postulated to have an effect to identify the key factors that led to the good or bad result with a greater certainty, enabling these factors to be adopted in future mainstream production.

Some experiments can be proposed for static conditions, for example, corresponding to measurement data indicating a particular unchanging conditions of the facility. This can allow the user to determine whether some of these static conditions are non-optimal, and that a different static condition may be more optimal in future operations of the facility. For example, in response to determining a color temperature and/or lumens level of lighting in a facility that grows plants is constant based on monitoring the lighting over time via light sensors of the multi-sensor units, an experiment with experimental groups with differing color temperature of lighting and/or different lumens levels of lighting can be proposed.

The user can choose whether or not to conduct some or all experiments proposed by the monitoring data analysis system. The user can facilitate performance of a proposed experiment, for example, utilizing a subset of goods and/or products within a small region of the facility that do not impact normal operations and/or at times that do not impact normal operations. Results of the experiment can be determined by the user and/or determined automatically based on continued monitoring of the environment and/or determining values of success metrics for the control and/or experimental groups. These results can be utilized to determine optimal environmental settings, and can be utilized to update measurement thresholds, conditions of interest, and/or controllable settings of corresponding equipment and/or utilities within the facility.

In some embodiments, the analysis data can include heat map data. The heat map data can be generated for measurements collected across different locations of the facility at a given time and/or over time. For example, a plurality of heat maps can be generated, each corresponding to measurement values collected by the same type of sensor device of multi-sensor units in different locations, and/or corresponding to a same type of processed measurement value collected in different locations. Each heat map can correspond to a particular time window in which the measurements were collected, and/or can correspond to a larger time frame, where the measurement values are averaged over multiple time windows within the larger time frame. In this fashion the heat map can correspond to average and/or expected conditions of the facility. Alternatively, each heat map can correspond to the most recent measurements collected, to display the most current information for the facility.

In particular the heat maps can visually indicate locations of the different measurements relative to the facility, based on the location of the respective multi-sensor unit that collected the measurement, as indicated in the contextual database 544. The heat maps can further indicate the measurement value based on a corresponding color in the visualization. Thus, the heat map can illustrate a two-dimensional and/or three-dimensional rendering of a particular type of measurement across different locations of the facility at a particular time or averaged over time. The monitoring data analysis system 140 can further generate an animation, corresponding to multiple heat maps for the same type of measurement collected in consecutive time intervals, to convey the changes in the measurement values across the facility over time.

The heat map data can be displayed via graphical user interface 190, and user input to the graphical user interface 190 can enable the user to interact with the heat map data by selecting a particular measurement type to be displayed and/or a particular time window to be displayed. In some embodiments, the time and/or location that a particular condition of interest was detected can be visually indicated at a particular time interval in the respective location in the displayed animation. The heat map animation can allow the user to visually digest how the various types of measurements changed in the vicinity of the location where the condition of interest was detected, leading up to the condition of interest and/or following the condition of interest.

In some embodiments, heat map data can be projected for future conditions. For example, the heat map data can display predicted measurement values generated by an inference function trained on measurement entries over time and/or predicted measurement values corresponding to historical averages based on analysis of corresponding historical measurement data. This projected heat map data can be generated based on one or more user-selected constraints via graphical user interface 190, such as selected amount of time in the future; a selected time of day, week or year; selected weather conditions; selected occupancy and/or attendance; and/or another selected fixed value or fixed range for one or more other types of measurements at one or more particular locations. This can be utilized to visually convey expected future conditions of one or more particular types of measurement in different locations across the facility, and/or to visually convey how other various controllable and/or uncontrollable conditions are expected to impact the one or more particular types of measurements in different locations across the facility.

The heat map data can further allow the user to visually digest historical ambient conditions and/or historical variability in conditions across different locations of the facility. For example, this can allow the user to understand the trends of various conditions across the facility, such as uncontrollable conditions. The user can utilize this information to determine that a particular area of the facility has unideal conditions and/or has tremendous, undesirable variability in conditions. The user can determine to store valuable inventory and/or to produce goods that are sensitive to these conditions in different locations of the facility.

In some embodiments, the monitoring data analysis system can automatically determine these unideal locations, for example, based on the monitored conditions over time comparing unfavorably to measurement thresholds, and/or based on success metrics comparing unfavorably to respective success thresholds and/or comparing unfavorably relative to success metrics determined for other locations in the facility. This can include customer satisfaction, product quality, failure rate of equipment, performance metrics, yield, operational efficiency, personnel productivity, and/or other metrics specific to products produced and/or stored in this location, people performing in this location, and/or features within in this location being unfavorable. In some embodiments, there may be no statistically significant measurement of environmental condition determined to be the cause and/or otherwise be correlated to these poor success metrics, but the relatively low success metric of the location relative to success metrics of other locations may still be determined to be statistically significant. This information can be utilized to determine to move production and/or storage of products from this location to a different location in the facility, to deter personnel and/or customers from entering and/or working in this portion of the facility, and/or to initiate an update and/or renovation to the location within the facility, for example, to make the environment within the location more controllable and/or to emulate other locations within the facility. Some or all of these suggested improvements to the operation of the facility can be controlled and/or initiated automatically, and/or can be conveyed to the user via graphical user interface 190. These provide significant improvements to the technologies associated with facilities management.

If there is a statistically significant measurement type that is determined to be the cause and/or otherwise be correlated to these poor success metrics in the location, and if the environmental condition is controllable and/or would be controllable as a result of installation of proper equipment and/or as a result of a particular renovation, the renovation, installation of proper equipment, and/or proper control of the environmental condition can be initiated and/or conveyed to the user via graphical user interface 190.

In some embodiments, particular products being stored in the facility require particularly strict and stable environmental control. The heat map data and/or corresponding collection of measurements across the corresponding locations over time can be utilized to aid the user in selecting where particularly precious and/or finicky inventory be stored. This can include comparing the measurement thresholds for the item in the feature database to the mean, variability, and/or most extreme historical conditions for measurements in its current location and/or across several possible locations that are unoccupied and/or have room for the inventory given its size and/or other storage requirements.

For example, a monitoring data analysis system for a facility being used to manufacture and/or store musical instruments can automatically suggest where different instruments be stored, based on individual measurement thresholds, valuation data, and/or size of each instrument. As another example, the monitoring data analysis system can suggest installation locations for sensitive and/or valuable electrical equipment that would be negatively affected by particular types and/or strengths of electromagnetic fields based on mean, variation, and/or historical maximums of a mapping of electromagnetic measurements across the facility, where the equipment is proposed to be installed in a location expected to have a low amount of electromagnetic interference. The monitoring data analysis system can also propose moving of other existing equipment to provide a space for the new equipment with a favorably low level of electromagnetic activity.

The monitoring data analysis system can automatically determine the last time an instrument was tuned or inspected by personnel, and can monitor temperature, humidity, and/or other conditions. Measurement thresholds corresponding to absolute temperature and humidity, or changes in temperature and humidity, can be utilized to automatically send an alert to a client device with tuning instructions and/or otherwise indicating that the instrument should be inspected and/or retuned. The monitoring data analysis system can predict changes in tuning of the instrument given the measured temperature and humidity induced on the instrument since the last time the instrument was tuned by performing a predicted tuning function, for example, trained on training data corresponding to prior tracked tunings of instruments and the conditions undergone by the instrument between tuning and/or based on known tuning tendencies of the instrument. This can be utilized to predict whether the instrument tuning is too sharp and/or too flat, and can indicate how many cents sharp and/or flat the instrument is and/or how many cents sharp or flat each string of a string instrument is. This can be utilized to generate the tuning data. The alerts can further be generated based on determining and/or predicting that an instrument will be utilized in a performance soon, will be showcased soon, will be sold soon, and/or will be appraised soon, for example where measurement thresholds are automatically set to be stricter to ensure more refined tuning at these critical times.

As another example, a facility can correspond to a concert venue, outdoor amphitheater and/or other location where music is performed and/or recorded. The historical data and/or analysis data for the entire venue and/or specific locations within the venue can be presented to a performer that will be performing at the venue, for example, as heat map data. This can include average and/or standard deviation of noise levels and/or reverberation levels, temperature, humidity, vibration, attendance, or other factors that are determined to affect musical performance for a particular musician that will be performing based on their own historical data, and/or that are determined to affect musical performance for musicians on average. The projected weather conditions for the performance based on weather data can be utilized to further determine expected conditions. The performer can tune their instrument and/or prepare accordingly. The monitoring data analysis system can automatically suggest and/or instruct the performer in tuning their instrument based on known tendencies of the pitch of the instrument in these expected conditions for example, based on in past measurements of similar instruments. The tuning instructions can further be based on known tendencies of the pitch of the performer, for example, based on past performances for the performer, based on automatically comparing pitch for live recordings and studio recordings of songs recorded for the performer, and/or based on the performer entering their pitch tendencies or providing a sound sample of playing their respective instrument via graphical user interface 190. The monitoring data analysis system can generate success metrics of the performance based on measured attendance and/or the measured levels of noise of attendees relative to the number of people that attended, and/or based on captured audio data and/or video data of the performer compared to their past recordings. The monitoring data analysis system can postulate various measured conditions that seem to impact the success metric for the performance based on analysis of measurements captured for various performances at the same or different venue.

As another example, a facility can correspond to a school, university, classroom, and/or examination facility that conducts examinations of intelligence and/or knowledge. Test scores collected over time, and/or other metrics of success in teaching and/or learning, can be analyzed in conjunction with various conditions of the facility, to determine which measurable factors are statistically significant in impacting the performance by particular students and/or overall performance. This can be utilized to determine optimal testing environments for particular people, and these people can seek out testing facilities for important examinations with historical measurement data and/or regulated conditions that correspond to the needs determined for particular people. The monitoring data analysis system can postulate which measurable factors of a testing environment seem to have the greatest impact on a student's performance to generate optimal testing environment conditions for the student, and can suggest a facility with historical measurement data suggesting that the facility will likely meet the measurement thresholds dictated by the optimal testing environment conditions for the student. This information can be conveyed to the student via graphical user interface 190 of their client device 160. Similarly, the monitoring data analysis system can postulate which measurable factors of a particular facility seem to have the greatest impact performance across all students to generate optimal testing environment conditions for the facility, and can suggest optimal testing environment conditions for the facility to achieve the highest overall performance in future examinations.

As another example, a facility can correspond to an athletic facility and/or recreational facility such as a stadium, gymnasium, track, pool, one or more ski slopes or trails, one or more hiking trails, one or more biking trails, a fitness center, and/or other facility where people engage in athletic activity. The various indoor and/or outdoor conditions across the facility can be measured, and can be evaluated over time to determine how they impact athletic performance and/or safety. Success metrics and/or additional measurements that can be collected to determine success can correspond to attendance overall; human traffic patterns across different parts of the facility or along different trails; time taken to complete a course, lap or trail; average speed of people engaging in activity; number of injuries in a day or within a time frame; level of seriousness of injuries; slipperiness of particular trails; hazardous conditions of particular trails; safety level and/or difficulty level of particular trails; customer satisfaction in their time at the facility; customer rating of their workout at the facility relative to other workouts; heart rate or other biometric metrics indicative of athletic performance collected from wearable devices; and/or other information. This can be utilized in conjunction with measurement data collected by multi-sensor units and/or additional data sources to postulate which environmental factors are indicative of highest athletic performance overall, for particular activities in the facility, and/or by particular people.

This can be further utilized to determine which measurable factors are indicative of these success metrics. For example, various environmental factors that are determined to cause and/or be related to safety risks and/or hazardous conditions in the facility can be utilized to set regulatory conditions, defined by various measurement thresholds, for determining whether or not the facility should be open, whether or not particular trails should be open, and/or whether or not particular portions of a trail or of the facility should be inspected and/or tended to. This can be utilized to generate a detection function that detects when these determined measurement thresholds are not met. The detection of the corresponding condition of interest can be utilized to alert personnel to inspect, tend to, or close areas of the facility in response to the condition of interest being detected via a notification sent to client device 160 for display via graphical user interface 190. The detection of the corresponding condition of interest can be utilized to alert customers that are currently determined to be within the facility and/or are determined to have membership and/or tickets to visit the facility. The alert can be displayed via graphical user interface 190 of their respective client devices 160, and can display information notifying these users of the potentially unsafe conditions and/or to indicate that a particular trail and/or particular location is currently closed and/or may be more hazardous and/or difficult than usual. Personnel or customers can otherwise be present current and/or projected conditions of the facility, such as safety metrics and/or measurement conditions determined to cause hazardous condition, as heat map data, enabling the personnel or customers to determine which parts of the facility are currently expected to be hazardous and/or projected to be hazardous at a future time.

As another example, various environmental factors that are determined to cause and/or be related to athletic performance and/or athlete satisfaction in the facility can be utilized to control controllable conditions, for example, if the facility is an indoor facility where the corresponding conditions are controllable by equipment and/or utilities in the facility. This can be utilized to generate a detection function that detects when these determined measurement thresholds for the optimal facility conditions are not met and/or to maintain control of these conditions in the facility.

Performance patterns for particular customers can be generated based on their measured performance metrics across different facilities or the same facility under different conditions over time to determine which measurable conditions have positive and/or negative impact on their athletic performance. These desirable conditions can be displayed to the customer via graphical user interface 190 of their respective client devices 160. The graphical user interface can indicate suggested locations within the facility, suggested trails, suggested types of workouts, suggested facilities from a plurality of monitored facilities, or other suggestions determined to have and/or expected to have the desired conditions at the current time and/or at any time. This can be presented as heat map data indicating particular conditions and/or illustrating which areas include desirable conditions.

Monitoring of athletic facilities can further be utilized to enforce regulatory requirements for official competitions and/or organized sporting events, such as regulation thresholds for particular sporting equipment. For example, regulation football pressure thresholds can be stored as measurement thresholds, and/or can influence selections for temperature, humidity, and/or atmospheric pressure that must be maintained in the facility storing footballs. The monitoring data analysis system 140 can automatically detect changes in environmental conditions leading up to a game and/or can monitor when personnel have last checked football pressure. For example, in response to detecting threshold values and/or changes in temperature, humidity, and/or atmospheric pressure since a football pressure was last determined to be inspected, an alert can be generated for transmission to a client device for display via graphical user interface 190 indicating that the football should be inspected again. This can further be utilized to retroactively determine the changes in temperature, humidity, and/or atmospheric pressure induced on a football in storage in the facility before the game, which can be utilized to determine what the expected football pressure would be given these conditions. This can be utilized to predict whether tampering and/or unsportsmanlike conduct was in play, for example by determining that the actual pressure of the football was different from the expected pressure of the football, calculated by the system, by at least a threshold amount.

The monitoring system 100 can be utilized in malls, retail facilities, amusement parks, and/or other facilities where people move about various locations and/or make purchased in various locations. The conditions measured across the facility over time by multi-sensor units can be analyzed in conjunction with retail data such as quantity of items sold, types of items sold, which locations in the facility sell more or less items, traffic of people throughout the facility, or other information indicating success of individual retailers and/or the facility as a whole in servicing people and/or selling products. This can be utilized to determine optimal conditions to maximize purchasing behavior and/or visitation to various locations within the facility by determining the correlation between various measured factors and how many people visited a particular location and/or how many items were sold in the particular location. The optimal conditions can be utilized to set conditions accordingly in various locations to maximize sales and/or attendance.

The monitoring system 100 can be operable to monitor the performance of personnel working at the facility. This can be utilized to ensure that regulatory inspection, repair, calibration, and/or tending of equipment, plants, goods, and/or products in the facility is conducted in accordance with regulatory requirements and/or desired requirements. This can also be utilized to ensure the regulation and/or desired level of servicing of people, for example, by doctors or medical personnel at hospitals, and/or by hospitality personnel at restaurants, hotels, and/or exclusive lounges. A condition of interest can correspond to detecting that a particular equipment, plant, good, and/or product has not been inspected, repaired, calibrated, and/or tended within a threshold amount of time and/or was not inspected, repaired, calibrated, and/or tended at a scheduled time. This detection can be performed based on an occupancy sensor detecting human presence in the location; based on determining if a machine has changed in its operation by comparing its previous state, motion, noise, power levels, electromagnetic field, temperature, and/or other conditions to new motion, noise, electromagnetic field, temperature; based on determining that vibration was induced by a human interacting with a feature of interest; based on detecting an RFID tag of the personnel and/or other identifier based on a tracking sensor; and/or by otherwise detecting intervention by personnel that indicates that the inspection, repair, calibration and/or tending was conducted. This can be utilized to track this human intervention over time, if regulatory and/or desired requirements are met in the frequency of human intervention, and/or how different levels of human intervention and/or how human intervention by distinct personnel affects one or more success metric of the facility based on analysis data generated utilizing this information.

Figure 9:
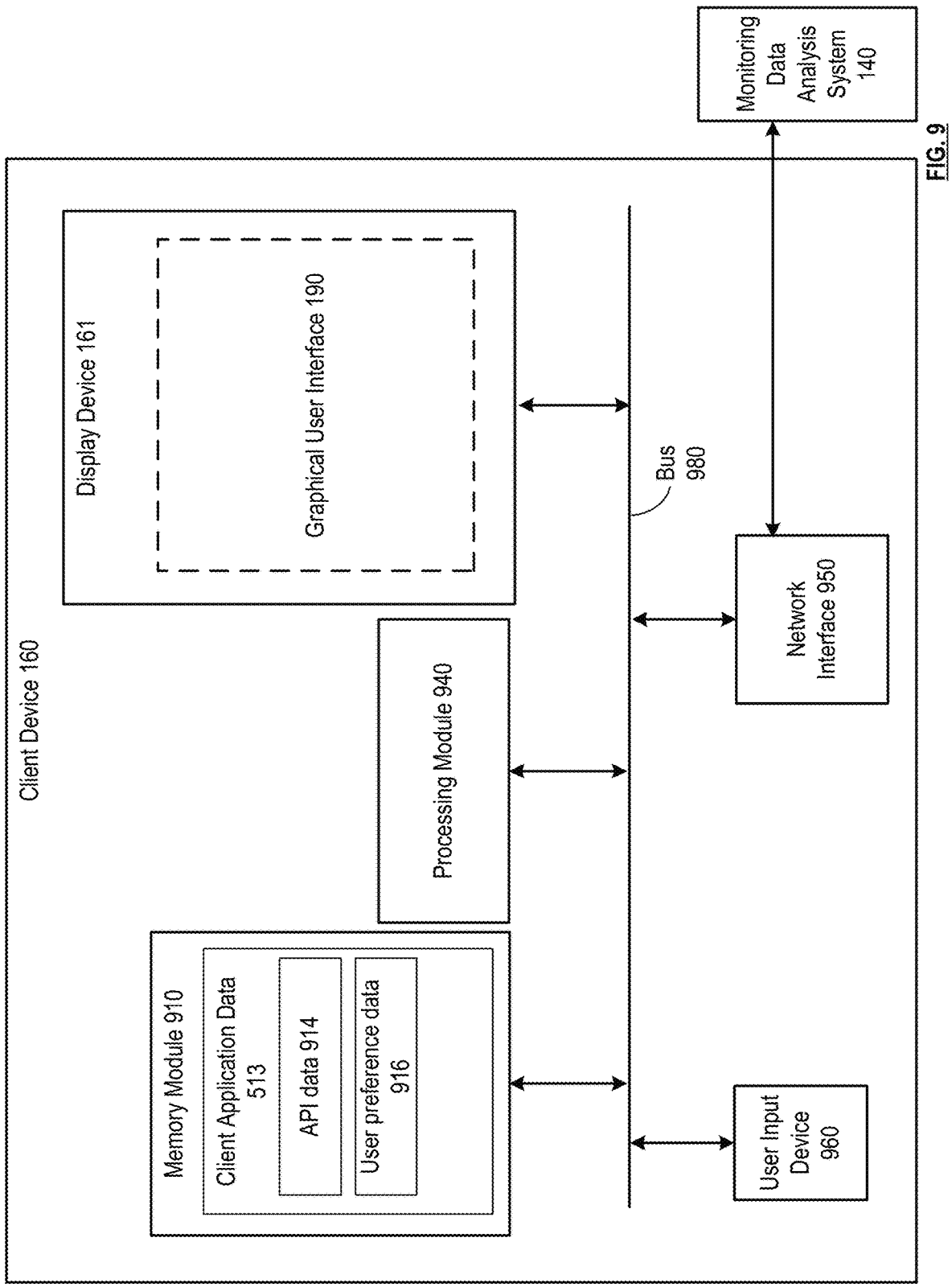
FIG. 9 is schematic block diagram of a client device in accordance with various embodiments of the present invention.

FIG. 9 illustrates an example embodiment of a client device 160. Client device 160 can include a memory module 910 that includes at least one memory device, a processing module 940 that includes at least one processing device, a network interface 950, a display device 161, and/or a user input device 960. The network interface 950 can be operable to communicate bidirectionally with monitoring data analysis system 140, for example, via network 150. The display device can be operable to display a graphical user interface 190 in accordance with execution of client application data 513. The user input device can include a keyboard, mouse, touchscreen, microphone, and/or other device capable of receiving user input, for example, to generate selections, enter input, and/or otherwise interact with prompts displayed via graphical user interface 190. The components of client device 160 can be coupled and/or operable to communicate via bus 980 and/or via another wired and/or wireless connection. Client device can be implemented by utilizing a computer, laptop, PC, mobile device, tablet, wearable device, or other device that facilitates operation of client application data 513. Client device 160 can correspond to and/or be utilized by a user of the system, for example, corresponding to a user responsible for configuring, monitoring and/or overriding any of the functionality of monitoring system 100 as discussed herein, via user input to graphical user interface 190.

The client application data 513 can transmitted to the client device 160 by monitoring data analysis system 140. The client application data 513 can include executable instructions that, when executed by processing module 940, can cause the client device to display the graphical user interface 190; to display prompts via the graphical user interface 190; to receive and process user input received via graphical user interface 190; to transmit configuration data, function calls, database queries, and/or other user input to the monitoring data analysis system 140 via network interface 150; to receive alert data, analysis data, query responses to database queries, function output of function calls, and/or other information from the monitoring data analysis system 140 via network interface 150; to display alert data, analysis data, query responses, function output, and/or other information received from the monitoring data analysis system 140 and/or generated locally via graphical user interface 190; and/or to otherwise facilitate functionality of the client device 160 and/or graphical user interface 190 as discussed herein.

The client application data 513 can include application programming interface (API) data. The user can utilize the API data to generate custom functionality, via user input to graphical user interface 190, for processing of measurement data locally, via processing module 940 of client device 160. Alternatively or in addition, the user can utilize the API data to generate custom functionality, via user input to graphical user interface 190 for processing of measurement data locally, for processing of measurement data via monitoring data analysis system, for example, to configure and/or override some or all of the functionality of the monitoring data analysis system discussed herein.

The graphical user interface 190 can be utilized to facilitate user generation of custom functions, applications, and/or other functionality to analyze data as customized by the user via user input. For example, the user can write user-defined functions that include function calls to one or more of the functions of function database 543. These user-defined functions can be added to function database 543 and/or can be run locally via processing module 940. Some or all of the functions of function database 543 can be stored as part of the API data 914 to facilitate the locally-run user-defined functions that call the functions of function database 543.

The user can generate database queries to one or more databases of the database system 541 to read, write, modify, and/or delete database entries. The graphical user interface can facilitate generation of database queries via one or more selectable filtering options. The user can select from discrete options and/or enter continuous values to bound a selected range. The selections can be utilized to determine filtering parameters for the query. For example, a query to the measurement database can include one or more selected timeframe bounds indicating which timestamps are queried; one or more selected measurement source identifiers indicating which measurement sources are queried; and/or one or more measurement value bounds indicating which measurement values are queried. The monitoring data analysis system can execute the queries against one or more databases of the database system accordingly in response to receiving the query and/or selected filtering parameters defining the query from the client device 160.

The user can interact with graphical user interface to enter a combination of interpreted code calling one or more functions of function database 543 and/or database queries to database system 541. In response to the user entering each line and/or module of interpreted code and/or each database query, the interpreted code and/or each database query can be sent to the monitoring data analysis system for execution by the monitoring data analysis system, where the result is transmitted back to the client device in response to the execution. In some embodiments, where functions are stored locally as API data, only the database queries are sent to the database system 541, and database entries dictated by filtering parameters of the database queries are received in response. The interpreted code entered by the user can be performed locally on the database entries by calling the locally stored functions for performance on the database entries and/or user-defined parameters as input to the locally stored functions, and the output of the functions can be displayed and/or can be utilized as input to further function calls entered in further interpreted code. This can be utilized to retroactively analyze particular conditions, for example, to determine average conditions and/or levels of fluctuation in conditions across various locations, based on calculating distribution data for various measurements over time via one or more statistical measurement functions. This can be utilized to determine whether suspected cause and effect relationships between various conditions of interest, various measurements, various locations, and/or various features exist, are highly correlated, and/or are statistically significant based on analysis of historical data. This can be utilized to retroactively analyze various data captured across the facility in a time frame leading up to and/or following a condition of interest that was and/or was not detected by the monitoring system 100.

In some embodiments, the user can write user-defined functions that can be stored locally and/or stored in function database 543. The user-defined functions utilize a combination of user-defined queries to read measurement entries from the measurement database and further utilize function calls of pre-defined and/or user-defined functions of the function database that utilize fields of the measurement values as input. For example, the user-defined functions can be written based on a series of function calls and/or queries utilized for retroactive analysis defined above. The output can be utilized as new measurement values to be written to the measurement database, for example, where the user-defined function corresponds to a synthetic function and where the function output is utilized to generate a new timestamped measurement entry. The output can be utilized as alert data, for example, where the user-defined function corresponds to a detection function and/or inference function indicating whether or not a condition of interest is determined to exist, where the alert data is displayed via the graphical user interface of the same and/or different client device 160 to the same and/or different user. The output can be utilized as analysis data, for example, where the user-defined function corresponds to a statistical measurement function, correlation function, and/or inference function, where the analysis data is displayed via the graphical user interface of the same and/or different client device 160 to the same and/or different user.

The user can configure that some of these user-defined functions be performed automatically by the monitoring data analysis system 140, for example, on all incoming data of a particular type, on all incoming data that meets filtering conditions otherwise used to query historical data, on incoming data at pre-determined time intervals, and/or on incoming data received in response to detection of a condition of interest by the monitoring data analysis system. This can be utilized to configure the detection of conditions of interest and/or to configure the data capture following conditions of interest. This can be utilized to ensure that desired analysis of can be facilitated automatically, closer to real time, rather than retroactively by the user. This can further be utilized to configure how data is collected and/or stored overtime to facilitate richer analysis in the future.

The user can interact with graphical user interface 190 to identify features, configure valuation of features, configure monitoring worth values of one or more locations, configure unit weights, configure sensor device weights, and/or populate and/or select values for fields of the contextual database. The user can generate qualitative metrics for some or all of the measurement entries, such as selecting quality metrics for particular features and/or for the facility as a whole at various times, performance metrics for particular people and/or animals, and/or other user-defined values indicating the success of the operation in the facility at particular times.

The user can interact with graphical user interface 190 to write, define and/or configure any functions of the function database described herein, can set parameter values for various functions and/or can determine how measurement values will be processed, presented and/or formatted. This can include writing interpreted code and/or facilitating transmission of the interpreted code to particular multi-sensor units to push updates to the particular multi-sensor units and/or otherwise cause the multi-sensor units to execute the interpreted code. This can include writing interpreted code to define functions of the function library 216 stored by particular multi-sensor units and/or stored in function database 543.

The user can utilize graphical user interface 190 to determine particular analyses to be performed on various measurements collected by the system and/or stored in measurement database 542, can determine when these analyses be performed, can determine how the output will be formatted and/or presented as visualization data, and/or can determine courses of action that will result from particular results in the analyses.

The user can utilize graphical user interface 190 to define some or all of the detection functions, for example, by providing the measurement thresholds and/or otherwise indicating the conditions of interest and/or indicating how each conditions of interest will be determined to exist. This can further include defining the resulting courses of action such as the information presented in the alert data, control data sent to equipment, updates to modes of operation or other control data sent to the multi-sensor units, and/or otherwise configuring courses of action automatically initiated in response to detecting a condition of interest.

The user can utilize graphical user interface 190 to configure graphical user interface 190 and/or to configure one or more client applications that utilize corresponding client application data 513 discussed herein, for use by the same user or other users. This can include determining layout of the graphical user interface, questions presented and/or prompts displayed by the graphical user interface, selection of a discrete set of selectable options from a larger set of possible options that are presented to the user and/or are selectable by the user, available functions to be performed locally and/or to be performed via monitoring data analysis system 140, and/or other functionality.

Different users can generate functions and can perform their own analysis of data collected and generated by monitoring data analysis system 140 based on their own interests and/or their responsibilities within the facility. Each user can thus utilize the data analysis platform provided by monitoring data analysis system 140 for their own needs, in accordance with their own configurable preferences and analysis. The user-defined functions of different users and/or other user specific configurations, as well as their respective client devices and/or account information, can be stored in user database 546.

Alternatively or in addition, at least one client device 160 can execute the same or different client application data to facilitate other functionality discussed herein. For example, other people that are not responsible for configuration of the system and/or do not utilize monitoring data analysis system 140 as a data analysis platform can still receive information from monitoring data analysis system 140 and/or can transmit data to monitoring data analysis system 140 via a corresponding client application on their client device 160. For example, various personnel of the facility can utilize their respective client devices 160 to engage with the observation collection application discussed herein to follow instructions presented via graphical user interface 190, answer questions, select observation data from discrete options, take pictures or capture audio via the client devices camera and/or microphone, and/or otherwise enter observations in response to the presented prompts. The inspection patterns, quality and/or frequency of observations provided, and/or movement of various personnel across the facility can also be tracked in measurement database based on the collection of this corresponding data via client device 160, to aid in determining which personnel are performing well, are not performing scheduled inspections, and/or how various success metrics are positively or negatively affected by the interaction with particular personnel.

As another example, various customers or other people currently visiting the facility and/or that will potentially visit the facility in the future can be presented historical information for the facility and/or statistical measurements describing expected conditions of the facility at the time they will visit, current conditions of various locations of the facility, and/or alerts relating to portions of the facility that are currently open or closed; busy or not busy; and/or safe or hazardous. This can include presenting a current heat map or projected heat map of the facility, generated by the monitoring data analysis system 140 for one or more types of measurement selected by the customer.

Alerts can be configurable by the customer based on their desired experience at the facility. The customer can enter their own measurement thresholds for various conditions based on their personal preferences and/or known health impact. Automatically generated measurement thresholds can be generated for the customer based on various locations in the same or different facilities they frequent over time and the corresponding measured conditions, and based on the customer satisfaction and/or customer performance at these various locations. This can be utilized to allow the graphical user interface 190 to present suggestion data, suggesting various locations within a facility and/or a particular facility from multiple facilities that will have the most positive impact on the user's performance and satisfaction, based on a determination that current and/or expected conditions at that location compare favorably to the automatically generated measurement thresholds. The suggestion data can further include a map and/or navigation data to aid the user in navigating to these suggested locations. The customer can be prompted to provide observation collection of the facility in the same or different fashion as personnel. The user can be prompted to provide customer satisfaction data by entering a review of the facility and/or answering various questions relating to their performance and/or satisfaction while at the facility, which can be utilized to populate corresponding measurement entries in the measurement database for the facility. Some or all of these configurations, user preferences, and/or user profile data can be stored for different users and/or different client devices in user database 546. Some or all of these configurations, user preferences, and/or user profile data can be stored by the client application data 513 on the client device locally as user preference data 916.

In some embodiments, some or all of the monitoring data analysis system 140 is integrated within the client device 160, for example, where some or all of the functionality of monitoring data analysis system 140 is performed locally by processing module 940 automatically and/or in response to user input via graphical user interface 190. The memory module 910 can store operation data 512 and/or can store some or all of database system 541.

Figure 10:
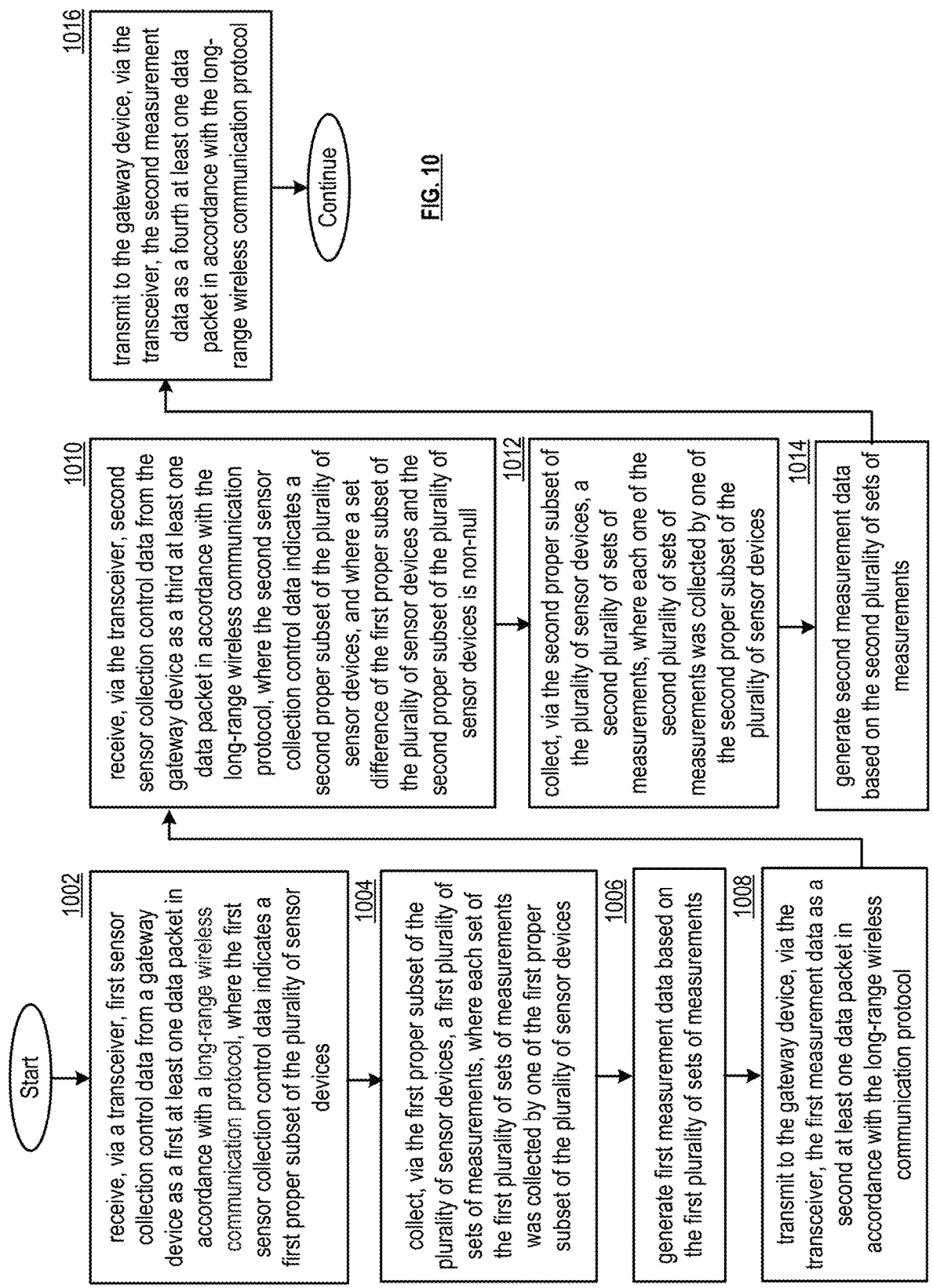

FIG. 10 illustrates a method for execution by a multi-sensor unit 120 in accordance with various embodiments of the present invention. The multi-sensor unit can include at least one processor, such as processing module 240 and a memory, such as memory module 210, that stores executable instructions that, when executed by the at least one processor, cause the multi-sensor unit 120 to perform the steps below.

Step 1002 includes receiving, via a transceiver of the multi-sensor unit 120 such as transceiver 220, first sensor collection control data from a gateway device, such as gateway device 130 as a first at least one data packet in accordance with a long-range wireless communication protocol. The first sensor collection control data indicates a first proper subset of the plurality of sensor devices. Step 1004 includes collecting, via the first proper subset of the plurality of sensor devices, a first plurality of sets of measurements, where each set of the first plurality of sets of measurements is collected by one of the first proper subset of the plurality of sensor devices. Step 1006 includes generating first measurement data based on the first plurality of sets of measurements. Step 1008 includes transmitting to the gateway device, via the transceiver, the first measurement data as a second at least one data packet in accordance with the long-range wireless communication protocol.

Step 1010 includes receiving, via the transceiver, second sensor collection control data from the gateway device as a third at least one data packet in accordance with the long-range wireless communication protocol. The second sensor collection control data indicates a second proper subset of the plurality of sensor devices, and a set difference of the first proper subset of the plurality of sensor devices and the second proper subset of the plurality of sensor devices is non-null. Step 1012 includes collecting, via the second proper subset of the plurality of sensor devices, a second plurality of sets of measurements, where each one of the second plurality of sets of measurements is collected by one of the second proper subset of the plurality of sensor devices. Step 1014 includes generating second measurement data based on the second plurality of sets of measurements. Step 1016 includes transmitting to the gateway device, via the transceiver, the second measurement data as a fourth at least one data packet in accordance with the long-range wireless communication protocol.

In various embodiments, the gateway device receives, via a transceiver of the gateway device, a plurality of sets of measurement data from a plurality of multi-sensor units as data packets in accordance with the long-range wireless communication protocol. The plurality of multi-sensor units includes the multi-sensor unit. The plurality of sets of measurement data includes the first measurement data and the second measurement data. The gateway device transmits, via a network interface of the gateway device, the plurality of sets of measurement data to a monitoring data analysis system, such as monitoring data analysis system 140.

In various embodiments, the first sensor collection control data and the second sensor collection control data were generated by the monitoring data analysis system communicating with the gateway device. The set difference of the first proper subset of the plurality of sensor devices and the second proper subset of the plurality of sensor devices is non-null in response to the monitoring data analysis system determining that throughput of the gateway device has changed from comparing favorably to a throughput threshold to comparing unfavorably to a throughput threshold. Determining that the throughput of the gateway device compares unfavorably to a throughput threshold can include determining that an input rate of data packets received from the plurality of multi-sensor units exceeds a maximum transmission rate of data via the network interface of the gateway device.

In various embodiments, the first sensor collection control data includes a first set of measurement collection rates, where each of the first set of measurement collection rates corresponds to one of the first proper subset of the plurality of sensor devices. The second sensor collection control data includes a second set of measurement collection rates, where each of the second set of measurement collection rates corresponds to one of the second proper subset of the plurality of sensor devices. The first plurality of sets of measurements are collected by the first proper subset of the plurality of sensor devices in accordance with the first set of measurement collection rates. An intersection of the first proper subset of the plurality of sensor devices and the second proper subset of the plurality of sensor devices is non-null, and one of the plurality of sensor devices included in the intersection collects measurements in accordance with a corresponding one of the first set of measurement collection rates in response to the first sensor collection control data being received, and the one of plurality of sensor devices included in the intersection collects measurements in accordance with a corresponding one of the second set of measurement collection rates in response to the second sensor collection control data being received. The one of the second set of measurement collection rates is different from the one of the first set of measurement collection rates.

In various embodiments, at least one memory of the multi-sensor unit further stores a library of processing function parameters indicating a plurality of processing functions that includes a first processing function and a second processing function that is different from the first processing function. An intersection of the first proper subset of the plurality of sensor devices and the second proper subset of the plurality of sensor devices is non-null. The first sensor collection control data indicates a first processing function be performed on measurements collected by one of plurality of sensor devices included in the intersection. The second sensor collection control data indicates a second processing function be performed on measurements collected by the one of plurality of sensor devices included in the intersection.

In various embodiments, the method can further include generating first processed measurement data for the one of plurality of sensor devices by performing the first processing function on one of the first plurality of sets of measurements collected by the one of plurality of sensor devices in response to receiving the first sensor collection control data. The first measurement data includes the first processed measurement data for the one of plurality of sensor devices. The method can further include generating second processed measurement data for the one of plurality of sensor devices by performing the second processing function on one of the second plurality of sets of measurements collected by the one of plurality of sensor devices in response to receiving the second sensor collection control data. The second measurement data includes the second processed measurement data for the one of plurality of sensor devices.

In various embodiments, at least one memory of the multi-sensor unit further stores historical measurement data collected by the one of the plurality of sensor devices. The method can further include updating the historical measurement data collected by the one of the plurality of sensor devices based on the first processed measurement data. The method can further include collecting, via the one of the plurality of sensor devices, at least one additional measurement after updating the historical measurement data. The method can further include performing a difference measurement function to generate a discrepancy value indicating a discrepancy between the at least one additional measurement and the updated historical measurement data collected by the one of the plurality of sensor devices. The method can further include generating discrepancy data by comparing the discrepancy value to a discrepancy threshold. The method can further include generating a discrepancy notification in response to determining that the discrepancy data indicates that the discrepancy value exceeds, or otherwise compares unfavorably to, the discrepancy threshold. The discrepancy notification can indicate the one of the plurality of sensor devices. The method can further include transmitting to the gateway device, via the transceiver, the discrepancy notification as a fifth at least one data packet in accordance with the long-range wireless communication protocol. The monitoring data analysis system communicating with the gateway device can generates the second sensor collection control data based on receiving the discrepancy notification.

In various embodiments, the second sensor collection control data includes an instruction to increase a measurement collection rate of the one of the plurality of sensor devices in response to the discrepancy notification. One of the second plurality of sets of measurements is collected by the one of the plurality of sensor devices in accordance with the increase in measurement collection rate of the one of the plurality of sensor devices.

In various embodiments, the first sensor collection control data includes first interpretive code instructions, and the second sensor collection control data includes second interpretive code instructions. The method further includes executing the first interpretive code instructions in response to receiving the first sensor collection control data, for example, by utilizing an interpreter module such as interpreter module 248 of the multi-sensor unit. The multi-sensor unit operates in a first mode of operation as a result of executing the first interpretive code instructions that causes the multi-sensor unit collects the first plurality of sets of measurement data in accordance with the first sensor collection control data. The method further includes executing the second interpretive code instructions in response to receiving the second sensor collection control data, for example, by utilizing the interpreter module of the multi-sensor unit. The multi-sensor unit changes from operating in the first mode of operation to operating in a second mode of operation as a result of executing the first interpretive code instructions that causes the multi-sensor unit collects the first plurality of sets of measurement data in accordance with the first sensor collection control data.

Figure 11:
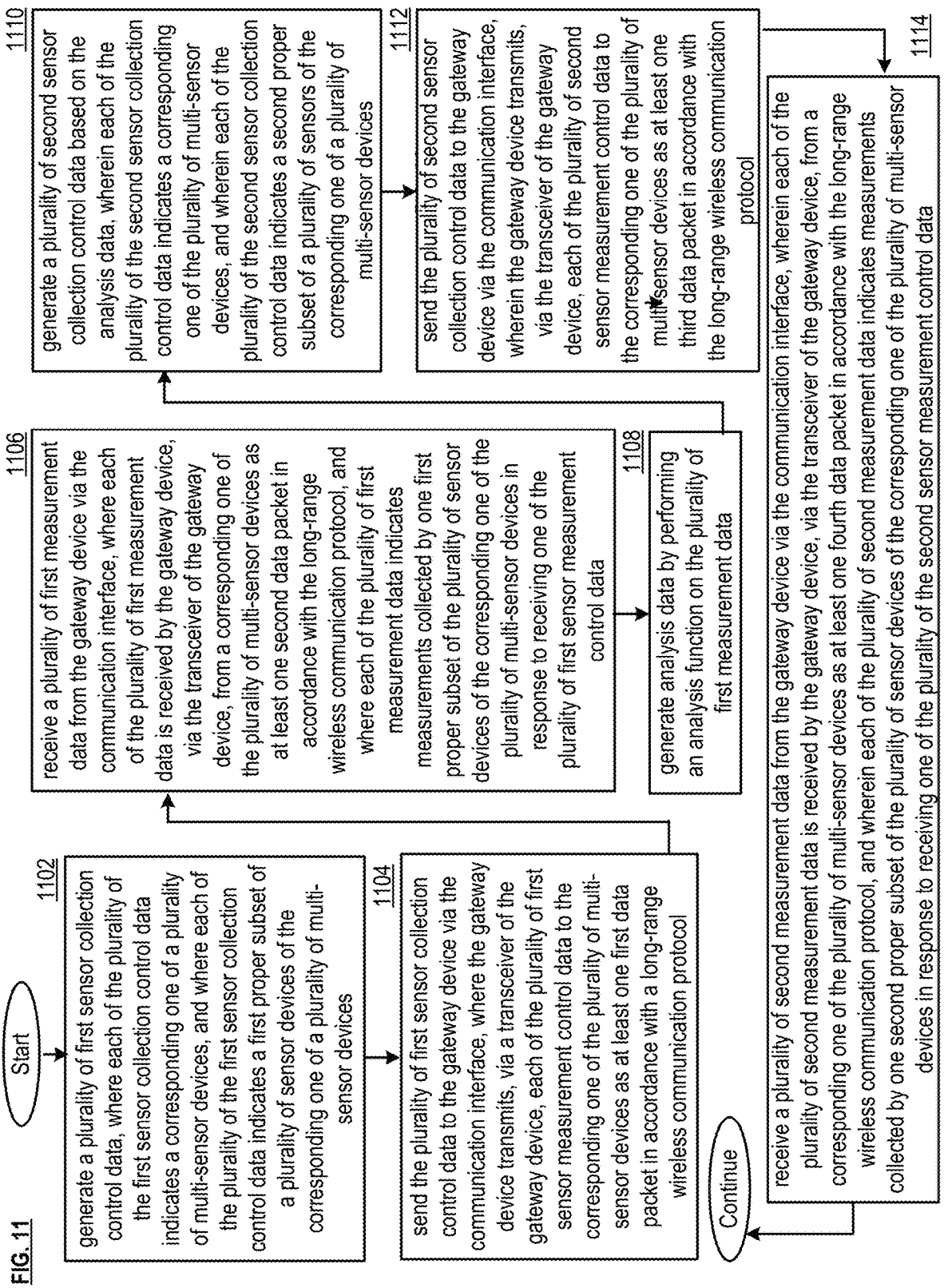

FIG. 11 illustrates a method for execution by a monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause the multi-sensor unit 120 to perform the steps below.

Step 1102 includes generating a plurality of first sensor collection control data. Each of the plurality of the first sensor collection control data indicates a corresponding one of a plurality of multi-sensor units, and where each of the plurality of the first sensor collection control data indicates a first proper subset of a plurality of sensor devices of the corresponding one of a plurality of multi-sensor units. Step 1104 includes sending the plurality of first sensor collection control data to the gateway device via a communication interface, such as network interface 550, configured to communicate with the gateway device. The gateway device transmits, via a transceiver of the gateway device, each of the plurality of first sensor measurement control data to the corresponding one of the plurality of multi-sensor units as at least one first data packet in accordance with a long-range wireless communication protocol. Step 1106 includes receiving a plurality of first measurement data from the gateway device via the communication interface. Each of the plurality of first measurement data is received by the gateway device, via the transceiver of the gateway device, from a corresponding one of the plurality of multi-sensor units as at least one second data packet in accordance with the long-range wireless communication protocol. Each of the plurality of first measurement data indicates measurements collected by one first proper subset of the plurality of sensor devices of the corresponding one of the plurality of multi-sensor units in response to receiving one of the plurality of first sensor measurement control data. Step 1108 includes generate analysis data by performing an analysis function, such as one or more functions of the function database 543, on the plurality of first measurement data.

Step 1110 includes generate a plurality of second sensor collection control data based on the analysis data, where each of the plurality of the second sensor collection control data indicates a corresponding one of the plurality of multi-sensor units, and where each of the plurality of the second sensor collection control data indicates a second proper subset of a plurality of sensors of the corresponding one of a plurality of multi-sensor units. Step 1112 includes sending the plurality of second sensor collection control data to the gateway device via the communication interface. The gateway device transmits, via the transceiver of the gateway device, each of the plurality of second sensor measurement control data to the corresponding one of the plurality of multi-sensor units as at least one third data packet in accordance with the long-range wireless communication protocol. Step 1114 includes receiving a plurality of second measurement data from the gateway device via the communication interface. Each of the plurality of second measurement data is received by the gateway device, via the transceiver of the gateway device, from a corresponding one of the plurality of multi-sensor units as at least one fourth data packet in accordance with the long-range wireless communication protocol. Rach of the plurality of second measurement data indicates measurements collected by one second proper subset of the plurality of sensor devices of the corresponding one of the plurality of multi-sensor units in response to receiving one of the plurality of the second sensor measurement control data.

In various embodiments, the monitoring data analysis system is implemented by utilizing at least one server system, and the communication interface is configured to communicate with the gateway device via a wired and/or wireless network such as the Internet and/or a cellular network. In various embodiments, the gateway device is coupled to the monitoring data analysis system, and the communication interface is configured to communicate with the gateway device via a short range wired connection.

In various embodiments, at least one memory of the monitoring data analysis system stores measurement threshold data. Generating the analysis data includes detecting a discrepancy between one of the plurality of first measurement data and the measurement threshold data that exceeds a discrepancy threshold based on comparing the plurality of first measurement data to the measurement threshold data, for example, by determining that one of the plurality of first measurement data compares unfavorably to the measurement threshold data. One of the plurality of second sensor collection control data, corresponding to the one of the plurality of multi-sensor units that generated the one of the plurality of first measurement data, indicates an increase in collection rate for at least one of the second proper subset of the plurality of sensor devices of the one of the plurality of multi-sensor units in response to the detection of the discrepancy by the monitoring data analysis system.

In various embodiments, the at least one memory further stores historical measurement data based on a plurality of previously received measurement data. The method further comprises generating trend data for the historical measurement data, and generating the measurement threshold data based on the trend data.

In various embodiments, the method includes determining a threshold incoming data packet rate for the gateway device. A second one of the plurality of second sensor collection control data, corresponding to a second one of the plurality of multi-sensor units, indicates a decrease in collection rate for at least one of the second proper subset of the plurality of sensor devices of the second one of the plurality of multi-sensor units in response to the increase in collection rate for at least one of the second proper subset of the plurality of sensor devices of the one of the plurality of multi-sensor units, based on the threshold incoming data packet rate.

In various embodiments, the memory further stores location data indicating a plurality of physical locations of the plurality of multi-sensor units. A second one of the plurality of second sensor collection control data, corresponding to a second one of the plurality of multi-sensor units, indicates an increase in collection rate for at least one of the second proper subset of the plurality of sensor devices of the second one of the plurality of multi-sensor units in response to the increase in collection rate for at least one of the second proper subset of the plurality of sensor devices of the one of the plurality of multi-sensor units in response to determining the second one of the plurality of multi-sensor units is closer in physical proximity to the one of the plurality of multi-sensor units than other ones of the plurality of multi-sensor units.

Figure 12A:
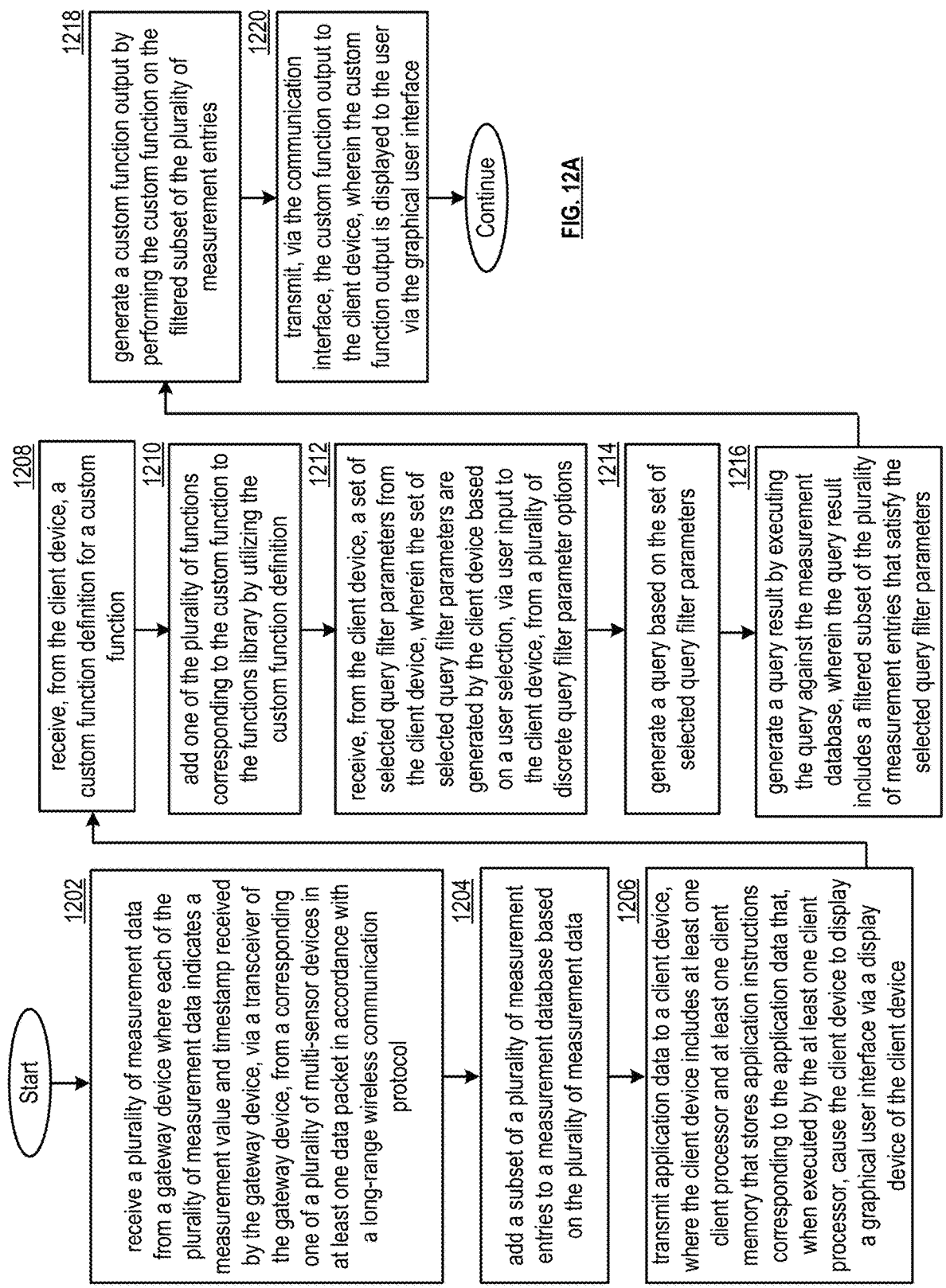

FIG. 12A illustrates a method for execution by a monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause the monitoring data analysis system 140 to perform the steps illustrated in FIG. 12A.

Furthermore, the memory can include and/or the monitoring data analysis system 140 can otherwise access a memory that stores an measurement database, such as measurement database 542, that includes a plurality of measurement entries corresponding to time-series data; a contextual database, such as contextual database 544, that includes a plurality of contextual data entries; and/or a function library, such as function database 543, that includes a plurality of functions.

At least a subset of the plurality of measurement entries store and/or indicate a sensor identifier indicating one of a plurality of sensor devices; a measurement value indicating a value of one of a plurality of measurements collected by the one of the plurality of sensor devices; and a timestamp indicating a time that the one of the plurality of measurements was collected by the one of the plurality of sensor devices. At least a subset of the plurality of contextual entries store and/or indicate sensor identifier data indicating one of a plurality of sensor devices; and contextual data for the one of the plurality of sensor devices, indicating static data describing the one of the plurality of sensor devices in the context of a facility that includes the plurality of sensor devices. At least a subset of the plurality of functions stored by the function library, when performed on measurement data of at least one entry of the monitoring data analysis system, generates function output data.

Step 1202 includes receiving a plurality of measurement data from the gateway device, via a communications interface such as network interface 550. Each of the plurality of measurement data indicates a measurement value and timestamp. The each of the plurality of measurement data can be transmitted the gateway device in response to the gateway device receiving, via a transceiver of the gateway device, the each of the plurality of measurement data from a corresponding one of a plurality of multi-sensor units in at least one data packet in accordance with a long-range wireless communication protocol. Step 1204 includes adding the subset of the plurality of measurement entries to the measurement database system based on the plurality of measurement data. The measurement value and timestamp of each of the plurality of entries are populated based on the measurement value and timestamp of a corresponding one of the plurality of measurement data, and the sensor identifier of the each of the plurality of entries is selected based on determining the corresponding one of the plurality of multi-sensor units that transmitted the measurement value and timestamp to the gateway device.

Step 1206 includes transmitting, via communication interface, application data, such as client application data 513, to a client device such as client device 160. The client device includes at least one client processor and at least one client memory that stores application instructions corresponding to the application data that, when executed by the at least one client processor, cause the client device to display a graphical user interface, such as graphical user interface 190, via a display device of the client device. Step 1208 includes receiving from the client device, via the communication interface, a custom function definition for a custom function, where the graphical user interface displays a prompt to enter a custom function definition, and where the custom function definition is entered via user input to the client device in response to the prompt. Step 1210 includes adding one of the plurality of functions corresponding to the custom function to the functions library by utilizing the custom function definition.

Step 1212 includes receiving, via the communication interface, a set of selected query filter parameters from the client device, where the graphical user interface displays a prompt to select at least one of a plurality of discrete query filter parameter options, and where the set of selected query filter parameters are generated by the client device based on a user selection, via user input to the client device, from the plurality of discrete query filter parameter options in response to the prompt. Step 1214 includes generating a query based on the set of selected query filter parameters. Step 1216 includes generating a query result by executing the query against the measurement database, where the query result includes a filtered subset of the plurality of measurement entries that satisfy the selected query filter parameters. Step 1218 includes generating a custom function output by performing the custom function on the filtered subset of the plurality of measurement entries. Step 1220 includes transmitting, via the communication interface, the custom function output to the client device, where the custom function output is displayed to the user via the graphical user interface.

Figure 12B:
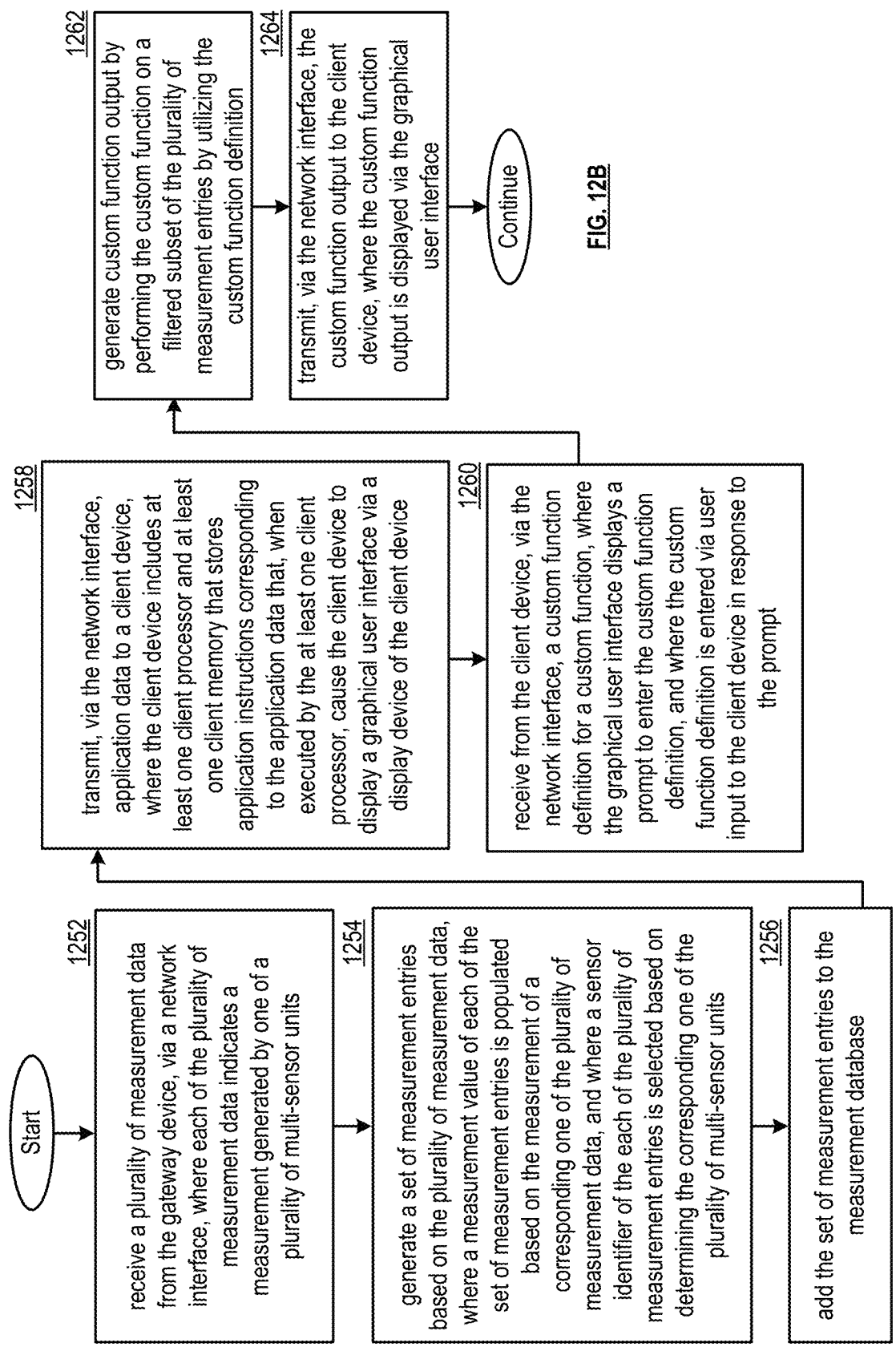

FIG. 12B illustrates a method for execution by the monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause a monitoring data analysis system, such as monitoring data analysis system 140, to perform the steps illustrated in FIG. 12B. The monitoring data analysis system can perform some or all of the steps of FIG. 12B instead of or in addition to some or all of the steps of FIG. 12A. The monitoring data analysis system can implement the steps of FIG. 12B to perform some or all of the functionality of the monitoring data analysis system 140 discussed herein. Some or all of the steps of FIGS. 10-19 can be utilized in conjunction with performing some or all of the steps of FIG. 12B. Some or all of the functionality of any embodiments of the monitoring data analysis system 140 discussed herein can be utilized in conjunction with performing some or all of the steps of FIG. 12B.

Step 1252 includes receiving a plurality of measurement data from the gateway device, via the network interface. Each of the plurality of measurement data can indicates a measurement generated by one of a plurality of multi-sensor units, such as multi-sensor units 120. For example, the measurement of each of the plurality of measurement data is received by the gateway device, via a transceiver of the gateway device, from the corresponding one of the plurality of multi-sensor units in at least one data packet in accordance with a long-range wireless communication protocol. The network interface can correspond to the communication interface of FIG. 12A and/or can be implemented by utilizing the network interface 550.

Step 1254 includes generating a set of measurement entries based on the plurality of measurement data. The measurement value of each of the set of measurement entries can be populated based on the measurement of a corresponding one of the plurality of measurement data. The sensor identifier of the each of the plurality of measurement entries can be selected based on determining the corresponding one of the plurality of multi-sensor units.

Step 1256 includes adding the set of measurement entries to the measurement database, such as measurement database 542. For example, the measurement database can include a plurality of measurement entries, where a subset of the plurality of measurement entries are generated based on being received in step 1252. This subset can include all the measurement entries of the measurement database. Alternatively, this subset can constitute a first proper subset of the plurality of measurement entries, where other measurement entries are generated based on being received from additional data sources that are distinct from the plurality of multi-sensor units 120, such as one or more additional data sources 170 discussed herein.

Step 1258 includes transmitting, via the network interface, application data to a client device, where the client device includes at least one client processor and at least one client memory that stores application instructions corresponding to the application data that, when executed by the at least one client processor, cause the client device to display a graphical user interface via a display device of the client device. Step 1260 includes receiving from the client device, via the network interface, a custom function definition for a custom function. The graphical user interface can display a prompt to enter the custom function definition, and/or the custom function definition can be entered via user input to the client device in response to the prompt. Step 1262 includes generating custom function output by performing the custom function on a filtered subset of the plurality of measurement entries by utilizing the custom function definition. For example, the filtered subset can be indicated by function parameters of the custom function, for example, where the user further enters function parameters to be utilized in performing the custom function. Alternatively, the custom function is performed on all of the plurality of measurement entries. In some cases, the filtered subset is automatically selected in performance of the custom function, and/or can be determined prior to performing the custom function.

Step 1264 includes transmitting, via the network interface, the custom function output to the client device, where the custom function output is displayed via the graphical user interface. In some cases, the custom function is performed multiple times on different filtered subsets of the set of measurement entries, for example, in predefined intervals indicated in the custom function definition and/or in response to commands to re-perform the custom function received from the client device based on user input. In such cases, custom function parameters dictating which filtered subset upon which the custom function is performed can be configured via user input and/or can otherwise be determined for each performance of the custom function.

In various embodiments, each of the plurality of measurement data received from the gateway device further includes a sensor timestamp indicating a time that the measurement of the each of the plurality of measurement data was generated by the corresponding one of a plurality of multi-sensor units. Generating the set of measurement entries further includes populating the timestamp of each of the set of measurement entries with the sensor timestamp indicated in a corresponding one of the plurality of measurement data. The timestamp can alternatively be based on a time the measurement was received by the gateway device and/or a time the measurement was received by the monitoring data analysis system.

In various embodiments, a subset of the plurality of sensor devices are each included in one of a plurality of multi-sensor units, for example, as PCB-mounted sensor devices on one or more PCBs of the multi-sensor unit. Each of the multi-sensor units includes one of a plurality of subsets of the plurality of sensor devices. The plurality of subsets of the plurality of sensor devices can be mutually exclusive. The sensor identifier data indicates the one of the plurality of sensor devices and further indicates the one of the plurality of multi-sensor units in which the one of the plurality of sensor devices is included.

In various embodiments, the sensor identifier data indicates a sensor measurement type and further indicates sensor measurement units, where the value of the one of a plurality of measurements is in accordance with the sensor measurement units. For example, the sensor identifier of each of the plurality of measurement entries indicates the one of the plurality of sensor devices corresponds to one of a plurality of sensor measurement types and further indicates one of a plurality of sensor measurement units based on the sensor measurement type. The measurement value of the one of a plurality of measurement entries can be in accordance with the sensor measurement units, and some or all of the plurality of measurement entries indicate measurements generated by different types of sensor devices corresponding to the plurality of sensor measurement types.

In various embodiments, at least one memory of the monitoring data analysis system stores a contextual database, such as contextual database 544, that includes a plurality of contextual data entries, Each of the plurality of contextual data entries can indicate sensor identifier data indicating at least one of a plurality of sensor devices and/or contextual data for the at least one of the plurality of sensor devices. The contextual data can indicate static data describing the one of the plurality of sensor devices in context of a facility that includes the plurality of sensor devices.

In various embodiments, the facility includes a plurality of plants. The contextual data of each contextual entry of at least a subset of the plurality of contextual data entries indicates at least one plant of the plurality of plants in proximity to the at least one of the plurality of sensor devices indicated by the sensor identifier data of each contextual entry. For example, one or more individual plants can be identified, one or more particular types of plants can be identified, and/or one or more particular rows of plants and/or groups of plants within the facility can be identified. The contextual database can otherwise indicate different particular plants and/or different types being grown in the facility that are being measured by and/or that are in proximity to different multi-sensor units and/or different particular sensor devices. Measurement values of each of at least a second subset of the plurality of measurement entries can indicates productivity data relating to the at least one plant in proximity to a corresponding one of the plurality of sensor devices identified by the sensor identifier of the each of the second subset of the plurality of measurement entries. This can include VPD measurements and/or other raw and/or synthetic measurements relating to and/or indicating productivity metrics for plant growth within the facility. This can include one or more metrics indicative of and/or relating to agricultural productivity for an agricultural facility as a whole. This can include one or more metrics indicative of and/or relating to productivity of one or more particular plants as they are grown in the facility.

In various embodiments, at least a subset of the contextual data entries can indicate one of a plurality of locations within the facility to indicate where each of the plurality of sensor devices are located with respect to the facility. For example, each of the contextual data entries can indicate one of a plurality of locations within the facility to indicate plurality of contextual data entries where the at least one of the plurality of sensor devices identified in the sensor identifier data of the each of the contextual data entries is located with respect to the facility. The method can further include receiving from the client device, via the network interface, location selection data indicating a localized region within bounds of the facility, such as one or more particular locations and/or bounds that include only a subset of the plurality of locations. The method can further include identifying a location-based set of sensor identifiers corresponding to only ones of the plurality of sensor devices with corresponding contextual data entries indicating ones of the plurality of locations that are within the localized region indicated in the location selection data. The method can further include determining the filtered subset of the plurality of measurement entries based on selecting only ones of the plurality of measurement entries with sensor identifiers included in the location-based set of sensor identifiers. In this fashion, the custom function can be performed on measurements collected in particular locations of the facility.

In various embodiments, the custom function output includes heat map data indicating measurements across different locations with respect to the facility based on the contextual data of contextual data entries for sensor devices indicated in the filtered subset of the plurality of measurement entries. The heat map data can be displayed via the graphical user interface in accordance with a visual rendering of the facility. For example, a plurality of colors mapped to a range of values of the plurality of measurement values for the filtered subset of the plurality of measurement entries are displayed and/or overlaid upon an two dimensional and/or three dimensional rendering of the facility, where locations of the plurality of colors with respect to the rendering of the facility correspond to locations in which the corresponding measurements were collected and/or correspond to locations of the corresponding multi-sensor unit and/or other sensor device that collected the measurement within the facility, for example, as indicated in the contextual database. The heat map data can indicate measurements of particular types of sensor devices indicated in the filtered subset of the plurality of measurement entries and/or measurements collected within a particular timeframe indicated in the filtered subset of the plurality of measurement entries.

In various embodiments, the method can further include receiving, via the network interface, a set of selected query filter parameters from the client device. The graphical user interface can display a prompt to select at least one of a plurality of query filter parameter options, and the set of selected query filter parameters are generated by the client device based on a user selection, via user input to the client device, from the plurality of query filter parameter options in response to the prompt. The query filter parameters can correspond to conditional statements, for example, of a SELECT operator of a SQL query. A query based on the set of selected query filter parameters and/or can otherwise be determined based on the user input, such as a query expression entered via user input. The query can be executed against the measurement database to produce the filtered subset of the plurality of measurement entries. The filtered subset of the plurality of measurement entries can includes only ones of the plurality of measurement entries that satisfy the set of selected query filter parameters, such as having fields that render the conditional statements TRUE. Thus, the custom function can be run on entries meeting the user specified filtering parameters. Alternatively, the custom function itself can indicate the query, where the query is performed in conjunction with performing the custom function to produce the filtered subset. For example, the query is performed based on query filter parameters indicated as custom function parameters of the custom function.

In various embodiments, the method includes determining a discrete, filtered set of options of the plurality of query filter parameter options, where only this discrete, filtered set of options are presented to the user, and where the user selects the set of selected query filter parameters from this discrete, filtered set of options This discrete, filtered set of options of the plurality of query filter parameter options can be determined in response to receiving, via the network interface, the discrete set of options as a selected subset from a larger set of options, where discrete set of options were generated by the same or different client device based on user input to the same or different client device selecting the discrete set of options from the larger set of options in response to a prompt displayed via the graphical user interface.

In various embodiments, the custom function output includes a plurality of synthetic measurement values generated from the filtered subset of the plurality of measurement entries. The method can further include generating a plurality of new measurement entries, where each of the plurality of new measurement entries is generated for a corresponding one of the plurality of synthetic measurement values. The timestamp of the each of the plurality of new measurement entries corresponds to a timestamp of one of the filtered subset of the plurality of measurement entries utilized to generate the corresponding one of the plurality of synthetic measurement values. The sensor identifier of the each of the plurality of new measurement entries corresponds to the timestamp of one of the filtered subset of the plurality of measurement entries utilized to generate the corresponding one of the plurality of synthetic measurement values. The measurement value of the each of the plurality of new measurement entries indicates the corresponding one of the plurality of synthetic measurement values. The each of the plurality of new measurement entries can alternatively or additionally indicate an identifier of the custom function. In various embodiments, the custom function utilizes at least two of the filtered subset of the plurality of measurement entries as input. For example, a single synthetic measurement value is generated from multiple measurement entries.

In various embodiments, the at least two of the filtered subset of the plurality of measurement entries have timestamps that are all within a pre-determined time interval. In various embodiments, the at least two of the filtered subset of the plurality of measurement entries have sensor identifiers corresponding to sensor devices on a same multi-sensor unit. In various embodiments, the at least two of the filtered subset of the plurality of measurement entries have sensor identifiers corresponding to sensor devices on at least two different multi-sensor units. As a particular example, the custom function can be configured to generate a synthetic measurement value based on measurements for multiple different types of sensors included in the same multi-sensor unit. As another particular example, the custom function can be configured to generate a synthetic measurement value based on measurements for multiple sensors of the same type included upon multiple different multi-sensor units. The at least two of the filtered subset of the plurality of measurement entries as input can have matching timestamps and/or substantially similar timestamps. The at least two of the filtered subset can have timestamps that compare favorably to a timestamp range, such as a range indicated as a parameter of the custom function and/or a range that is predetermined based on the custom function definition. The sensor identifier of the each of the plurality of new measurement entries can further indicate the sensor identifiers of the at least two of the filtered subset of the plurality of measurement entries.

In various embodiments, the at least one memory stores a function library that includes a plurality of functions. Each of the plurality of functions, when performed on measurement data of at least one entry of the measurement database, generates function output data. The method can further include transmitting, via the network interface, the application data to a second client device of a same or different user. For example, the application data is transmitted to a plurality of client devices associated with users of the monitoring system 100. The second client device includes at least one client processor and at least one client memory that stores the application instructions corresponding to the application data that, when executed by the at least one client processor, cause the second client device to display the graphical user interface via a display device of the second client device. The method can include receiving from the second client device, via the network interface, a second custom function definition for a second custom function. For example, the graphical user interface displays the prompt to enter the custom function definition, and where the second custom function definition is entered via user input to the client device in response to the prompt. The method can include adding the second custom function to the function library based on the second custom function definition.

The method can include transmitting to the client device, via the network interface, function library information that indicates the plurality of functions. The custom function definition is entered via user input to the client device to indicate use of the second custom function in performing the custom function based on the function library information. The custom function can also be added to the function library based on the custom function definition, for example for use by other users and/or for use in other custom functions generated by the same or different user. Performing the custom function includes performing the second custom function by accessing the function library to generate output of the second custom function based on the custom function definition. The custom function output is generated by processing the output of the second custom function in accordance with the custom function definition.

In various embodiments, the filtered subset of the plurality of measurement entries include at least two measurements taken at different timestamps by the same sensor device. The custom function output includes processed measurement data generated from the filtered subset of the plurality of measurement entries, and where the processed measurement data includes a statistical representation of the data within a time window bounded by a least recent timestamp of the filtered subset of the plurality of measurement entries and a most recent timestamp of the filtered subset of the plurality of measurement entries.

In various embodiments, the custom function corresponds to a training function. The method further includes performing the training function by utilizing the filtered subset of the plurality of measurement entries as training data to generate the custom function output, where the custom function output indicates parameters of a trained machine learning model. The method further includes adding a new function entry to the function library by utilizing the parameters of the trained machine learning model. The method further includes receiving an additional plurality of measurement data from the gateway device. The method further includes adding additional measurement entries to the measurement database based on the additional plurality of measurement data. The method further includes performing an inference function on the additional measurement entries by utilizing the new function entry to generate inference data based on the additional plurality of measurement data. The method further includes transmitting, via the communication interface, the inference data to the client device, where the inference data is displayed to the user via the graphical user interface.

In various embodiments, the network interface is configured to receive second measurement data, via the network, from at least one additional data source that is distinct from the plurality of sensor devices, where the subset of the plurality of measurement entries is a first proper subset of the plurality of measurement entries. A second proper subset of the plurality of measurement entries indicates the second measurement data received from the at least one additional data source, and the filtered subset of the plurality of measurement entries utilized to perform the custom function includes at least one of the first proper subset of the plurality of measurement entries and further includes at least one of the second proper subset of the plurality of measurement entries.

In various embodiments, a function library of the monitoring data analysis system includes a vapor pressure deficit (VPD) measurement function. For example, the VPD function was pre-loaded into the function library and/or was generated as the same or different custom function based on user input. The method further includes generating a set of VPD entries, where each VPD entry of the set of VPD entries is generated by: identifying an air temperature entry in the measurement database with a corresponding measurement value that indicates an air temperature measurement captured by an air temperature sensor; identifying a surface temperature entry in the measurement database with a corresponding measurement value that indicates a surface temperature measurement captured by a surface temperature sensor; and/or identifying a humidity entry in the measurement database with a corresponding measurement value that indicates a humidity measurement captured by a humidity sensor. The air temperature entry, the surface temperature entry, and the humidity entry are identified based on having respective timestamps that compare favorably to a threshold time interval, for example, dictating that the respective timestamps are sufficiently similar and/or that the respective timestamps are matching. The method can include performing the VPD function on the air temperature entry, the surface temperature entry, and/or the humidity entry to produce a VPD measurement value, where each VPD entry indicates the VPD measurement value. The method can include determining a VPD measurement timestamp for the each VPD entry based on at least one of: a timestamp of the air temperature entry, a timestamp of the surface temperature entry, or a timestamp of the humidity entry, where the each VPD entry indicates the VPD measurement timestamp. For example, the timestamp is an average timestamp of all three of these entries and/or is selected to match one or more of these entries. The set of VPD entries to the measurement database as measurement entries. In some cases, the sensor identifier of these entries indicates the VPD function and/or otherwise identifies the entries as VPD measurements.

In various embodiments, air temperature entry, the surface temperature entry, and the humidity entry utilized to generate the each VPD entry are identified based on each having a sensor identifier indicating a same one of the plurality of multi-sensor units. Each VPD entry can be generated to include a sensor identifier indicating the same one of the plurality of multi-sensor units that includes the corresponding air temperature sensor, the surface temperature sensor, and the humidity sensor. The set of VPD entries can identify different ones of a plurality of multi-sensor units that each include its own air temperature sensor, surface temperature sensor, and humidity sensor.

In various embodiments, a monitoring data analysis system includes a network interface configured to communicate with a gateway device via a network and further configured to communicate with a client device via the network; at least one processor; and at least one memory. The memory stores a measurement database that includes a plurality of measurement entries corresponding to time-series data. Each measurement entry of a subset of the plurality of measurement entries indicates: a sensor identifier indicating one of a plurality of sensor devices; a measurement value indicating a value of one of a plurality of measurements collected by the one of the plurality of sensor devices; and/or a timestamp indicating a time corresponding to collection of the one of the plurality of measurements.

The memory further stores executable instructions that, when executed by the at least one processor, cause the monitoring data analysis system to: receive a plurality of measurement data from the gateway device, via the network interface, where each of the plurality of measurement data indicates a measurement generated by one of a plurality of multi-sensor units; generate a set of measurement entries based on the plurality of measurement data, where the measurement value of each of the set of measurement entries is populated based on the measurement of a corresponding one of the plurality of measurement data, and where the sensor identifier of the each of the plurality of measurement entries is selected based on determining the corresponding one of the plurality of multi-sensor units; add the set of measurement entries to the measurement database as measurement entries of the subset of the plurality of measurement entries; transmit, via the network interface, application data to a client device, where the client device includes at least one client processor and at least one client memory that stores application instructions corresponding to the application data that, when executed by the at least one client processor, cause the client device to display a graphical user interface via a display device of the client device; receive from the client device, via the network interface, a custom function definition for a custom function, where the graphical user interface displays a prompt to enter the custom function definition, and where the custom function definition is entered via user input to the client device in response to the prompt; generate custom function output by performing the custom function on a filtered subset of the plurality of measurement entries by utilizing the custom function definition; and/or transmit, via the network interface, the custom function output to the client device, where the custom function output is displayed via the graphical user interface.

The monitoring data analysis system 140 of the monitoring system 100 presents improvements to environmental monitoring technologies in facilities by enabling a greater level of analytics to be achieved. By storing measurement data as standardized time-series data for different types of measurements collected by multi-sensor units, by additional data sources, and/or as synthetic measurements outputted via performance of pre-loaded and/or custom functions of existing entries, users can perform more sophisticated queries and/or can train machine learning models on many different types of measurements with ease. The standardized time-series entries of the database system, despite the vast array of measurement types and/or sources associated with these entries, improves database efficiency in performing queries and/or other functions upon the data by enabling data to be accessed and utilized more easily and/or by enabling users to write simpler queries and/or functions upon the data due to this standardized format. For example, correlations between distinct types of measurements can be more easily analyzed and captured to enable projections of future conditions of the facility and/or to automatically generate recommendations for the ideal environmental conditions to which the facility should be set, enabling a facility to operate more efficiently and/or to operate with higher productivity.

As a particular example, these features of the monitoring data analysis system 140 can improve the technologies associated with monitoring and/or functioning of agricultural facilities by automatically generating deeper insights into correlated environmental behaviors that affect plant growth based on the collected measurements stored in the measurement database. In particular, the specificity provided by the measurement variety and measurement frequency of measurement entries generated via a plurality of multi-sensor units installed across the facility can be automatically analyzed via statistical functions and/or inference functions to generate projections and/or trends regarding productivity metrics for plant growth in the facility.

By additionally storing contextual data and/or feature data, the link between measurements and their location data and/or significance with respect the facility is also captured, enabling deeper levels of analytics to understand trends and to generate projections for environmental measurements across distinct locations within the facility and/or for measurements of distinct features within the facility. For example, this can be utilized to automatically generate and present heat maps illustrating differing conditions within different locations of a facility at a particular time and/or as they change over time. In an agricultural facility, different types of plants and/or different rows of plants can be distinctly measured and/or monitored to automatically determine how differing conditions across the facility induce different levels of growth and/or agricultural productivity.

By further enabling users to generate and perform their own custom functions upon the data, where such custom functions can be stored in a function library for use by other users and/or to be performed automatically on a regular basis or in response to detected events as configured by the user, users can explore their own questions and/or intuition regarding correlations of measured conditions of the facility, particular features in the facility, and/or other information. Custom functions can enable users to set their own alert conditions, which can improve technologies associated with facility efficiency and/or can provide higher levels of safety by ensuring that potentially inefficient and/or unsafe conditions are automatically detected and handled appropriately.

In various embodiments, a non-transitory computer readable storage medium includes at least one memory section that stores operational instructions that, when executed by a processing module that includes a processor and a memory, cause the processing module to: receive a plurality of measurement data from the gateway device, via the network interface, where each of the plurality of measurement data indicates a measurement generated by one of a plurality of multi-sensor units; generate a set of measurement entries based on the plurality of measurement data, where the measurement value of each of the set of measurement entries is populated based on the measurement of a corresponding one of the plurality of measurement data, and where the sensor identifier of the each of the plurality of measurement entries is selected based on determining the corresponding one of the plurality of multi-sensor units; add the set of measurement entries to the measurement database as measurement entries of the subset of the plurality of measurement entries; transmit, via the network interface, application data to a client device, where the client device includes at least one client processor and at least one client memory that stores application instructions corresponding to the application data that, when executed by the at least one client processor, cause the client device to display a graphical user interface via a display device of the client device; receive from the client device, via the network interface, a custom function definition for a custom function, where the graphical user interface displays a prompt to enter the custom function definition, and where the custom function definition is entered via user input to the client device in response to the prompt; generate custom function output by performing the custom function on a filtered subset of the plurality of measurement entries by utilizing the custom function definition; and/or transmit, via the network interface, the custom function output to the client device, where the custom function output is displayed via the graphical user interface.

Figure 14:
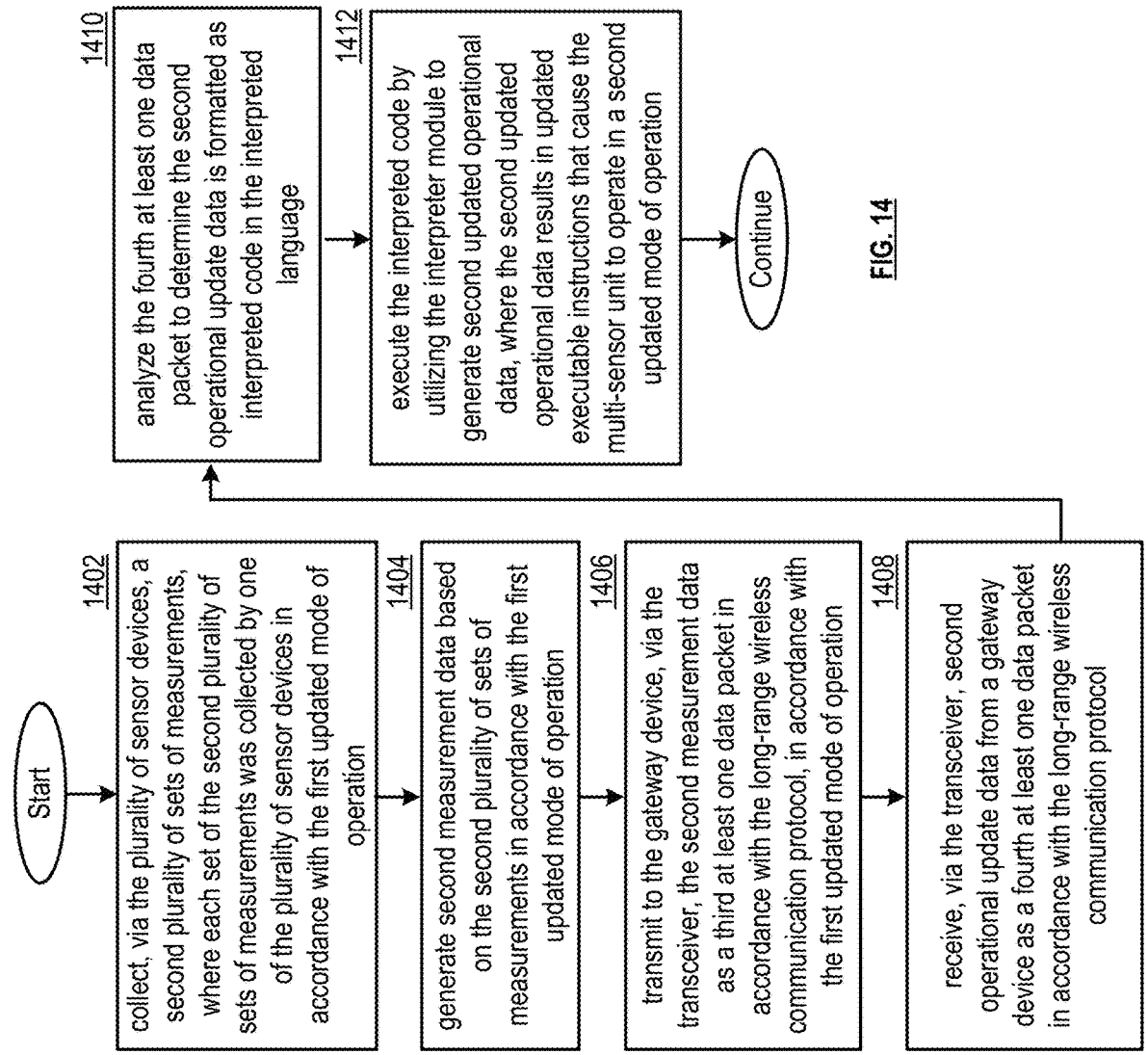
Figure 15:
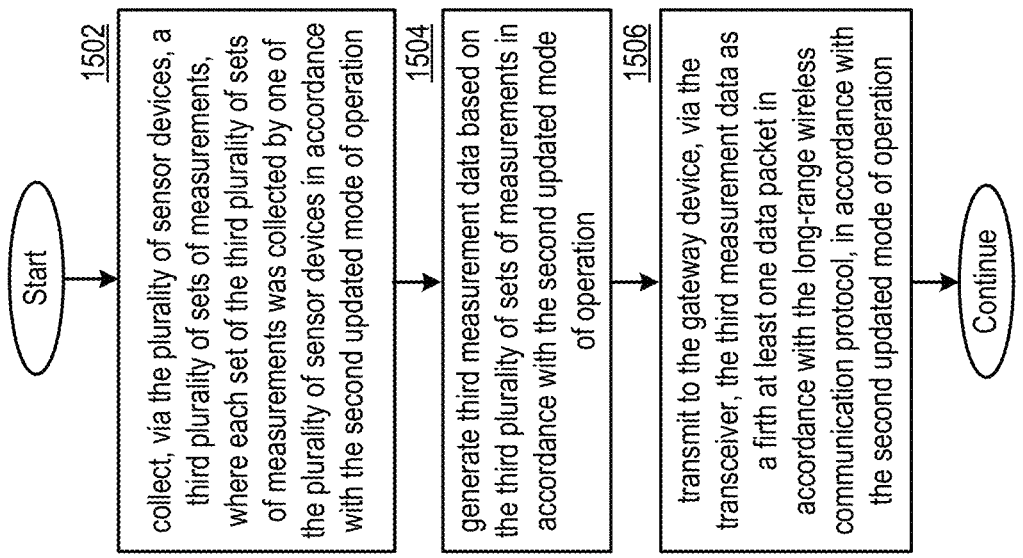

FIGS. 13-15 illustrate a method for execution by a multi-sensor unit 120 in accordance with various embodiments of the present invention. The multi-sensor unit can include at least one processor, such as processing module 240, that includes an interpreter module operable to execute interpreted code, for example, in accordance with a corresponding interpreted language. The multi-sensor unit can include a memory, such as memory module 210, that stores operational data that includes a plurality of modular binary elements. The plurality of modular binary elements dictate a current mode of operation of the multi-sensor unit. The at least one processor utilizes the operational data to execute executable instructions indicated in the plurality of modular binary elements to cause the multi-sensor unit to operate in the current mode of operation. Operating in the current mode of operation causes the multi-sensor unit to perform the steps of FIG. 13.

Step 1302 includes collecting, via a plurality of sensor devices of the multi-sensor unit, a first plurality of sets of measurements. Tach set of the first plurality of sets of measurements was collected by one of the plurality of sensor devices in accordance with the current mode of operation. Step 1304 includes generating first measurement data based on the first plurality of sets of measurements in accordance with the current mode of operation. Step 1306 includes transmitting to the gateway device, via the transceiver, the first measurement data as a first at least one data packet in accordance with the long-range wireless communication protocol, in accordance with the current mode of operation.

Step 1308 includes receiving, via the transceiver, first operational update data from a gateway device as a second at least one data packet in accordance with a long-range wireless communication protocol. Step 1310 includes analyzing the second at least one data packet to determine the first operational update data is formatted as binary difference data. Step 1312 includes extracting one of a plurality of modular binary element identifiers from the first operational update data, where the one of the plurality of modular binary element identifiers indicates the one of the plurality of modular binary elements. Step 1314 includes updating the one of the plurality of modular binary elements to generated first updated operational data by performing an XOR function on the one of the plurality of modular binary elements utilizing the binary difference data. The first updated operational data results in updated executable instructions that cause the multi-sensor unit to operate in a first updated mode of operation.

Operating in the first updated mode of operation causes the multi-sensor unit to perform the steps of FIG. 14. The at least one processor utilizes the first updated operational data to execute updated executable instructions indicated in the plurality of modular binary elements and the plurality of interpreted code elements to cause the multi-sensor unit to operate in the first updated mode of operation by performing the steps of FIG. 14. example, step 1402 can be performed in response to the steps of FIG. 13 being performed to cause the cause the multi-sensor unit to operate in a first updated mode of operation that facilitate the performance of the steps of FIG. 14.

Step 1402 includes collecting, via the plurality of sensor devices, a second plurality of sets of measurements, where each set of the second plurality of sets of measurements was collected by one of the plurality of sensor devices in accordance with the first updated mode of operation. Step 1404 includes generating second measurement data based on the second plurality of sets of measurements in accordance with the first updated mode of operation. Step 1406 includes transmitting to the gateway device, via the transceiver, the second measurement data as a third at least one data packet in accordance with the long-range wireless communication protocol, in accordance with the first updated mode of operation. Step 1408 includes receiving, via the transceiver, second operational update data from a gateway device as a fourth at least one data packet in accordance with the long-range wireless communication protocol. Step 1410 includes analyzing the fourth at least one data packet to determine the second update data is formatted as interpreted code in an interpreted language corresponding to the interpreter module. Step 1412 includes executing the interpreted code by utilizing the interpreter module to generate second updated operational data. The second updated operational data results in updated executable instructions that cause the multi-sensor unit to operate in a second updated mode of operation.

Operating in the second updated mode of operation causes the multi-sensor unit to perform the steps of FIG. 15. The at least one processor utilizes the second updated operational data to execute second updated executable instructions indicated in the plurality of modular binary elements to cause the multi-sensor unit to operate in the second updated mode of operation by performing the steps of FIG. 15. For example, step 1502 can be performed in response to the steps of FIG. 14 being performed to cause the cause the multi-sensor unit to operate in a second updated mode of operation that facilitate the performance of the steps of FIG. 15. Alternatively, step 1502 can be performed in response to the steps of FIG. 13 being performed to cause the cause the multi-sensor unit to operate in a second updated mode of operation that facilitate the performance of the steps of FIG. 15, where the steps of FIG. 14 follow the steps of FIG. 15.

Step 1502 includes collecting, via the plurality of sensor devices, a third plurality of sets of measurements, where each set of the third plurality of sets of measurements was collected by one of the plurality of sensor devices in accordance with the second updated mode of operation. Step 1504 includes generating third measurement data based on the third plurality of sets of measurements in accordance with the second updated mode of operation. Step 1506 includes transmitting to the gateway device, via the transceiver, the third measurement data as a firth at least one data packet in accordance with the long-range wireless communication protocol, in accordance with the second updated mode of operation.

In some embodiments, the monitoring system 100 monitors a facility that includes at least one motor and/or other equipment that can fail. The monitoring system 100 can be utilized for predictive maintenance. For example, one detection function of the function database can be a motor failure detection function, utilized to determine and/or predict whether a failure of a motor and/or other equipment operating in the facility has occurred and/or to determine whether a failure of a motor and/or other equipment operating in the facility is likely to occur soon, due to the motor being at a state of currently failing. In some embodiments, a motor failure detection function can utilize voltage measurement data collected by a voltage sensor of a multi-sensor unit; current measurement data collected by a current sensor of the multi-sensor unit; vibration data collected by a vibration sensor, accelerometer, magnetometer, gyroscope, and/or remote motion sensor of the multi-sensor unit; temperature data collected by a surface temperature sensor or other temperature sensor of the multi-sensor unit; and/or acoustic data or other noise data detected by a microphone and/or other acoustic sensor of the multi-sensor unit.

The sensor device weights assigned to sensor devices of multi-sensor units that are in proximity to a motor, and/or that are utilized as input to a motor failure detection function, can be weighted higher in response. In some embodiments, only the sensor devices utilized as input to the motor failure detection function are powered-on. The multi-sensor units that are in proximity to a motor, and/or that are utilized as input to a motor failure detection function, can be assigned higher unit weights in response.

The voltage measurements and/or current measurements can correspond to measurements of voltage and current being delivered to the motor, can correspond to measurements of voltage and current of a power source being utilized to power the motor, and/or can correspond to measurements of voltage and current being utilized in a circuit utilized by the motor and/or utilized to control the motor. Software configurations, for example, sent to the multi-sensor unit as control data, can tune the collection of data by the voltage measurements and/or current measurements and/or to dictate one or more processing functions performed on the vibration sensors based on known current and/or voltage ranges and/or fluctuations induced by the operation of the motor and/or failure of the motor. For example, this can include configurations based on known and/or learned range of motion induced by the operation of the motor. For example, the sensitivity of the current and/or voltage sensors can be configured to capture a sensitivity that captures fluctuations in voltage and/or current and/or characterizes significant changes within the range of voltage and/or current. For example, the sensitivity of the sensors and/or data outputted by processing functions can be configured to capture fluctuations and/or spikes in voltage and/or current and/or characterize the voltage and/or current within the range. The sensitivity can be broadened to merely capture large changes in voltage and/or current differentiating motor failure from normal operation. Alternatively, the sensitivity can be heightened to capture smaller changes in voltage and/or current that are indicative of a failing motor that has not yet failed.

The vibration data can correspond to vibration of the motor; vibration of equipment that encapsulates the motor, touches the motor, includes the motor, and/or moves as a result of the operation of the motor; vibration of one or more structural components of the facility and/or one or more other features within the facility, for example, imparted on the one or more structural components of the facility and/or one or more other features as a result of the vibration induced by proximity to the motor and/or induced by contact with the motor and/or equipment via one or more materials that transmit and/or otherwise carry the physical vibrations of the motor; vibration of one or more structural components of the facility and/or one or more other features within the facility, for example, imparted on the one or more structural components of the facility and/or one or more other features as a result of the vibration induced by proximity to the motor and/or induced by contact with the motor and/or equipment via one or more materials that transmit and/or otherwise carry the physical vibrations of the motor. The vibration data can be measured as vibrations of the multi-sensor unit itself via accelerometers, magnetometers, gyroscopes, and/or other sensors of the multi-sensor unit operable to measure its own motion. These vibrations are induced upon the multi-sensor unit itself by being physically installed on the motor, induced upon the multi-sensor unit itself by being physically installed on the equipment that encapsulates, touches, includes, and/or operates as a result of the motor's operation; and/or induced upon the multi-sensor unit itself by being physically installed on a structural components of the facility a feature of the facility that vibrates as a result of the vibration induced by proximity to the motor and/or induced by contact with the motor and/or equipment via one or more materials that transmit and/or otherwise carry the physical vibrations of the motor. Alternatively or in addition, the vibration data can be remotely measured, for example, by capturing the motion via an image sensor and/or motion detector, for example, where the vibration is measured based on changes in visible and/or infrared light due to the vibration of the motor.

One or more sensors utilized to capture vibration as discussed herein can be specifically configured to capture vibration of the motor, for example, by being placed in a position and/or orientation to capture highest amplitude vibration induced by the operation of the motor. Software configurations, for example, sent to the multi-sensor unit as control data, can tune the collection of data by the vibration sensors and/or to dictate one or more processing functions performed on the vibration sensors based on known vibration characteristics induced by the motor. For example, this can include configurations based on known and/or learned range of motion induced by the operation of the motor and/or the failure of the motor. For example, the sensitivity of the sensors and/or data generated by processing functions can be configured to capture fluctuations in vibration and/or characterizes the vibration within the range of motion. The sensitivity can be broadened to merely capture large changes in vibration differentiating motor failure from normal operation. Alternatively, the sensitivity can be heightened to capture smaller changes in vibration that are indicative of a failing motor that has not yet failed. The configurations can be based on known and/or learned frequency and/or cadence of vibration induced by the operation of the motor. For example, the rate of collection can be configured to be at least twice the maximum rhythmic cadence and/or maximum frequency of vibration caused by the operation of the motor and/or can otherwise be determined based on determining the Nyquist rate required to effectively capture the vibration.

The temperature data can be collected by a surface temperature sensor of the multi-sensor unit, for example, that is specifically configured to capture temperature of the motor by being directed towards the motor and/or by physically touching the motor if the surface temperature sensor includes a physical probe. These configurations can correspond to manual configurations, for example, as part of installation of the multi-sensor unit to point the sensor device towards the motor, to touch the probe to the motor, and/or orient the multi-sensor unit in a favorable orientation that enables capturing of the motor's surface temperature by the surface temperature sensor, and/or can correspond to software configurations, for example, sent as control data, to tune the collection of data by the surface temperature sensor and/or to dictate one or more processing functions performed on the surface temperature sensor based on known and/or learned temperature ranges, based on desired measurement sensitivity based on known and/or learned fluctuations of the surface temperature of the motor, and/or based on other known and/or learned temperature characteristics. For example, the sensitivity of the sensors and/or data generated by processing functions can be configured to capture fluctuations in vibration and/or characterizes the vibration within the range of motion. The sensitivity can be broadened to merely capture large changes in temperature and/or temperature fluctuation patterns differentiating motor failure from normal operation. Alternatively, the sensitivity can be heightened to capture smaller changes in temperature and/or temperature fluctuation patterns that are indicative of a failing motor that has not yet failed.

The noise data can be collected by an acoustic sensor of the multi-sensor unit, for example, that is specifically configured to capture noise directionally, for example, from a direction that the motor is located relative to the multi-sensor unit. Alternatively or in addition, the acoustic sensor can be configured to capture decibel levels within a known and/or learned decibel range for sound produced by the motor. Alternatively or in addition the acoustic sensor can be configured to capture pitch within a known and/or learned pitch range for sound produced by the motor. The rate of collection of the acoustic sensor can be configured to be high enough to capture known and/or acoustic cadences, dictating rhythmic changes in pitch and/or decibel level, at a known and/or learned rate. For example, the rate of collection can be configured to be at least twice the maximum acoustic cadence caused by the operation of the motor and/or can otherwise be determined based on determining the Nyquist rate required to effectively capture the cadence.

The detection function can utilize these measurements collected by a single multi-sensor unit and/or by multiple multi-sensor units measuring different parts of the motor and/or measuring the motor from different angles. The detection function can utilize only these measurements without other measurement data. Alternatively, other types of measurements detected by the multi-sensor units discussed herein can also be utilized as input to the detection function and/or measurements received by additional measurement sources 170 as discussed herein can also be utilized as input. Additional information fed into the detection function as input can include motor age, most recent inspection of the motor, most recent repair of the motor, recent performance of the motor, and/or other information that can be utilized to aid the detection function in predicting motor failure. Such additional information utilized as input can be retrieved from the measurement database and/or the feature database as fields describing a feature entry corresponding to the motor.

The detection function can be performed locally by a single multi-sensor unit 120 via measurement processing module 242, where the detection function is stored in function library 216. Alternatively or in addition, the detection function can be performed by the monitoring data analysis system 140 in response to receiving these measurements from one or more multi-sensor units.

Performing the detection function can include comparing each raw measurement to its own measurement thresholds. For example, voltage measurements can be compared to voltage thresholds, current measurements can be compared to current thresholds, vibration measurements can be compared to vibration thresholds corresponding to vibration rate and/or vibration amplitude, temperature measurements can be compared to temperature thresholds, and/or noise measurements can be compared to noise thresholds corresponding to pitch, amplitude, and/or cadence. If a particular proper subset of measures compare unfavorably to their respective thresholds at a timestamp or within a time window, if all measures compare unfavorably to their respective thresholds at a timestamp or within a time window, and/or if at least a threshold number of measures compare unfavorably to their respective thresholds at a timestamp or within a time window, the detection function can indicate detection of the motor failure and/or can indicate detection that the motor is likely about to fail.

Alternatively, the voltage measurements, current measurements, vibration measurements, temperature measurements, and/or noise measurements can be input to a synthetic function utilized for detection, for example, where these measurements are normalized, multiplied by respective pre-determined weights based on their relative importance, summed, and compared to a detection threshold as discussed herein. Detection over multiple consecutive or non-consecutive time windows may be necessary to positively identify detection, and/or filtering of detection can be performed, for example, in accordance with previous proportions of false positives and/or false negatives, and/or in accordance with the determined relative cost of false positives and/or false negatives.

An inference function can be trained based on historical data for previous motor failures and/or previous indications of future motor failure by the same motor or by different motors. Each feature vector of the training data can include raw and/or processed voltage measurements, current measurements, vibration measurements, temperature measurements, and/or noise measurements in a single time and/or at multiple consecutive times. The corresponding output of the training data can correspond to whether or not a motor failure occurred within a determined timeframe of the collected measurements. For example, the timeframe can correspond to a longer timeframe to enable the resulting inference function to make earlier, predictive detection of future motor failure. Alternatively, the timeframe can correspond to a shorter timeframe to enable the resulting inference function to make more accurate predictions, even if these predictions do not project failure as far into the future. The length of the timeframe can be tuned based on a desired level of accuracy of prediction and/or a desired amount of time to be alerted of motor failure before actual failure occurs. In some embodiments, multiple detection functions can be performed, corresponding to multiple inference functions trained on such timeframes of multiple lengths, enabling knowledge of both the less-accurate indicators that a motor may fail farther in the future as well as more-accurate indicators that a motor is about to fail or has already failed.

The output of performing the inference function can include a probability that the motor will fail within the timeframe. The probability can be compared to a probability threshold, where detection is determined to exist when the probability exceeds the probability threshold.

In some embodiments, the inference function can be trained on output corresponding to a determined motor health and/or other continuous value, and the detection function can track motor health over time, for example, to determine a current health level and/or a rate of deterioration. For example, the detection function can indicate the motor is failing in response to a rate of deterioration of predicted health within a time frame exceeding a threshold.

If detection is determined to exist, an alert can be generated for transmission to a client device. The alert can include some or all of the raw measurements, as well as intermediate and/or final values generated by the detection function. The monitoring data analysis system can additional send control data to multi-sensor units to detect additional data, such as image data or other sensor measurements. The monitoring data analysis system can send control data to cut power being delivered to the motor, to turn the motor off, and/or to shut down the area within the vicinity of the motor. A technician or other personnel can be automatically notified and/or instructed to repair and/or inspect the motor. The technician or other personnel can receive mitigation instructions, safety instructions, and/or can be instructed to collect observation data via execution of client application data 513 on their respective client device and/or via graphical user interface 190.

Figure 16:
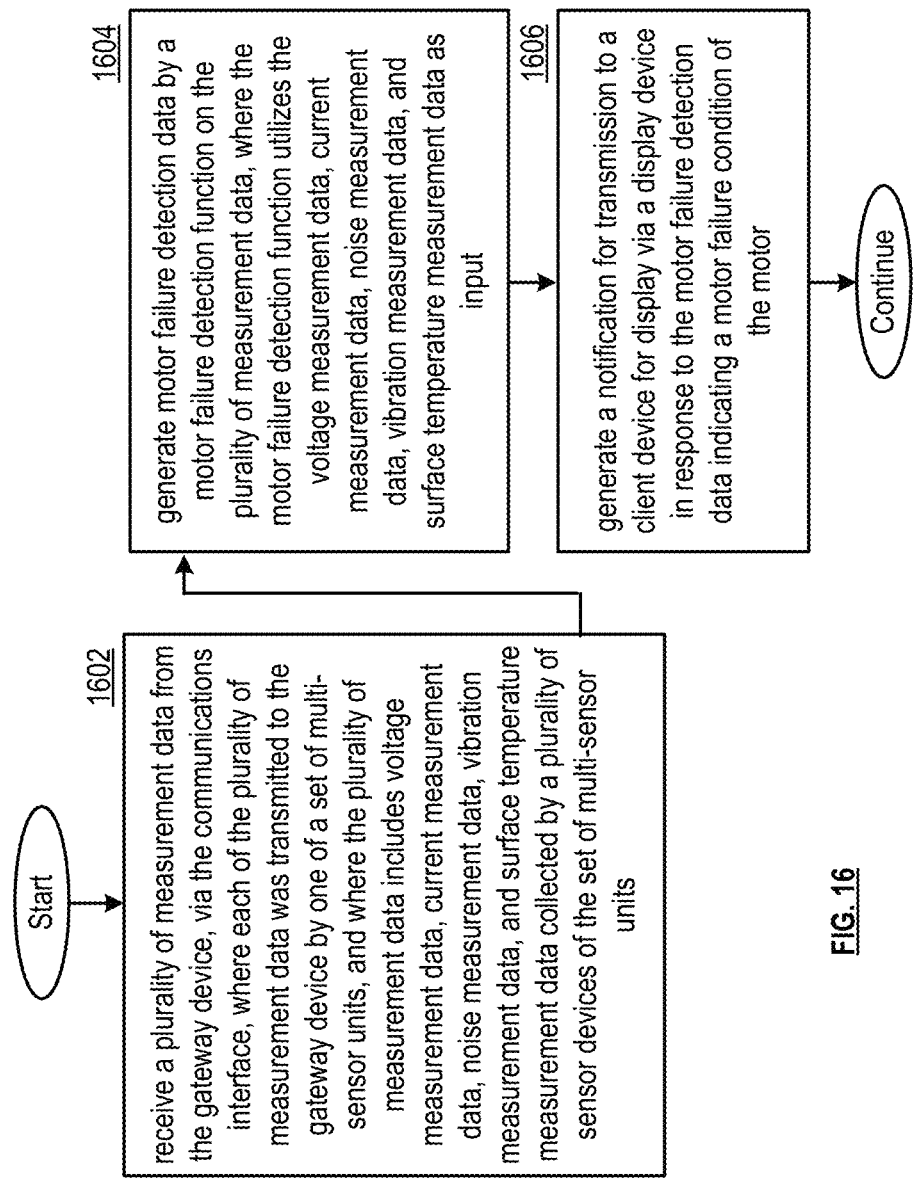

FIG. 16 illustrates a method for execution by a monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause the monitoring data analysis system 140 to perform the steps illustrated in FIG. 16.

Step 1602 includes receiving a plurality of measurement data from the gateway device, via a communications interface such as network interface 550. Each of the plurality of measurement data can be transmitted to the gateway device by one of a set of multi-sensor units, for example, via a long-range wireless communication protocol. The set of multi-sensor units can be installed in proximity to a motor. The plurality of measurement data can include voltage measurement data, current measurement data, noise measurement data, vibration measurement data, and surface temperature measurement data collected by a plurality of sensor devices of the set of multi-sensor units.

Step 1604 includes generating motor failure detection data by a motor failure detection function on the plurality of measurement data. The motor failure detection function can utilize voltage measurement data, current measurement data, noise measurement data, vibration measurement data, and surface temperature measurement data generated by one or more multi-sensor units as input.

Step 1606 includes generating a notification for transmission to a client device for display via a display device in response to the motor failure detection data indicating a motor failure condition of the motor.

In some embodiments, the monitoring system 100 monitors a facility that includes equipment powered by electricity, where the equipment stops functioning due to loss of power. In some embodiments, loss of power can be detected based on current sensors and/or voltage sensors. Alternatively, one or more multi-sensor units can detect loss of power without voltage or current measurements. For example, the first type of multi-sensor unit can be operable to detect loss of power without utilizing a voltage sensor or current sensor by performing a power loss detection function on its collected measurements. Alternatively or in addition, measurements received from first type of multi-sensor unit can be processed to detect loss of power by performing the power loss detection function The power loss detection function can utilize noise measurements collected by a noise sensor of a multi-sensor unit 120, electromagnetic measurements collected by an electromagnetic sensor of a multi-sensor unit 120, and/or temperature measurements collected by a surface temperature sensor and/or ambient temperature sensor. In some embodiments, these are the only types of input utilized to by the power loss detection function.

These measurements can be collected upon and/or in proximity to a motor or other equipment that operates when powered on. For example, the multi-sensor unit can be installed upon and/or in the vicinity of a motor or equipment as discussed with regards to the motor failure detection function. The noise sensor and/or temperature sensor can be configured in a similar fashion as discussed with regards to the noise sensor and/or temperature sensor of a multi-sensor unit operable to detect motor failure discussed above. The power loss detection function can indicate that the corresponding equipment is off or not powered, which can be used to deduce that power to the facility or a portion to the facility has failed, for example, if the equipment is not scheduled to be turned off and/or not likely to be turned off at the corresponding time that the power loss is detected. The power loss detection function can be performed alternatively or in addition to the motor loss function. In particular, the multi-sensor unit 120 and/or monitoring data analysis system 140 can be configured to differentiate between whether a motor has failed, or whether the motor is simply not running due to being intentionally or unintentionally turned off.

Performing the detection function can include comparing each raw measurement to its own measurement thresholds. For example, noise measurements can be compared to noise thresholds, temperature measurements can be compared to temperature thresholds, and/or electromagnetic measurements can be compared to electromagnetic thresholds. If a particular proper subset of measures compare unfavorably to their respective thresholds at a timestamp or within a time window, if all measures compare unfavorably to their respective thresholds at a timestamp or within a time window, and/or if at least a threshold number of measures compare unfavorably to their respective thresholds at a timestamp or within a time window, the detection function can indicate detection of the power loss and/or can indicate detection that the corresponding is not running.

Alternatively, the noise measurements, electromagnetic measurements, and/or temperature measurements can be input to a synthetic function utilized for detection, for example, where these measurements are normalized, multiplied by respective pre-determined weights based on their relative importance, summed, and compared to a detection threshold as discussed herein. Detection over multiple consecutive or non-consecutive time windows may be necessary to positively identify detection, and/or filtering of detection can be performed, for example, in accordance with previous proportions of false positives and/or false negatives, and/or in accordance with the determined relative cost of false positives and/or false negatives.

An inference function can be trained based on historical data for previous power losses and/or runtime measurements for the same equipment or different equipment. Each feature vector of the training data can include raw and/or processed noise measurements, temperature measurements, and/or electromagnetic measurements in a single time and/or at multiple consecutive times. The corresponding output of the training data can correspond to whether or not the equipment was running during the timeframe of the collected measurements. The output of performing the inference function can include a probability that the equipment is not running, that the equipment is powered off, and/or that power to the facility is lost within the timeframe. The probability can be compared to a probability threshold, where detection is determined to exist when the probability exceeds the probability threshold.

In some embodiments, multiple multi-sensor units monitoring different equipment in the facility can perform this detection function and/or variations of this detection function configured for their particular equipment. If multiple equipment, such as a threshold number of equipment or all equipment in the same or different location that share a power source, is determined to change from running to not running within a given time window, the detection function can indicate power loss to the facility or a location within the facility. If less than the threshold number of equipment is determined to change from running to not running within the given time window, the detection function can indicate there was no power loss, and that the equipment was turned off for a different reason. This information can be utilized as input to the motor failure function and/or to supplement the motor failure function.

This can further be utilized to track runtimes of various equipment across the facility. This can be utilized in analyzing operations of the facility over time, such as when and how often equipment is running, the necessity of running equipment at various times, the cost associated with running equipment unnecessarily, and/or the detriment caused by having particular equipment turned off when it should otherwise be turned on. The effect that equipment runtime has on various success metrics such as profit, operational efficiency, quality of output, and/or other measurable factors can be postulated and/or determined as discussed herein. This can be utilized to generate optimization data that can be utilized to better optimize the runtimes of various equipment in the facility based on costs associated with being turned on and/or off at various times. This optimization data can be utilized to automatically generate control data controlling power sources to the equipment and/or equipment itself to regulate when the equipment is turned on or off in accordance with the optimized runtimes. Alternatively, the optimization data can be transmitted as analysis data for display via graphical user interface 190, for example, along with recommendations and/or instructions presented to the user and/or to particular personnel responsible for operating equipment via their respective client devices.

Figure 17:
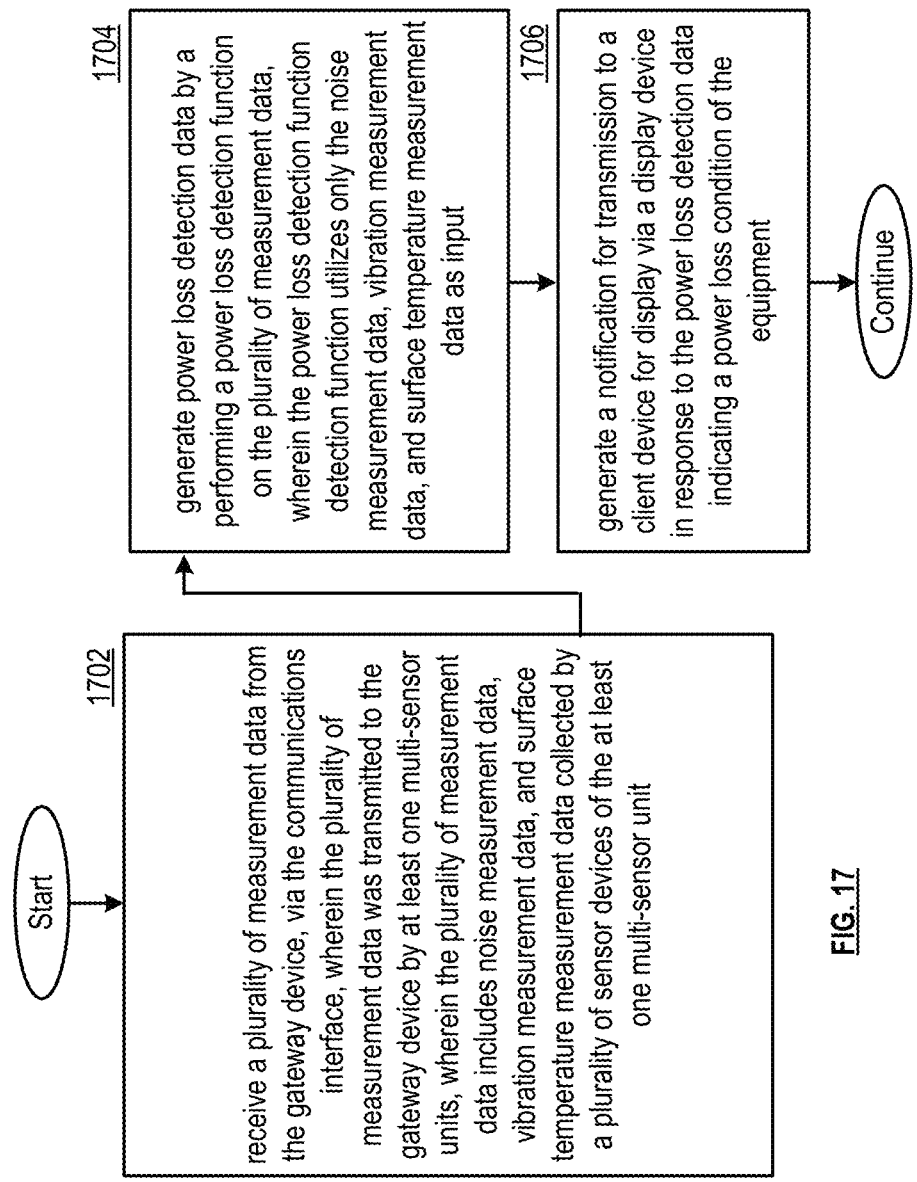

FIG. 17 illustrates a method for execution by a monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause the monitoring data analysis system 140 to perform the steps illustrated in FIG. 17.

Step 1702 includes receiving a plurality of measurement data from the gateway device, via a communications interface such as network interface 550. The plurality of measurement data can be transmitted to the gateway device by at least one multi-sensor units, for example, via a long-range wireless communication protocol. The at least one multi-sensor unit can be is installed in proximity to the same or different equipment. The plurality of measurement data includes noise measurement data, vibration measurement data, and surface temperature measurement data collected by a plurality of sensor devices of the at least one multi-sensor unit.

Step 1704 includes generating power loss detection data by a performing a power loss detection function on the plurality of measurement data. In some embodiments, the power loss detection function utilizes only the noise measurement data, vibration measurement data, and surface temperature measurement data as input. In some embodiments, the power loss detection function does not utilize voltage measurement data or current measurement data as input.

Step 1706 includes generating a notification for transmission to a client device for display via a display device in response to the power loss detection data indicating a power loss condition of the equipment.

In various embodiments, the power loss detection data includes a binary value indicating that either equipment in proximity to the multi-sensor unit is predicted to be running, or equipment in proximity to the multi-sensor unit is predicted to be not running. In various embodiments, the power loss data includes a probability value indicating a probability that equipment in proximity to the multi-sensor unit is not running. In various embodiments, the plurality of measurement data is received from a plurality of multi-sensor units in proximity to the equipment. In various embodiments, the plurality of measurement data is received from a single multi-sensor unit in proximity to the equipment.

In various embodiments, the plurality of measurement data is received from a plurality of multi-sensor units. Each of the plurality of multi-sensor units is in proximity to one of a plurality of equipment in a plurality of different locations, The plurality of equipment is powered by an AC power source, and performing the power loss detection function includes determining whether each of the plurality of equipment is determined to be running based on noise measurement data, vibration measurement data, and surface temperature measurement data as input collected in proximity to each of the plurality of equipment. The power loss detection data indicates a power loss condition to the plurality of equipment in response to detecting a threshold number of the plurality of equipment are predicted to have changed from running to not running within a same time window;

In various embodiments, the method further includes generating runtime data based on a plurality of power loss detection data generated by performing the power loss detection function on subsequently received pluralities of measurement data, for example, generated across multiple consecutive timeframes. The method further includes generating operational efficiency data based on analyzing the runtime data. The method further includes generating a notification for transmission to a client device for display via a display device indicating the runtime data and the operational efficiency data.

Figure 18:
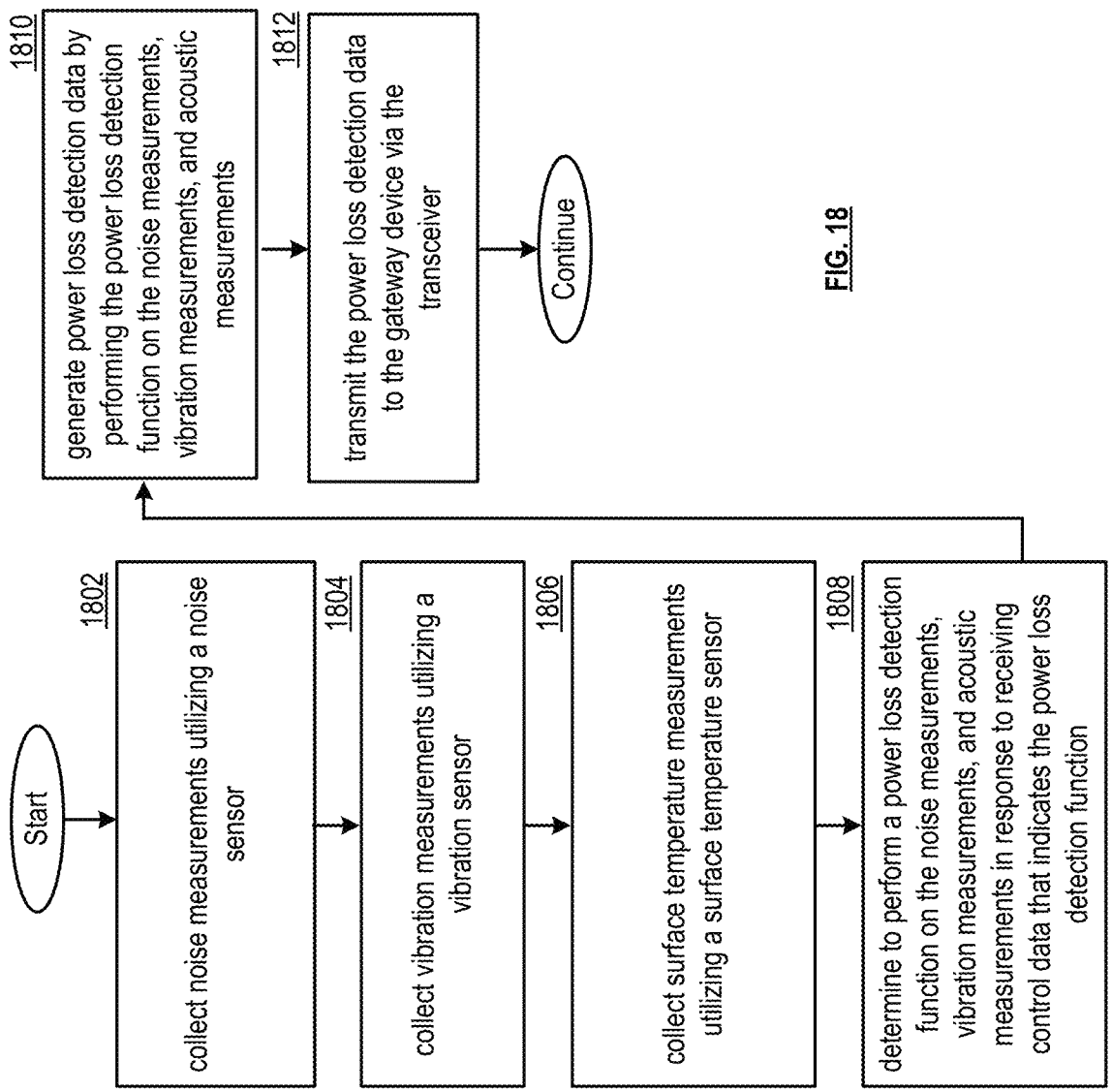

FIG. 18 illustrates a method for execution by a multi-sensor unit 120 in accordance with various embodiments of the present invention. The multi-sensor unit can include at least one processor, such as processing module 240 and a memory, such as memory module 210, that stores executable instructions that, when executed by the at least one processor, cause the multi-sensor unit 120 to perform the steps below.

Step 1802 includes collecting noise measurements utilizing a noise sensor of the multi-sensor unit. Step 1804 includes collecting vibration measurements utilizing a vibration sensor of the multi-sensor unit. Step 1806 includes collecting surface temperature measurements utilizing a surface temperature sensor of the multi-sensor unit. Step 1808 includes determining to perform a power loss detection function on the noise measurements, vibration measurements, and acoustic measurements in response to receiving control data, via a transceiver such as transceiver 220, for example, in accordance with a long-range wireless communication protocol. The control data can indicate the power loss detection function, for example, as an identifier to a function stored in the function library 216, measurement thresholds for the power loss detection function, and/or can include the function definition for the power loss detection function. Step 1810 includes generating power loss detection data by performing the runtime function on the noise measurements, vibration measurements, and acoustic measurements. Step 1812 includes transmitting the power loss detection data to the gateway device via the transceiver, for example, in accordance with the long-range wireless communication protocol.

In various embodiments, the power loss detection data is transmitted to the gateway device in response to the power loss detection data indicating a powered-off condition of equipment in proximity to the multi-sensor unit. For example, the power loss detection data is not transmitted to the gateway device when the power loss detection data indicates a powered-on condition of equipment in proximity to the multi-sensor unit. In various embodiments, the power loss detection data includes a binary value indicating that either equipment in proximity to the multi-sensor unit is predicted to be powered on, or equipment in proximity to the multi-sensor unit is predicted to be powered off. In various embodiments, the power loss detection data includes a probability value indicating a probability that equipment in proximity to the multi-sensor unit is powered off.

In some embodiments, the monitoring system 100 monitors an indoor and/or outdoor facility that functions to grow plants or other agriculture. One or more functions of the function database can be a productivity function, which can generate one or more productivity metrics as a function of collected measurements in the facility. The productivity function can be performed for measurements collected by a single multi-sensor unit, by multiple multi-sensor units or other additional data sources in the same location, and/or by multiple multi-sensor units or other additional data sources across the facility, enabling productivity metrics to be tuned for particular multi-sensor units and/or particular locations, and/or to capture facility-wide productivity.

A productivity function can utilize surface temperature measurements collected by one or more surface temperature sensors, such as leaf surface temperature measurements and/or soil temperature measurements; light measurements such a luminous flux measurements or color temperature measurements collected by one or more light sensors; humidity measurements collected by one or more humidity sensors; ambient temperature measurements collected by a temperature sensor; atmospheric pressure measurements collected by a pressure sensor; vibration measurements and/or occupancy measurements, corresponding to detection of movements of the plants themselves, motion inducing conditions such as wind or other environmental conditions, and/or detection of human presence and/or human interaction with the plants and/or soil, collected by one or more motion sensors, gyroscopes, magnetometers, accelerometers, acoustic sensors, infrared sensors, and/or other sensors operable to detect vibration, motion and/or occupancy discussed herein; soil measurements captured by at least one soil sensor; noise measurements collected by an acoustic sensor; and/or any other measurements collected as discussed herein.

These sensors devices can be weighted higher in response to being utilized to generate productivity, where sensors that are not utilized to generate productivity data are weighted lower. The determined importance of these sensor devices in determining productivity over time can be further utilized to weight the sensors accordingly. Control data can be transmitted to the multi-sensor units over time indicating changes to sensor device weights and/or unit weights based on their respective monitoring worth in determining productivity.

The productivity function can utilize one or more synthetic measures as input, such as VPD measurements, instead of or in addition to the corresponding raw measurements. The productivity function can utilize other information such as various collected observation data via graphical user interface 190, measured and/or scheduled watering and/or light cycles applied to the plants, types of soil and/or fertilizer the plants are growing in, weather data, scheduled inspection by personnel, sifting of soil by personnel, pruning of plants by personnel, source of the seeds, genetic information for the plants, and/or other information regarding the treatment or tending of the plants as they are being grown. Some of the tending to the plants by personnel can be detected automatically based on vibration and/or occupancy measurements collected by the multi-sensor units 120.

In some embodiments, some or all soil sensors are additional data sources 170. In some embodiments, some or all of additional measurements are collected by at least one multi-sensor unit 120, such as the first type of multi-sensor unit 120. Some or all multi-sensor units can be installed in close proximity to the plants being grown in the facility, such as underneath the leaves of the plants, below the canopy of the plants, and/or sitting on the soil next to a stem of the plant. The installation of the multi-sensor unit 120 can ensure that the presence of the multi-sensor unit does not interfere with the growth of the plant or space occupied by the plant. This close proximity to the plants can facilitate the collection of leaf temperate measurements and/or measurement of motion of the plants.

The productivity function can generate a productivity metric utilizing some or all of this information. This can include comparing various measurements to corresponding measurement thresholds to generate binary values for some or all measurements, for example, where the productivity metric is less favorable in response to one or more measurements falling outside their corresponding measurement thresholds. These measurement thresholds can be set based on known and/or learned thresholds determined to correspond to a favorable level of productivity. This can include normalizing each measurements via a corresponding linear or non-linear, strictly increasing or strictly decreasing function; multiplying each normalized measurement by a respective pre-determined weight based on their relative importance, and summing these products to generate the productivity metric. This can include comparing the productivity metric to a productivity threshold and/or a plurality of thresholds to generate a binary value indicating whether or not the productivity metric is favorable, and/or quantizing the productivity metric to a corresponding quantized level of productivity.

An inference function can be trained based on historical data for previous measurements of the same and/or different types of plants in the same and/or different location of the same and/or different facility. Each feature vector of the training data can include raw and/or processed VPD measurements, surface temperature measurements, ambient temperature measurements, humidity measurements, noise measurements, vibration measurements, occupancy measurements, air pressure measurements, soil measurements, or other measurements in a single time, at multiple consecutive times, and/or averaged over a longer period of time.

The corresponding output of the training data can correspond resulting productivity of the plants whose conditions were monitored, which can be a function of a health of the plants, a growth rate of the plants, lifecycle time of the plants, a size of the plants, a quality of the plants, a yield of the plants, a customer satisfaction data associated with the plants, retail data indicating how many plants were sold, or other information indicating productivity of the plants. Some or all of this information can be received via additional data sources 170 and/or based on observations collected via user input to client device 160 in response to corresponding prompts to collect evaluative data based on user observation indicative of productivity.

The resulting inference function can be a regression function that outputs a predicted productivity metric a continuous value, and/or that outputs a discrete value indicating a predicted level of productivity and/or whether or not desired productivity is achieved.

The model can be trained and/or tuned over time, and/or different models can be trained utilizing the same and/or different types of input data. Accuracies across different models can be utilized to determine the best model to be utilized in predicting productivity. The final model can be utilized to automatically determine which types of input are most significant in determining productivity, which types of input measurements are most important in controlling productivity, which types of output measurements are most indicative of a corresponding productivity, and/or various cause and effect relationships between the various fields of the feature vector that induce positive and/or negative effects on productivity.

This information, and/or other analysis data generated based on applying statistical measurements functions and/or correlation functions to some or all of this information, can be further utilized to determine optimal conditions for some or all of these measurements, which can dictate measurement thresholds for some or all of the corresponding sensor data. This information can be utilized to determine various conditions of interest determined to negatively impact productivity, which can be utilized to generate detection functions performed by individual multi-sensor units and/or the monitoring data analysis system. This information can be utilized to determine and/or update unit weights and/or sensor weights of the multi-sensor units and their respective sensor devices, and can be utilized to generate control data to the multi-sensor units indicating the updated weights. This can also be utilized to configure alerts and/or to control equipment and/or instruct personnel to resolve and/or mitigate conditions that are learned to have a negative effect on productivity. This can further be utilized to postulate and/or determine other conditions that could be more optimal as default environmental conditions, and can be utilized to propose experiments that can be conducted to more scientifically ascertain how various measured conditions affect productivity, and whether or not corresponding control of these conditions should be adapted and/or adjusted in future operation of the facility.

Alternatively or in addition, produce produced by the growing of plants in the same or different part of the facility can be monitored as it is stored and/or further processed. This can be utilized to how storage, refinement, fermentation, and/or other post-harvesting processes performed on various produce in the facility is affected by various measurable conditions. For example, the fermentation time and/or barrel aging of wine time can be monitored in conjunction with the measurable conditions induced on the wine inside or outside tanks and/or barrels. The customer satisfaction and/or sales rates of various bottles sold that were prepared under different conditions can be utilized to postulate which measurable factors in growth of the grapes, fermentation of the grapes, and/or storage of wine in barrels are important in causing higher quality wine and/or higher sale of wine. This analysis can be utilized to conduct experiments for different varietals overtime in different stages of production and/or to determine optimal conditions and/or time periods for each step in production of wine or another produced good. Some or all of these optimal conditions can be adopted by the facility in response in future growth and/or production.

This can be further utilized to determine conditions that cause various produce to go bad and/or expire more quickly. This can also be utilized to predict the expiration time and/or amount of time until produce needs to be sold and/or consumed. This can also be utilized to determine optimal conditions for extending the time until expiration for as long as possible, allowing the facility to adopt these conditions to extend the shelf-life of their produce.

Figure 19:
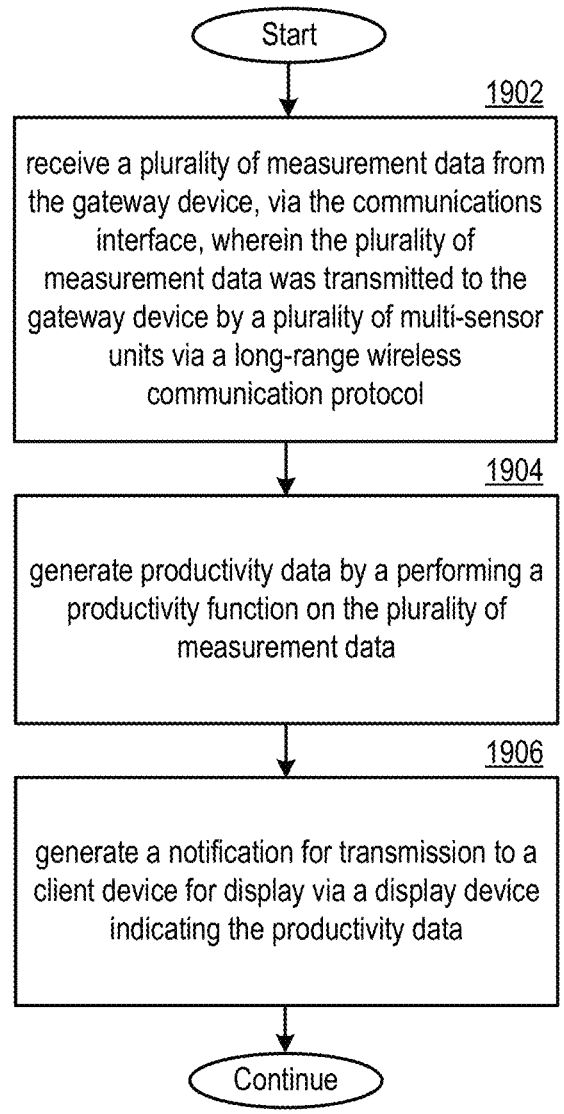

FIG. 19 illustrates a method for execution by a monitoring data analysis system 140 in accordance with various embodiments of the present invention. The monitoring data analysis system can include at least one processor, such as processing module 540 and a memory, such as memory module 510, that stores executable instructions that, when executed by the at least one processor, cause the monitoring data analysis system 140 to perform the steps illustrated in FIG. 19.

Step 1902 includes receiving a plurality of measurement data from the gateway device, via the communications interface. The plurality of measurement data can be transmitted to the gateway device by a plurality of multi-sensor units, for example, via a long-range wireless communication protocol. Some or all of the plurality of multi-sensor units Step 1904 includes generating productivity data by a performing a productivity function on the plurality of measurement data. For example, the productivity data can indicate a known and/or predicted level of favorability of the growth of the plants and/or a known and/or predicted level of favorability of the environmental conditions in the facility to optimally grow the plants. Step 1906 includes generating a notification for transmission to a client device for display via a display device indicating the productivity data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A monitoring data analysis system, comprising:
a network interface configured to communicate with a gateway device via a network and further configured to communicate with a client device via the network;
at least one processor; and
at least one memory that stores:
a measurement database that includes a plurality of measurement entries corresponding to time-series data, wherein each measurement entry of a subset of a plurality of subsets of the plurality of measurement entries indicates:
a sensor identifier indicating one of a plurality of sensor devices;
a measurement value indicating a value of one of a plurality of measurements collected by the one of the plurality of sensor devices; and
a timestamp indicating a time corresponding to collection of the one of the plurality of measurements; and
executable instructions that, when executed by the at least one processor, cause the monitoring data analysis system to:
receive a plurality of measurement data from the gateway device, via the network interface, wherein each of the plurality of measurement data indicates a measurement generated by one of a plurality of multi-sensor units, wherein a subset of a plurality of subsets of the plurality of sensor devices that includes multiples ones of the plurality of sensor devices are each of the subset of the plurality of subsets of the plurality of sensor devices mounted to a corresponding one of the plurality of multi-sensor units, and wherein each of a corresponding subset of a plurality of corresponding subsets of the plurality of measurement data was generated by a corresponding one of the subset of the plurality of subsets of the plurality of sensor devices;
generate a set of a plurality of sets of the plurality of measurement entries based on the plurality of measurement data, wherein the measurement value of each of the set of the plurality of sets of the measurement entries is populated based on the measurement of a corresponding one of the plurality of measurement data, and wherein the sensor identifier of the each of the set of the plurality of sets of the plurality of measurement entries is selected based on determining the corresponding one of the plurality of multi-sensor units, wherein a given subset of a set of the plurality of sets of the measurement entries is based on said each of the corresponding subset of the plurality of corresponding subsets of the plurality of measurement data;
add the set of the plurality of sets of the measurement entries to the measurement database as the measurement entries of the subset of the plurality of subsets of the plurality of measurement entries;
transmit, via the network interface, application data to the client device, wherein the client device includes at least one client processor and at least one client memory that stores application instructions corresponding to the application data that, when executed by the at least one client processor, cause the client device to display a graphical user interface via a display device of the client device;
receive from the client device, via the network interface, a custom function definition for a custom function, wherein the graphical user interface displays a prompt to enter the custom function definition, and wherein the custom function definition is entered via user input to the client device in response to the prompt;
generate custom function output by performing the custom function on a filtered subset of the plurality of measurement entries by utilizing the custom function definition;
transmit, via the network interface, the custom function output to the client device, wherein the custom function output is displayed via the graphical user interface.

2. The monitoring data analysis system of claim 1, wherein the measurement of said each of the plurality of measurement data is received by the gateway device, via a transceiver of the gateway device, from the corresponding one of the plurality of multi-sensor units in at least one data packet in accordance with a long-range wireless communication protocol.

3. The monitoring data analysis system of claim 1, wherein the each of the plurality of measurement data received from the gateway device further includes a sensor timestamp indicating a time that the measurement of the each of the plurality of measurement data was generated by the corresponding one of the plurality of multi-sensor units, and wherein generating the set of the measurement entries further includes populating the timestamp of each of the set of the measurement entries with the sensor timestamp indicated in the corresponding one of the plurality of measurement data.

4. The monitoring data analysis system of claim 1, wherein the subset of the plurality of subsets of the plurality of sensor devices are each of the subset of the plurality of subsets of the plurality of sensor devices mounted to a printed circuit board (PCB) of the corresponding one of the plurality of multi-sensor units, wherein each multi-sensor unit of the plurality of multi-sensor units includes the corresponding one of the subset of the plurality of subsets of the plurality of sensor devices all mounted to a corresponding PCB of the each multi-sensor unit, wherein the plurality of subsets of the plurality of sensor devices are mutually exclusive, wherein the sensor identifier of the each measurement entry of the subset of the plurality of measurement entries indicates a particular one of the plurality of multi-sensor units, and wherein the sensor identifier of the each measurement entry of the subset of the plurality of measurement entries further indicates a particular sensor device of the particular one of the plurality of multi-sensor units.

5. The monitoring data analysis system of claim 1, wherein the sensor identifier of said each measurement entry of the subset of the plurality of measurement entries indicates the one of the plurality of sensor devices corresponds to a sensor measurement type of a plurality of sensor measurement types and further indicates one of a plurality of sensor measurement units based on the sensor measurement type, wherein the measurement value of the plurality of measurement entries is in accordance with the sensor measurement units, and wherein the subset of the plurality of measurement entries indicate measurements generated by different types of sensor devices corresponding to the plurality of sensor measurement types.

6. The monitoring data analysis system of claim 1, wherein the at least one memory further stores a contextual database that includes a plurality of contextual data entries, wherein each of the plurality of contextual data entries indicates:
   sensor identifier data indicating the one of the plurality of sensor devices; and
   contextual data for the one of the plurality of sensor devices, indicating static data describing the one of the plurality of sensor devices in context of a facility that includes the plurality of sensor devices, wherein the facility includes an indoor portion, and wherein a set of contextual data entry of the plurality of contextual data entries corresponds to a set of multiple ones of the plurality of sensor devices located at different locations within of the indoor portion.

7. The monitoring data analysis system of claim 6, wherein the facility includes a plurality of plants growing in the facility based on the facility being an agricultural facility, wherein the contextual data of each contextual entry of a subset of the plurality of contextual data entries indicates at least one plant of the plurality of plants growing in the facility in proximity to the one of the plurality of sensor devices indicated by the sensor identifier data of the each contextual entry, and wherein each measurement value of measurement values of the subset of the plurality of measurement entries indicates productivity data relating to the at least one plant in proximity to the corresponding one of the subset of the plurality of sensor devices identified by a corresponding sensor identifier of the each of the subset of the plurality of measurement entries.

8. The monitoring data analysis system of claim 6, wherein the facility is bounded by bounds of the facility; wherein each of the plurality of contextual data entries indicates one of a plurality of locations within the facility to indicate where the one of the plurality of sensor devices identified in the sensor identifier data is located with respect to the facility within the bounds of the facility, and wherein the executable instructions, when executed by the at least one processor, further cause the monitoring data analysis system to:
   receive from the client device, via the network interface, location selection data indicating a localized region within the bounds of the facility;
   identify a location-based set of sensor identifiers corresponding to only ones of the plurality of sensor devices with corresponding contextual data entries indicating ones of the plurality of locations that are within the localized region indicated in the location selection data; and
   determine the filtered subset of the plurality of measurement entries based on selecting only ones of the plurality of measurement entries included in the location-based set of the sensor identifiers.

9. The monitoring data analysis system of claim 6, wherein the custom function output includes heat map data indicating measurements across the different locations with respect to the facility based on the contextual data of the contextual data entries for the sensor devices indicated in the filtered subset of the plurality of measurement entries, and wherein the heat map data is displayed via the graphical user interface in accordance with a visual rendering of the facility.

10. The monitoring data analysis system of claim 1, wherein the executable instructions, when executed by the at least one processor, further cause the monitoring data analysis system to:
   receive, via the network interface, a set of selected query filter parameters from the client device, wherein the graphical user interface displays the prompt to select at least one of a plurality of query filter parameter options, and wherein the set of selected query filter parameters are generated by the client device based on a user selection, via the user input to the client device, from the plurality of query filter parameter options in response to the prompt to select the at least one of the plurality of query filter parameter options;
   determine a query based on the set of selected query filter parameters; and
   execute the query against the measurement database to produce the filtered subset of the plurality of measurement entries, wherein the filtered subset of the plurality of measurement entries includes only ones of the plurality of measurement entries that satisfy the set of selected query filter parameters.

11. The monitoring data analysis system of claim 1, wherein the custom function output includes a plurality of synthetic measurement values generated from the filtered subset of the plurality of measurement entries, and wherein the executable instructions, when executed by the at least one processor, further cause the monitoring data analysis system to:
   generate a plurality of new measurement entries, wherein each of the plurality of new measurement entries is generated for a corresponding one of the plurality of synthetic measurement values, wherein a new timestamp of the each of the plurality of new measurement entries corresponds to a corresponding timestamp of one of the filtered subset of the plurality of measurement entries utilized to generate the corresponding one of the plurality of synthetic measurement values, wherein a corresponding sensor identifier of the each of the plurality of new measurement entries corresponds to the corresponding timestamp of one of the filtered subset of the plurality of measurement entries utilized to generate the corresponding one of the plurality of synthetic measurement values, and wherein a corresponding measurement value of the each of the plurality of new measurement entries indicates the corresponding one of the plurality of synthetic measurement values, and wherein the each of the plurality of new measurement entries further indicates an identifier of the custom function.

12. The monitoring data analysis system of claim 11, wherein the custom function utilizes at least two of the filtered subset of the plurality of measurement entries as input, and wherein the corresponding sensor identifier of the each of the plurality of new measurement entries further indicates corresponding sensor identifiers of the at least two of the filtered subset of the plurality of measurement entries.

13. The monitoring data analysis system of claim 1, wherein the at least one memory further stores a function library that includes a plurality of functions, wherein each of the plurality of functions, when performed on the plurality of measurement data of at least one entry of the measurement database, generates function output data;
wherein the executable instructions, when executed by the at least one processor, further cause the monitoring data analysis system to:
transmit, via the network interface, the application data to a second client device, wherein the second client device includes at least one second client processor and at least one second client memory that stores the application instructions corresponding to the application data that, when executed by the at least one second client processor, cause the second client device to display the graphical user interface via a second display device of the second client device;
receive from the second client device, via the network interface, a second custom function definition for a second custom function, wherein the graphical user interface displays the prompt to enter the second custom function definition, and wherein the second custom function definition is entered via the user input to the second client device in response to the prompt; and
add the second custom function to the function library based on the second custom function definition;
transmit to the second client device, via the network interface, function library information that indicates the plurality of functions, and wherein the second custom function definition is entered via the user input to the second client device to indicate use of the second custom function in performing the second custom function based on the function library information; and
add the second custom function to the function library based on the second custom function definition;
wherein performing the second custom function includes performing the second custom function by accessing the function library to generate output of the second custom function based on the second custom function definition, and wherein the custom function output is generated by processing the output of the second custom function in accordance with the second custom function definition.

14. The monitoring data analysis system of claim 1, wherein the filtered subset of the plurality of measurement entries include at least two measurements taken at different timestamps by a same sensor device, wherein the custom function output includes processed measurement data generated from the filtered subset of the plurality of measurement entries, and wherein the processed measurement data includes a statistical representation of measurement values of the filtered subset of the plurality of measurement entries within a time window bounded by a least recent timestamp of the filtered subset of the plurality of measurement entries and a most recent timestamp of the filtered subset of the plurality of measurement entries.

15. The monitoring data analysis system of claim 1, wherein the custom function corresponds to a training function, and wherein the executable instructions, when executed by the at least one processor, further cause the monitoring data analysis system to:
perform the training function by utilizing the filtered subset of the plurality of measurement entries as training data to generate the custom function output, wherein the custom function output indicates parameters of a trained machine learning model;
add a new function entry to a function library of the monitoring data analysis system by utilizing the parameters of the trained machine learning model;
receive an additional plurality of measurement data from the gateway device;
add additional measurement entries to the measurement database based on the additional plurality of measurement data;
perform an inference function on the additional measurement entries by utilizing the new function entry to generate inference data based on the additional plurality of measurement data; and
transmit, via the network interface, the inference data to the client device, wherein the inference data is displayed via the graphical user interface.

16. The monitoring data analysis system of claim 1, wherein the network interface is configured to receive second measurement data, via the network, from at least one additional data source that is distinct from the plurality of sensor devices, wherein the subset of the plurality of measurement entries is a first proper subset of the plurality of measurement entries, wherein a second proper subset of the plurality of measurement entries indicates the second measurement data received from the at least one additional data source, and wherein the filtered subset of the plurality of measurement entries utilized to perform the custom function includes at least one of the first proper subset of the plurality of measurement entries and further includes at least one of the second proper subset of the plurality of measurement entries.

17. The monitoring data analysis system of claim 1, wherein a function library of the monitoring data analysis system includes a vapor pressure deficit (VPD) measurement function, and wherein the executable instructions, when executed by the at least one processor, further cause the monitoring data analysis system to:
generate a set of VPD entries, wherein each VPD entry of the set of VPD entries is generated by:
identifying an air temperature entry in the measurement database with a corresponding measurement value that indicates an air temperature measurement captured by an air temperature sensor; identifying a surface temperature entry in the measurement database with a corresponding measurement value that indicates a surface temperature measurement captured by a surface temperature sensor;
identifying a humidity entry in the measurement database with a corresponding measurement value that indicates a humidity measurement captured by a humidity sensor, wherein the air temperature entry, the surface temperature entry, and the humidity entry are identified based on having respective timestamps that compare favorably to a threshold time interval;

performing the VPD function on the air temperature entry, the surface temperature entry, and the humidity entry to produce a VPD measurement value, wherein the each VPD entry indicates the VPD measurement value; and determining a VPD measurement timestamp for the each VPD entry based on at least one of: a timestamp of the air temperature entry, a timestamp of the surface temperature entry, or a timestamp of the humidity entry, wherein the each VPD entry indicates the VPD measurement timestamp; and add the set of VPD entries to the measurement database as new measurement entries to the plurality of measurement entries.

18. The monitoring data analysis system of claim 17, wherein the air temperature entry, the surface temperature entry, and the humidity entry utilized to generate said each VPD entry are identified based on having a corresponding sensor identifier indicating the one of the plurality of multi-sensor units, wherein the each VPD entry is generated to include the corresponding sensor identifier indicating the one of the plurality of multi-sensor units that includes the air temperature sensor, the surface temperature sensor, and the humidity sensor, and wherein the set of VPD entries identify different ones of the plurality of multi-sensor units that each include its own air temperature sensor, surface temperature sensor, and humidity sensor.

19. A method for execution by a monitoring data analysis system, comprising:

receiving a plurality of measurement data from a gateway device, wherein each of the plurality of measurement data indicates a measurement generated by a corresponding one of a plurality of multi-sensor units;

generating a set of a plurality of sets of a plurality of measurement entries based on the plurality of measurement data, wherein a measurement value of each of the set of the plurality of measurement entries is populated based on the measurement of a corresponding one of the plurality of measurement data, and wherein a sensor identifier of said each of the set of a plurality of measurement entries is selected based on determining the corresponding one of the plurality of multi-sensor units, wherein a subset of a plurality of subsets of a plurality of sensor devices that includes multiples ones of the plurality of sensor devices are each of the subset of the plurality of subsets of the plurality of sensor devices mounted to the corresponding one of the plurality of multi-sensor units, wherein each of a corresponding subset of a plurality of corresponding subsets of the plurality of measurement data was generated by a corresponding one of the subset of the plurality of sensor devices, and wherein a given subset of a set of the plurality of sets of the plurality of measurement entries is based on the corresponding subset of the plurality of measurement data;

adding the set of the plurality of sets of the plurality of measurement entries to a measurement database;

transmitting application data to a client device, wherein the client device includes at least one client processor and at least one client memory that stores application instructions corresponding to the application data that, when executed by the at least one client processor, cause the client device to display a graphical user interface via a display device of the client device;

receiving, from the client device, a custom function definition for a custom function, wherein the graphical user interface displays a prompt to enter the custom function definition, and wherein the custom function definition is entered via user input to the client device in response to the prompt;

generating custom function output by performing the custom function on a filtered subset of the plurality of measurement entries by utilizing the custom function definition; and transmitting the custom function output to the client device, wherein the custom function output is displayed via the graphical user interface.

20. A non-transitory computer readable storage medium comprises:

at least one memory section that stores operational instructions that, when executed by a processing module that includes a processor and a memory, causes the processing module to:

receive a plurality of measurement data from a gateway device, wherein each of the plurality of measurement data indicates a measurement generated by a corresponding one of a plurality of multi-sensor units, generate a set of a plurality of sets of a plurality of measurement entries based on the plurality of measurement data, wherein a measurement value of each of the set of the plurality of sets of the measurement entries is populated based on the measurement of a corresponding one of the plurality of measurement data, and wherein a sensor identifier of each of the set of the plurality of sets of the plurality of measurement entries is selected based on determining the corresponding one of the plurality of multi-sensor units, wherein a subset of a plurality of subsets of a plurality of sensor devices that includes multiples ones of the plurality of sensor devices are each of the subset of the plurality of subsets of the plurality of sensor devices mounted to the corresponding one of the plurality of multi-sensor units, wherein each of a corresponding subset of a plurality of corresponding subsets of the plurality of measurement data was generated by a corresponding one of the subset of the plurality of subsets of the plurality of sensor devices, and wherein a given subset of a set of the plurality of sets of the plurality of measurement entries is based on the corresponding subset of the plurality of measurement data;

add the set of the plurality of sets of the plurality of measurement entries to a measurement database;

transmit application data to a client device, wherein the client device includes at least one client processor and at least one client memory that stores application instructions corresponding to the application data that, when executed by the at least one client processor, cause the client device to display a graphical user interface via a display device of the client device;

receive, from the client device, a custom function definition for a custom function, wherein the graphical user interface displays a prompt to enter the custom function definition, and wherein the custom function definition is entered via user input to the client device in response to the prompt;

generate custom function output by performing the custom function on a filtered subset of the plurality of measurement entries by utilizing the custom function definition; and transmit the custom function output to the client device, wherein the custom function output is displayed via the graphical user interface.

\* \* \* \* \*